(12) United States Patent
Lee et al.

(10) Patent No.: US 11,631,158 B2
(45) Date of Patent: Apr. 18, 2023

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventors: Jinwon Lee, Seoul (KR); Sejin Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/182,933

(22) Filed: Feb. 23, 2021

(65) Prior Publication Data

US 2021/0295567 A1 Sep. 23, 2021

(30) Foreign Application Priority Data

Mar. 18, 2020 (KR) .................. 10-2020-0033414

(51) Int. Cl.
*G06T 3/40* (2006.01)
*G06T 9/00* (2006.01)
*G06T 17/20* (2006.01)

(52) U.S. Cl.
CPC .............. *G06T 3/40* (2013.01); *G06T 9/001* (2013.01); *G06T 17/205* (2013.01); *G06T 2207/20021* (2013.01)

(58) Field of Classification Search
None
See application file for complete search history.

(56) References Cited

U.S. PATENT DOCUMENTS

| 2003/0184555 | A1* | 10/2003 | Fraser | G06T 15/00 345/582 |
| 2014/0192151 | A1* | 7/2014 | Wang | H04N 5/919 348/43 |
| 2015/0110473 | A1* | 4/2015 | Wang | H04N 21/85406 386/341 |
| 2016/0071234 | A1* | 3/2016 | Lehtinen | G06T 15/10 345/420 |

(Continued)

FOREIGN PATENT DOCUMENTS

| KR | 1020130037996 | 4/2013 | |
| KR | 20190082065 A * | 7/2019 | G01S 17/89 |

(Continued)

OTHER PUBLICATIONS

"WD of ISO/IEC 23090-10 Carriage of PC data"—N18321—Apr. 12, 2019, pp. 1-16 (Year: 2019).*

(Continued)

*Primary Examiner* — Bernard Krasnic
(74) *Attorney, Agent, or Firm* — Fish & Richardson P.C.

(57) ABSTRACT

Disclosed herein is a transmitting method and a receiving method of point cloud data. The transmitting method may include encoding point cloud data, encapsulating a bitstream that includes the encoded point cloud data into a file, and transmitting the file, the point cloud data include at least geometry data, attribute data, or an occupancy map data, the bitstream is stored in multiple tracks of the file, the file further includes signaling data, and the signaling data include spatial region information of the point cloud data.

8 Claims, 54 Drawing Sheets

(56) References Cited

U.S. PATENT DOCUMENTS

| | | | |
|---|---|---|---|
| 2016/0086353 A1* | 3/2016 | Lukac | G06T 9/00 |
| | | | 345/419 |
| 2019/0080483 A1 | 3/2019 | Mammou et al. | |
| 2019/0087979 A1* | 3/2019 | Mammou | G06T 9/001 |
| 2019/0156518 A1* | 5/2019 | Mammou | G06T 7/0002 |
| 2019/0197739 A1* | 6/2019 | Sinharoy | G06T 3/4007 |
| 2019/0318488 A1 | 10/2019 | Lim et al. | |
| 2020/0302632 A1* | 9/2020 | Oh | G06T 7/187 |
| 2020/0304834 A1* | 9/2020 | Wang | H04N 21/83 |
| 2021/0029187 A1* | 1/2021 | Oh | H03M 7/3062 |
| 2021/0105313 A1* | 4/2021 | Wang | H04L 65/80 |
| 2021/0112236 A1* | 4/2021 | Fleureau | H04N 21/8451 |
| 2021/0281879 A1* | 9/2021 | Roimela | H04N 21/85406 |
| 2021/0287405 A1* | 9/2021 | Lim | G06K 9/00 |
| 2022/0051443 A1* | 2/2022 | Hamza | H04N 19/70 |

FOREIGN PATENT DOCUMENTS

| | | | | |
|---|---|---|---|---|
| KR | 1020190100096 | | 8/2019 | |
| KR | 1020190105011 | | 9/2019 | |
| WO | WO-2019079032 A1 * | 4/2019 | | H04N 21/816 |
| WO | WO-2019191205 A1 * | 10/2019 | | H04N 21/85406 |

OTHER PUBLICATIONS

"Continuous improvementof Study Text of ISO/IEC CD 23090-5 Video-based Point Cloud Compression"—N18479—May 8, 2019, pp. 1-140 (Year: 2019).*

Khaled Mammou et al "G-PCC codec description v2" ISO/IEC JTC1/SC29/WG11, N18189, Jan. 2019. See abstract, section 2 and section 3. (Year: 2019).*

"Draft Text of IS0/IEC DIS 23090-10 Carriage of Video-based Point Cloud Compression Data"—ISO/IEC JTC 1/SC 29/WG 11 N19066—Feb. 21, 2020, pp. 1-46 (Year: 2020).*

3DG, "PCC Test Model Categoty 2 v0," ISO/IEC JTC1/SC29/WG11, N17248, Macau, China, dated Oct. 2017, 12 pages.

PCT International Search Report and Written Opinion in International Appln. No. PCT/KR2021/000694, dated May 4, 2021, 18 pages (with English translation).

Shao et al., "G-PCC TMC13 CE13.2 report on point cloud tile and slice based coding," ISO/IEC JTC1/SC29/WG11 MPEG2018/m45867, International Organisation for Standardisation, Presented at Marrakech, Morocco, Jan. 2019, 11 pages.

Notice of allowance in Korean Appln. No. 10-2021-0007283, dated Mar. 19, 2022, 3 pages (with English translation).

* cited by examiner

FIG. 27

| sample_stream_vpcc_header() { | Descriptor |
|---|---|
| ssvh_unit_size_precision_bytes_minus1 | u(3) |
| ssvh_reserved_zero_5bits | u(5) |
| } | |

FIG. 28

| sample_stream_vpcc_unit() { | Descriptor |
|---|---|
| ssvu_vpcc_unit_size | u(v) |
| vpcc_unit(ssvu_vpcc_unit_size ) | |
| } | |

FIG. 29

| vpcc_unit( numBytesInVPCCUnit) { | Descriptor |
|---|---|
| vpcc_unit_header( ) | |
| vpcc_unit_payload( ) | |
| while( more_data_in_vpcc_unit ) | |
| trailing_zero_8bits /* equal to 0x00 */ | f(8) |
| } | |

FIG. 30

| vpcc_unit_header( ) { | Descriptor |
|---|---|
|     vuh_unit_type | u(5) |
|     if( vuh_unit_type == VPCC_AVD \|\| vuh_unit_type == VPCC_GVD \|\|<br>            vuh_unit_type == VPCC_OVD \|\| vuh_unit_type == VPCC_AD ) { | |
|         vuh_vpcc_parameter_set_id | u(4) |
|         vuh_atlas_id | u(6) |
|     } | |
|     if( vuh_unit_type == VPCC_AVD ) { | |
|         vuh_attribute_index | u(7) |
|         vuh_attribute_dimension_index | u(5) |
|         vuh_map_index | u(4) |
|         vuh_raw_video_flag | u(1) |
|     } else if( vuh_unit_type == VPCC_GVD ) { | |
|         vuh_map_index | u(4) |
|         vuh_raw_video_flag | u(1) |
|         vuh_reserved_zero_12bits | u(12) |
|     } else if( vuh_unit_type == VPCC_OVD \|\| vuh_unit_type == VPCC_AD ) | |
|         vuh_reserved_zero_17bits | u(17) |
|     else | |
|         vuh_reserved_zero_27bits | u(27) |
| } | |

FIG. 31

| vuh_unit_type | Identifier | V-PCC Unit Type | Description |
|---|---|---|---|
| 0 | VPCC_VPS | V-PCC parameter set | V-PCC level parameters |
| 1 | VPCC_AD | Atlas data | Atlas information |
| 2 | VPCC_OVD | Occupancy Video Data | Occupancy information |
| 3 | VPCC_GVD | Geometry Video Data | Geometry information |
| 4 | VPCC_AVD | Attribute Video Data | Attribute information |
| 5...31 | VPCC_RSVD | Reserved | - |

FIG. 32

| vpcc_unit_payload( ) { | Descriptor |
|---|---|
|     if( vuh_unit_type == VPCC_VPS ) | |
|         vpcc_parameter_set( ) | |
|     else if( vuh_unit_type == VPCC_AD ) | |
|         atlas_sub_bitstream( ) | |
|     else if( vuh_unit_type == VPCC_OVD \|\| | |
|         vuh_unit_type == VPCC_GVD \|\| | |
|         vuh_unit_type == VPCC_AVD) | |
|         video_sub_bitstream( ) | |
| } | |

FIG. 33

| vpcc_parameter_set( ) { | Descriptor |
|---|---|
|   profile_tier_level() | |
|   vps_vpcc_parameter_set_id | u(4) |
|   sps_bounding_box_present_flag | u(1) |
|   if( sps_bounding_box_present_flag ) { | |
|     sps_bounding_box_offset_x | se(v) |
|     sps_bounding_box_offset_y | se(v) |
|     sps_bounding_box_offset_z | se(v) |
|     sps_bounding_box_size_width | ue(v) |
|     sps_bounding_box_size_height | ue(v) |
|     sps_bounding_box_size_depth | ue(v) |
|     sps_bounding_box_changed_flag | u(1) |
|     sps_bounding_box_info_flag | u(1) |
|   } | |
|   vps_atlas_count_minus1 | u(6) |
|   for(j = 0; j < vps_atlas_count_minus1 + 1; j++ ) { | |
|     vps_frame_width[ j ] | u(16) |
|     vps_frame_height[ j ] | u(16) |
|     vps_map_count_minus1[ j ] | u(4) |
|     if( vps_map_count_minus1[ j ] > 0 ) | |
|       vps_multiple_map_streams_present_flag[ j ] | u(1) |
|     vps_map_absolute_coding_enabled_flag[ j ][ 0 ] = 1 | |
|     for( i = 1; i <= vps_map_count_minus1[ j ]; i++ ) { | |
|       if( vps_multiple_map_streams_present_flag[ j ] ) | |
|         vps_map_absolute_coding_enabled_flag[ j ][ i ] | u(1) |
|       else | |
|         vps_map_absolute_coding_enabled_flag[ j ][ i ] = 1 | |
|       if( vps_map_absolute_coding_enabled_flag[ j ][ i ] == 0 ) { | |
|         if( i > 0 ) | |
|           vps_map_predictor_index_diff[ j ][ i ] | ue(v) |
|         else | |
|           vps_map_predictor_index_diff[ j ][ i ] = 0 | |
|       } | |
|     } | |
|     vps_raw_patch_enabled_flag[ j ] | u(1) |
|     if( vps_raw_patch_enabled_flag[ j ] ) | |
|       vps_raw_separate_video_present_flag[ j ] | u(1) |
|     occupancy_information( j ) | |
|     geometry_information( j ) | |
|     attribute_information( j ) | |
|   } | |
|   byte_alignment( ) | |
| } | |

FIG. 35

| sample_stream_nal_header() { | Descriptor |
|---|---|
| ssnh_unit_size_precision_bytes_minus1 | u(3) |
| ssnh_reserved_zero_5bits | u(5) |
| } | |

FIG. 36

| sample_stream_nal_unit() { | Descriptor |
|---|---|
|     ssnu_nal_unit_size | u(v) |
|     nal_unit(ssnu_nal_unit_size) | |
| } | |

FIG. 37

| atlas_sequence_parameter_set_rbsp( ) { | Descriptor |
|---|---|
|     asps_atlas_sequence_parameter_set_id | ue(v) |
|     asps_frame_width | u(16) |
|     asps_frame_height | u(16) |
|     asps_log2_patch_packing_block_size | u(3) |
|     asps_log2_max_atlas_frame_order_cnt_lsb_minus4 | ue(v) |
|     asps_max_dec_atlas_frame_buffering_minus1 | ue(v) |
|     asps_long_term_ref_atlas_frames_flag | u(1) |
|     asps_num_ref_atlas_frame_lists_in_asps | ue(v) |
|     for( i = 0; i < asps_num_ref_atlas_frame_lists_in_asps; i++ ) | |
|         ref_list_struct( i ) | |
|     asps_use_eight_orientations_flag | u(1) |
|     asps_45degree_projection_patch_present_flag | u(1) |
|     asps_normal_axis_limits_quantization_enabled_flag | u(1) |
|     asps_normal_axis_max_delta_value_enabled_flag | u(1) |
|     asps_remove_duplicate_point_enabled_flag | u(1) |
|     asps_pixel_deinterleaving_flag | u(1) |
|     asps_patch_precedence_order_flag | u(1) |
|     asps_patch_size_quantizer_present_flag | u(1) |
|     asps_enhanced_occupancy_map_for_depth_flag | u(1) |
|     asps_point_local_reconstruction_enabled_flag | u(1) |
|     if( asps_enhanced_occupancy_map_for_depth_flag \|\| | |
|         asps_point_local_reconstruction_enabled_flag ) | |
|         asps_map_count_minus1 | u(4) |
|     if( asps_enhanced_occupancy_map_for_depth_flag && asps_map_count_minus1 == 0 ) | |
|         asps_enhanced_occupancy_map_fix_bit_count_minus1 | u(4) |
|     if( asps_point_local_reconstruction_enabled_flag ) | |
|         asps_point_local_reconstruction_information( asps_map_count_minus1 ) | |
|     if( asps_pixel_interleaving_flag \|\| asps_point_local_reconstruction_enabled_flag ) | |
|         asps_surface_thickness_minus1 | u(8) |
|     asps_vui_parameters_present_flag | u(1) |
|     if( asps_vui_parameters_present_flag ) | |
|         vui_parameters( ) | |
|     rbsp_trailing_bits( ) | |
| } | |

FIG. 38

| atlas_frame_parameter_set_rbsp( ) { | Descriptor |
|---|---|
|     afps_atlas_frame_parameter_set_id | ue(v) |
|     afps_atlas_sequence_parameter_set_id | ue(v) |
|     atlas_frame_tile_information( ) | |
|     afps_num_ref_idx_default_active_minus1 | ue(v) |
|     afps_additional_lt_afoc_lsb_len | ue(v) |
|     afps_2d_pos_x_bit_count_minus1 | u(4) |
|     afps_2d_pos_y_bit_count_minus1 | u(4) |
|     afps_3d_pos_x_bit_count_minus1 | u(5) |
|     afps_3d_pos_y_bit_count_minus1 | u(5) |
|     afps_lod_bit_count | u(5) |
|     afps_override_eom_for_depth_flag | u(1) |
|     if( afps_override_eom_for_depth_flag ) { | |
|         afps_eom_number_of_patch_bit_count_minus1 | u(4) |
|         afps_eom_max_bit_count_minus1 | u(4) |
|     } | |
|     afps_raw_3d_pos_bit_count_explicit_mode_flag | u(1) |
|     rbsp_trailing_bits( ) | |
| } | |

FIG. 39

| atlas_frame_tile_information( ) { | Descriptor |
|---|---|
|   afti_single_tile_in_atlas_frame_flag | u(1) |
|   if( !afti_single_tile_in_atlas_frame_flag ) { | |
|     afti_uniform_tile_spacing_flag | u(1) |
|     if( afti_uniform_tile_spacing_flag ) { | |
|       afti_tile_cols_width_minus1 | ue(v) |
|       afti_tile_rows_height_minus1 | ue(v) |
|     } else { | |
|       afti_num_tile_columns_minus1 | ue(v) |
|       afti_num_tile_rows_minus1 | ue(v) |
|       for( i = 0; i < afti_num_tile_columns_minus1; i++ ) | |
|         afti_tile_column_width_minus1[ i ] | ue(v) |
|       for( i = 0; i < afti_num_tile_rows_minus1; i++ ) | |
|         afti_tile_row_height_minus1[ i ] | ue(v) |
|     } | |
|     afti_num_tiles_in_atlas_frame_minus1 | ue(v) |
|     for( i = 0; i < afti_num_tile_groups_in_atlas_frame_minus1 + 1; i++ ) | |
|       afti_tile_idx[i] | u(v) |
|     afti_single_tile_per_tile_group_flag | u(1) |
|     if( !afti_single_tile_per_tile_group_flag ) { | |
|       afti_num_tile_groups_in_atlas_frame_minus1 | ue(v) |
|       for( i = 0; i < afti_num_tile_groups_in_atlas_frame_minus1 + 1; i++ ) { | |
|         if( i > 0 ) | |
|           afti_top_left_tile_idx[ i ] | u(v) |
|           afti_bottom_right_tile_idx_delta[ i ] | u(v) |
|       } | |
|     } | |
|     afti_signalled_tile_group_id_flag | u(1) |
|     if( afti_signalled_tile_group_id_flag ) { | |
|       afti_signalled_tile_group_id_length_minus1 | ue(v) |
|       for( i = 0; i < afti_num_tile_groups_in_atlas_frame_minus1 + 1; i++ ) | |
|         afti_tile_group_id[ i ] | u(v) |
|     } | |
|   } | |
| } | |

FIG. 40

```
sei_payload( payloadType, payloadSize ) {
    if( psd_unit_type == PSD_PREFIX_SEI ) {
        if( payloadType == 0 )
            buffering_period( payloadSize )
        else if( payloadType == 1 )
            pic_timing( payloadSize )
        else if( payloadType == 2 )
            filler_payload( payloadSize )
        else if( payloadType == 3 )
            user_data_registered_itu_t_t35( payloadSize )
        else if( payloadType == 4 )
            user_data_unregistered( payloadSize )
        else if( payloadType == 5 )
            recovery_point( payloadSize )
        else if( payloadType == 6 )
            no_display( payloadSize )
        else if( payloadType == 7 )
            time_code( payloadSize )
        else if( payloadType == 8 )
            regional_nesting( payloadSize )
        else if( payloadType == 9 )
            sei_manifest( payloadSize )
        else if( payloadType == 10 )
            sei_prefix_indication( payloadSize )
        else if( payloadType == 11 )
            geometry_transformation_params( payloadSize )
        else if( payloadType == 12 )
            3d_bounding_box_info( payloadSize )
        else if( payloadType == 13 )
            3d_region_mapping( payloadSize )
        else
            reserved_sei_message( payloadSize )
    }
    else { /* psd_unit_type == PSD_SUFFIX_SEI */
        if( payloadType == 2 )
            filler_payload( payloadSize )
        else if( payloadType == 3 )
            user_data_registered_itu_t_t35( payloadSize )
        else if( payloadType == 4 )
            user_data_unregistered( payloadSize )
        else if( payloadType == 11 )
            decoded_pcc_hash( payloadSize )
        else
            reserved_sei_message( payloadSize )
    }
    if( more_data_in_payload( ) ) {
        if( payload_extension_present( ) )
            sp_reserved_payload_extension_data
        byte_alignment( )
    }
}
```

FIG. 41

| 3d_bounding_box_info( payloadSize ) { | Descriptor |
|---|---|
|     3dbi_cancel_flag | u(1) |
| if (!3dbi_cancel_flag) { | |
|     object_id | ue(v) |
|     3d_bounding_box_x | se(v) |
|     3d_bounding_box_y | se(v) |
|     3d_bounding_box_z | se(v) |
|     3d_bounding_box_delta_x | ue(v) |
|     3d_bounding_box_delta_y | ue(v) |
|     3d_bounding_box_delta_z | ue(v) |
| } | |

FIG. 42

| | Descriptor |
|---|---|
| 3d_region_mapping_info( payloadSize ) { | |
|   3dmi_cancel_flag | u(1) |
|   if (!3dmi_cancel_flag) { | |
|     num_3d_regions | ue(v) |
|     for(i=0; i<num_3d_regions;i++){ | |
|       3d_region_idx[i] | |
|       3d_region_anchor_x[i] | se(v) |
|       3d_region_anchor_y[i] | se(v) |
|       3d_region_anchor_z[i] | se(v) |
|       3d_region_type[i] | |
|       if (3d_region_type == '1') {. //cuboid | |
|         3d_region_delta_x[i] | ue(v) |
|         3d_region_delta_y[i] | ue(v) |
|         3d_region_delta_z[i] | ue(v) |
|       } | |
|       num_2d_regions [i] | ue(v) |
|       for(j=0; j < num_2d_regions [i]; j++){ | |
|         2d_region_idx [j] | |
|         2d_region_top [j] | se(v) |
|         2d_region_left [j] | se(v) |
|         2d_region_width [j] | ue(v) |
|         2d_region_height [j] | ue(v) |
|         num_tiles[j] | ue(v) |
|         for (k=0; k < num_tiles [j] ; k++) | |
|           tile_idx[k] | ue(v) |
|         num_tile_groups[j] | ue(v) |
|         for (m=0; m < num_tile_groups[j]; m++) | |
|           tile_group_idx[m] | ue(v) |
|       } | |
|     } | |
|   } | |
| } | |

FIG. 43

| volumetric_tiling_info( payloadSize ) { | Descriptor |
|---|---|
|     vti_cancel_flag | u(1) |
|     if (!vti_cancel_flag) { | |
|         vti_object_label_present_flag | u(1) |
|         vti_3d_bounding_box_present_flag | u(1) |
|         vti_object_priority_present_flag | u(1) |
|         vti_object_hidden_present_flag | u(1) |
|         vti_object_collision_shape_present_flag | u(1) |
|         vti_object_dependency_present_flag | u(1) |
|         if( vti_object_label_present_flag ) | |
|             volumetric_tiling_info_labels( ) | |
|         if (vti_3d_bounding_box_present_flag) { | |
|             vti_bounding_box_scale_log2 | u(5) |
|             vti_3d_bounding_box_scale_log2 | u(5) |
|             vti_3d_bounding_box_precision_minus8 | u(5) |
|         } | |
|         volumetric_tiling_info_objects( vti_object_label_present_flag, vti_3d_bounding_box_present_flag, vti_object_priority_present_flag, vti_object_hidden_present_flag, vti_object_collision_shape_present_flag, vti_object_dependency_present_flag ) | |
|     } | |
| } | |

FIG. 44

| volumetric_tiling_info_labels( ) { | Descriptor |
|---|---|
|     vti_object_label_language_present_flag | u(1) |
|     if( vti_object_label_language_present_flag ) { | |
|         while( !byte_aligned( ) ) | |
|             vti_bit_equal_to_zero /* equal to 0 */ | f(1) |
|         vti_object_label_language | st(v) |
|     } | |
|     vti_num_object_label_updates | ue(v) |
|     for( i = 0; i < vti_num_object_label_updates ; i++ ) { | |
|         vti_label_idx[ i ] | ue(v) |
|         vti_label_cancel_flag | u(1) |
|         LabelAssigned[ vti_label_idx[ i ] ] = !vti_label_cancel_flag | |
|         if ( !vti_label_cancel_flag) { | |
|             while( !byte_aligned( ) ) | |
|                 vti_bit_equal_to_zero /* equal to 0 */ | f(1) |
|             vti_label[ vti_label_idx[ i ] ] | st(v) |
|         } | |
|     } | |
| } | |

FIG. 45

| | |
|---|---|
| volumetric_tiling_info_objects( vtiObjectLabelPresentFlag, vti3dBoundingBoxPresentFlag, vtiObjectPriorityPresentFlag, vtiObjectHiddenPresentFlag, vtiObjectCollisionShapePresentFlag, vtiObjectDependencyPresentFlag ) { | |
| vti_num_object_updates | ue(v) |
| for( i = 0; i <= vti_num_object_updates; i++ ) { | |
|   vti_object_idx[ i ] | ue(v) |
|   vti_num_object_tile_groups[ i ] | ue(v) |
|   for(k=0; k < vti_num_object_tile_groups; k++) { | |
|     vti_object_tile_group_id[k] | |
|   } | |
|   vti_object_cancel_flag[ vti_object_idx[ i ] ] | u(1) |
|   ObjectTracked[vti_object_idx[ i ] ] = ! vti_object_cancel_flag[ vti_object_idx[ i ] ] | |
|   if (!vti_object_cancel_flag[ vti_object_idx[ i ] ] ) { | |
|     vti_bounding_box_update_flag[ vti_object_idx[ i ] ] | u(1) |
|     if ( vti_bounding_box_update_flag[ vti_object_idx[ i ] ] ) { | |
|       vti_bounding_box_top[ vti_object_idx[ i ] ] | u(v) |
|       vti_bounding_box_left[ vti_object_idx[ i ] ] | u(v) |
|       vti_bounding_box_width[ vti_object_idx[ i ] ] | u(v) |
|       vti_bounding_box_height[ vti_object_idx[ i ] ] | u(v) |
|     } | |
|     if (vti3dBoundingBoxPresentFlag) { | |
|       vti_3d_bounding_box_update_flag[ vti_object_idx[ i ] ] | u(1) |
|       if( vti_3d_bounding_box_update_flag[ vti_object_idx[ i ] ] ) { | |
|         vti_3d_bounding_box_x[ vti_object_idx[ i ] ] | u(v) |
|         vti_3d_bounding_box_y[ vti_object_idx[ i ] ] | u(v) |
|         vti_3d_bounding_box_z[ vti_object_idx[ i ] ] | u(v) |
|         vti_3d_bounding_box_delta_x[ vti_object_idx[ i ] ] | u(v) |
|         vti_3d_bounding_box_delta_y[ vti_object_idx[ i ] ] | u(v) |
|         vti_3d_bounding_box_delta_z[ vti_object_idx[ i ] ] | u(v) |
|       } | |
|     } | |
|     if( vtiObjectPriorityPresentFlag ) { | |
|       vti_object_priority_update_flag[ vti_object_idx[ i ] ] | u(1) |
|       if( vti_object_priority_update_flag[ vti_object_idx[ i ] ] ) | |
|         vti_object_priority_value[ vti_object_idx[ i ] ] | u(4) |
|     } | |
|     if( vtiObjectHiddenPresentFlag ) | |
|       vti_object_hidden_flag[ vti_object_idx[ i ] ] | u(1) |
|     if( vtiObjectLabelPresentFlag ) { | |
|       vti_object_label_update_flag[ vti_object_idx[ i ] ] | u(1) |
|       if (vti_object_label_update_flag[ vti_object_idx[ i ] ]) | |
|         vti_object_label_idx[ vti_object_idx[ i ] ] | ue(v) |
|     } | |
|     if( vtiObjectCollisionShapePresentFlag ) { | |
|       vti_object_collision_shape_update_flag[ vti_object_idx[ i ] ] | u(1) |
|       if (vti_object_collision_shape_update_flag[ vti_object_idx[ i ] ]) | |
|         vti_object_collision_shape_id[ vti_object_idx[ i ] ] | u(16) |
|     } | |
|     if(vtiObjectDependencyPresentFlag ) { | |
|       vti_object_dependency_update_flag[ vti_object_idx[ i ] ] | u(1) |
|       if (vti_object_dependency_update_flag[ vti_object_idx[ i ] ]) { | |
|         vti_object_num_dependencies[ vti_object_idx[ i ] ] | u(4) |
|         for( j = 0; j < vti_object_num_dependencies[ vti_object_idx[ i ] ]; j++) | |
|           vti_object_dependency_idx[ vti_object_idx[ i ] ][ j ] | u(8) |
|       } | |
|     } | |
|   } | |
| } | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATION

This application claims the benefit of Korean Patent Application No. 10-2020-0033414, filed on Mar. 18, 2020, which is hereby incorporated by reference as if fully set forth herein.

TECHNICAL FIELD

Embodiments provide a method for providing point cloud contents to provide a user with various services such as virtual reality (VR), augmented reality (AR), mixed reality (MR), and autonomous driving services.

BACKGROUND

A point cloud is a set of points in a three-dimensional (3D) space. It is difficult to generate point cloud data because the number of points in the 3D space is large.

A large throughput is required to transmit and receive data of a point cloud.

SUMMARY

An object of the present disclosure is to provide a point cloud data transmission device, a point cloud data transmission method, a point cloud data reception device, and a point cloud data reception method for efficiently transmitting and receiving a point cloud.

Another object of the present disclosure is to provide a point cloud data transmission device, a point cloud data transmission method, a point cloud data reception device, and a point cloud data reception method for addressing latency and encoding/decoding complexity.

Another object of the present disclosure is to provide a point cloud data transmission device, a point cloud data transmission method, a point cloud data reception device, and a point cloud data reception method for providing optimized point cloud content to a user by signaling viewport related information of the point cloud data.

Another object of the present disclosure is to provide a point cloud data transmission device, a point cloud data transmission method, a point cloud data reception device, and a point cloud data reception method for providing optimized point cloud content to a user by allowing viewport information, recommended viewport information, and initial viewing orientation (i.e., viewpoint) for data processing and rendering in a V-PCC bitstream to be transmitted in a bitstream.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of transmitting point cloud data may include encoding point cloud data, encapsulating a bitstream that includes the encoded point cloud data into a file, and transmitting the file.

According to embodiments, the point cloud data may include at least geometry data, attribute data, or an occupancy map data, the bitstream may be stored in multiple tracks of the file, the file may further include signaling data, and the signaling data may include spatial region information of the point cloud data.

According to embodiments, the point cloud data may be divided into one or more 3 dimension (3D) spatial regions, and the spatial region information may include at least identification information for identifying each 3D spatial region or position information of an anchor point of each 3D spatial region.

According to embodiments, the spatial region information may signaled in at least a sample entry of a track that carries some or all of the signaling information or a sample of a metadata track associated with the track.

According to embodiments, the spatial region information signaled in the sample entry may further include tile identification information for identifying one or more tiles related to the each 3D spatial region.

According to embodiments, the sample may further include priority information and dependency information that are related to a 3D spatial region.

According to embodiments, a point cloud data transmission apparatus may include an encoder to encode point cloud data, an encapsulator to encapsulate a bitstream that includes the encoded point cloud data into a file, and a transmitter to transmit the file.

According to embodiments, the point cloud data may include at least geometry data, attribute data, or an occupancy map data, the bitstream may be stored in multiple tracks of the file, the file may further include signaling data, and the signaling data may include spatial region information of the point cloud data.

According to embodiments, the point cloud data may be divided into one or more 3 dimension (3D) spatial regions and the spatial region information may include at least identification information for identifying each 3D spatial region or position information of an anchor point of each 3D spatial region.

According to embodiments, the spatial region information may be signaled in at least a sample entry of a track that carries some or all of the signaling information or a sample of a metadata track associated with the track.

According to embodiments, the spatial region information signaled in the sample entry may further include tile identification information for identifying one or more tiles related to the each 3D spatial region.

According to embodiments, the sample may further include priority information and dependency information that are related to 3D spatial region.

According to embodiments, a point cloud data reception apparatus may include a receiver to receive a file, a decapsulator to decapsulate the file into a bitstream that includes point cloud data, the bitstream is stored in multiple tracks of the file and the file further includes signaling data, a decoder to decode the point cloud data based on the signaling data, and a renderer to render the decoded point cloud data based on the signaling data.

According to embodiments, the point cloud data may include at least geometry data, attribute data, or an occupancy map data and the signaling data may include spatial region information of the point cloud data.

According to embodiments, the point cloud data may be divided into one or more 3 dimension (3D) spatial regions and the spatial region information may include at least identification information for identifying each 3D spatial region or position information of an anchor point of each 3D spatial region.

According to embodiments, the spatial region information may be signaled in at least a sample entry of a track that carries some or all of the signaling information or a sample of a metadata track associated with the track.

According to embodiments, the spatial region information signaled in the sample entry may further include tile identification information for identifying one or more tiles related to the each 3D spatial region.

According to embodiments, the sample may further include priority information and dependency information that are related to 3D spatial region.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 27 illustrates an exemplary syntax structure of a sample stream V-PCC header included in a V-PCC bitstream according to embodiments;

FIG. 28 illustrates an exemplary syntax structure of a sample stream V-PCC unit according to embodiments;

FIG. 29 illustrates an exemplary syntax structure of a V-PCC unit according to embodiments;

FIG. 30 illustrates an exemplary syntax structure of a V-PCC unit header according to embodiments;

FIG. 31 illustrates an exemplary type of a V-PCC unit allocated to a vuh_unit_type field according to embodiments;

FIG. 32 illustrates an exemplary syntax structure of a V-PCC unit payload according to embodiments;

FIG. 33 illustrates an exemplary syntax structure of a V-PCC parameter set according to embodiments;

FIG. 35 illustrates an exemplary syntax structure of a sample stream NAL header included in an atlas substream according to embodiments;

FIG. 36 illustrates an exemplary syntax structure of a sample stream NAL unit according to embodiments;

FIG. 37 illustrates an exemplary syntax structure of atlas_sequence_parameter_set according to embodiments;

FIG. 38 illustrates an exemplary syntax structure of an atlas frame parameter set according to embodiments;

FIG. 39 illustrates an exemplary syntax structure of atlas_frame_tile_information according to embodiments;

FIG. 40 illustrates an exemplary syntax structure of supplemental enhancement information (SEI) according to embodiments;

FIG. 41 illustrates an exemplary syntax structure of 3D bounding box information SEI according to embodiments;

FIG. 42 illustrates an exemplary syntax structure of 3D region mapping information SEI according to embodiments;

FIG. 43 illustrates an exemplary syntax structure of volumetric tiling information SEI according to embodiments;

FIG. 44 illustrates an exemplary syntax structure of volumetric tiling information labels information according to embodiments;

FIG. 45 illustrates an exemplary syntax structure of volumetric tiling information objects information according to embodiments;

DETAILED DESCRIPTION

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
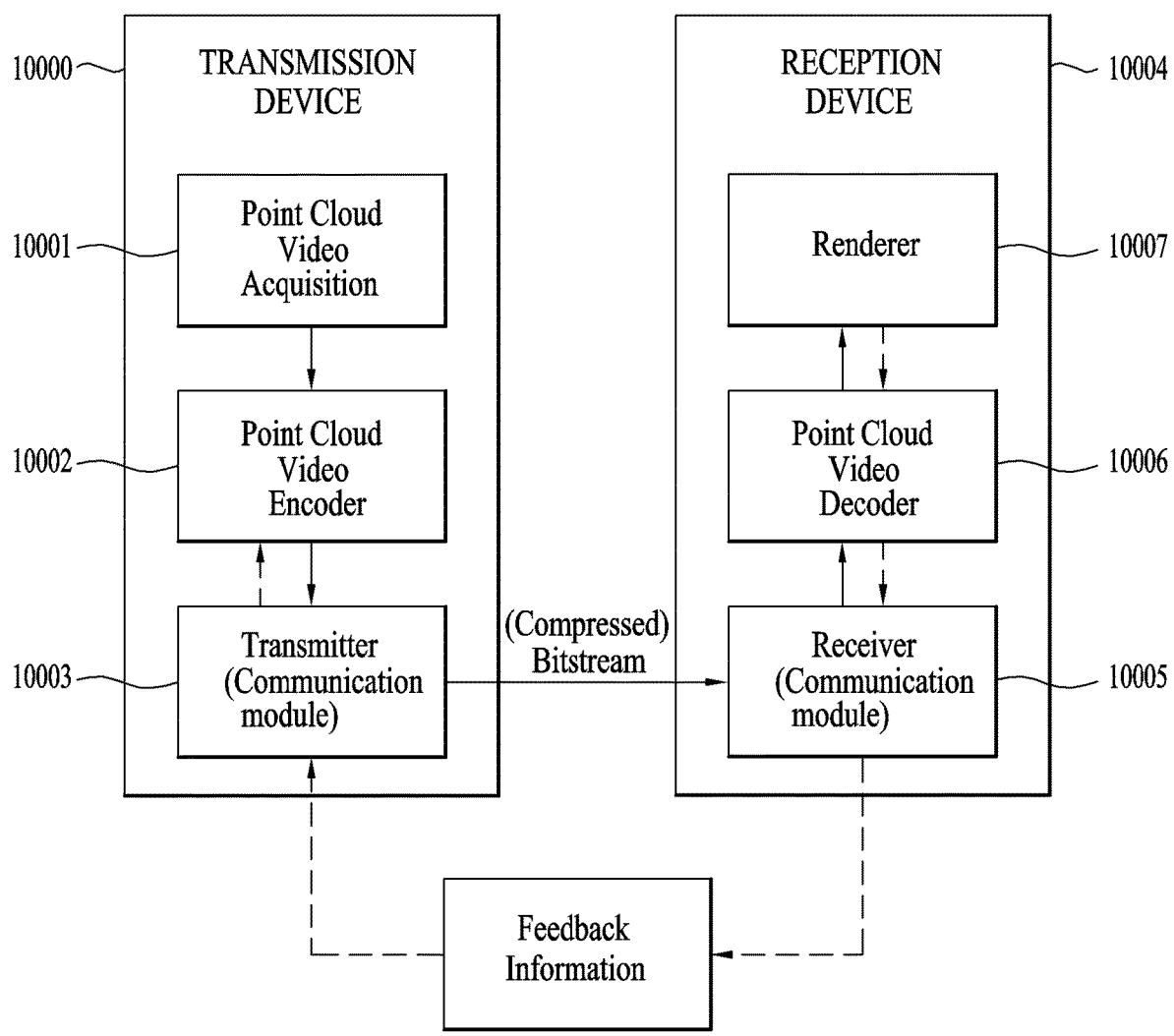
FIG. 1 illustrates an exemplary structure of a transmission/reception system for providing point cloud content according to embodiments.

FIG. 1 illustrates an exemplary structure of a transmission/reception system for providing point cloud content according to embodiments.

The present disclosure provides a method of providing point cloud content to provide a user with various services such as virtual reality (VR), augmented reality (AR), mixed reality (MR), and autonomous driving. The point cloud content according to the embodiments represent data representing objects as points, and may be referred to as a point cloud, point cloud data, point cloud video data, point cloud image data, or the like.

A point cloud data transmission device 10000 according to embodiment may include a point cloud video acquisition unit 10001, a point cloud video encoder 10002, a file/segment encapsulation module (or file/segment encapsulator) 10003, and/or a transmitter (or communication module) 10004. The transmission device according to the embodiments may secure and process point cloud video (or point cloud content) and transmit the same. According to embodiments, the transmission device may include a fixed station, a base transceiver system (BTS), a network, an artificial intelligence (AI) device and/or system, a robot, and an AR/VR/XR device and/or a server. According to embodiments, the transmission device 10000 may include a device robot, a vehicle, AR/VR/XR devices, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The point cloud video acquisition unit 10001 according to the embodiments acquires a point cloud video through a process of capturing, synthesizing, or generating a point cloud video.

The point cloud video encoder 10002 according to the embodiments encodes the point cloud video data acquired from the point cloud video acquisition unit 10001. According to embodiments, the point cloud video encoder 10002 may be referred to as a point cloud encoder, a point cloud data encoder, an encoder, or the like. The point cloud compression coding (encoding) according to the embodiments is not limited to the above-described embodiment. The point cloud video encoder may output a bitstream including the encoded point cloud video data. The bitstream may include not only the encoded point cloud video data, but also signaling information related to encoding of the point cloud video data.

The point cloud video encoder 10002 according to the embodiments may support both the geometry-based point cloud compression (G-PCC) encoding scheme and/or the video-based point cloud compression (V-PCC) encoding scheme. In addition, the point cloud video encoder 10002 may encode a point cloud (referring to either point cloud data or points) and/or signaling data related to the point cloud.

The term V-PCC representing video-based point cloud compression, used herein, has the same meaning as visual volumetric video-based coding (V3C) and they may be used complementary to each other.

The file/segment encapsulation module 10003 according to the embodiments encapsulates the point cloud data in the form of a file and/or segment form. The point cloud data transmission method/device according to the embodiments may transmit the point cloud data in a file and/or segment form.

The transmitter (or communication module) 10004 according to the embodiments transmits the encoded point cloud video data in the form of a bitstream. According to embodiments, the file or segment may be transmitted to a reception device over a network, or stored in a digital storage medium (e.g., USB, SD, CD, DVD, Blu-ray, HDD, SSD, etc.). The transmitter according to the embodiments is capable of wired/wireless communication with the reception device (or the receiver) over a network of 4G, 5G, 6G, etc. In addition, the transmitter may perform necessary data processing operation according to the network system (e.g., a 4G, 5G or 6G communication network system). The transmission device may transmit the encapsulated data in an on-demand manner.

A point cloud data reception device 10005 according to the embodiments may include a receiver 10006, a file/segment decapsulator (or file/segment decapsulation module) 10007, a point cloud video decoder 10008, and/or a renderer 10009. According to embodiments, the reception device may include a device robot, a vehicle, AR/VR/XR devices, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The receiver 10006 according to the embodiments receives a bitstream containing point cloud video data.

According to embodiments, the receiver 10006 may transmit feedback information to the point cloud data transmission device 10000.

The file/segment decapsulation module 10007 decapsulates a file and/or a segment containing point cloud data.

The point cloud video decoder 10008 decodes the received point cloud video data.

The renderer 10009 renders the decoded point cloud video data. According to embodiments, the renderer 10009 may transmit the feedback information obtained at the reception side to the point cloud video decoder 10008. The point cloud video data according to the embodiments may carry feedback information to the receiver 10006. According to embodiments, the feedback information received by the point cloud transmission device may be provided to the point cloud video encoder 10002.

The arrows indicated by dotted lines in the drawing represent a transmission path of feedback information acquired by the reception device 10005. The feedback information is information for reflecting interactivity with a user who consumes point cloud content, and includes user information (e.g., head orientation information), viewport information, and the like). In particular, when the point cloud content is content for a service (e.g., autonomous driving service, etc.) that requires interaction with a user, the feedback information may be provided to the content transmitting side (e.g., the transmission device 10000) and/or the service provider. According to embodiments, the feedback information may be used in the reception device 10005 as well as the transmission device 10000, and may not be provided.

The head orientation information according to embodiments is information about a user's head position, orientation, angle, motion, and the like. The reception device 10005 according to the embodiments may calculate viewport information based on the head orientation information. The viewport information may be information about a region of the point cloud video that the user is viewing. A viewpoint (or orientation) is a point where a user is viewing a point cloud video, and may refer to a center point of the viewport region. That is, the viewport is a region centered on the viewpoint, and the size and shape of the region may be determined by a field of view (FOV). In other words, a viewport is determined according to a position and a viewpoint (or orientation) of a virtual camera or a user, point cloud data is rendered in the viewport based on viewport information. Accordingly, the reception device 10005 may extract the viewport information based on a vertical or horizontal FOV supported by the device in addition to the head orientation information. In addition, the reception device 10005 performs gaze analysis to check how the user consumes a point cloud, a region that the user gazes at in the point cloud video, a gaze time, and the like. According to embodiments, the reception device 10005 may transmit feedback information including the result of the gaze analysis to the transmission device 10000. The feedback information according to the embodiments may be acquired in the rendering and/or display process. The feedback information according to the embodiments may be secured by one or more sensors included in the reception device 10005. In addition, according to embodiments, the feedback information may be secured by the renderer 10009 or a separate external element (or device, component, etc.). The dotted lines in FIG. 1 represent a process of transmitting the feedback information secured by the renderer 10009. The point cloud content providing system may process (encode/decode) point cloud data based on the feedback information.

Accordingly, the point cloud video decoder 10008 may perform a decoding operation based on the feedback information. The reception device 10005 may transmit the feedback information to the transmission device. The transmission device (or the point cloud video encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) all point cloud data, and provide point cloud content to the user.

According to embodiments, the transmission device 10000 may be called an encoder, a transmission device, a transmitter, or the like, and the reception device 10005 may be called a decoder, a reception device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to point cloud data.

The elements of the point cloud content providing system illustrated in FIG. 1 may be implemented by hardware, software, a processor, and/or combinations thereof.

Embodiments may provide a method of providing point cloud content to provide a user with various services such as virtual reality (VR), augmented reality (AR), mixed reality (MR), and autonomous driving.

In order to provide a point cloud content service, a point cloud video may be acquired first. The acquired point cloud video may be transmitted to a reception side through a series of processes, and the reception side may process the received data back into the original point cloud video and render the processed point cloud video. Thereby, the point cloud video may be provided to the user. Embodiments provide a method of effectively performing this series of processes.

The entire processes for providing a point cloud content service (the point cloud data transmission method and/or point cloud data reception method) may include an acquisition process, an encoding process, a transmission process, a decoding process, a rendering process, and/or a feedback process.

According to embodiments, the process of providing point cloud content (or point cloud data) may be referred to as a point cloud compression process. According to embodiments, the point cloud compression process may represent a video-based point cloud compression (V-PCC) process.

Each element of the point cloud data transmission device and the point cloud data reception device according to the embodiments may be hardware, software, a processor, and/or a combination thereof.

The point cloud compression system may include a transmission device and a reception device. According to embodiments, the transmission device may be called an encoder, a transmission apparatus, a transmitter, a point cloud transmission apparatus and so on. According to embodiments, the reception device may be called a decoder, a reception apparatus, a receiver, a point cloud reception apparatus and so on. The transmission device may output a bitstream by encoding a point cloud video, and deliver the same to the reception device through a digital storage medium or a network in the form of a file or a stream (streaming segment). The digital storage medium may include various storage media such as a USB, SD, CD, DVD, Blu-ray, HDD, and SSD.

The transmission device may include a point cloud video acquisition unit, a point cloud video encoder, a file/segment encapsulator, and a transmitting unit (or transmitter) as shown in FIG. 1. The reception device may include a receiver, a file/segment decapsulator, a point cloud video decoder, and a renderer as shown in FIG. 1. The encoder may be referred to as a point cloud video/picture/picture/frame encoder, and the decoder may be referred to as a point cloud video/picture/picture/frame decoding device. The renderer may include a display. The renderer and/or the display may be configured as separate devices or external components. The transmission device and the reception device may further include a separate internal or external module/unit/component for the feedback process. According to embodiments, each element in a transmission device and a reception device may be configured of hardware, software and/or processor.

According to embodiments, the operation of the reception device may be the reverse process of the operation of the transmission device.

The point cloud video acquirer may perform the process of acquiring point cloud video through a process of capturing, composing, or generating point cloud video. In the acquisition process, data of 3D positions (x, y, z)/attributes (color, reflectance, transparency, etc.) of multiple points, for example, a polygon file format (PLY) (or the stanford triangle format) file may be generated. For a video having multiple frames, one or more files may be acquired. During the capture process, point cloud related metadata (e.g., capture related metadata) may be generated.

A point cloud data transmission device according to embodiments may include an encoder configured to encode point cloud data, and a transmitter configured to transmit the point cloud data or a bitstream including the point cloud data.

A point cloud data reception device according to embodiments may include a receiver configured to receive a bitstream including point cloud data, a decoder configured to decode the point cloud data, and a renderer configured to render the point cloud data.

The method/device according to the embodiments represents the point cloud data transmission device and/or the point cloud data reception device.

Figure 2:
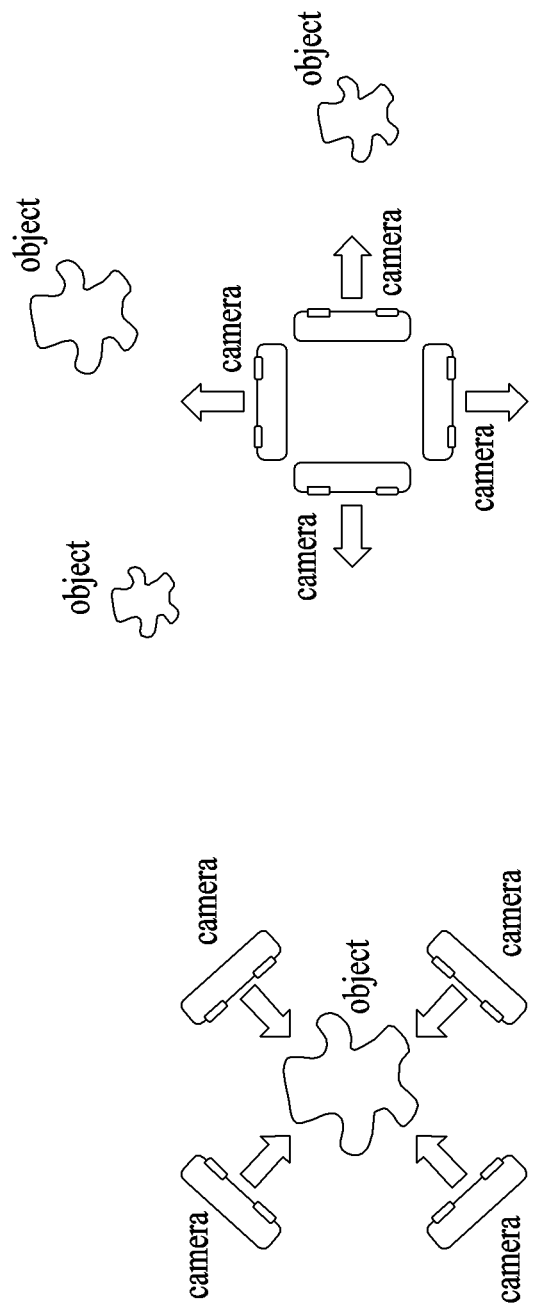
FIG. 2 illustrates capture of point cloud data according to embodiments.

FIG. 2 illustrates capture of point cloud data according to embodiments.

Point cloud data (or point cloud video data) according to embodiments may be acquired by a camera or the like. A capturing technique according to embodiments may include, for example, inward-facing and/or outward-facing.

In the inward-facing according to the embodiments, one or more cameras inwardly facing an object of point cloud data may photograph the object from the outside of the object.

In the outward-facing according to the embodiments, one or more cameras outwardly facing an object of point cloud data may photograph the object. For example, according to embodiments, there may be four cameras.

The point cloud data or the point cloud content according to the embodiments may be a video or a still image of an object/environment represented in various types of 3D spaces. According to embodiments, the point cloud content may include video/audio/an image of an object.

An equipment for capture of point cloud content, a combination of camera equipment (a combination of an infrared pattern projector and an infrared camera) capable of acquiring depth and RGB cameras capable of extracting color information corresponding to the depth information may be configured. Alternatively, the depth information may be extracted through LiDAR, which uses a radar system that measures the location coordinates of a reflector by emitting a laser pulse and measuring the return time. A shape of the geometry consisting of points in a 3D space may be extracted from the depth information, and an attribute representing the color/reflectance of each point may be extracted from the RGB information. The point cloud content may include information about the positions (x, y, z) and color (YCbCr or RGB) or reflectance (r) of the points. For the point cloud content, the outward-facing technique of capturing an external environment and the inward-facing technique of capturing a central object may be used. In the VR/AR environment, when an object (e.g., a core object such as a character, a player, a thing, or an actor) is configured into point cloud content that may be viewed by the user in any direction (360 degrees), the configuration of the capture camera may be based on the inward-facing technique. When the current surrounding environment is configured into point cloud content in a mode of a vehicle, such as autonomous driving, the configuration of the capture camera may be based on the outward-facing technique. Because the point cloud content may be captured by multiple cameras, a camera calibration process may need to be performed before the content is captured to configure a global coordinate system for the cameras.

The point cloud content may be a video or still image of an object/environment presented in various types of 3D spaces.

Additionally, in the point cloud content acquisition method, any point cloud video may be composed based on the captured point cloud video. Alternatively, when a point cloud video for a computer-generated virtual space is to be provided, capturing with an actual camera may not be performed. In this case, the capture process may be replaced simply by a process of generating related data.

Post-processing may be needed for the captured point cloud video to improve the quality of the content. In the video capture process, the maximum/minimum depth may be adjusted within a range provided by the camera equipment. Even after the adjustment, point data of an unwanted area may still be present. Accordingly, post-processing of removing the unwanted area (e.g., the background) or recognizing a connected space and filling the spatial holes may be performed. In addition, point clouds extracted from the cameras sharing a spatial coordinate system may be integrated into one piece of content through the process of transforming each point into a global coordinate system based on the coordinates of the location of each camera acquired through a calibration process. Thereby, one piece of point cloud content having a wide range may be generated, or point cloud content with a high density of points may be acquired.

The point cloud video encoder 10002 may encode the input point cloud video into one or more video streams. One point cloud video may include a plurality of frames, each of which may correspond to a still image/picture. In this specification, a point cloud video may include a point cloud image/frame/picture/video/audio. In addition, the term "point cloud video" may be used interchangeably with a point cloud image/frame/picture. The point cloud video encoder 10002 may perform a video-based point cloud compression (V-PCC) procedure. The point cloud video encoder may perform a series of procedures such as prediction, transformation, quantization, and entropy coding for compression and encoding efficiency. The encoded data (encoded video/image information) may be output in the form of a bitstream. Based on the V-PCC procedure, the point cloud video encoder may encode point cloud video by dividing the same into a geometry video, an attribute video, an occupancy map video, and auxiliary information (or auxiliary data), which will be described later. The geometry video may include a geometry image, the attribute video may include an attribute image, and the occupancy map video may include an occupancy map image. The auxiliary information may include auxiliary patch information. The attribute video/image may include a texture video/image.

The file/segment encapsulator (file/segment encapsulation module) 10003 may encapsulate the encoded point cloud video data and/or metadata related to the point cloud video in the form of, for example, a file. Here, the metadata related to the point cloud video may be received from the metadata processor. The metadata processor may be included in the point cloud video encoder 10002 or may be configured as a separate component/module. The file/segment encapsulator 10003 may encapsulate the data in a file format such as ISOBMFF or process the same in the form of a DASH segment or the like. According to an embodiment, the file/segment encapsulator 10003 may include the point cloud video-related metadata in the file format. The point cloud video metadata may be included, for example, in boxes at various levels on the ISOBMFF file format or as data in a separate track within the file. According to an embodiment, the file/segment encapsulator 10003 may encapsulate the point cloud video-related metadata into a file. The transmission processor may perform processing for transmission on the point cloud video data encapsulated according to the file format. The transmission processor may be included in the transmitter 10004 or may be configured as a separate component/module. The transmission processor may process the point cloud video data according to a transmission protocol. The processing for transmission may include processing for delivery over a broadcast network and processing for delivery through a broadband. According to an embodiment, the transmission processor may receive point cloud video-related metadata from the metadata processor along with the point cloud video data, and perform processing of the point cloud video data for transmission.

The transmitter 10004 may transmit the encoded video/image information or data that is output in the form of a bitstream to the receiver 10006 of the reception device through a digital storage medium or a network in the form of a file or streaming. The digital storage medium may include various storage media such as USB, SD, CD, DVD, Blu-ray, HDD, and SSD. The transmitter may include an element for generating a media file in a predetermined file format, and may include an element for transmission over a broadcast/communication network. The receiver may extract the bitstream and transmit the extracted bitstream to the decoding device.

The receiver 10006 may receive point cloud video data transmitted by the point cloud video transmission device according to the present disclosure. Depending on the transmission channel, the receiver may receive the point cloud video data over a broadcast network or through a broadband. Alternatively, the point cloud video data may be received through a digital storage medium.

The reception processor may process the received point cloud video data according to the transmission protocol. The reception processor may be included in the receiver 10006 or may be configured as a separate component/module. The reception processor may reversely perform the above-described process of the transmission processor such that the processing corresponds to the processing for transmission performed at the transmission side. The reception processor may deliver the acquired point cloud video data to the file/segment decapsulator 10007, and the acquired point cloud video-related metadata to the metadata processor (not shown). The point cloud video-related metadata acquired by the reception processor may take the form of a signaling table.

The file/segment decapsulator (file/segment decapsulation module) 10007 may decapsulate the point cloud video data received in the form of a file from the reception processor. The file/segment decapsulator 10007 may decapsulate the files according to ISOBMFF or the like, and may acquire a point cloud video bitstream or point cloud video-related metadata (a metadata bitstream). The acquired point cloud video bitstream may be delivered to the point cloud video decoder 10008, and the acquired point cloud video-related metadata (metadata bitstream) may be delivered to the metadata processor (not shown). The point cloud video bitstream may include the metadata (metadata bitstream). The metadata processor may be included in the point cloud video decoder 10008 or may be configured as a separate component/module. The point cloud video-related metadata acquired by the file/segment decapsulator 10007 may take the form of a box or a track in the file format. The file/segment decapsulator 10007 may receive metadata necessary for decapsulation from the metadata processor, when necessary. The point cloud video-related metadata may be delivered to the point cloud video decoder 10008 and used in a point cloud video decoding procedure, or may be transferred to the renderer 10009 and used in a point cloud video rendering procedure.

The point cloud video decoder 10008 may receive the bitstream and decode the video/image by performing an operation corresponding to the operation of the point cloud video encoder. In this case, the point cloud video decoder 10008 may decode the point cloud video by dividing the same into a geometry video, an attribute video, an occupancy map video, and auxiliary information as described below. The geometry video may include a geometry image, and the attribute video may include an attribute image. The occupancy map video may include an occupancy map image. The auxiliary information may include auxiliary patch information. The attribute video/image may include a texture video/image.

The 3D geometry may be reconstructed based on the decoded geometry image, the occupancy map, and auxiliary patch information, and then may be subjected to a smoothing process. A color point cloud image/picture may be reconstructed by assigning color values to the smoothed 3D geometry based on the texture image. The renderer 10009 may render the reconstructed geometry and the color point cloud image/picture. The rendered video/image may be displayed through the display (not shown). The user may view all or part of the rendered result through a VR/AR display or a typical display.

The feedback process may include transferring various kinds of feedback information that may be acquired in the rendering/displaying process to the transmission side or to the decoder of the reception side. Interactivity may be provided through the feedback process in consuming point cloud video. According to an embodiment, head orientation information, viewport information indicating a region currently viewed by a user, and the like may be delivered to the transmission side in the feedback process. According to an embodiment, the user may interact with things implemented in the VR/AR/MR/autonomous driving environment. In this case, information related to the interaction may be delivered to the transmission side or a service provider during the feedback process. According to an embodiment, the feedback process may be skipped.

The head orientation information may represent information about the location, angle and motion of a user's head. On the basis of this information, information about a region of the point cloud video currently viewed by the user, that is, viewport information, may be calculated.

The viewport information may be information about a region of the point cloud video currently viewed by the user. Gaze analysis may be performed using the viewport information to check the way the user consumes the point cloud video, a region of the point cloud video at which the user gazes, and how long the user gazes at the region. The gaze analysis may be performed at the reception side and the result of the analysis may be delivered to the transmission side on a feedback channel. A device such as a VR/AR/MR display may extract a viewport region based on the location/direction of the user's head, vertical or horizontal FOV supported by the device, and the like.

According to an embodiment, the aforementioned feedback information may not only be delivered to the transmission side, but also be consumed at the reception side. That is, decoding and rendering processes at the reception side may be performed based on the aforementioned feedback information. For example, only the point cloud video for the region currently viewed by the user may be preferentially decoded and rendered based on the head orientation information and/or the viewport information.

Here, the viewport or viewport region may represent a region of the point cloud video currently viewed by the user. A viewpoint is a point which is viewed by the user in the point cloud video and may represent a center point of the viewport region. That is, a viewport is a region around a viewpoint, and the size and form of the region may be determined by the field of view (FOV).

The present disclosure relates to point cloud video compression as described above. For example, the methods/embodiments disclosed in the present disclosure may be applied to the point cloud compression or point cloud coding (PCC) standard of the moving picture experts group (MPEG) or the next generation video/image coding standard.

As used herein, a picture/frame may generally represent a unit representing one image in a specific time interval.

A pixel or a pel may be the smallest unit constituting one picture (or image). Also, "sample" may be used as a term corresponding to a pixel. A sample may generally represent a pixel or a pixel value. It may represent only a pixel/pixel value of a luma component, only a pixel/pixel value of a chroma component, or only a pixel/pixel value of a depth component.

A unit may represent a basic unit of image processing. The unit may include at least one of a specific region of the picture and information related to the region. The unit may be used interchangeably with term such as block or area or module in some cases. In a general case, an M×N block may include samples (or a sample array) or a set (or array) of transform coefficients configured in M columns and N rows.

Figure 3:
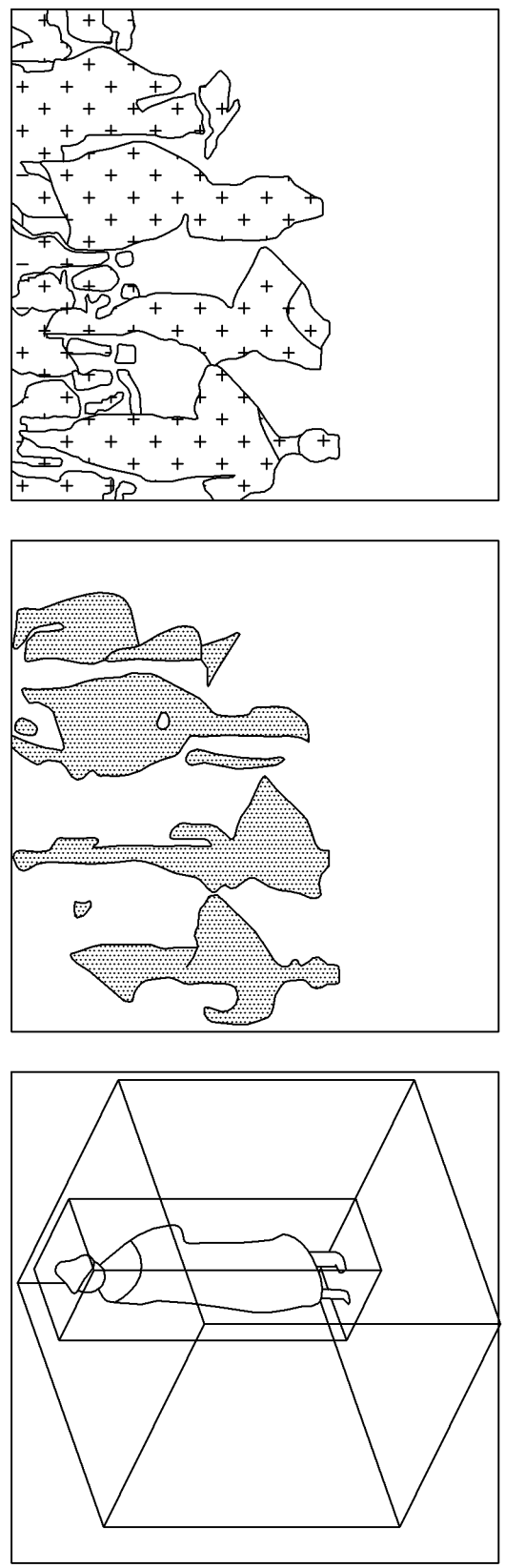
FIG. 3 illustrates an exemplary point cloud, geometry, and texture image according to embodiments.

FIG. 3 illustrates an example of a point cloud, a geometry image, and a texture image according to embodiments.

A point cloud according to the embodiments may be input to the V-PCC encoding process of FIG. 4, which will be described later, to generate a geometric image and a texture image. According to embodiments, a point cloud may have the same meaning as point cloud data.

In FIG. 3, the left drawing illustrates a point cloud capable of representing a point cloud object located in a 3D space as a bounding box. In FIG. 3, the middle drawing shows a geometry image and the right drawing shows a texture image (non-padding). That is, the 3D bounding box may specify a volume defined as a cuboid solid having six rectangular faces placed at right angles. In the present specification, the geometry image is also referred to as a geometry patch frame/picture or a geometry frame/picture. In addition, the texture image is also referred to as an attribute patch frame/picture or an attribute frame/picture.

A video-based point cloud compression (V-PCC) according to embodiments is a method of compressing 3D point cloud data based on a 2D video codec such as High Efficiency Video Coding (HEVC) or Versatile Video Coding (VVC). Data and information that may be generated in the V-PCC compression process are as follows:

Occupancy map: this is a binary map indicating whether there is data at a corresponding position in a 2D plane, using a value of 0 or 1 in dividing the points constituting a point cloud into patches and mapping the same to the 2D plane. The occupancy map may represent a 2D array corresponding to atlas, and the values of the occupancy map may indicate whether each sample position in the atlas corresponds to a 3D point.

An atlas is composed of patches and refers to an object including information about 2D patches of each point cloud frame. For example, the atlas may include a 2D arrangement and sizes of patches, a position of a corresponding 3D region within a 3D point, a projection plane, and a level-of-detail parameter. That is, the atlas may be partitioned into patch packing blocks of the same size.

In addition, the atlas is a collection of 2D bounding boxes and information associated therewith that are placed in a rectangular frame and correspond to a 3D bounding box (i.e., volume) in a 3D space in which volumetric data is rendered.

An atlas bitstream is a sequence of bits forming a representation of one or more atlas frames constituting an atlas.

An atlas frame is a 2D rectangular array of atlas samples onto which patches are projected.

An atlas sample is a position of a rectangular frame onto which patches associated with an atlas are projected.

An atlas sequence is a collection of atlas frames.

According to embodiments, the atlas frame may be partitioned into tiles. A tile is a unit that splits a 2D frame. That is, the tile is a unit for partitioning signaling information of point cloud data called an atlas.

A patch is a collection of points constituting a point cloud. Points belonging to the same patch are adjacent to each other in a 3D space and are mapped in the same direction among six bounding box planes in a mapping process to a 2D image. The patch is a unit that partitions a tile. That is, the patch is signaling information about construction of point cloud data.

A tile represents an independently decodable rectangular region of an atlas frame.

The reception device according to embodiments may restore attribute video data, geometry video data, and occupant video data, which are actual video data having the same presentation time, based on an atlas (a tile or a patch).

Geometry image: this is an image in the form of a depth map that presents position information (geometry) about each point constituting a point cloud on a patch-by-patch basis. The geometry image may be composed of pixel values of one channel. Geometry represents a set of coordinates associated with a point cloud frame.

Texture image: this is an image representing the color information about each point constituting a point cloud on a patch-by-patch basis. A texture image may be composed of pixel values of a plurality of channels (e.g., three channels of R, G, and B). The texture is included in an attribute. According to embodiments, a texture and/or attribute may be interpreted as the same object and/or having an inclusive relationship.

Auxiliary patch info: this indicates metadata needed to reconstruct a point cloud with individual patches. Auxiliary patch information may include information about the position, size, and the like of a patch in a 2D/3D space.

Point cloud data according to the embodiments, for example, V-PCC components may include an atlas, an occupancy map, geometry, and attributes.

Atlas represents a collection of 2D bounding boxes. That is, atlas may be a group of patches, for example, patches projected into a rectangular frame that correspond to a 3-dimensional bounding box in 3D space, which may represent a subset of a point cloud. In this case, a patch may represent a rectangular region in the atlas corresponding to a rectangular region in a planar projection. In addition, patch data may represent data required to perform transformation of patches from 2D to 3D. Additionally, a patch data group is also referred to as an atlas.

An attribute may represent a scalar or vector associated with each point in the point cloud. For example, the attributes may include color, reflectance, surface normal, time stamps, material ID.

The point cloud data according to the embodiments represents PCC data according to video-based point cloud compression (V-PCC) scheme. The point cloud data may include a plurality of components. For example, it may include an occupancy map, a patch, geometry and/or texture.

Figure 4:
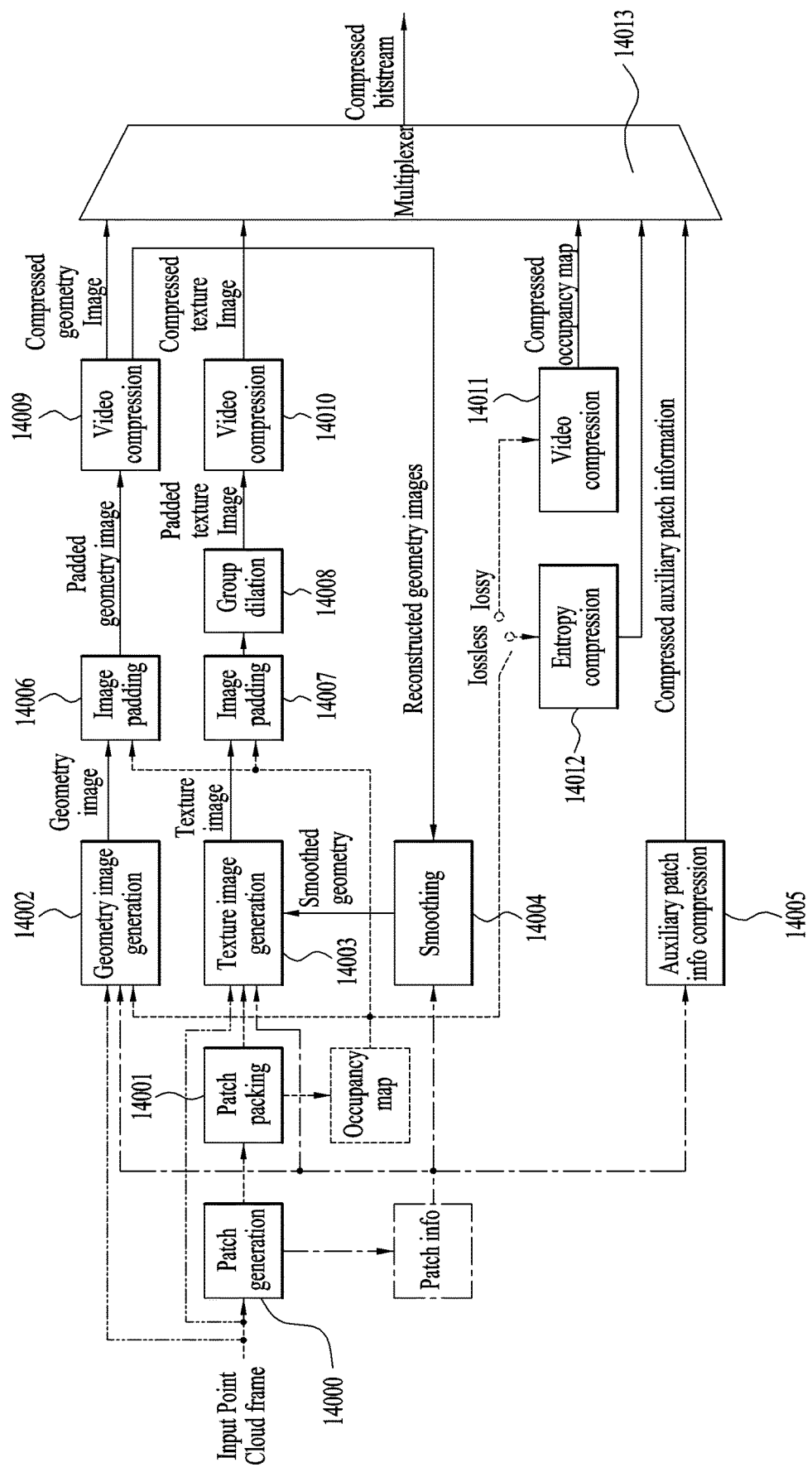
FIG. 4 illustrates an exemplary V-PCC encoding process according to embodiments.

FIG. 4 illustrates an example of a point cloud video encoder according to embodiments.

FIG. 4 illustrates a V-PCC encoding process for generating and compressing an occupancy map, a geometry image, a texture image, and auxiliary patch information. The V-PCC encoding process of FIG. 4 may be processed by the point cloud video encoder 10002 of FIG. 1. Each element of FIG. 4 may be performed by software, hardware, processor and/or a combination thereof.

The patch generation or patch generator 14000 receives a point cloud frame (which may be in the form of a bitstream containing point cloud data). The patch generator 14000 generates a patch from the point cloud data. In addition, patch information including information about patch generation is generated.

The patch packing or patch packer 14001 packs one or more patches. In addition, the patch packer 14001 generates an occupancy map containing information about patch packing.

The geometry image generation or geometry image generator 14002 generates a geometry image based on the point cloud data, patch information (or auxiliary information), and/or occupancy map information. The geometry image means data (i.e., 3D coordinate values of points) containing geometry related to the point cloud data and refers as to a geometry frame.

The texture image generation or texture image generator 14003 generates a texture image based on the point cloud data, patches, packed patches, patch information (or auxiliary information) and/or the smoothed geometry. The texture image refers as to an attribute frame. That is, the texture image may be generated further based on smoothed geometry generated by smoothing processing of smoothing based on the patch information.

The smoothing or smoother 14004 may mitigate or eliminate errors contained in the image data. For example, the reconstructed geometry images are smothered based on the patch information. That is, portions that may cause errors between data may be smoothly filtered out to generate smoothed geometry.

The auxiliary patch information compression or auxiliary patch information compressor 14005 may compress auxiliary patch information related to the patch information generated in the patch generation. In addition, the compressed auxiliary patch information in the auxiliary patch information compressor 14005 may be transmitted to the multiplexer 14013. The auxiliary patch information may be used in the geometry image generator 14002.

The image padding or image padders 14006 and 14007 may pad the geometry image and the texture image, respectively. The padding data may be padded to the geometry image and the texture image.

The group dilation or group dilator 14008 may add data to the texture image in a similar manner to image padding. The auxiliary patch information may be inserted into the texture image.

The video compression or video compressors 14009, 14010, and 14011 may compress the padded geometry image, the padded texture image, and/or the occupancy map, respectively. In other words, the video compressors 14009, 14010, and 14011 may compress the input geometry frame, attribute frame, and/or occupancy map frame, respectively, to output a video bitstream of the geometry image, a video bitstream of the texture image, a video bitstream of the occupancy map. The video compression may encode geometry information, texture information, and occupancy information.

The entropy compression or entropy compressor 14012 may compress the occupancy map based on an entropy scheme.

According to embodiments, the entropy compression and/or video compression may be performed on an occupancy map frame depending on whether the point cloud data is lossless and/or lossy.

The multiplexer 14013 multiplexes the video bitstream of the compressed geometry, the video bitstream of the compressed texture image, the video bitstream of the compressed occupancy map, and the bitstream of compressed auxiliary patch information from the respective compressors into one bitstream.

The blocks described above may be omitted or may be replaced by blocks having similar or identical functions. In addition, each of the blocks shown in FIG. 4 may operate as at least one of a processor, software, and hardware.

Detailed operations of each process of FIG. 4 according to embodiments are described below.

Patch Generation (14000)

The patch generation process refers to a process of dividing a point cloud into patches, which are mapping units, in order to map the point cloud to the 2D image. The patch generation process may be divided into three steps: normal value calculation, segmentation, and patch segmentation.

The normal value calculation process will be described in detail with reference to FIG. 5.

Figure 5:
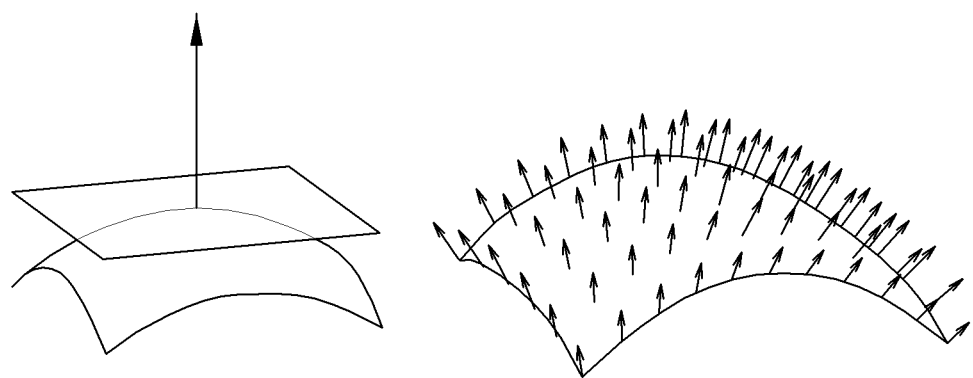
FIG. 5 illustrates an example of a tangent plane and a normal vector of a surface according to embodiments.

FIG. 5 illustrates an example of a tangent plane and a normal vector of a surface according to embodiments.

The surface of FIG. 5 is used in the patch generator 14000 of the V-PCC encoding process of FIG. 4 as follows.

Normal Calculation Related to Patch Generation

Each point of a point cloud has its own direction, which is represented by a 3D vector called a normal vector. Using the neighbors of each point obtained using a K-D tree or the like, a tangent plane and a normal vector of each point constituting the surface of the point cloud as shown in FIG. 5 may be obtained. The search range applied to the process of searching for neighbors may be defined by the user.

The tangent plane refers to a plane that passes through a point on the surface and completely includes a tangent line to the curve on the surface.

Figure 6:
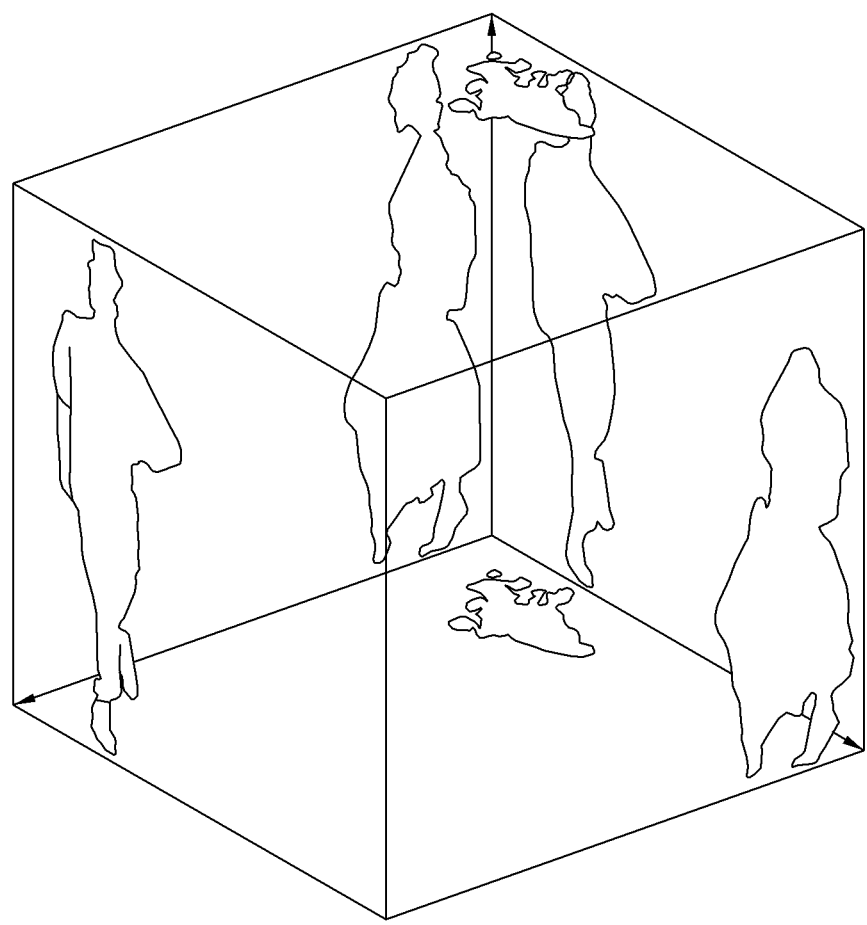
FIG. 6 illustrates an exemplary bounding box of a point cloud according to embodiments.

FIG. 6 illustrates an exemplary bounding box of a point cloud according to embodiments.

The bounding box according to the embodiments refers to a box of a unit for dividing point cloud data based on a hexahedron in a 3D space.

A method/device according to embodiments, for example, patch generator 14000 may use a bounding box in a process generating a patch from point cloud data.

The bounding box may be used in the process of projecting a target object of the point cloud data onto a plane of each planar face of a hexahedron in a 3D space. The bounding box may be generated and processed by the point cloud video acquisition unit 10001 and the point cloud video encoder 10002 of FIG. 1. Further, based on the bounding box, the patch generation 14000, patch packing 14001, geometry image generation 14002, and texture image generation 14003 of the V-PCC encoding process of FIG. 4 may be performed.

Segmentation Related to Patch Generation

Segmentation is divided into two processes: initial segmentation and refine segmentation.

The point cloud video encoder 10002 according to the embodiments projects a point onto one face of a bounding box. Specifically, each point constituting a point cloud is projected onto one of the six faces of a bounding box surrounding the point cloud as shown in FIG. 6. Initial segmentation is a process of determining one of the planar faces of the bounding box onto which each point is to be projected.

$\vec{n}_{p_{idx}}$, which is a normal value corresponding to each of the six planar faces, is defined as follows:

(1.0, 0.0, 0.0), (0.0, 1.0, 0.0), (0.0, 0.0, 1.0), (−1.0, 0.0, 0.0), (0.0, −1.0, 0.0), (0.0, 0.0, −1.0).

As shown in the equation below, a face that yields the maximum value of dot product of the normal vector $\vec{n}_{p_i}$ of each point, which is obtained in the normal value calculation process, and $\vec{n}_{p_{idx}}$ is determined as a projection plane of the corresponding point. That is, a plane whose normal vector is most similar to the direction of the normal vector of a point is determined as the projection plane of the point.

$$\max_{p_{idx}}\{\vec{n}_{p_i} \cdot \vec{n}_{p_{idx}}\}$$

The determined plane may be identified by one cluster index, which is one of 0 to 5.

Refine segmentation is a process of enhancing the projection plane of each point constituting the point cloud determined in the initial segmentation process in consideration of the projection planes of neighboring points. In this process, a score normal, which represents the degree of similarity between the normal vector of each point and the normal of each planar face of the bounding box which are considered in determining the projection plane in the initial segmentation process, and score smooth, which indicates the degree of similarity between the projection plane of the current point and the projection planes of neighboring points, may be considered together.

Score smooth may be considered by assigning a weight to the score normal. In this case, the weight value may be defined by the user. The refine segmentation may be performed repeatedly, and the number of repetitions may also be defined by the user.

Patch segmentation related to patch generation

Patch segmentation is a process of dividing the entire point cloud into patches, which are sets of neighboring points, based on the projection plane information about each point constituting the point cloud obtained in the initial/refine segmentation process. The patch segmentation may include the following steps:

1) Calculate neighboring points of each point constituting the point cloud, using the K-D tree or the like. The maximum number of neighbors may be defined by the user;

2) When the neighboring points are projected onto the same plane as the current point (when they have the same cluster index), extract the current point and the neighboring points as one patch;

3) Calculate geometry values of the extracted patch.

4) Repeat operations 2) to 3) until there is no unextracted point.

The occupancy map, geometry image and texture image for each patch as well as the size of each patch are determined through the patch segmentation process.

Figure 7:
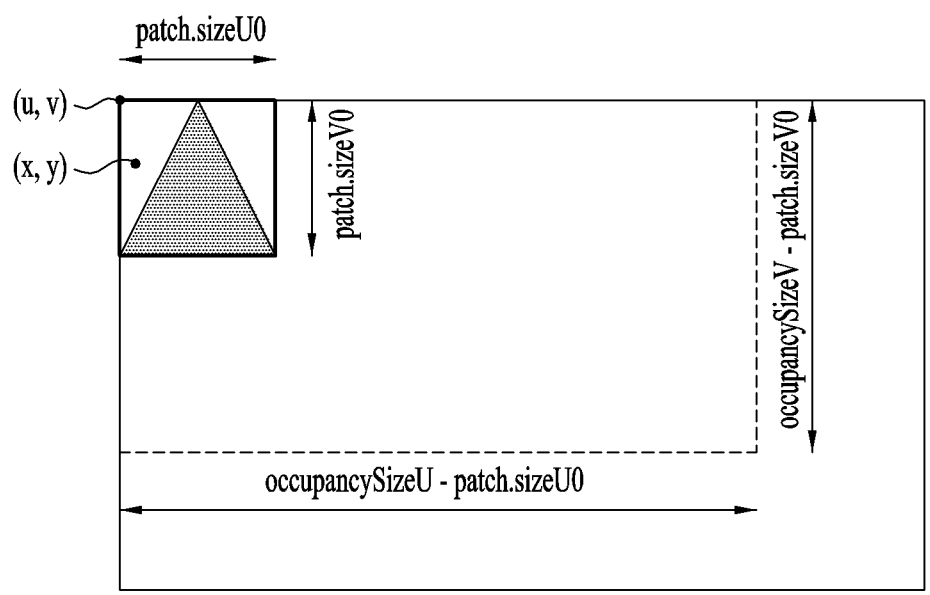
FIG. 7 illustrates an example of determination of individual patch positions on an occupancy map according to embodiments.

FIG. 7 illustrates an example of determination of individual patch positions on an occupancy map according to embodiments.

The point cloud video encoder 10002 according to the embodiments may perform patch packing and generate an occupancy map.

Patch Packing & Occupancy Map Generation (14001)

This is a process of determining the positions of individual patches in a 2D image to map the segmented patches to the 2D image. The occupancy map, which is a kind of 2D image, is a binary map that indicates whether there is data at a corresponding position, using a value of 0 or 1. The occupancy map is composed of blocks and the resolution thereof may be determined by the size of the block. For example, when the block is 1*1 block, a pixel-level resolution is obtained. The occupancy packing block size may be determined by the user.

The process of determining the positions of individual patches on the occupancy map may be configured as follows:

1) Set all positions on the occupancy map to 0;

2) Place a patch at a point (u, v) having a horizontal coordinate within the range of (0, occupancySizeU−patch.sizeU0) and a vertical coordinate within the range of (0, occupancySizeV−patch.sizeV0) in the occupancy map plane;

3) Set a point (x, y) having a horizontal coordinate within the range of (0, patch.sizeU0) and a vertical coordinate within the range of (0, patch.sizeV0) in the patch plane as a current point;

4) Change the position of point (x, y) in raster order and repeat operations 3) and 4) if the value of coordinate (x, y) on the patch occupancy map is 1 (there is data at the point in the patch) and the value of coordinate (u+x, v+y) on the global occupancy map is 1 (the occupancy map is filled with the previous patch). Otherwise, proceed to operation 6);

5) Change the position of (u, v) in raster order and repeat operations 3) to 5); 6) Determine (u, v) as the position of the patch and copy the occupancy map data about the patch onto the corresponding portion on the global occupancy map; and 7) Repeat operations 2) to 6) for the next patch.

occupancySizeU: indicates the width of the occupancy map. The unit thereof is occupancy packing block size.

occupancySizeV: indicates the height of the occupancy map. The unit thereof is occupancy packing block size.

patch.sizeU0: indicates the width of the patch. The unit thereof is occupancy packing block size.

patch.sizeV0: indicates the height of the patch. The unit thereof is occupancy packing block size.

For example, as shown in FIG. 7, there is a box corresponding to a patch having a patch size in a box corresponding to an occupancy packing size block, and a point (x, y) may be located in the box.

Figure 8:
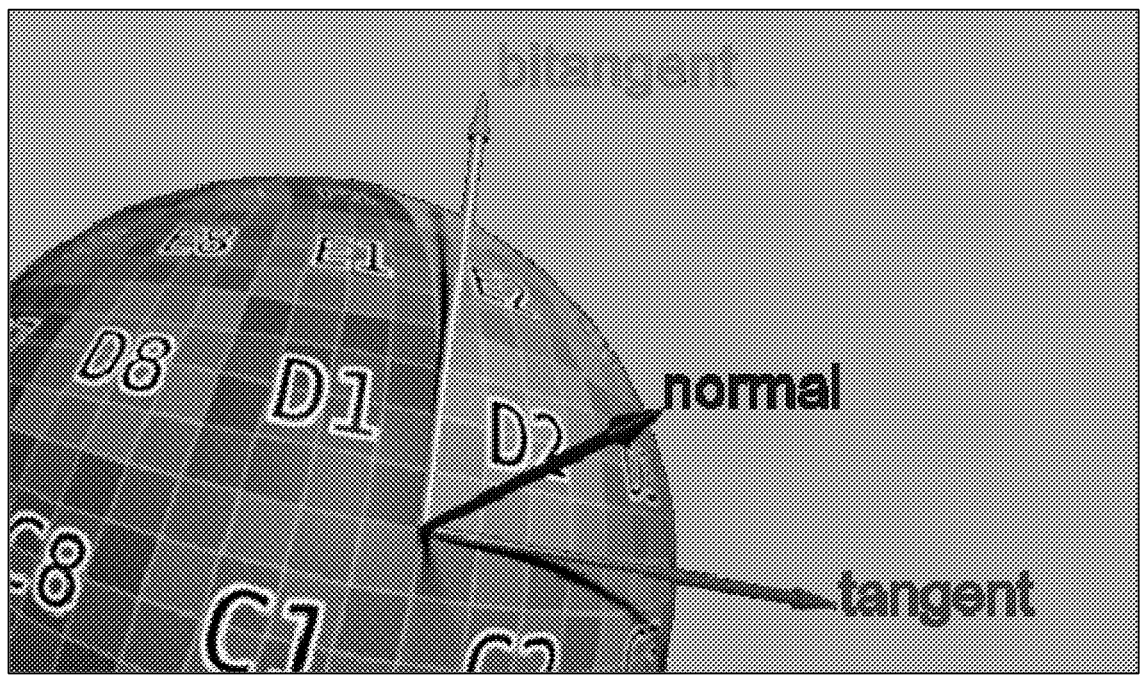
FIG. 8 shows an exemplary relationship among normal, tangent, and bitangent axes according to embodiments.

FIG. 8 shows an exemplary relationship among normal, tangent, and bitangent axes according to embodiments.

The point cloud video encoder 10002 according to embodiments may generate a geometry image. The geometry image refers to image data including geometry information about a point cloud. The geometry image generation process may employ three axes (normal, tangent, and bitangent) of a patch in FIG. 8.

Geometry Image Generation (14002)

In this process, the depth values constituting the geometry images of individual patches are determined, and the entire geometry image is generated based on the positions of the patches determined in the patch packing process described above. The process of determining the depth values constituting the geometry images of individual patches may be configured as follows.

1) Calculate parameters related to the position and size of an individual patch. The parameters may include the following information. According to an embodiment, a position of a patch is included in patch information.

A normal index indicating the normal axis is obtained in the previous patch generation process. The tangent axis is an axis coincident with the horizontal axis u of the patch image among the axes perpendicular to the normal axis, and the bitangent axis is an axis coincident with the vertical axis v of the patch image among the axes perpendicular to the normal axis. The three axes may be expressed as shown in FIG. 8.

Figure 9:
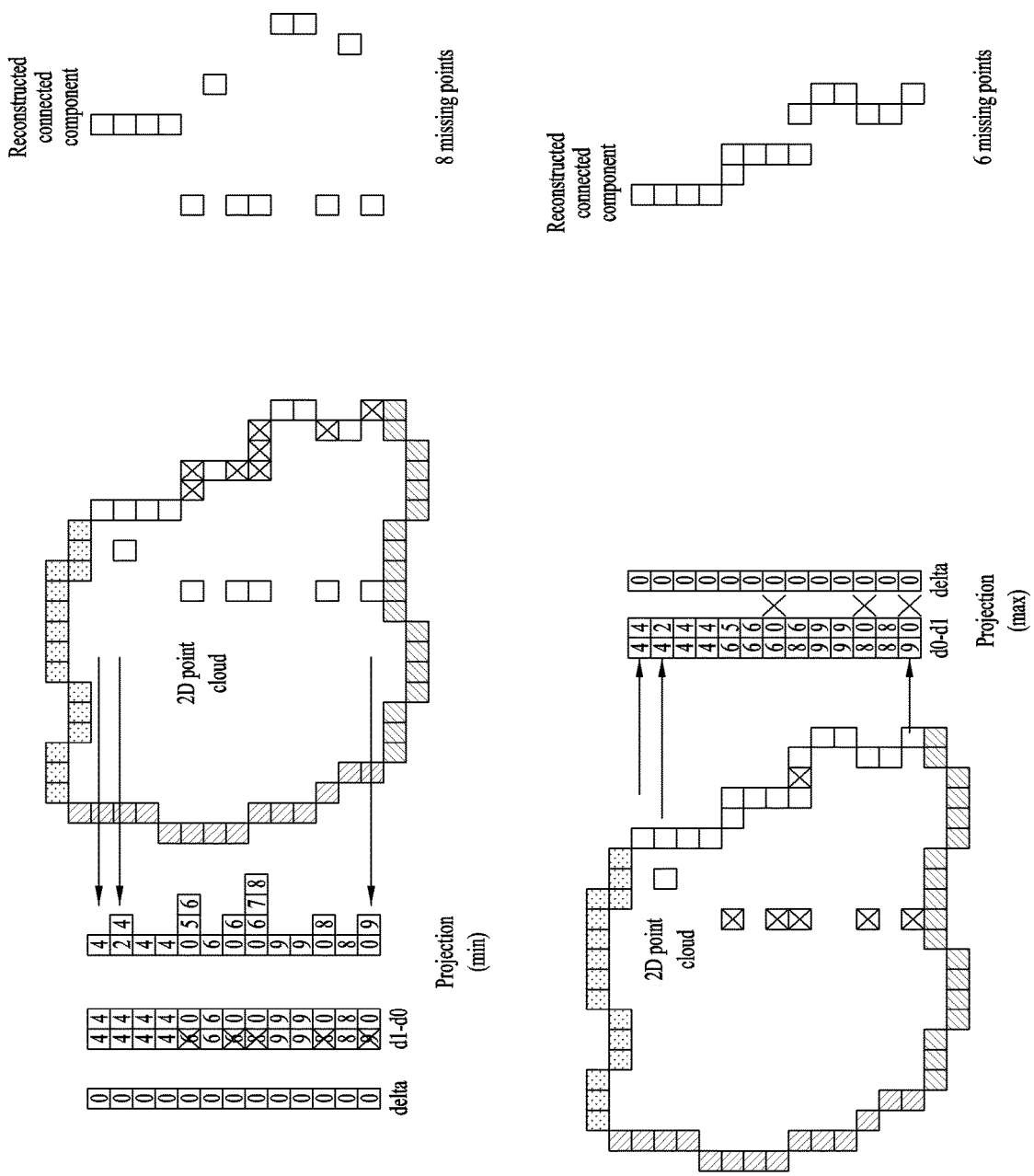
FIG. 9 shows an exemplary configuration of minimum mode and maximum mode of a projection mode according to embodiments.

FIG. 9 shows an exemplary configuration of the minimum mode and maximum mode of a projection mode according to embodiments.

The point cloud video encoder 10002 according to embodiments may perform patch-based projection to generate a geometry image, and the projection mode according to the embodiments includes a minimum mode and a maximum mode.

3D spatial coordinates of a patch may be calculated based on the bounding box of the minimum size surrounding the patch. For example, the 3D spatial coordinates may include the minimum tangent value of the patch (on the patch 3d shift tangent axis) of the patch, the minimum bitangent value of the patch (on the patch 3d shift bitangent axis), and the minimum normal value of the patch (on the patch 3d shift normal axis).

2D size of a patch indicates the horizontal and vertical sizes of the patch when the patch is packed into a 2D image. The horizontal size (patch 2d size u) may be obtained as a difference between the maximum and minimum tangent values of the bounding box, and the vertical size (patch 2d size v) may be obtained as a difference between the maximum and minimum bitangent values of the bounding box.

2) Determine a projection mode of the patch. The projection mode may be either the min mode or the max mode. The geometry information about the patch is expressed with a depth value. When each point constituting the patch is projected in the normal direction of the patch, two layers of images, an image constructed with the maximum depth value and an image constructed with the minimum depth value, may be generated.

In the min mode, in generating the two layers of images d0 and d1, the minimum depth may be configured for d0, and the maximum depth within the surface thickness from the minimum depth may be configured for d1, as shown in FIG. 9.

For example, when a point cloud is located in 2D as illustrated in FIG. 9, there may be a plurality of patches including a plurality of points. As shown in the figure, it is indicated that points marked with the same style of shadow may belong to the same patch. The figure illustrates the process of projecting a patch of points marked with blanks.

When projecting points marked with blanks to the left/right, the depth may be incremented by 1 as 0, 1, 2, . . . 6, 7, 8, 9 with respect to the left side, and the number for calculating the depths of the points may be marked on the right side.

The same projection mode may be applied to all point clouds or different projection modes may be applied to respective frames or patches according to user definition. When different projection modes are applied to the respective frames or patches, a projection mode that may enhance compression efficiency or minimize missed points may be adaptively selected.

3) Calculate the depth values of the individual points.

In the min mode, image d0 is constructed with depth( ) which is a value obtained by subtracting the minimum normal value of the patch (on the patch 3d shift normal axis) calculated in operation 1) from the minimum normal value of the patch (on the patch 3d shift normal axis) for the minimum normal value of each point. If there is another depth value within the range between depth( ) and the surface thickness at the same position, this value is set to depth1. Otherwise, the value of depth( ) is assigned to depth1. Image d1 is constructed with the value of depth1.

For example, a minimum value may be calculated in determining the depth of points of image d0 (4 2 4 4 0 6 0 0 9 9 0 8 0). In determining the depth of points of image d1, a greater value among two or more points may be calculated. When only one point is present, the value thereof may be calculated (4 4 4 4 6 6 6 8 9 9 8 8 9). In the process of encoding and reconstructing the points of the patch, some points may be lost (For example, in the figure, eight points are lost).

In the max mode, image d0 is constructed with depth( ) which is a value obtained by subtracting the minimum normal value of the patch (on the patch 3d shift normal axis) calculated in operation 1) from the minimum normal value of the patch (on the patch 3d shift normal axis) for the maximum normal value of each point. If there is another depth value within the range between depth( ) and the surface thickness at the same position, this value is set to depth1. Otherwise, the value of depth( ) is assigned to depth1. Image d1 is constructed with the value of depth1.

For example, a maximum value may be calculated in determining the depth of points of d0 (4 4 4 4 6 6 6 8 9 9 8 8 9). In addition, in determining the depth of points of d1, a lower value among two or more points may be calculated. When only one point is present, the value thereof may be calculated (4 2 4 4 5 6 0 6 9 9 0 8 0). In the process of encoding and reconstructing the points of the patch, some points may be lost (For example, in the figure, six points are lost).

The entire geometry image may be generated by placing the geometry images of the individual patches generated through the above-described processes onto the entire geometry image based on the patch position information determined in the patch packing process.

Layer d1 of the generated entire geometry image may be encoded using various methods. A first method (absolute d1 encoding method) is to encode the depth values of the previously generated image d1. A second method (differential encoding method) is to encode a difference between the depth values of previously generated image d1 and the depth values of image d0.

In the encoding method using the depth values of the two layers, d0 and d1 as described above, if there is another point between the two depths, the geometry information about the point is lost in the encoding process, and therefore an enhanced-delta-depth (EDD) code may be used for lossless coding.

Hereinafter, the EDD code will be described in detail with reference to FIG. 10.

Figure 10:
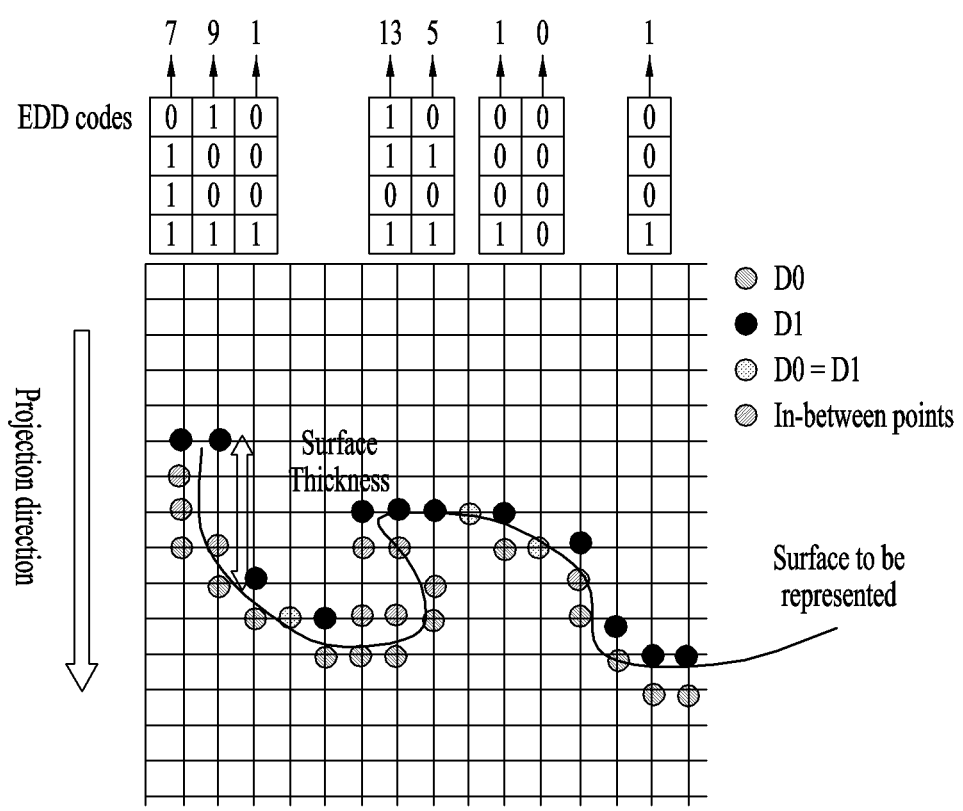
FIG. 10 illustrates an exemplary EDD code according to embodiments.

FIG. 10 illustrates an exemplary EDD code according to embodiments.

In some/all processes of the point cloud video encoder 10002 and/or V-PCC encoding (e.g., video compression 14009), the geometry information about points may be encoded based on the EOD code.

As shown in FIG. 10, the EDD code is used for binary encoding of the positions of all points within the range of surface thickness including d1. For example, in FIG. 10, the points included in the second left column may be represented by an EDD code of 0b1001 (=9) because the points are present at the first and fourth positions over D0 and the second and third positions are empty. When the EDD code is encoded together with D0 and transmitted, a reception terminal may restore the geometry information about all points without loss.

For example, when there is a point present above a reference point, the value is 1. When there is no point, the value is 0. Thus, the code may be expressed based on 4 bits.

Smoothing (14004)

Smoothing is an operation for eliminating discontinuity that may occur on the patch boundary due to deterioration of the image quality occurring during the compression process. Smoothing may be performed by the point cloud video encoder 10002 or smoother 14004:

1) Reconstruct the point cloud from the geometry image. This operation may be the reverse of the geometry image generation described above. For example, the reverse process of encoding may be reconstructed;

2) Calculate neighboring points of each point constituting the reconstructed point cloud using the K-D tree or the like;

3) Determine whether each of the points is positioned on the patch boundary. For example, when there is a neighboring point having a different projection plane (cluster index) from the current point, it may be determined that the point is positioned on the patch boundary;

4) If there is a point present on the patch boundary, move the point to the center of mass of the neighboring points (positioned at the average x, y, z coordinates of the neighboring points). That is, change the geometry value. Otherwise, maintain the previous geometry value.

Figure 11:
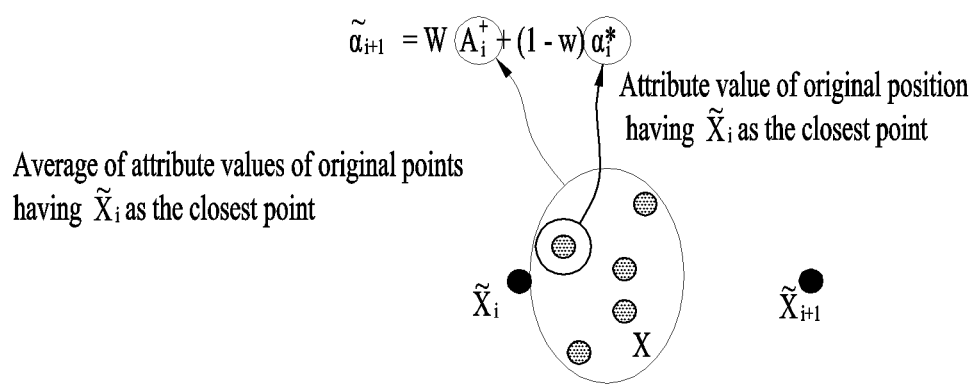
FIG. 11 illustrates an example of recoloring based on color values of neighboring points according to embodiments.

FIG. 11 illustrates an example of recoloring based on color values of neighboring points according to embodiments.

The point cloud video encoder 10002 or the texture image generator 14003 according to the embodiments may generate a texture image based on recoloring.

Texture Image Generation (14003)

The texture image generation process, which is similar to the geometry image generation process described above, includes generating texture images of individual patches and generating an entire texture image by arranging the texture images at determined positions. However, in the operation of generating texture images of individual patches, an image with color values (e.g., R, G, and B values) of the points constituting a point cloud corresponding to a position is generated in place of the depth values for geometry generation.

In estimating a color value of each point constituting the point cloud, the geometry previously obtained through the smoothing process may be used. In the smoothed point cloud, the positions of some points may have been shifted from the original point cloud, and accordingly a recoloring process of finding colors suitable for the changed positions may be required. Recoloring may be performed using the color values of neighboring points. For example, as shown in FIG. 11, a new color value may be calculated in consideration of the color value of the nearest neighboring point and the color values of the neighboring points.

For example, referring to FIG. 11, in the recoloring, a suitable color value for a changed position may be calculated based on the average of the attribute information about the closest original points to a point and/or the average of the attribute information about the closest original positions to the point.

Texture images may also be generated in two layers of t0 and t1, like the geometry images generated in two layers of d0 and d1.

Auxiliary Patch Information Compression (14005)

The point cloud video encoder 10002 or the auxiliary patch information compressor 14005 according to the embodiments may compress the auxiliary patch information (auxiliary information about the point cloud).

The auxiliary patch information compressor 14005 compresses the auxiliary patch information generated in the patch generation, patch packing, and geometry generation processes described above. The auxiliary patch information may include the following parameters:

Index (cluster index) for identifying the projection plane (normal plane);

3D spatial position of a patch, i.e., the minimum tangent value of the patch (on the patch 3d shift tangent axis), the minimum bitangent value of the patch (on the patch 3d shift bitangent axis), and the minimum normal value of the patch (on the patch 3d shift normal axis);

2D spatial position and size of the patch, i.e., the horizontal size (patch 2d size u), the vertical size (patch 2d size v), the minimum horizontal value (patch 2d shift u), and the minimum vertical value (patch 2d shift u); and Mapping information about each block and patch, i.e., a candidate index (when patches are disposed in order based on the 2D spatial position and size information about the patches, multiple patches may be mapped to one block in an overlapping manner. In this case, the mapped patches constitute a candidate list, and the candidate index indicates the position in sequential order of a patch whose data is present in the block), and a local patch index (which is an index indicating one of the patches present in the frame). Table 1 shows a pseudo code representing the process of matching between blocks and patches based on the candidate list and the local patch indexes.

The maximum number of candidate lists may be defined by a user.

TABLE 1

```
for( i = 0; i < BlockCount; i++ ) {
    if( candidatePatches[ i ].size( ) = = 1 ) {
        blockToPatch[ i ] = candidatePatches[ i ][ 0 ]
    } else {
        candidate_index
        if( candidate_index = = max_candidate_count ) {
            blockToPatch[ i ] = local_patch_index
        } else {
            blockToPatch[ i ] = candidatePatches[ i ][ candidate_index
            ]
        }
    }
}
```

Figure 12:
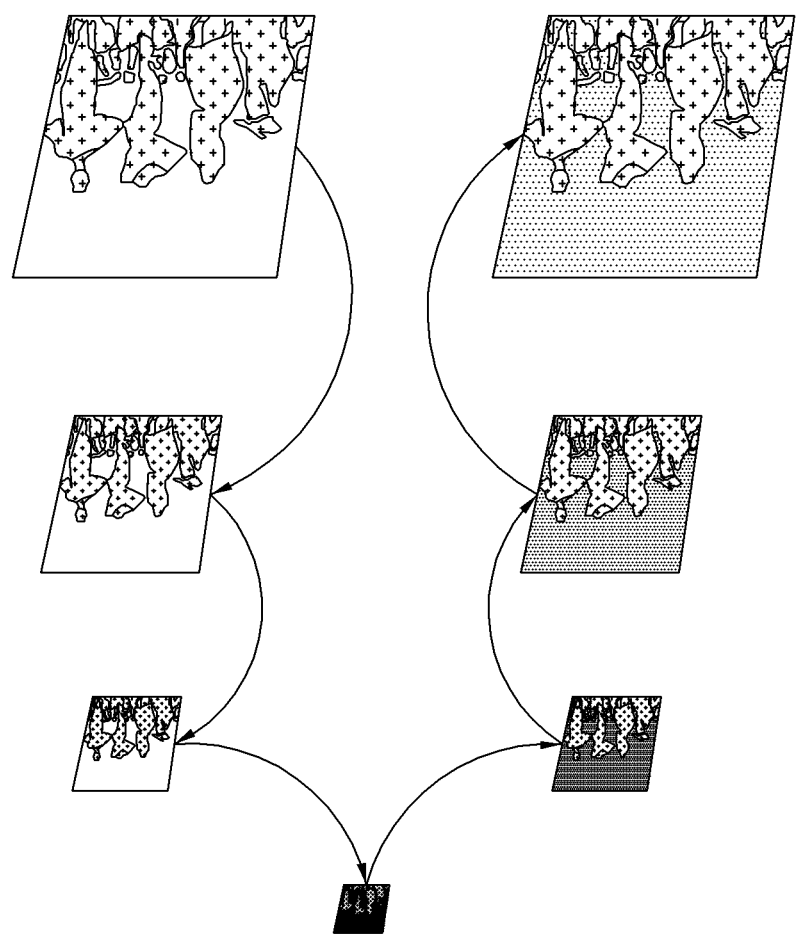
FIG. 12 illustrates an example of push-pull background filling according to embodiments.

FIG. 12 illustrates push-pull background filling according to embodiments.

Image Padding and Group Dilation (14006, 14007, 14008)

The image padder according to the embodiments may fill the space except the patch area with meaningless supplemental data based on the push-pull background filling technique.

Image padding 14006 and 14007 is a process of filling the space other than the patch region with meaningless data to improve compression efficiency. For image padding, pixel values in columns or rows close to a boundary in the patch may be copied to fill the empty space. Alternatively, as shown in FIG. 12, a push-pull background filling method may be used. According to this method, the empty space is filled with pixel values from a low resolution image in the process of gradually reducing the resolution of a non-padded image and increasing the resolution again.

Group dilation 14008 is a process of filling the empty spaces of a geometry image and a texture image configured in two layers, d0/d1 and t0/t1, respectively. In this process, the empty spaces of the two layers calculated through image padding are filled with the average of the values for the same position.

Figure 13:
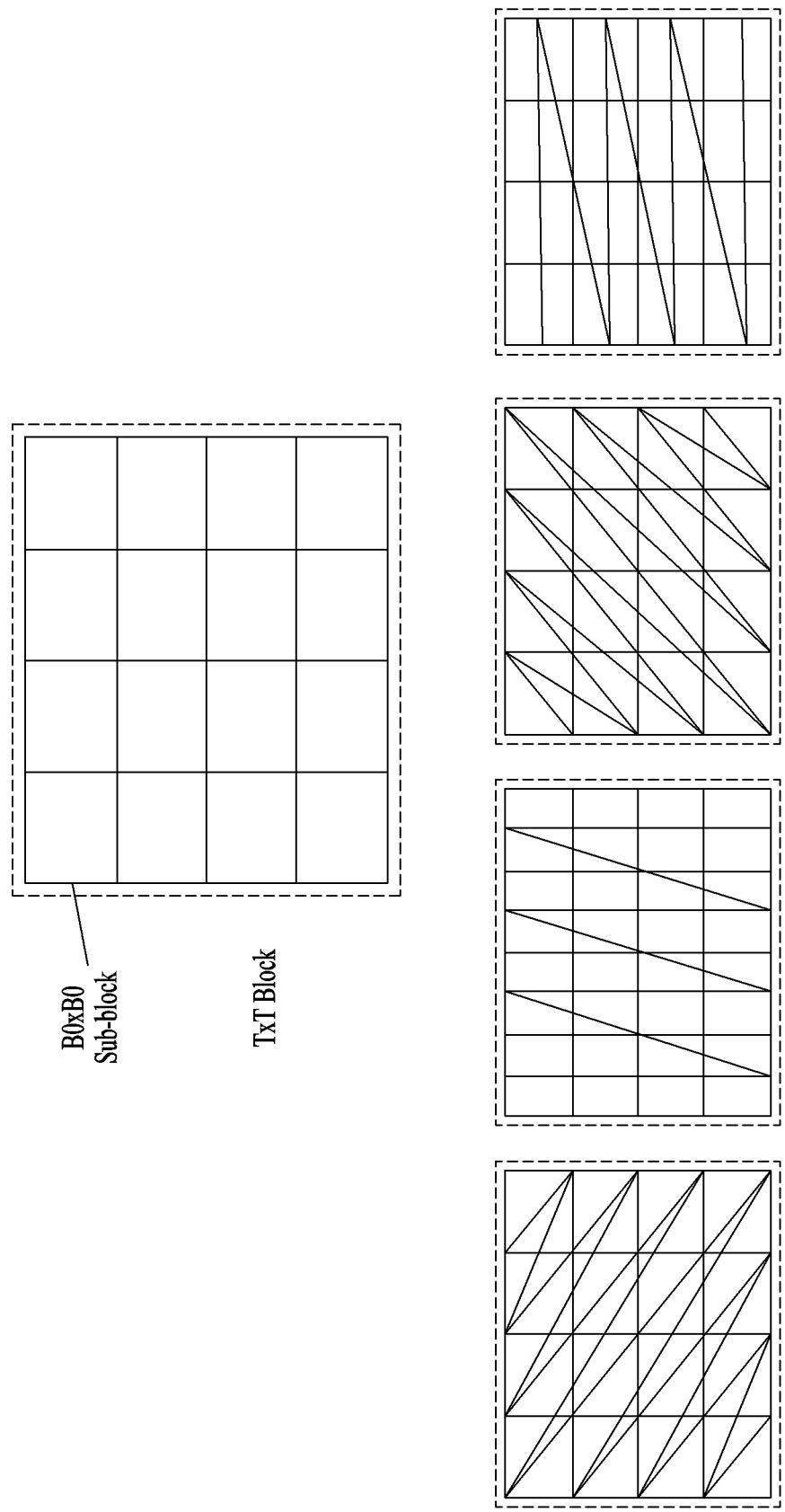
FIG. 13 shows an exemplary possible traversal order for a 4*4 block according to embodiments.

FIG. 13 shows an exemplary possible traversal order for a 4*4 block according to embodiments.

Occupancy Map Compression (14012, 14011)

The occupancy map compressor according to the embodiments may compress the previously generated occupancy map. Specifically, two methods, namely video compression for lossy compression and entropy compression for lossless compression, may be used. Video compression is described below.

The entropy compression may be performed through the following operations.

If a block constituting an occupancy map is fully occupied, encode 1 and repeat the same operation for the next block of the occupancy map. Otherwise, encode 0 and perform operations 2) to 5).

Determine the best traversal order to perform run-length coding on the occupied pixels of the block. FIG. 13 shows four possible traversal orders for a 4*4 block.

Figure 14:
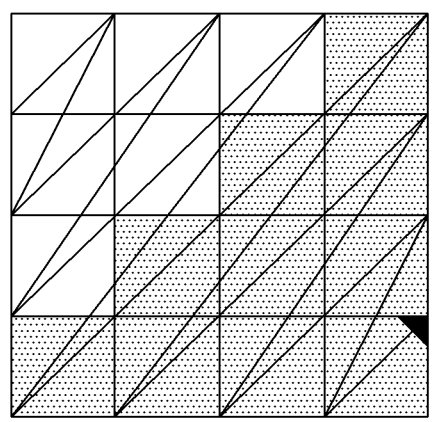
FIG. 14 illustrates an exemplary best traversal order according to embodiments.

FIG. 14 illustrates an exemplary best traversal order according to embodiments.

As described above, the entropy compressor according to the embodiments may code (encode) a block based on the traversal order scheme as shown in FIG. 14.

For example, the best traversal order with the minimum number of runs is selected from among the possible traversal orders and the index thereof is encoded. FIG. 14 illustrates a case where the third traversal order in FIG. 13 is selected. In the illustrated case, the number of runs may be minimized to 2, and therefore the third traversal order may be selected as the best traversal order.

3) Encode the number of runs. In the example of FIG. 14, there are two runs, and therefore 2 is encoded.

4) Encode the occupancy of the first run. In the example of FIG. 14, 0 is encoded because the first run corresponds to unoccupied pixels.

5) Encode lengths of the individual runs (as many as the number of runs). In the example of FIG. 14, the lengths of the first run and the second run, 6 and 10, are sequentially encoded.

Video Compression (14009, 14010, 14011)

The video compressors 14009, 14010, and 14011 according to the embodiments encodes a sequence of a geometry image, a texture image, an occupancy map image, and the like generated in the above-described operations, using a 2D video codec such as HEVC or VVC.

Figure 15:
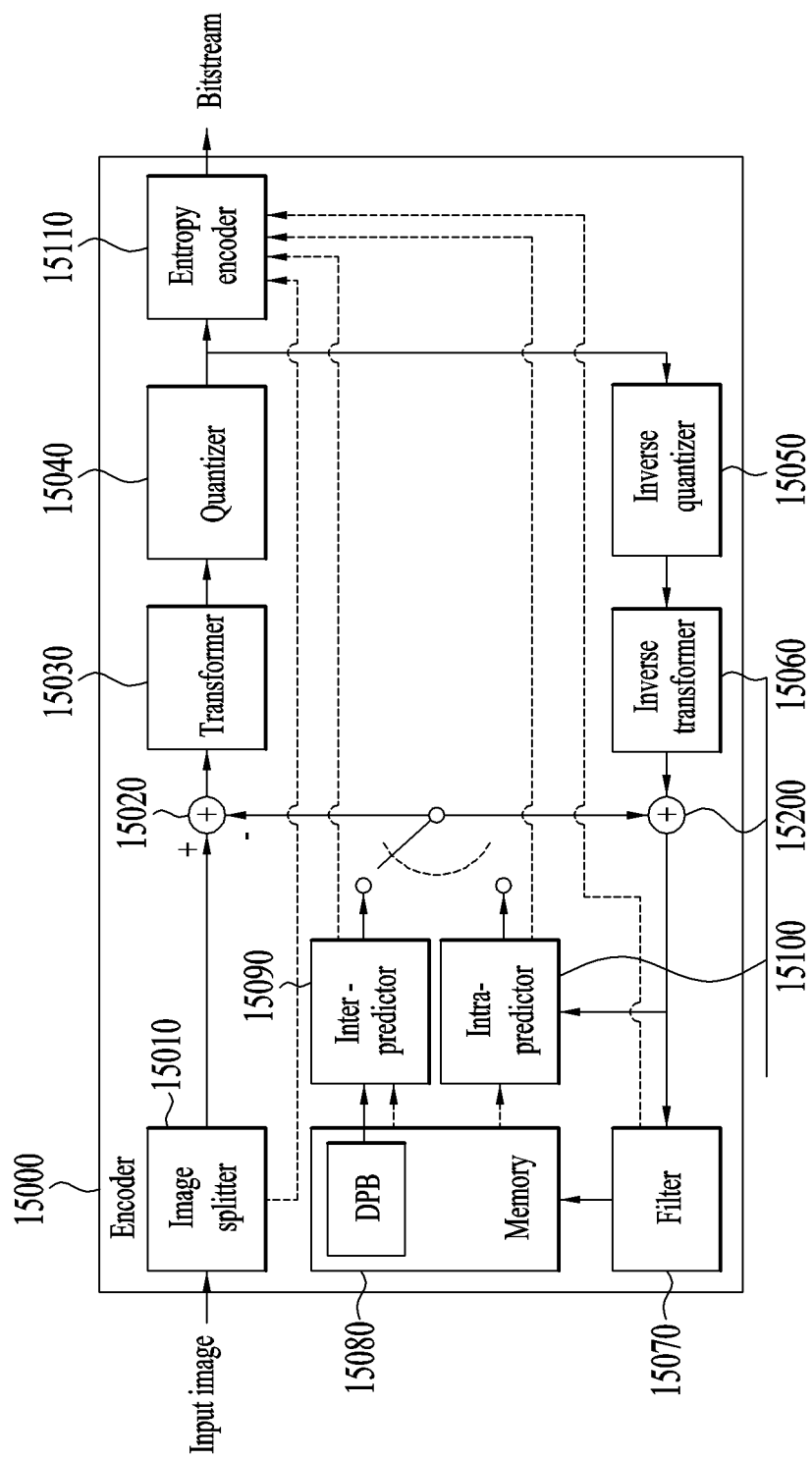
FIG. 15 illustrates an exemplary 2D video/image encoder according to embodiments.

FIG. 15 illustrates an exemplary 2D video/image encoder according to embodiments. According to embodiments, the 2D video/image encoder may be called an encoding device.

FIG. 15, which represents an embodiment to which the video compressors 14009, 14010, and 14011 described above is applied, is a schematic block diagram of a 2D video/image encoder 15000 configured to encode a video/image signal. The 2D video/image encoder 15000 may be included in the point cloud video encoder 10002 described above or may be configured as an internal/external component. Each component of FIG. 15 may correspond to software, hardware, processor and/or a combination thereof.

Here, the input image may be one of the geometry image, the texture image (attribute(s) image), and the occupancy map image described above. When the 2D video/image encoder of FIG. 15 is applied to the video compressor 14009, the image input to the 2D video/image encoder 15000 is a padded geometry image, and the bitstream output from the 2D video/image encoder 15000 is a bitstream of a compressed geometry image. When the 2D video/image encoder of FIG. 15 is applied to the video compressor 14010, the image input to the 2D video/image encoder 15000 is a padded texture image, and the bitstream output from the 2D video/image encoder 15000 is a bitstream of a compressed texture image. When the 2D video/image encoder of FIG. 15 is applied to the video compressor 14011, the image input to the 2D video/image encoder 15000 is an occupancy map image, and the bitstream output from the 2D video/image encoder 15000 is a bitstream of a compressed occupancy map image.

An inter-predictor 15090 and an intra-predictor 15100 may be collectively called a predictor. That is, the predictor may include the inter-predictor 15090 and the intra-predictor 15100. A transformer 15030, a quantizer 15040, an inverse quantizer 15050, and an inverse transformer 15060 may be collectively called a residual processor. The residual processor may further include a subtractor 15020. According to an embodiment, the image splitter 15010, the subtractor 15020, the transformer 15030, the quantizer 15040, the inverse quantizer 15050, the inverse transformer 15060, the adder 15200, the filter 15070, the inter-predictor 15090, the intra-predictor 15100, and the entropy encoder 15110 of FIG. 15 may be configured by one hardware component (e.g., an encoder or a processor). In addition, the memory

15080 may include a decoded picture buffer (DPB) and may be configured by a digital storage medium.

The image splitter 15010 may spit an image (or a picture or a frame) input to the encoder 15000 into one or more processing units. For example, the processing unit may be called a coding unit (CU). In this case, the CU may be recursively split from a coding tree unit (CTU) or a largest coding unit (LCU) according to a quad-tree binary-tree (QTBT) structure. For example, one CU may be split into a plurality of CUs of a lower depth based on a quad-tree structure and/or a binary-tree structure. In this case, for example, the quad-tree structure may be applied first and the binary-tree structure may be applied later. Alternatively, the binary-tree structure may be applied first. The coding procedure according to the present disclosure may be performed based on a final CU that is not split anymore. In this case, the LCU may be used as the final CU based on coding efficiency according to characteristics of the image. When necessary, a CU may be recursively split into CUs of a lower depth, and a CU of the optimum size may be used as the final CU. Here, the coding procedure may include prediction, transformation, and reconstruction, which will be described later. As another example, the processing unit may further include a prediction unit (PU) or a transform unit (TU). In this case, the PU and the TU may be split or partitioned from the aforementioned final CU. The PU may be a unit of sample prediction, and the TU may be a unit for deriving a transform coefficient and/or a unit for deriving a residual signal from the transform coefficient.

The term "unit" may be used interchangeably with terms such as block or area or module. In a general case, an M×N block may represent a set of samples or transform coefficients configured in M columns and N rows. A sample may generally represent a pixel or a value of a pixel, and may indicate only a pixel/pixel value of a luma component, or only a pixel/pixel value of a chroma component. "Sample" may be used as a term corresponding to a pixel or a pel in one picture (or image).

The subtractor 15020 of the encoding device 15000 may generate a residual signal (residual block or residual sample array) by subtracting a prediction signal (predicted block or predicted sample array) output from the inter-predictor 15090 or the intra-predictor 15100 from an input image signal (original block or original sample array), and the generated residual signal is transmitted to the transformer 15030. In this case, as shown in the figure, the unit that subtracts the prediction signal (predicted block or predicted sample array) from the input image signal (original block or original sample array) in the encoding device 15000 may be called a subtractor 15020. The predictor may perform prediction for a processing target block (hereinafter referred to as a current block) and generate a predicted block including prediction samples for the current block. The predictor may determine whether intra-prediction or inter-prediction is applied on a current block or CU basis. As will be described later in the description of each prediction mode, the predictor may generate various kinds of information about prediction, such as prediction mode information, and deliver the generated information to the entropy encoder 15110. The information about the prediction may be encoded and output in the form of a bitstream by the entropy encoder 15110.

The intra-predictor 15100 of the predictor may predict the current block with reference to the samples in the current picture. The samples may be positioned in the neighbor of or away from the current block depending on the prediction mode. In intra-prediction, the prediction modes may include a plurality of non-directional modes and a plurality of directional modes. The non-directional modes may include, for example, a DC mode and a planar mode. The directional modes may include, for example, 33 directional prediction modes or 65 directional prediction modes according to fineness of the prediction directions. However, this is merely an example, and more or fewer directional prediction modes may be used depending on the setting. The intra-predictor 15100 may determine a prediction mode to be applied to the current block, based on the prediction mode applied to the neighboring block.

The inter-predictor 15090 of the predictor may derive a predicted block for the current block based on a reference block (reference sample array) specified by a motion vector on the reference picture. In this case, in order to reduce the amount of motion information transmitted in the inter-prediction mode, the motion information may be predicted on a per block, subblock, or sample basis based on the correlation in motion information between the neighboring blocks and the current block. The motion information may include a motion vector and a reference picture index. The motion information may further include information about an inter-prediction direction (L0 prediction, L1 prediction, Bi prediction, etc.). In the case of inter-prediction, the neighboring blocks may include a spatial neighboring block, which is present in the current picture, and a temporal neighboring block, which is present in the reference picture. The reference picture including the reference block may be the same as or different from the reference picture including the temporal neighboring block. The temporal neighboring block may be referred to as a collocated reference block or a collocated CU (colCU), and the reference picture including the temporal neighboring block may be referred to as a collocated picture (colPic). For example, the inter-predictor 15090 may configure a motion information candidate list based on the neighboring blocks and generate information indicating a candidate to be used to derive a motion vector and/or a reference picture index of the current block. Inter-prediction may be performed based on various prediction modes. For example, in a skip mode and a merge mode, the inter-predictor 15090 may use motion information about a neighboring block as motion information about the current block. In the skip mode, unlike the merge mode, the residual signal may not be transmitted. In a motion vector prediction (MVP) mode, the motion vector of a neighboring block may be used as a motion vector predictor and the motion vector difference may be signaled to indicate the motion vector of the current block.

The prediction signal generated by the inter-predictor 15090 or the intra-predictor 15100 may be used to generate a reconstruction signal or to generate a residual signal.

The transformer 15030 may generate transform coefficients by applying a transformation technique to the residual signal. For example, the transformation technique may include at least one of discrete cosine transform (DCT), discrete sine transform (DST), Karhunen-Loéve transform (KLT), graph-based transform (GBT), or conditionally non-linear transform (CNT). Here, the GBT refers to transformation obtained from a graph depicting the relationship between pixels. The CNT refers to transformation obtained based on a prediction signal generated based on all previously reconstructed pixels. In addition, the transformation operation may be applied to pixel blocks having the same size of a square, or may be applied to blocks of a variable size other than the square.

The quantizer 15040 may quantize the transform coefficients and transmit the same to the entropy encoder 15110. The entropy encoder 15110 may encode the quantized signal (information about the quantized transform coefficients) and output a bitstream of the encoded signal. The information about the quantized transform coefficients may be referred to as residual information. The quantizer 15040 may rearrange the quantized transform coefficients, which are in a block form, in the form of a one-dimensional vector based on a coefficient scan order, and generate information about the quantized transform coefficients based on the quantized transform coefficients in the form of the one-dimensional vector.

The entropy encoder 15110 may employ various encoding techniques such as, for example, exponential Golomb, context-adaptive variable length coding (CAVLC), and context-adaptive binary arithmetic coding (CABAC). The entropy encoder 15110 may encode information necessary for video/image reconstruction (e.g., values of syntax elements) together with or separately from the quantized transform coefficients. The encoded information (e.g., encoded video/image information) may be transmitted or stored in the form of a bitstream on a network abstraction layer (NAL) unit basis.

The bitstream may be transmitted over a network or may be stored in a digital storage medium. Here, the network may include a broadcast network and/or a communication network, and the digital storage medium may include various storage media such as USB, SD, CD, DVD, Blu-ray, HDD, and SSD. A transmitter (not shown) to transmit the signal output from the entropy encoder 15110 and/or a storage (not shown) to store the signal may be configured as internal/external elements of the encoder 15000. Alternatively, the transmitter may be included in the entropy encoder 15110.

The quantized transform coefficients output from the quantizer 15040 may be used to generate a prediction signal. For example, inverse quantization and inverse transform may be applied to the quantized transform coefficients through the inverse quantizer 15050 and the inverse transformer 15060 to reconstruct the residual signal (residual block or residual samples). The adder 15200 may add the reconstructed residual signal to the prediction signal output from the inter-predictor 15090 or the intra-predictor 15100. Thereby, a reconstructed signal (reconstructed picture, reconstructed block, reconstructed sample array) may be generated. When there is no residual signal for a processing target block as in the case where the skip mode is applied, the predicted block may be used as the reconstructed block. The adder 15200 may be called a reconstructor or a reconstructed block generator. The generated reconstructed signal may be used for intra-prediction of the next processing target block in the current picture, or may be used for inter-prediction of the next picture through filtering as described below.

The filter 15070 may improve subjective/objective image quality by applying filtering to the reconstructed signal output from the adder 15200. For example, the filter 15070 may generate a modified reconstructed picture by applying various filtering techniques to the reconstructed picture, and the modified reconstructed picture may be stored in the memory 15080, specifically, the DPB of the memory 15080. The various filtering techniques may include, for example, deblocking filtering, sample adaptive offset, adaptive loop filtering, and bilateral filtering. As described below in the description of the filtering techniques, the filter 15070 may generate various kinds of information about filtering and deliver the generated information to the entropy encoder 15110. The information about filtering may be encoded and output in the form of a bitstream by the entropy encoder 15110.

The modified reconstructed picture stored in the memory 15080 may be used as a reference picture by the inter-predictor 15090. Thus, when inter-prediction is applied, the encoder may avoid prediction mismatch between the encoder 15000 and the decoder and improve encoding efficiency.

The DPB of the memory 15080 may store the modified reconstructed picture so as to be used as a reference picture by the inter-predictor 15090. The memory 15080 may store the motion information about a block from which the motion information in the current picture is derived (or encoded) and/or the motion information about the blocks in a picture that has already been reconstructed. The stored motion information may be delivered to the inter-predictor 15090 so as to be used as motion information about a spatial neighboring block or motion information about a temporal neighboring block. The memory 15080 may store the reconstructed samples of the reconstructed blocks in the current picture and deliver the reconstructed samples to the intra-predictor 15100.

At least one of the prediction, transform, and quantization procedures described above may be skipped. For example, for a block to which the pulse code modulation (PCM) is applied, the prediction, transform, and quantization procedures may be skipped, and the value of the original sample may be encoded and output in the form of a bitstream.

Figure 16:
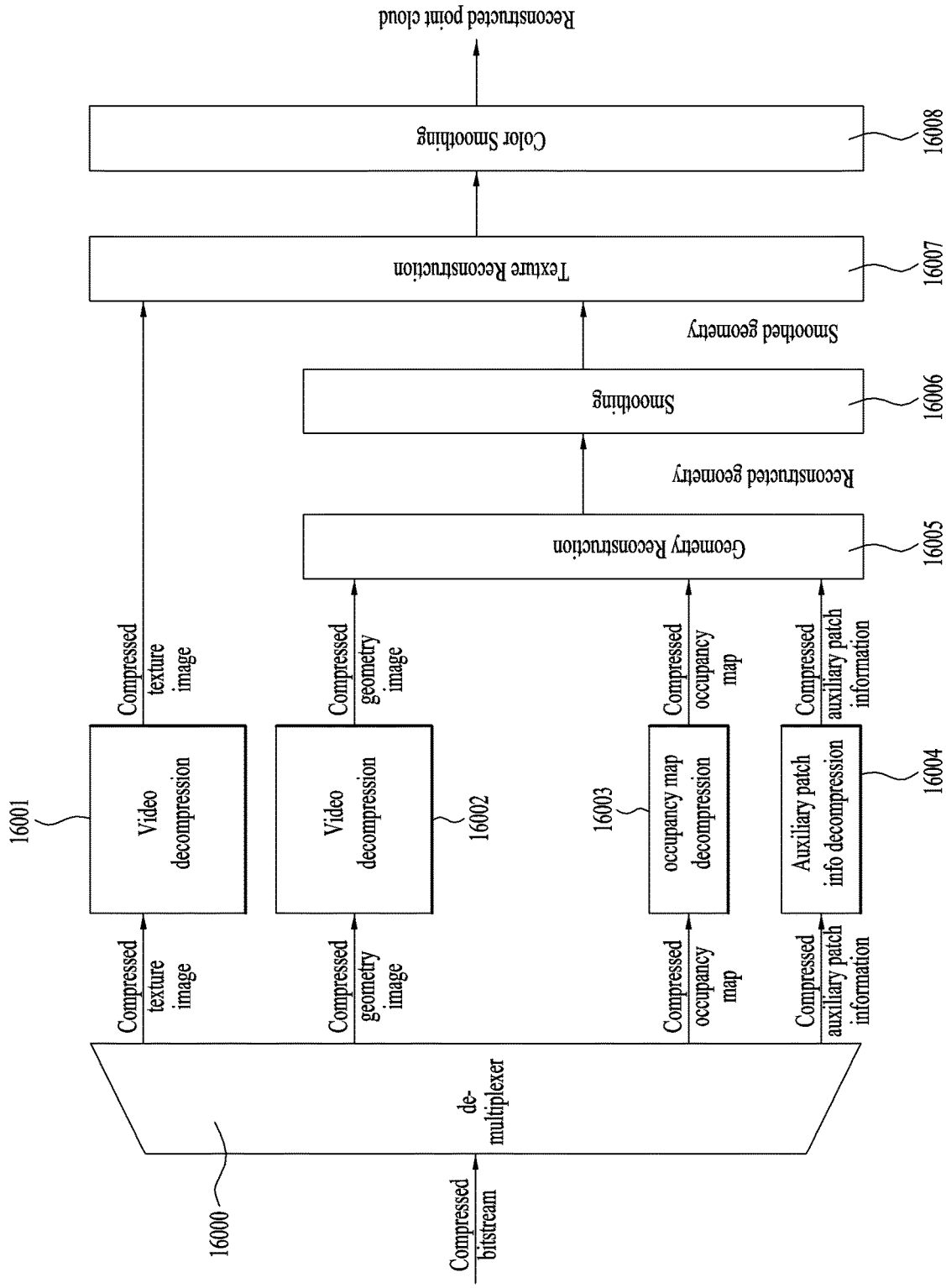
FIG. 16 illustrates an exemplary V-PCC decoding process according to embodiments.

FIG. 16 illustrates an exemplary V-PCC decoding process according to embodiments.

The V-PCC decoding process or V-PCC decoder may follow the reverse process of the V-PCC encoding process (or encoder) of FIG. 4. Each component in FIG. 16 may correspond to software, hardware, a processor, and/or a combination thereof.

The demultiplexer 16000 demultiplexes the compressed bitstream to output a compressed texture image, a compressed geometry image, a compressed occupancy map, and a compressed auxiliary patch information, respectively.

The video decompression or video decompressors 16001 and 16002 decompress each of the compressed texture image and the compressed geometry image.

The occupancy map decompression or occupancy map decompressor 16003 decompresses the compressed occupancy map image.

The auxiliary patch information decompression or auxiliary patch information decompressor 16004 decompresses the compressed auxiliary patch information.

The geometry reconstruction or geometry reconstructor 16005 restores (reconstructs) the geometry information based on the decompressed geometry image, the decompressed occupancy map, and/or the decompressed auxiliary patch information. For example, the geometry changed in the encoding process may be reconstructed.

The smoothing or smoother 16006 may apply smoothing to the reconstructed geometry. For example, smoothing filtering may be applied.

The texture reconstruction or texture reconstructor 16007 reconstructs the texture from the decompressed texture image and/or the smoothed geometry.

The color smoothing or color smoother 16008 smooths color values from the reconstructed texture. For example, smoothing filtering may be applied.

As a result, reconstructed point cloud data may be generated.

FIG. 16 illustrates a decoding process of the V-PCC for reconstructing a point cloud by decompressing (decoding) the compressed occupancy map, geometry image, texture image, and auxiliary patch information.

Each of the units illustrated in FIG. 16 may operate as at least one of a processor, software, and hardware. Detailed operations of each unit of FIG. 16 according to embodiments are described below.

Video Decompression (16001, 16002)

Video decompression is a reverse process of the video compression described above. It is a process of decoding the bitstream of a geometry image, the bitstream of a compressed texture image, and/or the bitstream of a compressed occupancy map image generated in the above-described process, using a 2D video codec such as HEVC and VVC.

Figure 17:
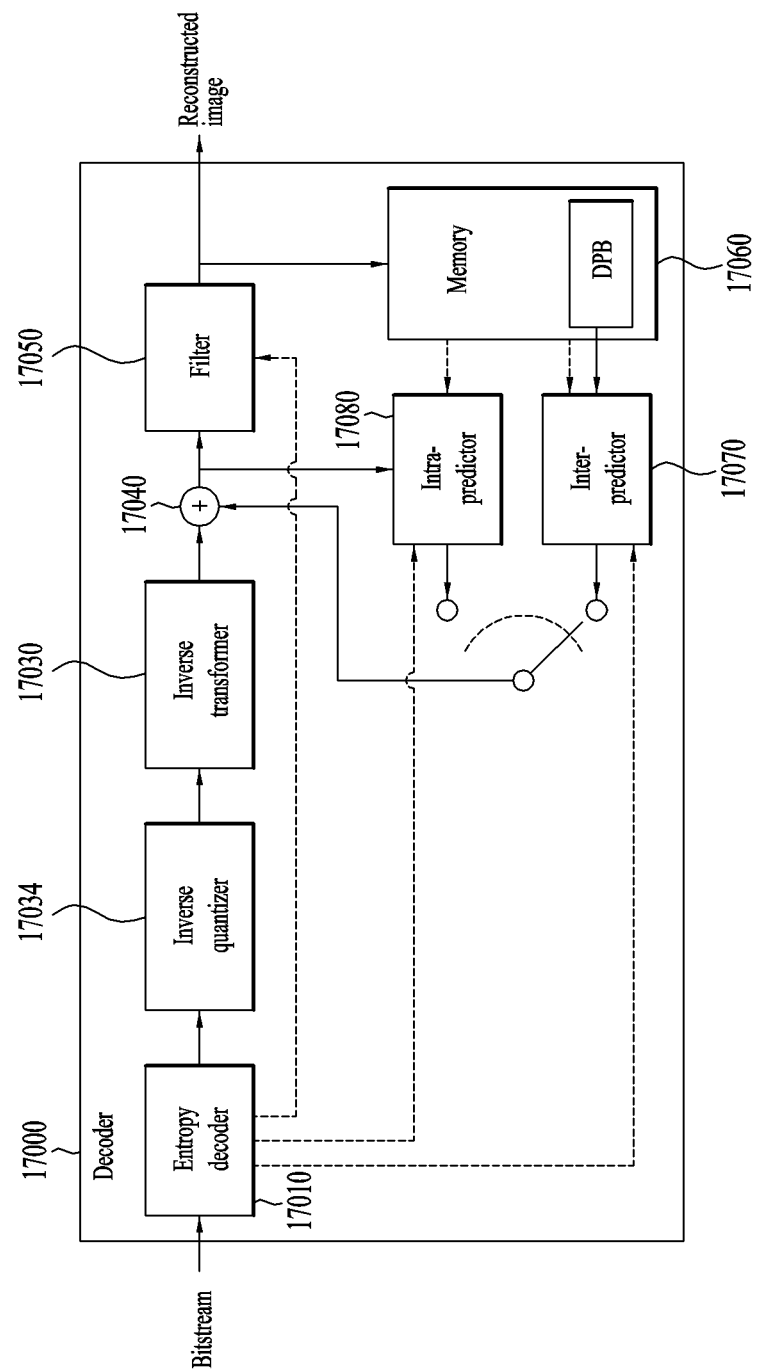
FIG. 17 shows an exemplary 2D video/image decoder according to embodiments.

FIG. 17 illustrates an exemplary 2D video/image decoder according to embodiments, which is also referred to as a decoding device.

The 2D video/image decoder may follow the reverse process of the operation of the 2D video/image encoder of FIG. 15.

The 2D video/image decoder of FIG. 17 is an embodiment of the video decompressors 16001 and 16002 of FIG. 16. FIG. 17 is a schematic block diagram of a 2D video/image decoder 17000 by which a video/image signal is decoded. The 2D video/image decoder 17000 may be included in the point cloud video decoder 10008 described above, or may be configured as an internal/external component. Each component in FIG. 17 may correspond to software, hardware, a processor, and/or a combination thereof.

Here, the input bitstream may be one of a bitstream of a geometry image, a bitstream of a texture image (attribute(s) image), and a bitstream of an occupancy map image. When the 2D video/image decoder of FIG. 17 is applied to the video decompressor 16001, the bitstream input to the 2D video/image decoder is a bitstream of a compressed texture image, and the reconstructed image output from the 2D video/image decoder is a decompressed texture image. When the 2D video/image decoder of FIG. 17 is applied to the video decompressor 16002, the bitstream input to the 2D video/image decoder is a bitstream of a compressed geometry image, and the reconstructed image output from the 2D video/image decoder is a decompressed geometry image. The 2D video/image decoder of FIG. 17 may receive a bitstream of a compressed occupancy map image and decompress the same. The reconstructed image (or the output image or decoded image) may represent a reconstructed image for the above-described geometry image, texture image (attribute(s) image), and occupancy map image.

Referring to FIG. 17, an inter-predictor 17070 and an intra-predictor 17080 may be collectively referred to as a predictor. That is, the predictor may include the inter-predictor 17070 and the intra-predictor 17080. An inverse quantizer 17020 and an inverse transformer 17030 may be collectively referred to as a residual processor. That is, the residual processor may include the inverse quantizer 17020 and the inverse transformer 17030. The entropy decoder 17010, the inverse quantizer 17020, the inverse transformer 17030, the adder 17040, the filter 17050, the inter-predictor 17070, and the intra-predictor 17080 of FIG. 17 may be configured by one hardware component (e.g., a decoder or a processor) according to an embodiment. In addition, the memory 17060 may include a decoded picture buffer (DPB) or may be configured by a digital storage medium.

When a bitstream containing video/image information is input, the decoder 17000 may reconstruct an image in a process corresponding to the process in which the video/image information is processed by the encoder of FIG. 15. For example, the decoder 17000 may perform decoding using a processing unit applied in the encoder. Thus, the processing unit of decoding may be, for example, a CU. The CU may be split from a CTU or an LCU along a quad-tree structure and/or a binary-tree structure. Then, the reconstructed video signal decoded and output through the decoder 17000 may be played through a player.

The decoder 17000 may receive a signal output from the encoder in the form of a bitstream, and the received signal may be decoded through the entropy decoder 17010. For example, the entropy decoder 17010 may parse the bitstream to derive information (e.g., video/image information) necessary for image reconstruction (or picture reconstruction). For example, the entropy decoder 17010 may decode the information in the bitstream based on a coding technique such as exponential Golomb coding, CAVLC, or CABAC, output values of syntax elements required for image reconstruction, and quantized values of transform coefficients for the residual. More specifically, in the CABAC entropy decoding, a bin corresponding to each syntax element in the bitstream may be received, and a context model may be determined based on decoding target syntax element information and decoding information about neighboring and decoding target blocks or information about a symbol/bin decoded in a previous step. Then, the probability of occurrence of a bin may be predicted according to the determined context model, and arithmetic decoding of the bin may be performed to generate a symbol corresponding to the value of each syntax element. According to the CABAC entropy decoding, after a context model is determined, the context model may be updated based on the information about the symbol/bin decoded for the context model of the next symbol/bin. Information about the prediction in the information decoded by the entropy decoder 17010 may be provided to the predictors (the inter-predictor 17070 and the intra-predictor 17080), and the residual values on which entropy decoding has been performed by the entropy decoder 17010, that is, the quantized transform coefficients and related parameter information, may be input to the inverse quantizer 17020. In addition, information about filtering of the information decoded by the entropy decoder 17010 may be provided to the filter 17050. A receiver (not shown) configured to receive a signal output from the encoder may be further configured as an internal/external element of the decoder 17000. Alternatively, the receiver may be a component of the entropy decoder 17010.

The inverse quantizer 17020 may output transform coefficients by inversely quantizing the quantized transform coefficients. The inverse quantizer 17020 may rearrange the quantized transform coefficients in the form of a two-dimensional block. In this case, the rearrangement may be performed based on the coefficient scan order implemented by the encoder. The inverse quantizer 17020 may perform inverse quantization on the quantized transform coefficients using a quantization parameter (e.g., quantization step size information), and acquire transform coefficients.

The inverse transformer 17030 acquires a residual signal (residual block and residual sample array) by inversely transforming the transform coefficients.

The predictor may perform prediction on the current block and generate a predicted block including prediction samples for the current block. The predictor may determine whether intra-prediction or inter-prediction is to be applied to the current block based on the information about the prediction output from the entropy decoder 17010, and may determine a specific intra-/inter-prediction mode.

The intra-predictor 17080 of the predictor may predict the current block with reference to the samples in the current picture. The samples may be positioned in the neighbor of or away from the current block depending on the prediction mode. In intra-prediction, the prediction modes may include a plurality of non-directional modes and a plurality of directional modes. The intra-predictor 17080 may determine a prediction mode to be applied to the current block, using the prediction mode applied to the neighboring block.

The inter-predictor 17070 of the predictor may derive a predicted block for the current block based on a reference block (reference sample array) specified by a motion vector on the reference picture. In this case, in order to reduce the amount of motion information transmitted in the inter-prediction mode, the motion information may be predicted on per a block, subblock, or sample basis based on the correlation in motion information between the neighboring blocks and the current block. The motion information may include a motion vector and a reference picture index. The motion information may further include information about an inter-prediction direction (L0 prediction, L1 prediction, Bi prediction, etc.). In the case of inter-prediction, the neighboring blocks may include a spatial neighboring block, which is present in the current picture, and a temporal neighboring block, which is present in the reference picture. For example, the inter-predictor 17070 may configure a motion information candidate list based on neighboring blocks and derive a motion vector of the current block and/or a reference picture index based on the received candidate selection information. Inter-prediction may be performed based on various prediction modes. The information about the prediction may include information indicating an inter-prediction mode for the current block.

The adder 17040 may add the acquired residual signal in the inverse transformer 17030 to the prediction signal (predicted block or prediction sample array) output from the inter-predictor 17070 or the intra-predictor 17080, thereby generating a reconstructed signal (a reconstructed picture, a reconstructed block, or a reconstructed sample array). When there is no residual signal for a processing target block as in the case where the skip mode is applied, the predicted block may be used as the reconstructed block.

The adder 17040 may be called a reconstructor or a reconstructed block generator. The generated reconstructed signal may be used for intra-prediction of the next processing target block in the current picture, or may be used for inter-prediction of the next picture through filtering as described below.

The filter 17050 may improve subjective/objective image quality by applying filtering to the reconstructed signal output from the adder 17040. For example, the filter 17050 may generate a modified reconstructed picture by applying various filtering techniques to the reconstructed picture, and may transmit the modified reconstructed picture to the memory 17060, specifically, the DPB of the memory 17060. The various filtering techniques may include, for example, deblocking filtering, sample adaptive offset, adaptive loop filtering, and bilateral filtering.

The reconstructed picture stored in the DPB of the memory 17060 may be used as a reference picture in the inter-predictor 17070. The memory 17060 may store the motion information about a block from which the motion information is derived (or decoded) in the current picture and/or the motion information about the blocks in a picture that has already been reconstructed. The stored motion information may be delivered to the inter-predictor 17070 so as to be used as the motion information about a spatial neighboring block or the motion information about a temporal neighboring block. The memory 17060 may store the reconstructed samples of the reconstructed blocks in the current picture, and deliver the reconstructed samples to the intra-predictor 17080.

In the present disclosure, the embodiments described regarding the filter 15070, the inter-predictor 15090, and the intra-predictor 15100 of the encoder 15000 of FIG. 15 may be applied to the filter 17050, the inter-predictor 17070 and the intra-predictor 17080 of the decoder 17000, respectively, in the same or corresponding manner.

At least one of the prediction, inverse transform, and inverse quantization procedures described above may be skipped. For example, for a block to which the pulse code modulation (PCM) is applied, the prediction, inverse transform, and inverse quantization procedures may be skipped, and the value of a decoded sample may be used as a sample of the reconstructed image.

Occupancy Map Decompression (16003)

This is a reverse process of the occupancy map compression described above. Occupancy map decompression is a process for reconstructing the occupancy map by decompressing the occupancy map bitstream.

Auxiliary Patch Information Decompression (16004)

The auxiliary patch information may be reconstructed by performing the reverse process of the aforementioned auxiliary patch information compression and decoding the compressed auxiliary patch information bitstream.

Geometry Reconstruction (16005)

This is a reverse process of the geometry image generation described above. Initially, a patch is extracted from the geometry image using the reconstructed occupancy map, the 2D position/size information about the patch included in the auxiliary patch information, and the information about mapping between a block and the patch. Then, a point cloud is reconstructed in a 3D space based on the geometry image of the extracted patch and the 3D position information about the patch included in the auxiliary patch information. When the geometry value corresponding to a point (u, v) within the patch is g(u, v), and the coordinates of the position of the patch on the normal, tangent and bitangent axes of the 3D space are ($\delta 0$, s0, r0), $\delta(u, v)$, s(u, v), and r(u, v), which are the normal, tangent, and bitangent coordinates in the 3D space of a position mapped to point (u, v) may be expressed as follows:

$$\delta(u,v)=\delta 0+g(u,v)$$

$$s(u,v)=s0+u$$

$$r(u,v)=r0+v.$$

Smoothing (16006)

Smoothing, which is the same as the smoothing in the encoding process described above, is a process for eliminating discontinuity that may occur on the patch boundary due to deterioration of the image quality occurring during the compression process.

Texture Reconstruction (16007)

Texture reconstruction is a process of reconstructing a color point cloud by assigning color values to each point constituting a smoothed point cloud. It may be performed by assigning color values corresponding to a texture image pixel at the same position as in the geometry image in the 2D space to points of a point of a point cloud corresponding to the same position in the 3D space, based on the geometry image reconstructed in the geometry reconstruction process and the mapping information of the point cloud described above.

Color Smoothing (16008)

Color smoothing is similar to the process of geometry smoothing described above. Color smoothing is a process for eliminating discontinuity that may occur on the patch boundary due to deterioration of the image quality occurring during the compression process. Color smoothing may be performed through the following operations:

1) Calculate neighboring points of each point constituting the reconstructed point cloud using the K-D tree or the like. The neighboring point information calculated in the geometry smoothing process described above may be used.

2) Determine whether each of the points is positioned on the patch boundary. These operations may be performed based on the boundary information calculated in the geometry smoothing process described above.

3) Check the distribution of color values for the neighboring points of the points present on the boundary and determine whether smoothing is to be performed. For example, when the entropy of luminance values is less than or equal to a threshold local entry (there are many similar luminance values), it may be determined that the corresponding portion is not an edge portion, and smoothing may be performed. As a method of smoothing, the color value of the point may be replaced with the average of the color values of the neighboring points.

Figure 18:
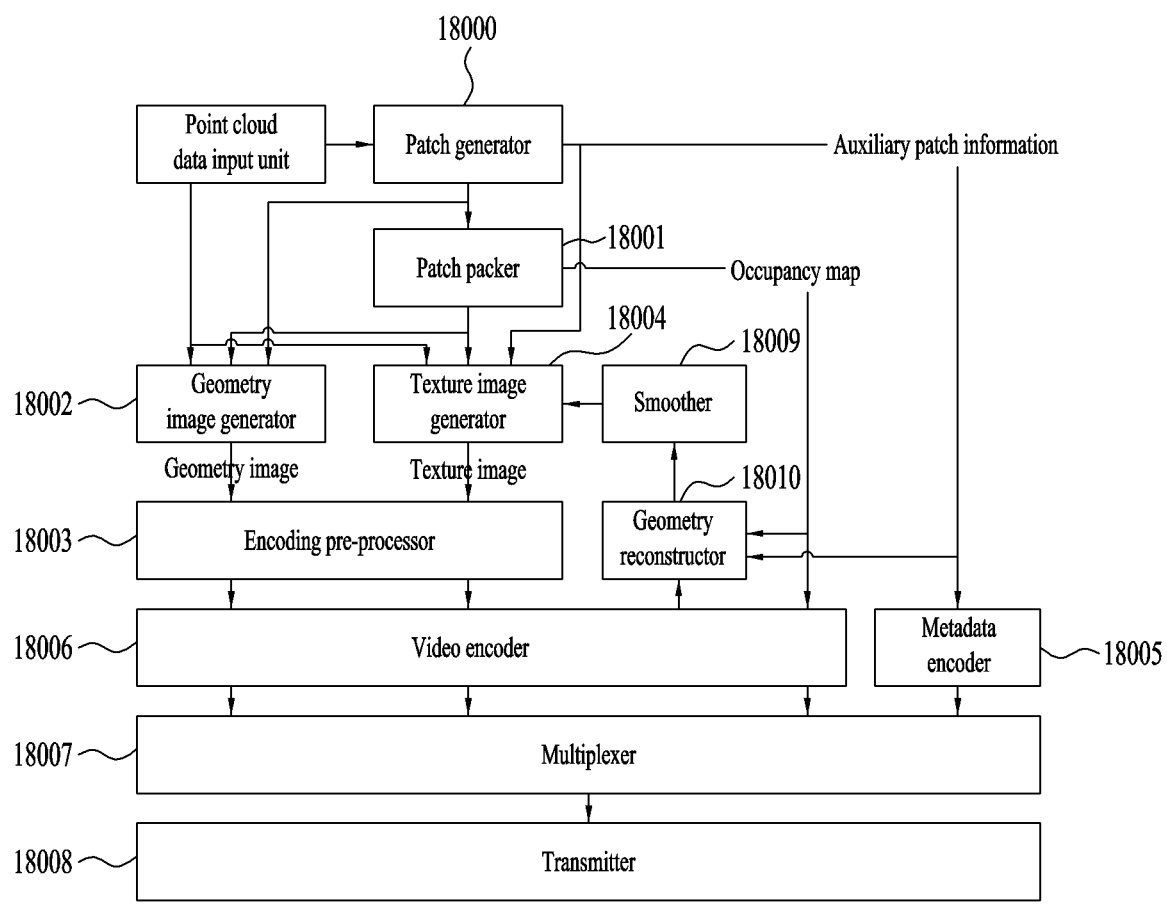
FIG. 18 is a flowchart illustrating operation of a transmission device according to embodiments of the present disclosure.

FIG. 18 is a flowchart illustrating operation of a transmission device for compression and transmission of V-PCC based point cloud data according to embodiments of the present disclosure.

The transmission device according to the embodiments may correspond to the transmission device of FIG. 1, the encoding process of FIG. 4, and the 2D video/image encoder of FIG. 15, or perform some/all of the operations thereof. Each component of the transmission device may correspond to software, hardware, a processor and/or a combination thereof.

An operation process of the transmission terminal for compression and transmission of point cloud data using V-PCC may be performed as illustrated in the figure.

The point cloud data transmission device according to the embodiments may be referred to as a transmission device or a transmission system.

Regarding a patch generator 18000, a patch for 2D image mapping of a point cloud is generated based on input point cloud data. Patch information and/or auxiliary patch information is generated as a result of the patch generation. The generated patch information and/or auxiliary patch information may be used in the processes of geometry image generation, texture image generation, smoothing, and geometry reconstruction for smoothing.

The patch packer 18001 performs a patch packing process of mapping the patches generated by the patch generator 18000 into a 2D image. For example, one or more patches may be packed. An occupancy map may be generated as a result of the patch packing. The occupancy map may be used in the processes of geometry image generation, geometry image padding, texture image padding, and/or geometry reconstruction for smoothing.

The geometry image generator 18002 generates a geometry image based on the point cloud data, the patch information (or auxiliary patch information), and/or the occupancy map. The generated geometry image is pre-processed by the encoding pre-processor 18003 and then encoded into one bitstream by the video encoder 18006.

The encoding pre-processor 18003 may include an image padding procedure. In other words, the generated geometry image and some spaces in the generated texture image may be padded with meaningless data. The encoding pre-processor 18003 may further include a group dilation procedure for the generated texture image or the texture image on which image padding has been performed.

The geometry reconstructor 18010 reconstructs a 3D geometry image based on the geometry bitstream, auxiliary patch information, and/or occupancy map encoded by the video encoder 18006.

The smoother 18009 smoothes the 3D geometry image reconstructed and output by the geometry reconstructor 18010 based on the auxiliary patch information, and outputs the smoothed 3D geometry image to the texture image generator 18004.

The texture image generator 18004 may generate a texture image based on the smoothed 3D geometry, point cloud data, patch (or packed patch), patch information (or auxiliary patch information), and/or occupancy map. The generated texture image may be pre-processed by the encoding pre-processor 18003 and then encoded into one video bitstream by the video encoder 18006.

The metadata encoder 18005 may encode the auxiliary patch information into one metadata bitstream.

The video encoder 18006 may encode the geometry image and the texture image output from the encoding pre-processor 18003 into respective video bitstreams, and may encode the occupancy map into one video bitstream. According to an embodiment, the video encoder 18006 encodes each input image by applying the 2D video/image encoder of FIG. 15.

The multiplexer 18007 multiplexes the video bitstream of geometry, the video bitstream of the texture image, the video bitstream of the occupancy map, which are output from the video encoder 18006, and the bitstream of the metadata (including auxiliary patch information), which is output from the metadata encoder 18005, into one bitstream.

The transmitter 18008 transmits the bitstream output from the multiplexer 18007 to the receiving side. Alternatively, a file/segment encapsulator may be further provided between the multiplexer 18007 and the transmitter 18008, and the bitstream output from the multiplexer 18007 may be encapsulated in the form of a file and/or segment and output to the transmitter 18008.

The patch generator 18000, the patch packer 18001, the geometry image generator 18002, the texture image generator 18004, the metadata encoder 18005, and the smoother 18009 of FIG. 18 may correspond to the patch generation 14000, the patch packing 14001, the geometry image generation 14002, the texture image generation 14003, the auxiliary patch information compression 14005, and the smoothing 14004, respectively. The encoding pre-processor 18003 of FIG. 18 may include the image padders 14006 and 14007 and the group dilator 14008 of FIG. 4, and the video encoder 18006 of FIG. 18 may include the video compressors 14009, 14010, and 14011 and/or the entropy compressor 14012 of FIG. 4. For parts not described with reference to FIG. 18, refer to the description of FIGS. 4 to 15. The above-described blocks may be omitted or may be replaced by blocks having similar or identical functions. In addition, each of the blocks shown in FIG. 18 may operate as at least one of a processor, software, or hardware. Alternatively, the generated video bitstreams of the geometry, the texture image, and the occupancy map and the metadata bitstream of the auxiliary patch information may be formed into one or more track data in a file or encapsulated into segments and transmitted to the receiving side through a transmitter.

Procedure of Operating the Reception Device

Figure 19:
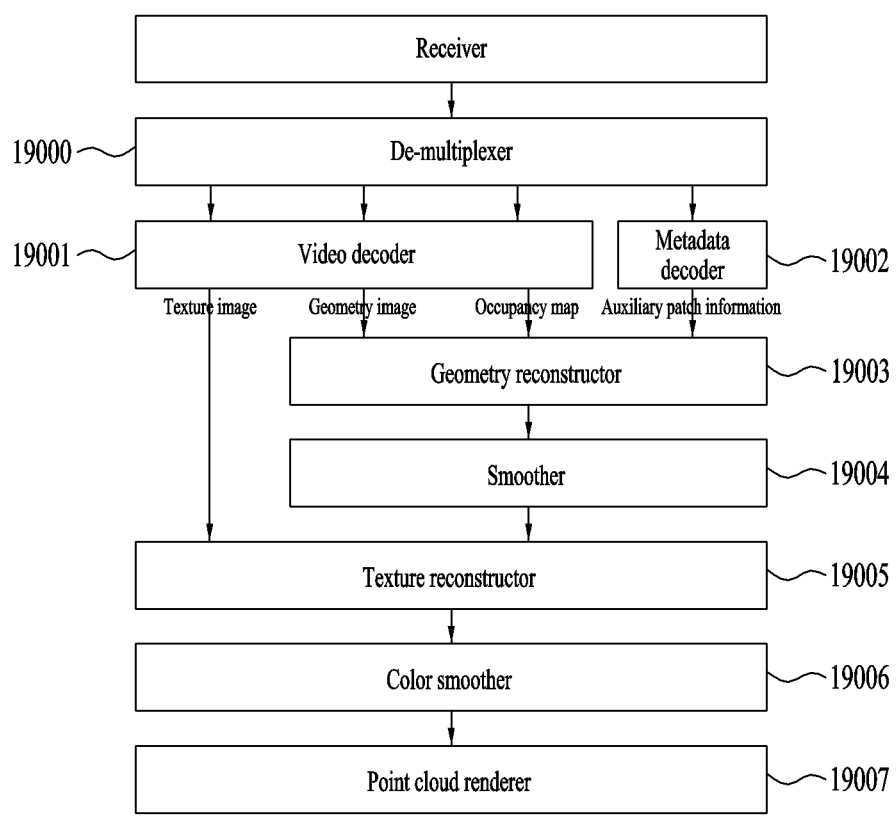
FIG. 19 is a flowchart illustrating operation of a reception device according to embodiments.

FIG. 19 is a flowchart illustrating operation of a reception device for receiving and restoring V-PCC-based point cloud data according to embodiments.

The reception device according to the embodiments may correspond to the reception device of FIG. 1, the decoding process of FIG. 16, and the 2D video/image encoder of FIG. 17, or perform some/all of the operations thereof. Each component of the reception device may correspond to software, hardware, a processor and/or a combination thereof.

The operation of the reception terminal for receiving and reconstructing point cloud data using V-PCC may be performed as illustrated in the figure. The operation of the V-PCC reception terminal may follow the reverse process of the operation of the V-PCC transmission terminal of FIG. 18.

The point cloud data reception device according to the embodiments may be referred to as a reception device, a reception system, or the like.

The receiver receives a bitstream (i.e., compressed bitstream) of a point cloud, and the demultiplexer 19000 demultiplexes a bitstream of a texture image, a bitstream of a geometry image, and a bitstream of an occupancy map image, and a bitstream of metadata (i.e., auxiliary patch information) from the received point cloud bitstream. The demultiplexed bitstreams of the texture image, the geometry image, and the occupancy map image are output to the video decoder 19001, and the bitstream of the metadata is output to the metadata decoder 19002.

According to an embodiment, when the transmission device of FIG. 18 is provided with a file/segment encapsulator, a file/segment decapsulator is provided between the receiver and the demultiplexer 19000 of the receiving device of FIG. 19 as. In this case, the transmission device encapsulates and transmits the point cloud bitstream in the form of a file and/or segment, and the reception device receives and decapsulates the file and/or segment containing the point cloud bitstream.

The video decoder 19001 decodes the bitstream of the geometry image, the bitstream of the texture image, and the bitstream of the occupancy map image into the geometry image, the texture image, and the occupancy map image, respectively. According to an embodiment, the video decoder 19001 performs the decoding operation by applying the 2D video/image decoder of FIG. 17 to each input bitstream. The metadata decoder 19002 decodes the bitstream of metadata into auxiliary patch information, and outputs the information to the geometry reconstructor 19003.

The geometry reconstructor 19003 reconstructs the 3D geometry based on the geometry image, the occupancy map, and/or auxiliary patch information output from the video decoder 19001 and the metadata decoder 19002.

The smoother 19004 smoothes the 3D geometry reconstructed by the geometry reconstructor 19003.

The texture reconstructor 19005 reconstruct the texture using the texture image output from the video decoder 19001 and/or the smoothed 3D geometry. That is, the texture reconstructor 19005 reconstructs the color point cloud image/picture by assigning color values to the smoothed 3D geometry using the texture image. Thereafter, in order to improve objective/subjective visual quality, a color smoothing process may be additionally performed on the color point cloud image/picture by the color smoother 19006. The modified point cloud image/picture derived through the operation above is displayed to the user after the rendering process in the point cloud renderer 19007. In some cases, the color smoothing process may be omitted.

The above-described blocks may be omitted or may be replaced by blocks having similar or identical functions. In addition, each of the blocks shown in FIG. 19 may operate as at least one of a processor, software, and hardware.

Figure 20:
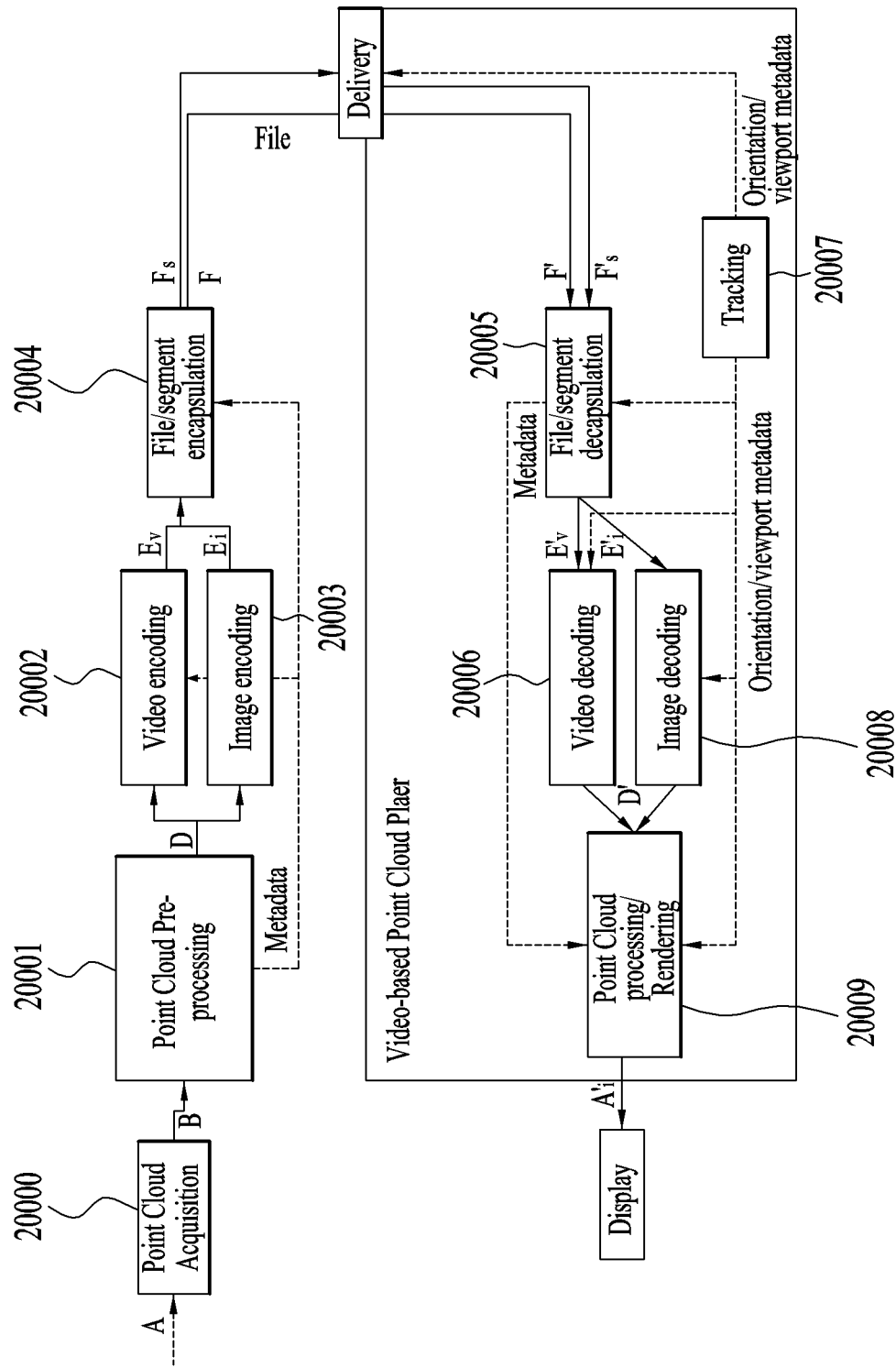
FIG. 20 illustrates an exemplary architecture for V-PCC based storage and streaming of point cloud data according to embodiments.

FIG. 20 illustrates an exemplary architecture for V-PCC based storage and streaming of point cloud data according to embodiments.

A part/the entirety of the system of FIG. 20 may include some or all of the transmission device and reception device of FIG. 1, the encoding process of FIG. 4, the 2D video/image encoder of FIG. 15, the decoding process of FIG. 16, the transmission device of FIG. 18, and/or the reception device of FIG. 19. Each component in the figure may correspond to software, hardware, a processor and/or a combination thereof.

FIG. 20 shows the overall architecture for storing or streaming point cloud data compressed based on video-based point cloud compression (V-PCC). The process of storing and streaming the point cloud data may include an acquisition process, an encoding process, a transmission process, a decoding process, a rendering process, and/or a feedback process.

The embodiments propose a method of effectively providing point cloud media/content/data.

In order to effectively provide point cloud media/content/data, a point cloud acquirer 20000 may acquire a point cloud video. For example, one or more cameras may acquire point cloud data through capture, composition or generation of a point cloud. Through this acquisition process, a point cloud video including a 3D position (which may be represented by x, y, and z position values, etc.) (hereinafter referred to as geometry) of each point and attributes (color, reflectance, transparency, etc.) of each point may be acquired. For example, a Polygon File format (PLY) (or Stanford Triangle format) file or the like containing the point cloud video may be generated. For point cloud data having multiple frames, one or more files may be acquired. In this process, point cloud related metadata (e.g., metadata related to capture, etc.) may be generated.

Post-processing for improving the quality of the content may be needed for the captured point cloud video. In the video capture process, the maximum/minimum depth may be adjusted within the range provided by the camera equipment. Even after the adjustment, point data of an unwanted area may still be present. Accordingly, post-processing of removing the unwanted area (e.g., the background) or recognizing a connected space and filling the spatial holes may be performed. In addition, point clouds extracted from the cameras sharing a spatial coordinate system may be integrated into one piece of content through the process of transforming each point into a global coordinate system based on the coordinates of the location of each camera acquired through a calibration process. Thereby, a point cloud video with a high density of points may be acquired.

A point cloud pre-processor 20001 may generate one or more pictures/frames for the point cloud video. Generally, a picture/frame may be a unit representing one image in a specific time interval. In addition, in dividing the points constituting the point cloud video into one or more patches and mapping the same to a 2D plane, the point cloud pre-processor 20001 may generate an occupancy map picture/frame, which is a binary map indicating presence or absence of data at the corresponding position in the 2D plane with a value of 0 or 1. Here, a patch is a set of points that constitute the point cloud video, wherein the points belonging to the same patch are adjacent to each other in the 3D space and are mapped to the same face among the planar faces of a 6-face bounding box in mapping to a 2D image). In addition, the point cloud pre-processor 20001 may generate a geometry picture/frame, which is in the form of a depth map that represents the information about the position (geometry) of each point constituting the point cloud video on a patch-by-patch basis. The point cloud pre-processor 20001 may also generate a texture picture/frame, which represents the color information about each point constituting the point cloud video on a patch-by-patch basis. In this process, metadata needed to reconstruct the point cloud from the individual patches may be generated. The metadata may contain information (auxiliary information or auxiliary patch information) about the patches, such as the position and size of each patch in the 2D/3D space. These pictures/frames may be generated continuously in temporal order to construct a video stream or metadata stream.

A point cloud video encoder 20002 may encode one or more video streams related to a point cloud video. One video may include multiple frames, and one frame may correspond to a still image/picture. In the present disclosure, the point cloud video may include a point cloud image/frame/picture, and the term "point cloud video" may be used interchangeably with the point cloud video/frame/picture. The point cloud video encoder 20002 may perform a video-based point cloud compression (V-PCC) procedure. The point cloud video encoder 20002 may perform a series of procedures such as prediction, transform, quantization, and entropy coding for compression and coding efficiency. The encoded data (encoded video/image information) may be output in the form of a bitstream. Based on the V-PCC procedure, the point cloud video encoder 20002 may encode point cloud video by dividing the same into a geometry video, an attribute video, an occupancy map video, and metadata, for example, information about patches, as described below. The geometry video may include a geometry image, the attribute video may include an attribute image, and the occupancy map video may include an occupancy map image. The patch data, which is auxiliary information, may include patch related information. The attribute video/image may include a texture video/image.

A point cloud image encoder 20003 may encode one or more images related to a point cloud video. The point cloud image encoder 20003 may perform a video-based point cloud compression (V-PCC) procedure. The point cloud image encoder 20003 may perform a series of procedures such as prediction, transform, quantization, and entropy coding for compression and coding efficiency. The encoded image may be output in the form of a bitstream. Based on the V-PCC procedure, the point cloud image encoder 20003 may encode the point cloud image by dividing the same into a geometry image, an attribute image, an occupancy map image, and metadata, for example, information about patches, as described below.

According to embodiments, the point cloud video encoder 20002, the point cloud image encoder 20003, the point cloud video decoder 20006, and the point cloud image decoder 20008 may be performed by one encoder/decoder as described above, and may be performed along separate paths as shown in the figure.

In file/segment encapsulator 20004, the encoded point cloud data and/or point cloud-related metadata may be encapsulated into a file or a segment for streaming. Here, the point cloud-related metadata may be received from the metadata processor (not shown) or the like. The metadata processor may be included in the point cloud video/image encoders 20002/20003 or may be configured as a separate component/module. The file/segment encapsulator 20004 may encapsulate the corresponding video/image/metadata in a file format such as ISOBMFF or in the form of a DASH segment or the like. According to an embodiment, the file/segment encapsulator 20004 may include the point cloud metadata in the file format. The point cloud-related metadata may be included, for example, in boxes at various levels on the ISOBMFF file format or as data in a separate track within the file. According to an embodiment, the file/segment encapsulator 20004 may encapsulate the point cloud-related metadata into a file.

The file/segment encapsulator 20004 according to the embodiments may store one bitstream or individually bitstreams into one or multiple tracks in a file, and may also encapsulate signaling information for this operation. In addition, an atlas stream (or patch stream) included on the bitstream may be stored as a track in the file, and related signaling information may be stored. Furthermore, an SEI message present in the bitstream may be stored in a track in the file and related signaling information may be stored.

A transmission processor (not shown) may perform processing of the encapsulated point cloud data for transmission according to the file format. The transmission processor may be included in the transmitter (not shown) or may be configured as a separate component/module. The transmission processor may process the point cloud data according to a transmission protocol. The processing for transmission may include processing for delivery over a broadcast network and processing for delivery through a broadband. According to an embodiment, the transmission processor may receive point cloud-related metadata from the metadata processor as well as the point cloud data, and perform processing of the point cloud video data for transmission.

The transmitter may transmit a point cloud bitstream or a file/segment including the bitstream to the receiver (not shown) of the reception device over a digital storage medium or a network. For transmission, processing according to any transmission protocol may be performed. The data processed for transmission may be delivered over a broadcast network and/or through a broadband. The data may be delivered to the reception side in an on-demand manner. The digital storage medium may include various storage media such as USB, SD, CD, DVD, Blu-ray, HDD, and SSD. The transmitter may include an element for generating a media file in a predetermined file format, and may include an element for transmission over a broadcast/communication network. The receiver may extract the bitstream and transmit the extracted bitstream to the decoder.

The receiver may receive point cloud data transmitted by the point cloud data transmission device according to the present disclosure. Depending on the transmission channel, the receiver may receive the point cloud data over a broadcast network or through a broadband. Alternatively, the point cloud data may be received through the digital storage medium. The receiver may include a process of decoding the received data and rendering the data according to the viewport of the user.

The reception processor (not shown) may perform processing on the received point cloud video data according to the transmission protocol. The reception processor may be included in the receiver or may be configured as a separate component/module. The reception processor may reversely perform the process of the transmission processor above described so as to correspond to the processing for transmission performed at the transmission side. The reception processor may deliver the acquired point cloud video to a file/segment decapsulator 20005, and the acquired point cloud-related metadata to a metadata parser.

The file/segment decapsulator 20005 may decapsulate the point cloud data received in the form of a file from the reception processor. The file/segment decapsulator 20005 may decapsulate files according to ISOBMFF or the like, and may acquire a point cloud bitstream or point cloud-related metadata (or a separate metadata bitstream). The acquired point cloud bitstream may be delivered to the point cloud video decoder 20006 and the point cloud image decoder 20008, and the acquired point cloud video-related metadata (metadata bitstream) may be delivered to the metadata processor (not shown). The point cloud bitstream may include the metadata (metadata bitstream). The metadata processor may be included in the point cloud video decoder 20006 or may be configured as a separate component/module. The point cloud video-related metadata acquired by the file/segment decapsulator 20005 may take the form of a box or track in the file format. The file/segment decapsulator 20005 may receive metadata necessary for decapsulation from the metadata processor, when necessary. The point cloud-related metadata may be delivered to the point cloud video decoder 20006 and/or the point cloud image decoder 20008 and used in a point cloud decoding procedure, or may be transferred to the renderer 20009 and used in a point cloud rendering procedure.

The point cloud video decoder 20006 may receive the bitstream and decode the video/image by performing an operation corresponding to the operation of the point cloud video encoder 20002. In this case, the point cloud video decoder 20006 may decode the point cloud video by dividing the same into a geometry video, an attribute video, an occupancy map video, and auxiliary patch information as described below. The geometry video may include a geometry image, the attribute video may include an attribute image, and the occupancy map video may include an occupancy map image. The auxiliary information may include auxiliary patch information. The attribute video/image may include a texture video/image.

The point cloud image decoder 20008 may receive a bitstream and perform a reverse process corresponding to the operation of the point cloud image encoder 20003. In this case, the point cloud image decoder 20008 may partition the point cloud image into a geometry image, an attribute image, an occupancy map image, and metadata, which is, for example, auxiliary patch information, to decode the same.

The 3D geometry may be reconstructed based on the decoded geometry video/image, the occupancy map, and auxiliary patch information, and then may be subjected to a smoothing process. The color point cloud image/picture may be reconstructed by assigning a color value to the smoothed 3D geometry based on the texture video/image. The renderer 20009 may render the reconstructed geometry and the color point cloud image/picture. The rendered video/image may be displayed through the display. All or part of the rendered result may be shown to the user through a VR/AR display or a typical display.

A sensor/tracker (sensing/tracking) 20007 acquires orientation information and/or user viewport information from the user or the reception side and delivers the orientation information and/or the user viewport information to the receiver and/or the transmitter. The orientation information may represent information about the position, angle, movement, etc. of the user's head, or represent information about the position, angle, movement, etc. of a device through which the user is viewing a video/image. Based on this information, information about the area currently viewed by the user in a 3D space, that is, viewport information may be calculated.

The viewport information may be information about an area in a 3D space currently viewed by the user through a device or an HMD. A device such as a display may extract a viewport area based on the orientation information, a vertical or horizontal FOV supported by the device, and the like. The orientation or viewport information may be extracted or calculated at the reception side. The orientation or viewport information analyzed at the reception side may be transmitted to the transmission side on a feedback channel.

Based on the orientation information acquired by the sensor/tracker 20007 and/or the viewport information indicating the area currently viewed by the user, the receiver may efficiently extract or decode only media data of a specific area, i.e., the area indicated by the orientation information and/or the viewport information from the file. In addition, based on the orientation information and/or viewport information acquired by the sensor/tracker 20007, the transmitter may efficiently encode only the media data of the specific area, that is, the area indicated by the orientation information and/or the viewport information, or generate and transmit a file therefor.

The renderer 20009 may render the decoded point cloud data in a 3D space. The rendered video/image may be displayed through the display. The user may view all or part of the rendered result through a VR/AR display or a typical display.

The feedback process may include transferring various feedback information that may be acquired in the rendering/displaying process to the transmitting side or the decoder of the receiving side. Through the feedback process, interactivity may be provided in consumption of point cloud data. According to an embodiment, head orientation information, viewport information indicating an area currently viewed by a user, and the like may be delivered to the transmitting side in the feedback process. According to an embodiment, the user may interact with what is implemented in the VR/AR/MR/autonomous driving environment. In this case, information related to the interaction may be delivered to the transmitting side or a service provider in the feedback process. According to an embodiment, the feedback process may be skipped.

According to an embodiment, the above-described feedback information may not only be transmitted to the transmitting side, but also be consumed at the receiving side. That is, the decapsulation processing, decoding, and rendering processes at the receiving side may be performed based on the above-described feedback information. For example, the point cloud data about the area currently viewed by the user may be preferentially decapsulated, decoded, and rendered based on the orientation information and/or the viewport information.

Figure 21:
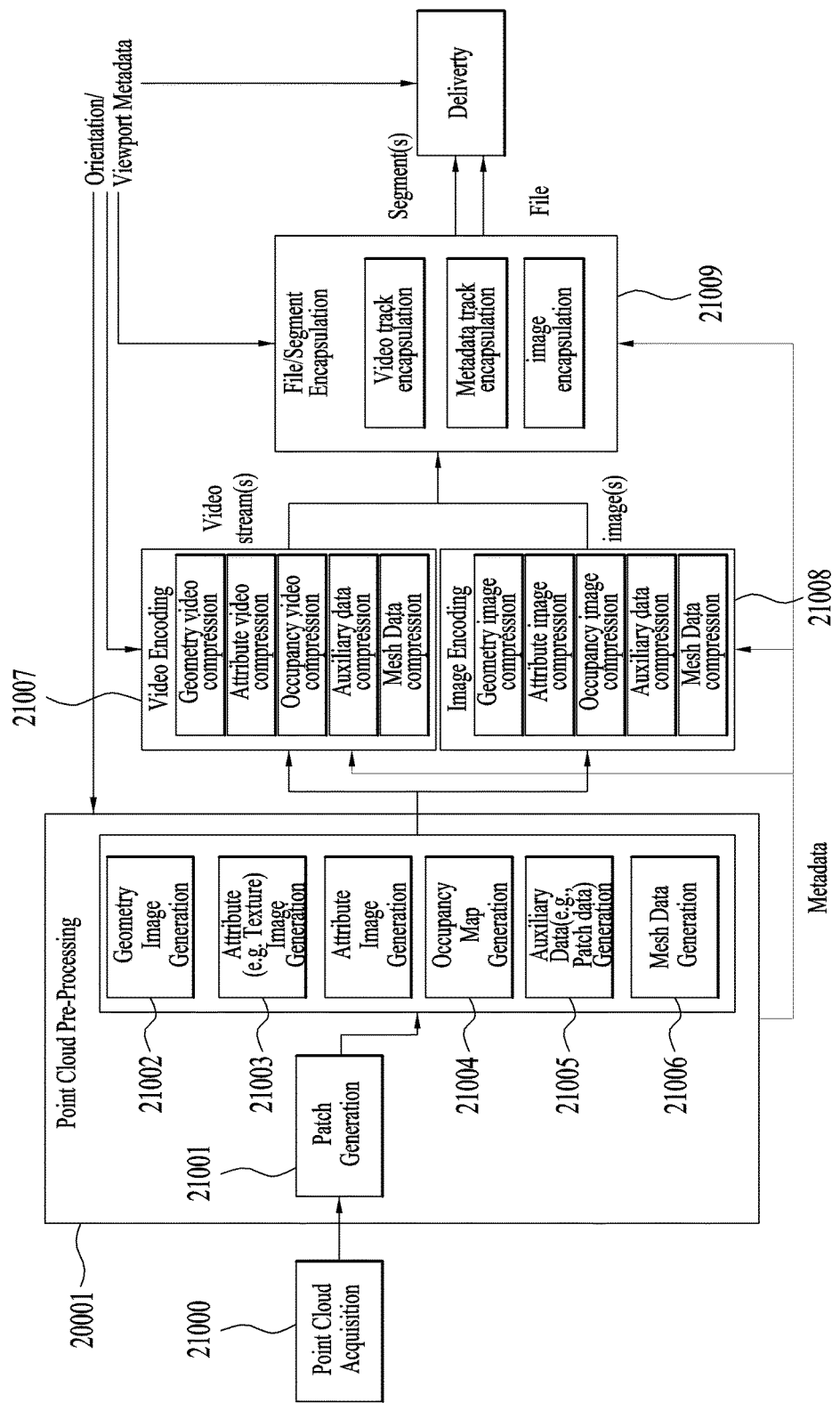
FIG. 21 is an exemplary block diagram of a device for storing and transmitting point cloud data according to embodiments.

FIG. 21 is an exemplary block diagram of a device for storing and transmitting point cloud data according to embodiments.

FIG. 21 shows a point cloud system according to embodiments. A part/the entirety of the system may include some or all of the transmission device and reception device of FIG. 1, the encoding process of FIG. 4, the 2D video/image encoder of FIG. 15, the decoding process of FIG. 16, the transmission device of FIG. 18, and/or the reception device of FIG. 19. In addition, it may be included or corresponded to a part/the entirety of the system of FIG. 20.

A point cloud data transmission device according to embodiments may be configured as shown in the figure. Each element of the transmission device may be a module/unit/component/hardware/software/a processor.

The geometry, attribute, occupancy map, auxiliary data (or auxiliary information), and mesh data of the point cloud may each be configured as a separate stream or stored in different tracks in a file. Furthermore, they may be included in a separate segment.

A point cloud acquirer 21000 acquires a point cloud. For example, one or more cameras may acquire point cloud data through capture, composition or generation of a point cloud. Through this acquisition process, point cloud data including a 3D position (which may be represented by x, y, and z position values, etc.) (hereinafter referred to as geometry) of each point and attributes (color, reflectance, transparency, etc.) of each point may be acquired. For example, a Polygon File format (PLY) (or Stanford Triangle format) file or the like including the point cloud data may be generated. For point cloud data having multiple frames, one or more files may be acquired. In this process, point cloud related metadata (e.g., metadata related to capture, etc.) may be generated. A patch generator 21001 generates patches from the point cloud data. The patch generator 21001 generates point cloud data or point cloud video as one or more pictures/frames. A picture/frame may generally represent a unit representing one image in a specific time interval. When points constituting the point cloud video is divided into one or more patches (sets of points that constitute the point cloud video, wherein the points belonging to the same patch are adjacent to each other in the 3D space and are mapped in the same direction among the planar faces of a 6-face bounding box when mapped to a 2D image) and mapped to a 2D plane, an occupancy map picture/frame in a binary map, which indicates presence or absence of data at the corresponding position in the 2D plane with 0 or 1 may be generated. In addition, a geometry picture/frame, which is in the form of a depth map that represents the information about the position (geometry) of each point constituting the point cloud video on a patch-by-patch basis, may be generated. A texture picture/frame, which represents the color information about each point constituting the point cloud video on a patch-by-patch basis, may be generated. In this process, metadata needed to reconstruct the point cloud from the individual patches may be generated. The metadata may include information about the patches, such as the position and size of each patch in the 2D/3D space. These pictures/frames may be generated continuously in temporal order to construct a video stream or metadata stream.

In addition, the patches may be used for 2D image mapping. For example, the point cloud data may be projected onto each face of a cube. After patch generation, a geometry image, one or more attribute images, an occupancy map, auxiliary data, and/or mesh data may be generated based on the generated patches.

Geometry image generation, attribute image generation, occupancy map generation, auxiliary data generation, and/or mesh data generation are performed by a point cloud pre-processor 20001 or a controller (not shown). The point cloud pre-processor 20001 may include a patch generator 21001, a geometry image generator 21002, an attribute image generator 21003, an occupancy map generator 21004, an auxiliary data generator 21005, and a mesh data generator 21006.

The geometry image generator 21002 generates a geometry image based on the result of the patch generation. Geometry represents a position of a point in a 3D space. The geometry image is generated using the occupancy map, which includes information related to 2D image packing of the patches, auxiliary data (including patch data), and/or mesh data based on the patches. The geometry image is related to information such as a depth (e.g., near, far) of the patch generated after the patch generation.

The attribute image generator 21003 generates an attribute image. For example, an attribute may represent a texture. The texture may be a color value that matches each point. According to embodiments, images of a plurality of attributes (such as color and reflectance) (N attributes) including a texture may be generated. The plurality of attributes may include material information and reflectance. According to an embodiment, the attributes may additionally include information indicating a color, which may vary depending on viewing angle and light even for the same texture.

The occupancy map generator 21004 generates an occupancy map from the patches. The occupancy map includes information indicating presence or absence of data in the pixel, such as the corresponding geometry or attribute image.

The auxiliary data generator 21005 generates auxiliary data (or auxiliary information) including information about the patches. That is, the auxiliary data represents metadata about a patch of a point cloud object. For example, it may represent information such as normal vectors for the patches. Specifically, the auxiliary data may include information needed to reconstruct the point cloud from the patches (e.g., information about the positions, sizes, and the like of the patches in 2D/3D space, and projection (normal) plane identification information, patch mapping information, etc.)

The mesh data generator 21006 generates mesh data from the patches. Mesh represents connection between neighboring points. For example, it may represent data of a triangular shape. For example, the mesh data refers to connectivity between the points.

A point cloud pre-processor 20001 or controller generates metadata related to patch generation, geometry image generation, attribute image generation, occupancy map generation, auxiliary data generation, and mesh data generation.

The point cloud transmission device performs video encoding and/or image encoding in response to the result generated by the point cloud pre-processor 20001. The point cloud transmission device may generate point cloud image data as well as point cloud video data. According to embodiments, the point cloud data may have only video data, only image data, and/or both video data and image data.

A video encoder 21007 performs geometry video compression, attribute video compression, occupancy map video compression, auxiliary data compression, and/or mesh data compression. The video encoder 21007 generates video stream(s) containing encoded video data.

Specifically, in the geometry video compression, point cloud geometry video data is encoded. In the attribute video compression, attribute video data of the point cloud is encoded. In the auxiliary data compression, auxiliary data associated with the point cloud video data is encoded. In the mesh data compression, mesh data of the point cloud video data is encoded. The respective operations of the point cloud video encoder may be performed in parallel.

An image encoder 21008 performs geometry image compression, attribute image compression, occupancy map image compression, auxiliary data compression, and/or mesh data compression. The image encoder generates image(s) containing encoded image data.

Specifically, in the geometry image compression, the point cloud geometry image data is encoded. In the attribute image compression, the attribute image data of the point cloud is encoded. In the auxiliary data compression, the auxiliary data associated with the point cloud image data is encoded. In the mesh data compression, the mesh data associated with the point cloud image data is encoded. The respective operations of the point cloud image encoder may be performed in parallel.

The video encoder 21007 and/or the image encoder 21008 may receive metadata from the point cloud pre-processor 20001. The video encoder 21007 and/or the image encoder 21008 may perform each encoding process based on the metadata.

A file/segment encapsulator 21009 encapsulates the video stream(s) and/or image(s) in the form of a file and/or segment. The file/segment encapsulator 21009 performs video track encapsulation, metadata track encapsulation, and/or image encapsulation.

In the video track encapsulation, one or more video streams may be encapsulated into one or more tracks.

In the metadata track encapsulation, metadata related to a video stream and/or an image may be encapsulated in one or more tracks. The metadata includes data related to the content of the point cloud data. For example, it may include initial viewing orientation metadata. According to embodiments, the metadata may be encapsulated into a metadata track, or may be encapsulated together in a video track or an image track.

In the image encapsulation, one or more images may be encapsulated into one or more tracks or items.

For example, according to embodiments, when four video streams and two images are input to the encapsulator, the four video streams and two images may be encapsulated in one file.

The file/segment encapsulator 21009 may receive metadata from the point cloud pre-processor 20001. The file/segment encapsulator 21009 may perform encapsulation based on the metadata.

A file and/or a segment generated by the file/segment encapsulator 21009 are transmitted by the point cloud transmission device or the transmitter. For example, the segment(s) may be delivered based on a DASH-based protocol.

The deliverer may transmit a point cloud bitstream or a file/segment including the bitstream to the receiver of the reception device over a digital storage medium or a network. Processing according to any transmission protocol may be performed for transmission. The data that has been processed for transmission may be delivered over a broadcast network and/or through a broadband. The data may be delivered to the receiving side in an on-demand manner. The digital storage medium may include various storage media such as USB, SD, CD, DVD, Blu-ray, HDD, and SSD.

The file/segment encapsulator 21009 according to the embodiments may partition and store one bitstream or individual bitstreams into one or a plurality of tracks in a file, and encapsulate signaling information for this. In addition, a patch (or atlas) stream included in the bitstream may be stored as a track in the file, and related signaling information may be stored. Furthermore, the SEI message present in the bitstream may be stored in a track in the file, and related signaling information may be stored.

The deliverer may include an element for generating a media file in a predetermined file format, and may include an element for transmission over a broadcast/communication network. The deliverer receives orientation information and/or viewport information from the receiver. The deliverer may deliver the acquired orientation information and/or viewport information (or information selected by the user) to the point cloud pre-processor 20001, the video encoder 21007, the image encoder 21008, the file/segment encapsulator 21009, and/or the point cloud encoder. Based on the orientation information and/or the viewport information, the point cloud encoder may encode all point cloud data or the point cloud data indicated by the orientation information and/or the viewport information. Based on the orientation information and/or the viewport information, the file/segment encapsulator may encapsulate all point cloud data or the point cloud data indicated by the orientation information and/or the viewport information. Based on the orientation information and/or the viewport information, the deliverer may deliver all point cloud data or the point cloud data indicated by the orientation information and/or the viewport information.

For example, the point cloud pre-processor 20001 may perform the above-described operation on all the point cloud data or on the point cloud data indicated by the orientation information and/or the viewport information. The video encoder 21007 and/or the image encoder 21008 may perform the above-described operation on all the point cloud data or on the point cloud data indicated by the orientation information and/or the viewport information. The file/segment encapsulator 21009 may perform the above-described operation on all the point cloud data or on the point cloud data indicated by the orientation information and/or the viewport information. The transmitter may perform the above-described operation on all the point cloud data or on the point cloud data indicated by the orientation information and/or the viewport information.

Figure 22:
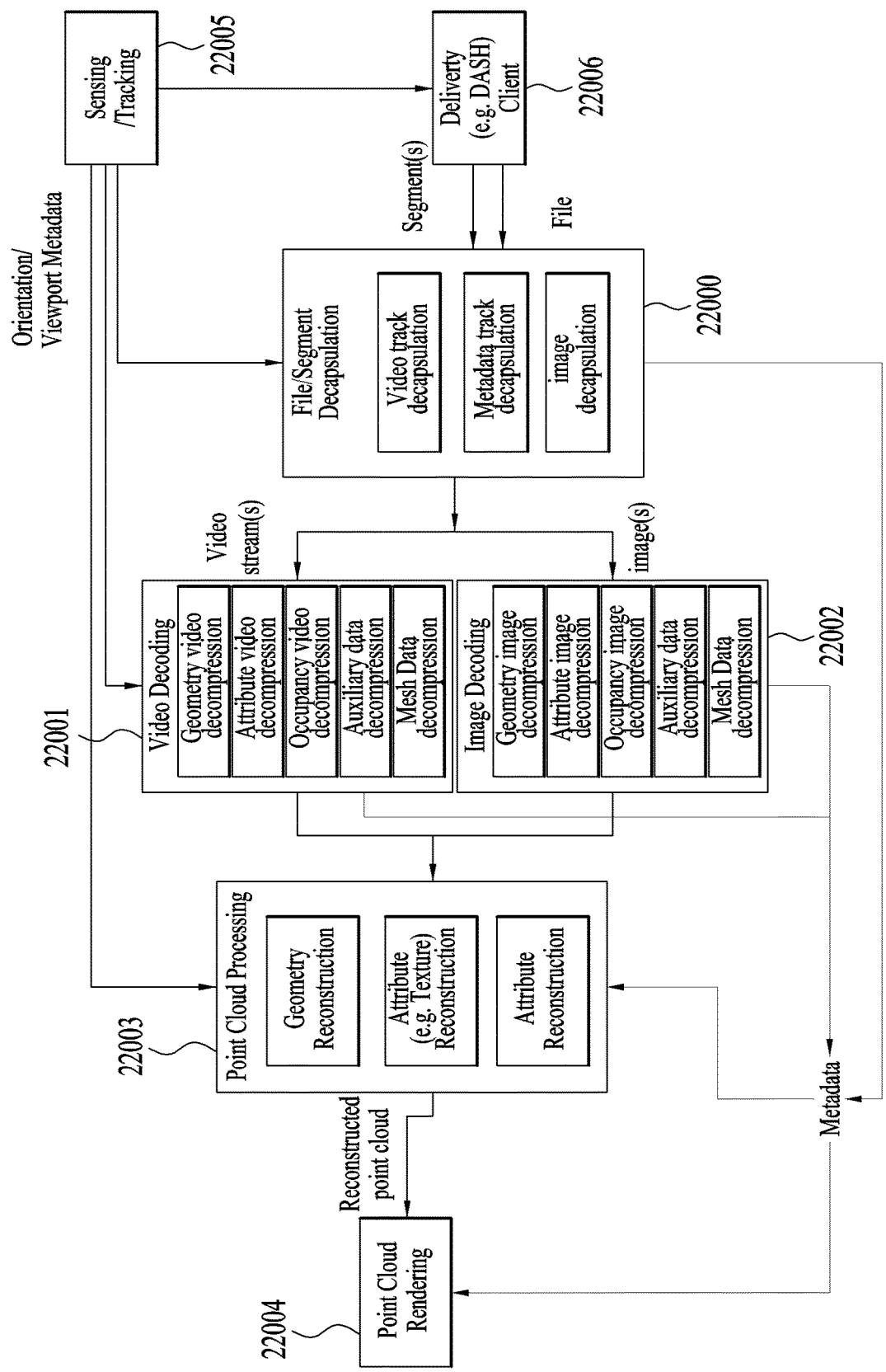
FIG. 22 is an exemplary block diagram of a point cloud data reception device according to embodiments.

FIG. 22 is an exemplary block diagram of a point cloud data reception device according to embodiments.

FIG. 22 shows a point cloud system according to embodiments. A part/the entirety of the system may include some or all of the transmission device and reception device of FIG. 1, the encoding process of FIG. 4, the 2D video/image encoder of FIG. 15, the decoding process of FIG. 16, the transmission device of FIG. 18, and/or the reception device of FIG. 19. In addition, it may be included or corresponded to a part/the entirety of the system of FIG. 20 and FIG. 21.

Each component of the reception device may be a module/unit/component/hardware/software/processor. A delivery client may receive point cloud data, a point cloud bitstream, or a file/segment including the bitstream transmitted by the point cloud data transmission device according to the embodiments. The receiver may receive the point cloud data over a broadcast network or through a broadband depending on the channel used for the transmission. Alternatively, the point cloud data may be received through a digital storage medium. The receiver may include a process of decoding the received data and rendering the received data according to the user viewport. The reception processor may perform processing on the received point cloud data according to a transmission protocol. A delivery client (or reception processor) 22006 may be included in the receiver or configured as a separate component/module. The reception processor may reversely perform the process of the transmission processor described above so as to correspond to the processing for transmission performed at the transmitting side. The reception processor may deliver the acquired point cloud data to the file/segment decapsulator 22000 and the acquired point cloud related metadata to the metadata processor (not shown).

The sensor/tracker 22005 acquires orientation information and/or viewport information. The sensor/tracker 22005 may deliver the acquired orientation information and/or viewport information to the delivery client 22006, the file/segment decapsulator 22000, the point cloud decoder 22001 and 22002, and the point cloud processor 22003.

The delivery client 22006 may receive all point cloud data or the point cloud data indicated by the orientation information and/or the viewport information based on the orientation information and/or the viewport information. The file/segment decapsulator 22000 may decapsulate all point cloud data or the point cloud data indicated by the orientation information and/or the viewport information based on the orientation information and/or the viewport information. The point cloud decoder (the video decoder 22001 and/or the image decoder 22002) may decode all point cloud data or the point cloud data indicated by the orientation information and/or the viewport information based on the orientation information and/or the viewport information. The point cloud processor 22003 may process all point cloud data or the point cloud data indicated by the orientation information and/or the viewport information based on the orientation information and/or the viewport information.

The file/segment decapsulator 22000 performs video track decapsulation, metadata track decapsulation, and/or image decapsulation. The file/segment decapsulator 22000 may decapsulate the point cloud data in the form of a file received from the reception processor. The file/segment decapsulator 22000 may decapsulate files or segments according to ISOBMFF, etc., to acquire a point cloud bitstream or point cloud-related metadata (or a separate metadata bitstream). The acquired point cloud bitstream may be delivered to the point cloud decoders 22001 and 22002, and the acquired point cloud-related metadata (or metadata bitstream) may be delivered to the metadata processor (not shown). The point cloud bitstream may include the metadata (metadata bitstream). The metadata processor may be included in the point cloud video decoder or may be configured as a separate component/module. The point cloud-related metadata acquired by the file/segment decapsulator 22000 may take the form of a box or track in a file format. The file/segment decapsulator 22000 may receive metadata necessary for decapsulation from the metadata processor, when necessary. The point cloud-related metadata may be delivered to the point cloud decoders 22001 and 22002 and used in a point cloud decoding procedure, or may be delivered to the renderer 22004 and used in a point cloud rendering procedure. The file/segment decapsulator 22000 may generate metadata related to the point cloud data.

In the video track decapsulation by the file/segment decapsulator 22000, a video track contained in the file and/or segment is decapsulated. Video stream(s) including a geometry video, an attribute video, an occupancy map, auxiliary data, and/or mesh data are decapsulated.

In the metadata track decapsulation by the file/segment decapsulator 22000, a bitstream including metadata related to the point cloud data and/or auxiliary data is decapsulated.

In the image decapsulation by the file/segment decapsulator 22000, image(s) including a geometry image, an attribute image, an occupancy map, auxiliary data and/or mesh data are decapsulated.

The in the file/segment decapsulator 22000 according to the embodiments may store one bitstream or individually bitstreams in one or multiple tracks in a file, and may also decapsulate signaling information therefor. In addition, the atlas (or patch) stream included in the bitstream may be decapsulated based on a track in the file, and related signaling information may be parsed. Furthermore, an SEI message present in the bitstream may be decapsulated based on a track in the file, and related signaling information may be also acquired.

The video decoder 22001 performs geometry video decompression, attribute video decompression, occupancy map decompression, auxiliary data decompression, and/or mesh data decompression. The video decoder 22001 decodes the geometry video, the attribute video, the auxiliary data, and/or the mesh data in a process corresponding to the process performed by the video encoder of the point cloud transmission device according to the embodiments.

The image decoder 22002 performs geometry image decompression, attribute image decompression, occupancy map decompression, auxiliary data decompression, and/or mesh data decompression. The image decoder 22002 decodes the geometry image, the attribute image, the auxiliary data, and/or the mesh data in a process corresponding to the process performed by the image encoder of the point cloud transmission device according to the embodiments.

The video decoder 22001 and the image decoder 22002 according to the embodiments may be processed by one video/image decoder as described above, and may be performed along separate paths as illustrated in the figure.

The video decoder 22001 and/or the image decoder 22002 may generate metadata related to the video data and/or the image data.

In point cloud processor 22003, geometry reconstruction and/or attribute reconstruction are performed.

In the geometry reconstruction, the geometry video and/or geometry image are reconstructed from the decoded video data and/or decoded image data based on the occupancy map, auxiliary data and/or mesh data.

In the attribute reconstruction, the attribute video and/or the attribute image are reconstructed from the decoded attribute video and/or the decoded attribute image based on the occupancy map, auxiliary data, and/or mesh data. According to embodiments, for example, the attribute may be a texture. According to embodiments, an attribute may represent a plurality of pieces of attribute information. When there is a plurality of attributes, the point cloud processor 22003 according to the embodiments performs a plurality of attribute reconstructions.

The point cloud processor 22003 may receive metadata from the video decoder 22001, the image decoder 22002, and/or the file/segment decapsulator 22000, and process the point cloud based on the metadata.

The point cloud renderer 22004 renders the reconstructed point cloud. The point cloud renderer 22004 may receive metadata from the video decoder 22001, the image decoder 22002, and/or the file/segment decapsulator 22000, and render the point cloud based on the metadata.

The display displays the result of rendering on an actual display device.

According to the method/device according to the embodiments, as shown in FIG. 20 to FIG. 22, the transmitting side may encode the point cloud data into a bitstream, encapsulate the bitstream in the form of a file and/or segment, and transmits the same. The receiving side may decapsulate the file and/or segment into a bitstream containing the point cloud, and may decode the bitstream into point cloud data. For example, a point cloud data device according to the embodiments may encapsulate point cloud data based on a file. The file may include a V-PCC track containing parameters for a point cloud, a geometry track containing geometry, an attribute track containing an attribute, and an occupancy track containing an occupancy map.

In addition, a point cloud data reception device according to embodiments decapsulates the point cloud data based on a file. The file may include a V-PCC track containing parameters for a point cloud, a geometry track containing geometry, an attribute track containing an attribute, and an occupancy track containing an occupancy map.

The encapsulation operation described above may be performed by the file/segment encapsulator 20004 of FIG. 20, the file/segment encapsulator 21009 of FIG. 21. The decapsulation operation described above may be performed by the file/segment decapsulator 20005 of FIG. 20 or the file/segment decapsulator 22000 of FIG. 22.

Figure 23:
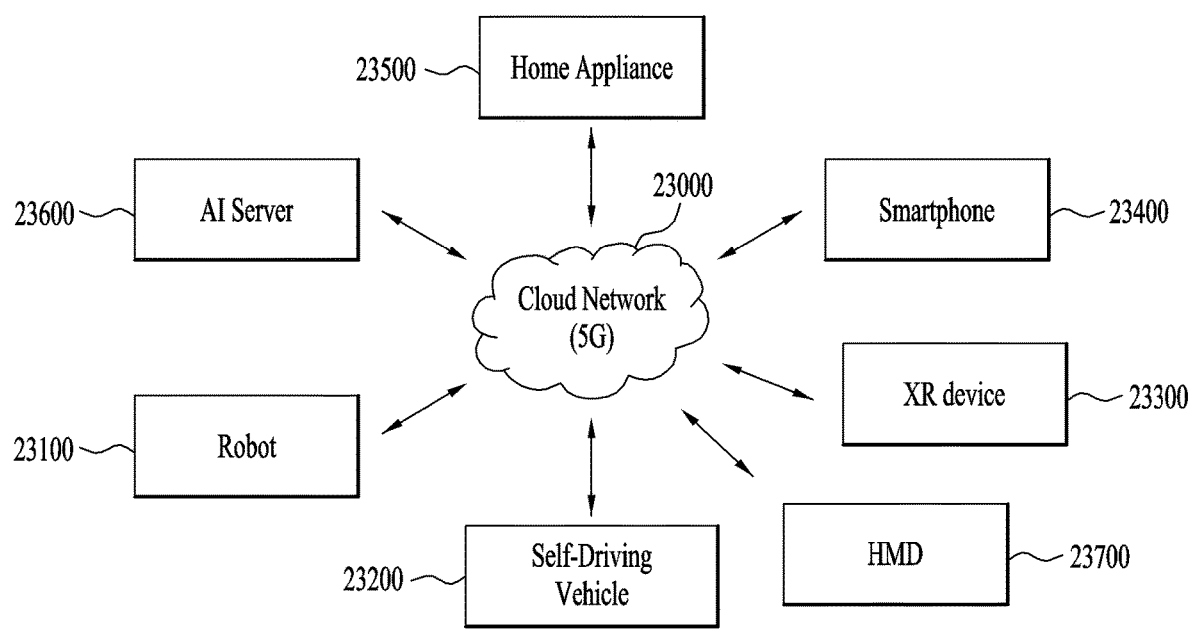
FIG. 23 illustrates an exemplary structure operable in connection with point cloud data transmission/reception methods/devices according to embodiments.

FIG. 23 illustrates an exemplary structure operable in connection with point cloud data transmission/reception methods/devices according to embodiments.

In the structure according to the embodiments, at least one of a server 23600, a robot 23100, a self-driving vehicle 23200, an XR device 23300, a smartphone 23400, a home appliance 23500 and/or a head-mount display (HMD) 23700 is connected to a cloud network 23000. Here, the robot 23100, the self-driving vehicle 23200, the XR device 23300, the smartphone 23400, or the home appliance 23500 may be referred to as a device. In addition, the XR device 23300 may correspond to a point cloud data (PCC) device according to embodiments or may be operatively connected to the PCC device.

The cloud network 23000 may represent a network that constitutes part of the cloud computing infrastructure or is present in the cloud computing infrastructure. Here, the cloud network 23000 may be configured using a 3G network, 4G or Long Term Evolution (LTE) network, or a 5G network.

The server 23600 may be connected to at least one of the robot 23100, the self-driving vehicle 23200, the XR device 23300, the smartphone 23400, the home appliance 23500, and/or the HMD 23700 over the cloud network 23000 and may assist at least a part of the processing of the connected devices 23100 to 23700.

The HMD 23700 represents one of the implementation types of the XR device and/or the PCC device according to the embodiments. An HMD type device according to embodiments includes a communication unit, a control unit, a memory, an I/O unit, a sensor unit, and a power supply unit.

Hereinafter, various embodiments of the devices 23100 to 23500 to which the above-described technology is applied will be described. The devices 23100 to 23500 illustrated in FIG. 23 may be operatively connected/coupled to a point cloud data transmission and reception device according to the above-described embodiments.

<PCC+XR>

The XR/PCC device 23300 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 23300 may analyze 3D point cloud data or image data acquired through various sensors or from an external device and generate position data and attribute data about 3D points. Thereby, the XR/PCC device 23300 may acquire information about the surrounding space or a real object, and render and output an XR object. For example, the XR/PCC device 23300 may match an XR object including auxiliary information about a recognized object with the recognized object and output the matched XR object.

<PCC+Self-driving+XR>

The self-driving vehicle 23200 may be implemented as a mobile robot, a vehicle, an unmanned aerial vehicle, or the like by applying the PCC technology and the XR technology.

The self-driving vehicle 23200 to which the XR/PCC technology is applied may represent an autonomous vehicle provided with means for providing an XR image, or an autonomous vehicle that is a target of control/interaction in the XR image. In particular, the self-driving vehicle 23200, which is a target of control/interaction in the XR image, may be distinguished from the XR device 23300 and may be operatively connected thereto.

The self-driving vehicle 23200 having means for providing an XR/PCC image may acquire sensor information from the sensors including a camera, and output the generated XR/PCC image based on the acquired sensor information. For example, the self-driving vehicle may have an HUD and output an XR/PCC image thereto to provide an occupant with an XR/PCC object corresponding to a real object or an object present on the screen.

In this case, when the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap the object on the screen. For example, the self-driving vehicle may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only real-world objects, backgrounds, and the like as CG images. On the other hand, the AR technology refers to a technology for showing a CG image virtually created on a real object image. The MR technology is similar to the AR technology described above in that virtual objects to be shown are mixed and combined with the real world. However, the MR technology differs from the AR technology makes a clear distinction between a real object and a virtual object created as a CG image and uses virtual objects as complementary objects for real objects, whereas the MR technology treats virtual objects as objects having the same characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to all VR, AR, MR, and XR technologies. For such technologies, encoding/decoding based on PCC, V-PCC, and G-PCC techniques may be applied.

The PCC method/device according to the embodiments may be applied to the self-driving vehicle 23200 that provides a self-driving service.

The self-driving vehicle 23200 that provides the self-driving service is connected to a PCC device for wired/wireless communication.

When the point cloud compression data transmission and reception device (PCC device) according to the embodiments is connected to self-driving vehicle 23200 for wired/wireless communication, the device may receive and process content data related to an AR/VR/PCC service that may be provided together with the self-driving service and transmit the processed content data to the self-driving vehicle 23200. In the case where the point cloud data transmission and reception device is mounted on the self-driving vehicle 23200, the point cloud transmitting and reception device may receive and process content data related to the AR/VR/PCC service according to a user input signal input through a user interface device and provide the processed content data to the user. The self-driving vehicle 23200 or the user interface device according to the embodiments may receive a user input signal. The user input signal according to the embodiments may include a signal indicating the self-driving service.

As described above, the V-PCC-based point cloud video encoder of FIG. 1, 4, 18, 20, or 21 projects 3D point cloud data (or content) into a 2D space to generate patches. The patches are generated in the 2D space by dividing the data into a geometry image representing position information (referred to as a geometry frame or a geometry patch frame) and a texture image representing color information (referred to as an attribute frame or an attribute patch frame). The geometry image and the texture image are video-compressed for each frame, and a video bitstream of the geometry image (referred to as a geometry bitstream) and a video bitstream of the texture image (referred to as an attribute bitstream) are output. In addition, auxiliary patch information (also referred to as patch information or metadata or atlas data) including projection plane information and patch size information about each patch, which are needed to decode a 2D patch at the receiving side, is also video-compressed and a bitstream of the auxiliary patch information is output. In addition, the occupancy map, which indicates presence/absence of a point for each pixel as 0 or 1, is entropy-compressed or video-compressed depending on whether it is in a lossless mode or a lossy mode, and a video bitstream of the occupancy map (or referred to as an occupancy map bitstream) is output. The compressed geometry bitstream, the compressed attribute bitstream, the compressed auxiliary patch information bitstream (also referred to as or atlas bitstream), and the compressed occupancy map bitstream are multiplexed into a structure of a V-PCC bitstream.

According to embodiments, the V-PCC bitstream may be transmitted to the receiving side as it is, or may be encapsulated in a file/segment form by the file/segment encapsulator of FIG. 1, 18, 20, or 21 and transmitted to the reception device or stored in a digital storage medium (e.g., USB, SD, CD, DVD, Blu-ray, HDD, SSD, etc.). According to an embodiment of the present disclosure, the file is in a file format ISOBMFF.

According to embodiments, the V-PCC bitstream may be transmitted through multiple tracks in a file, or may be transmitted through one single track. Details will be described later.

In this document, point cloud data (i.e., V-PCC data) represents volumetric encoding of a point cloud composed of a sequence of point cloud frames. In a point cloud sequence, which is the sequence of the point cloud frames, each point cloud frame includes a collection of points. Each point may have a 3D position, i.e., geometry information, and a plurality of attributes, for example, color, reflectance, and a surface normal. That is, each point cloud frame refers to a set of 3D points specified by Cartesian coordinates (x, y, z) (i.e., positions) of 3D points and zero or more attributes at a particular time instance.

Video-based point cloud compression (V-PCC) described in this document is the same as visual volumetric video-based coding (V3C). V-PCC according to embodiments may be used interchangeably with V3C.

According to embodiments, point cloud content (also referred to as V-PCC content or V3C content) refers to volumetric media encoded using V-PCC.

According to embodiments, a volumetric scene may refer to 3D data and may be composed of one or more objects. That is, the volumetric scene is a region or unit composed of one or more objects constituting the volumetric media. In addition, when encapsulating a V-PCC bitstream in a file format for transmission, a region obtained by dividing a bounding box for the overall volumetric media according to a spatial reference is referred to as a 3D spatial region. According to embodiments, the 3D spatial region may be referred to as a 3D region or a spatial region.

According to embodiments, an object may refer to one point cloud data, volumetric media, or V3C content. An object may be divided into several objects according to the spatial reference and, in this specification, each of the divided objects is referred to as a sub-object or simply an object. According to embodiments, a 3D bounding box may be information representing position information of an object in a 3D space, and a 2D bounding box may represent a rectangular region surrounding patches corresponding to one object in a 2D frame. That is, data generated after a process of projecting an object onto a 2D plane, which is one process of encoding one object, is patches, and a box surrounding the patches may be referred to as the 2D bounding box. That is, since one object may be composed of several patches in the encoding process, one object is related to the patches. An object in the 3D space is represented as 3D bounding box information surrounding the object. Since an atlas frame includes patch information corresponding to each object and 3D bounding box information in the 3D space, the object is related to a 3D bounding box or tile or 3D spatial regions.

According to embodiments, when encapsulating the V-PCC bitstream in the file format, the 3D bounding box of the point cloud data may be partitioned into one or more 3D regions and each divided 3D region may include one or more objects. When patches are packed in the atlas frame, the patches are collected in units of objects and packed in (mapped to) one or more atlas tile regions in the atlas frame. That is, one 3D region (i.e., file level) may be associated with one or more objects (i.e., bitstream level), and one object may be associated with one or more 3D regions. Since each object is associated with one or more atlas tiles, one 3D region may be associated with one or more atlas tiles. For example, object #1 may correspond to atlas tile #1 and atlas tile #2, object #2 may correspond to atlas tile #3, and object #3 may correspond to atlas tile #4 and atlas tile #5.

According to embodiments, 3D regions may overlap each other. As an example, 3D (space) region #1 may include object #1 and 3D region #2 may include object #2 and object #3. However, in another example, 3D region #1 may include object #1 and object #2 and 3D region #2 may include object #2 and object #3. In other words, object #2 may be related to 3D region #1 and 3D region #2. In addition, since the same object (e.g., object #2) may be included in different 3D regions (e.g., 3D region #1 and 3D region #2), patch(es) corresponding to object #2 may be allocated to (included in) different 3D regions (3D region #1 and 3D region #2).

For partial access of point cloud data, it is necessary to access part of the point cloud data according to 3D (spatial) regions or objects. To this end, the present specification signals association between 3D regions and tiles or between objects and tiles. Association signaling between 3D regions and tiles or between objects and tiles will be described in detail below.

According to embodiments, atlas data is signaling information including an atlas sequence parameter set (ASPS), an atlas frame parameter set (AFPS), atlas tile group information (or atlas tile information), and an SEI message and may be referred to as metadata about an atlas.

According to embodiments, an atlas represents a collection of 2D bounding boxes and may be patches projected onto a rectangular frame.

According to embodiments, an atlas frame is a 2D rectangular array of atlas samples onto which patches are projected. The atlas sample is a position of a rectangular frame onto which patches related to the atlas are projected.

According to embodiments, the atlas frame may be partitioned into one or more rectangular tiles. That is, a tile is a unit for partitioning a 2D frame. In other words, the tile is a unit for partitioning signaling information of the point cloud data called the atlas. According to embodiments, tiles do not overlap in the atlas frame and one atlas frame may include regions that are not related to the tiles. In addition, the height and width of each tile included in one atlas may be different for each tile.

According to embodiments, one 3D region may correspond to one atlas frame, and thus one 3D region may be associated with a plurality of 2D regions.

According to embodiments, a patch is a collection of points constituting a point cloud. Points belonging to the same patch are adjacent to each other in a 3D space and are mapped in the same direction among six bounding box planes in a mapping process to a 2D image. The patch is signaling information about construction of the point cloud data.

The reception device according to embodiments may restore attribute video data, geometry video data, and occupant video data, which are actual video data having the same presentation time, based on the atlas (the tile or the patch).

Meanwhile, when a user zooms in or changes a viewport, part of a point cloud object/data other than the overall point cloud object/data may be rendered or displayed on the user viewport. In this case, it is efficient for a PCC decoder/player to decode or process the video or atlas data associated with part of the point cloud data rendered or displayed on the user viewport and not to decode or process video or atlas data associated with the point cloud data of a portion/region that is not rendered or displayed.

To this end, it is necessary to support partial access of the point cloud data.

In this case, partial point cloud data corresponding to a specific 3D spatial region of the overall point cloud data may be related to one or more 2D regions. According to embodiments, a 2D region refers to one or more video frames or atlas frames including data related to the point cloud data within a corresponding 3D region.

Figure 24:
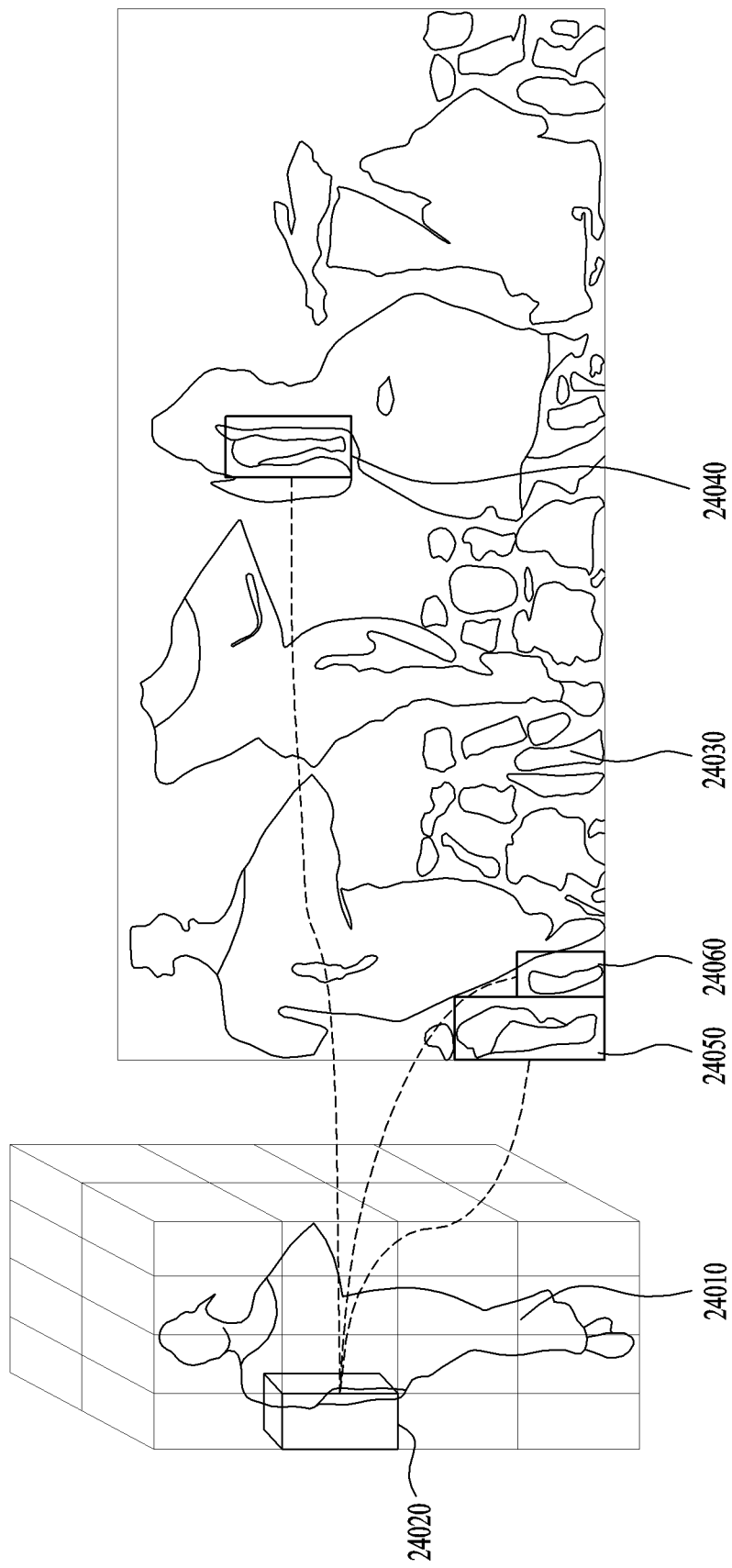
FIG. 24 illustrates an exemplary association between a partial 3D region of point cloud data and one or more 2D regions in a video frame according to embodiments.

FIG. 24 illustrates an exemplary association between a partial 3D region of point cloud data and one or more 2D regions in a video frame according to embodiments.

As illustrated in FIG. 24, data associated with a partial 3D region of point cloud data may be associated with video data of one or more 2D regions in a video frame. That is, data associated with a partial 3D region 24020 of an object 24010 (or a bounding box) of point cloud data may be associated with video data of one or more 2D regions 24040, 24050, and 24060 in a video frame 24030.

In the case of dynamic point cloud data (i.e., data in which the number of points of a point cloud or the position of the point cloud changes over time), point cloud data displayed in the same 3D region may change over time.

Therefore, in order to enable spatial or partial access of point cloud data rendered/displayed on a user viewport in the PCC decoder/player of the reception device, the transmission device may transmit information about one or more 2D regions in a video frame related to a 3D region of the point cloud capable of changing over time, through a V-PCC bitstream or transmit the same in the form of signaling or metadata in a file. In this specification, information transmitted through the V-PCC bitstream or in the form of signaling or metadata in the file is referred to as signaling information.

A method/device according to embodiments may encode point cloud data that changes over time, i.e., dynamic point cloud data, transmit and receive the dynamic point cloud data, and decode the dynamic point cloud data. In this case, point cloud data displayed in the same 3D region may change over time.

When the user zooms in or changes a viewport, the reception device and the renderer according to embodiments may render or display part of the point cloud object/data on the user viewport.

For an efficient process, the PCC decoder/player according to embodiments may decode or process video or atlas data associated with part of point cloud data rendered or displayed on the user viewport.

For an efficient process, the PCC decoder/player according to embodiments may not decode or process video or atlas data associated with point cloud data of a portion/region that is not rendered or displayed.

In other words, signaling information is required in order for the reception device to extract partial point cloud data corresponding to a specific 3D spatial region among overall point cloud data from a file and decode and/or render the extracted partial point cloud data. That is, signaling information for supporting partial access by the reception device is needed.

In addition, when the reception device renders the point cloud data based on the user viewport, signaling information for extracting partial point cloud data among the overall point cloud data from the file and decoding and/or rendering the partial point cloud data is required.

According to embodiments, signaling information needed to extract only the partial point cloud data among the overall point cloud data from the file and decode the partial point cloud data, i.e., signaling information for partial access, may include 3D bounding box information, 3D spatial region information, 2D region information, and 3D region mapping information. The signaling information may be stored in a sample within a track, a sample entry within the track, a sample group within the track, a track group, or a separate metadata track. Particularly, some of the signaling information may be stored in the sample entry in the form of a box or a full box. Storage and signaling of the 3D bounding box information, the 3D spatial region information, the 2D region information, and the 3D region mapping information, included in the signaling information, will be described in detail later.

According to embodiments, the signaling information for supporting partial access may be generated by the metadata generation unit (e.g., the metadata encoding unit 18005 of FIG. 18) of the transmission device and then signaled by a file/segment encapsulation module or unit in sample within the track, the sample entry within the track, the sample group within the track, the track group, or the separate metadata track. Alternatively, the signaling information may be generated by the file/segment encapsulation module and then signaled in the sample within the track, the sample entry within the track, the sample group within the track, the track group, or the separate metadata track. In the present specification, the signaling information may include metadata (e.g., a setting value) regarding the point cloud data. Depending on an application, the signaling information may also be defined at a system side, such as a file format, dynamic adaptive streaming over HTTP (DASH), or MPEG media transport (MMT), or at a wired interface side, such as a high definition multimedia interface (HDMI), a display port, video electronics standards association (VESA), or CTA.

The method/device according to embodiments may signal 3D region information or 2D region-related information in a video atlas frame, associated with the 3D region information, to a V-PCC bitstream (e.g., see FIG. 25) to perform transmission and reception.

The method/device according to embodiments may signal 3D region information or 2D region-related information in a video or atlas frame, associated with the 3D region information, to a file to perform transmission and reception.

The method/device according to embodiments may signal 3D region information, associated with an image item, or 2D region-related information in a video or atlas frame, associated with the 3D region information, to the file to perform transmission and reception.

The method/device according to embodiments may group tracks including data associated with a 3D region and generate signaling information related to the tracks to perform transmission and reception.

The method/device according to embodiments may group tracks including data associated with a 2D region and generate signaling information related to the tracks to perform transmission and reception.

Figure 25:
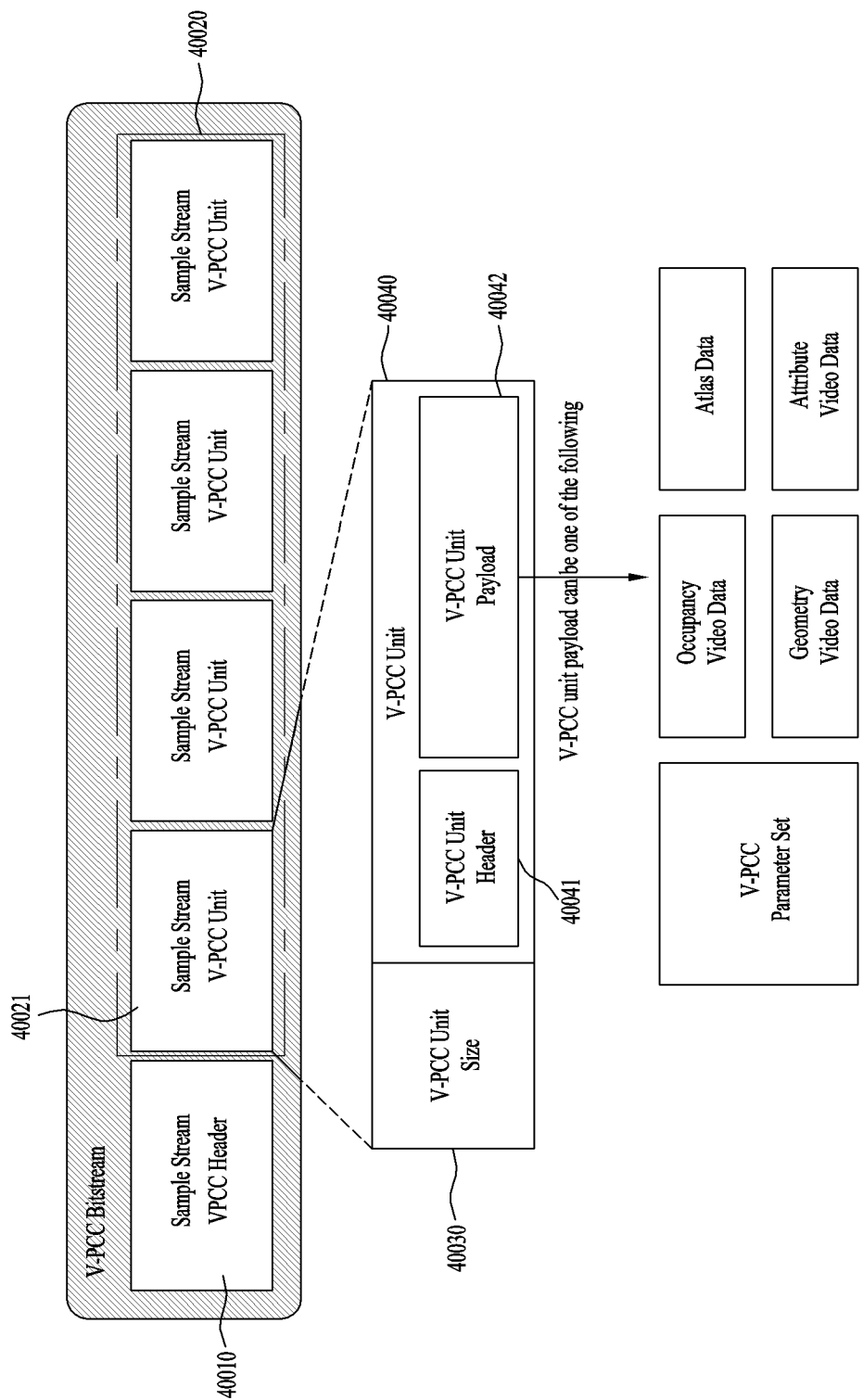
FIG. 25 illustrates an exemplary structure of a V-PCC bitstream according to embodiments.

FIG. 25 shows an example of a V-PCC bitstream structure according to other embodiments of the present disclosure. In an embodiment, the V-PCC bitstream of FIG. 25 is generated and output by the V-PCC-based point cloud video encoder of FIG. 1, 4, 18, 20, or 21.

A V-PCC bitstream according to the embodiments, containing a coded point cloud sequence (CPCS), may be composed of sample stream V-PCC units. The sample stream V-PCC units carry V-PCC parameter set (also referred to as VPS) data, an atlas bitstream, a 2D video encoded occupancy map bitstream, a 2D video encoded geometry bitstream, and zero or more 2D video encoded attribute bitstreams.

In FIG. 25, the V-PCC bitstream may include one sample stream V-PCC header 40010 and one or more sample stream V-PCC units 40020. For simplicity, the one or more sample stream V-PCC units 40020 may be referred to as a sample stream V-PCC payload. That is, the sample stream V-PCC payload may be referred to as a set of sample stream V-PCC units.

The sample stream V-PCC header 40010 may specify the precision, in bytes, of the ssvu_vpcc_unit_size element in all sample stream V-PCC units.

Each sample stream V-PCC unit 40021 may include V-PCC unit size information 40030 and a V-PCC unit 40040. The V-PCC unit size information 40030 indicates the size of the corresponded V-PCC unit 40040. For simplicity, the V-PCC unit size information 40030 may be referred to as a sample stream V-PCC unit header, and the V-PCC unit 40040 may be referred to as a sample stream V-PCC unit payload.

Each V-PCC unit 40040 may include a V-PCC unit header 40041 and a V-PCC unit payload 40042.

In the present disclosure, data contained in the V-PCC unit payload 40042 is distinguished by the V-PCC unit header 40041. To this end, the V-PCC unit header 40041 contains type information indicating the type of the V-PCC unit. Each V-PCC unit payload 40042 may contain at least one of geometry video data (i.e., a 2D video encoded geometry bitstream), attribute video data (i.e., a 2D video encoded attribute bitstream), occupancy video data (i.e., a 2D video encoded occupancy map bitstream), atlas data, or a V-PCC parameter set (VPS) according to the type information in the V-PCC unit header 40041.

The VPS according to the embodiments is also referred to as a sequence parameter set (SPS). The two terms may be used interchangeably.

Figure 26:
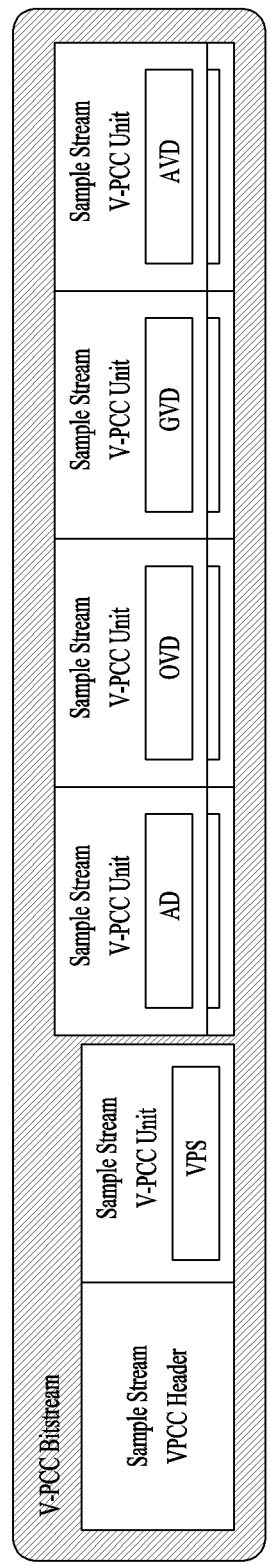
FIG. 26 illustrates exemplary data carried by sample stream V-PCC units in a V-PCC bitstream according to embodiments.

FIG. 26 illustrates an example of data carried by sample stream V-PCC units in a V-PCC bitstream according to embodiments.

In the example of FIG. 26, the V-PCC bitstream contains a sample stream V-PCC unit carrying a V-PCC parameter set (VPS), sample stream V-PCC units carrying atlas data (AD), sample stream V-PCC units carrying occupancy video data (OVD), sample stream V-PCC units carrying geometry video data (GVD), and sample stream V-PCC units carrying attribute video data (AVD).

Namely, each sample stream V-PCC unit contains one type of V-PCC unit among the VPS, AD, OVD, GVD, and AVD.

FIG. 27 shows an example of a syntax structure of a sample stream V-PCC header contained in a V-PCC bitstream according to embodiments.

The sample stream v-pcc header( ) according to the embodiments may include an ssvh_unit_size_precision_bytes_minus1 field and an ssvh_reserved_zero_5bits field.

The value of the ssvh_unit_size_precision_bytes_minus1 field plus 1 may specify the precision, in bytes, of the ssvu_vpcc_unit_size element in all sample stream V-PCC units. The value of this field may be in the range of 0 to 7.

The ssvh_reserved_zero_5bits field is a reserved field for future use.

FIG. 28 shows an example of a syntax structure of a sample stream V-PCC unit (sample_stream_vpcc_unit( ) according to embodiments.

The content of each sample stream V-PCC unit is associated with the same access unit as the V-PCC unit contained in the sample stream V-PCC unit.

The sample_stream_vpcc_unit( ) according to embodiments may include an ssvu_vpcc_unit_size field and vpcc_unit(ssvu_vpcc_unit_size).

The ssvu_vpcc_unit_size field corresponds to the V-PCC unit size information 40030 of FIG. 25, and specifies the size, in bytes, of the subsequent vpcc_unit. The number of bits used to represent the ssvu_vpcc_unit_size field is equal to (ssvh_unit_size_precision_bytes_minus1+1)*8.

The vpcc_unit(ssvu_vpcc_unit_size) has a length corresponding to the value of the ssvu_vpcc_unit_size field, and carries one of the VPS, AD, OVD, GVD, and AVD.

FIG. 29 shows an example of a syntax structure of a V-PCC unit according to embodiments. A V-PCC unit is consists of a V-PCC unit header (vpcc_unit_header( ) and a V-PCC unit payload (vpcc_unit_payload( )). The V-PCC unit according to the embodiments may contain more data. In this case, it may further include a trailing zero 8bits field. The trailing zero 8bits field according to the embodiments is a byte corresponding to 0x00.

FIG. 30 shows an example of a syntax structure of a V-PCC unit header according to embodiments. In an embodiment, the vpcc_unit_header( ) of FIG. 30 includes a vuh_unit_type field. The vuh_unit_type field indicates the type of the corresponding V-PCC unit. The vuh_unit_type field according to the embodiments is also referred to as a vpcc_unit_type field.

FIG. 31 shows an example of V-PCC unit types assigned to the vuh_unit_type field according to embodiments.

Referring to FIG. 31, according to an embodiment, the vuh_unit_type field set to 0 indicates that the data contained in the V-PCC unit payload of the V-PCC unit is a V-PCC parameter set (VPCC_VPS). The vuh_unit_type field set to 1 indicates that the data is atlas data (VPCC_AD). The vuh_unit_type field set to 2 indicates that the data is occupancy video data (VPCC_OVD). The vuh_unit_type field set to 3 indicates that the data is geometry video data (VPCC_GVD). The vuh_unit_type field set to 4 indicates that the data is attribute video data (VPCC_AVD).

The meaning, order, deletion, addition, and the like of values assigned to the vuh_unit_type field may be easily changed by those skilled in the art, and accordingly the present disclosure will not be limited to the embodiment described above.

When the vuh_unit_type field indicates VPCC_AVD, VPCC_GVD, VPCC_OVD, or VPCC_AD, the V-PCC unit header according to the embodiments may further include a vuh_vpcc_parameter_set_id field and a vuh_atlas_id field.

The vuh_vpcc_parameter_set_id field specifies the value of vps_vpcc_parameter_set_id for the active V-PCC VPS.

The vuh_atlas_id field specifies the index (or identifier) of the atlas that corresponds to the current V-PCC unit.

When the vuh_unit_type field indicates VPCC_AVD, the V-PCC unit header according to the embodiments may further include a vuh_attribute_index field, a vuh_attribute_dimension_index field, a vuh_map_index field, and a vuh_raw_video_flag field.

The vuh_attribute_index field indicates the index of the attribute data carried in the attribute video data unit.

The vuh_attribute_dimension_index field indicates the index of the attribute dimension group carried in the attribute video data unit.

When present, the vuh_map_index field may indicate the map index of the current geometry or attribute stream.

The vuh_raw_video_flag field may indicate whether RAW coded points are contained. For example, the vuh_raw_video_flag field set to 1 may indicate that the associated attribute video data unit contains RAW coded points only. As another example, the vuh_raw_video_flag field set to 0 may indicate that the associated attribute video data unit may contain RAW coded points. When the vuh_raw_video_flag field is not present, its value may be inferred to be equal to 0. According to embodiments, RAW coded points are also referred to as pulse code modulation (PCM) coded points.

When the vuh_unit_type field indicates VPCC_GVD, The V-PCC unit header according to the embodiments may further include a vuh_map_index field, a vuh_raw_video_flag field, and a vuh_reserved_zero_12bits field.

When present, the vuh_map_index field indicates the index of the current geometry stream.

The vuh_raw_video_flag field may indicate whether RAW coded points are contained. For example, the vuh_raw_video_flag field set to 1 may indicate that the associated geometry video data unit contains RAW coded points only. As another example, the vuh_raw_video_flag field set to 0 may indicate that the associated geometry video data unit may contain RAW coded points. When the vuh_raw_video_flag field is not present, its value may be inferred to be equal to 0. According to embodiments, RAW coded points are also referred to as PCM coded points.

The vuh_reserved_zero_12bits field is a reserved field for future use.

If the vuh_unit_type field indicates VPCC_OVD or VPCC_AD, the V-PCC unit header according to the embodiments may further include a vuh_reserved_zero_17bits field. Otherwise, the V-PCC unit header may further include a vuh_reserved_zero_27bits field.

The vuh_reserved_zero_17bits field and the vuh_reserved_zero_27bits field are reserved fields for future use.

FIG. 32 illustrates an exemplary syntax structure of a V-PCC unit payload (vpcc_unit_payload( )) according to embodiments.

That is, a V-PCC bitstream is a collection of V-PCC components, for example, an atlas, an occupancy map, a geometry, and an attribute. The atlas component (or atlas frame) may be divided into one or more tiles (or tile groups) and may be encapsulated in NAL units. In an embodiment, a collection of one or more tiles in the atlas frame may be referred to as a tile group. In another embodiment, a collection of one or more tiles in the atlas frame may also be referred to as a tile. For example, the atlas frame may be divided into one or more rectangular partitions and the one or more rectangular partitions may be referred to as tiles.

According to embodiments, coded V-PCC video components are referred to as video bitstreams and the atlas component is referred to as an atlas bitstream. The video bitstream may be split into smaller units, for example, video sub-bitstreams, and the atlas bitstream may also be split into smaller units, for example, atlas sub-bitstreams.

The V-PCC unit payload of FIG. 32 may contain one of a V-PCC parameter set (vpcc_parameter_set( )), an atlas sub-bitstream (atlas_sub_bitstream( )), and a video sub-bitstream (video_sub_bitstream( )) according to the value of the vuh_unit_type field in the V-PCC unit header.

For example, when the vuh_unit_type field indicates VPCC_VPS, the V-PCC unit payload contains vpcc_parameter_set( ) containing overall encoding information about the bitstream. When the vuh_unit_type field indicates VPCC_AD, the V-PCC unit payload contains atlas_sub_bitstream( ) carrying atlas data. In addition, according to an embodiment, when the vuh_unit_type field indicates VPCC_OVD, the V-PCC unit payload contains an occupancy video sub-bitstream (video_sub_bitstream( )) carrying occupancy video data. When the vuh_unit_type field indicates VPCC_GVD, the V-PCC unit payload contains a geometry video sub-bitstream (video_sub_bitstream( )) carrying geometry video data. When the vuh_unit_type field indicates VPCC_AVD, the V-PCC unit payload contains an attribute video sub-bitstream (video_sub_bitstream( )) carrying attribute video data.

According to embodiments, the atlas sub-bitstream may be referred to as an atlas substream, and the occupancy video sub-bitstream may be referred to as an occupancy video substream. The geometry video sub-bitstream may be referred to as a geometry video substream, and the attribute video sub-bitstream may be referred to as an attribute video substream. The V-PCC unit payload according to the embodiments conforms to the format of a High Efficiency Video Coding (HEVC) Network Abstraction Layer (NAL) unit.

FIG. 33 illustrates an exemplary syntax structure of a V-PCC parameter set (VPS) according to embodiments.

According to embodiments, the VPS may include profile_tier_level( ) a vps_vpcc_parameter_set_id field, and an sps_bounding_boxpresent_flag field.

profile_tier_level( ) specifies restrictions on bitstreams. For example, profile_tier_level( ) specifies limits on capabilities needed to decode the bitstreams. Profiles, tiers, and levels may also be used to indicate interoperability points between individual decoder implementations.

The vps_vpcc_parameter_set_id field may provide an identifier for the V-PCC VPS for reference by other syntax elements.

The sps_bounding_boxpresent_flag field represents a flag indicating whether there is information about an overall (entire) bounding box of a point cloud object/content in a bitstream (the overall bounding box may be a bounding box including all bounding boxes that change over time). For example, the sps_bounding_boxpresent_flag field equal to 1 may indicate an overall bounding box offset and size information of the point cloud content carried in this bitstream.

According to embodiments, when the sps_bounding_boxpresent_flag field is equal to 1, the VPS may further include an sps_bounding_box_offset_x field, an sps_bounding_box_offset_y field, an sps_bounding_box_offset_z field, an sps_bounding_box_size_width field, an sps_bounding_box_size_height field, an sps_bounding_box_size_depth field, an sps_bounding_box_changed_flag field, and an sps_bounding_box_info_flag field.

The sps_bounding_box_offset_x field indicates an x offset of the overall bounding box offset as the size information of the point cloud content carried in the bitstream in Cartesian coordinates. When not present, the value of sps_bounding_box_offset_x may be inferred to be 0.

The sps_bounding_box_offset_y field indicates a y offset of the overall bounding box offset as the size information of the point cloud content carried in the bitstream in Cartesian coordinates. When not present, the value of sps_bounding_box_offset_y may be inferred to be 0.

The sps_bounding_box_offset_z field indicates a z offset of the overall bounding box offset as the size information of the point cloud content carried in the bitstream in Cartesian coordinates. When not present, the value of sps_bounding_box_offset_z may be inferred to be 0.

The sps_bounding_box_size_width field indicates the width of the overall bounding box offset as the size information of the point cloud content carried in the bitstream in Cartesian coordinates. When not present, the value of sps_bounding_box_size_width may be inferred to be 1.

The sps_bounding_box_size_height field indicates the height of the overall bounding box offset as the size information of the point cloud content carried in the bitstream in Cartesian coordinates. When not present, the value of sps_bounding_box_size_height may be inferred to be 1.

The sps_bounding_box_size_depth field indicates the depth of the overall bounding box offset as the size information of the point cloud content carried in the bitstream in Cartesian coordinates. When not present, the value of sps_bounding_box_size_depth may be inferred to be 1.

The sps_bounding_box_changed_flag field may indicate whether a bounding box of point cloud data included in the bitstream changes over time. For example, the sps_bounding_box_changed_flag field equal to 1 may indicate that the bounding box of the point cloud data changes over time.

The sps_bounding_box_info_flag field may indicate whether SEI including bounding box information of the point cloud data in the bitstream is present. For example, the sps_bounding_box_info_flag field equal to 1 may indicate that the SEI (3D bounding box SEI) including the bounding box information of the point cloud data is included in the bitstream. In this case, this may indicate that a PCC player corresponding to the method/device according to embodiments acquires and uses information included in the corresponding SEI.

The VPS according to embodiments may further include a vps_atlas_count_minus1 field. The vps_atlas_count_minus1 field plus 1 indicates the total number of supported atlases in a current bitstream.

The VPS according to embodiments may include a first iteration statement repeated as many times as the value of vps_atlas_count_minus1 field. The first iteration statement may include a vps_frame_width[j] field, a vps_frame_height[j] field, a vps_map_count_minus1[j] field, and a vps_raw_patch_enabled_flag[j] field. In an embodiment, the index j is initialized to 0 and incremented by 1 every time the first iteration statement is executed, and the first iteration statement is repeated until the value of j becomes the value of the vps_atlas_count_minus1 field.

The vps_frame_width[j] field may indicate the width of a V-PCC frame in terms of integer luma samples for an atlas with the index j. This frame width is a nominal width associated with all V-PCC components for the atlas with the index j.

The vps_frame_height[j] field may indicate the height of the V-PCC frame in terms of integer luma samples for the atlas with the index j. This frame height is a nominal height associated with all V-PCC components for the atlas with the index j.

The vps_map_count_minus1[j] field plus 1 may indicate the number of maps used to encode geometry and attribute data for the atlas with the index j.

According to embodiments, when the value of the vps_map_count_minus1[j] field is greater than 0, the first iteration statement may further include a vps_multiple_map_streams_present_flag[j] field and vps_map_absolute_coding_enabled_flag[j][0]=1.

The vps_multiple_map_streams_present_flag[j] field equal to 0 indicates that all geometry or attribute maps for the atlas with the index j are placed in a single geometry or attribute video stream, respectively. The vps_multiple_map_streams_present_flag[j] field equal to 1 indicates that all geometry or attribute maps for the atlas with index j are placed in separate video streams.

According to embodiments, the first iteration statement includes a second iteration statement repeated as many times as the value of the vps_map_count_minus1[j] field. In an embodiment, the index i is initialized to 1 and incremented by 1 every time the second iteration statement is executed, and the second iteration statement is repeated until the value of i becomes the value of the vps_map_count_minus1 field.

The second iteration statement may further include a vps_map_absolute_coding_enabled_flag[j][i] field and/or a vps_map_predictor_index_diff[j][i] field according to the value of a vps_multiple_map_streams_present_flag[j] field.

According to embodiments, if the value of the vps_multiple_map_streams_present_flag[j] field is 1, the second iteration statement may further include the vps_map_absolute_coding_enabled_flag[j][i] field and, otherwise, the vps_map_absolute_coding_enabled_flag[j][i] field may be equal to 1.

The vps_map_absolute_coding_enabled_flag[j][i] field equal to 1 indicates that a geometry map with the index i for the atlas with index j is coded without any form of map prediction. The vps_map_absolute_coding_enabled_flag[j][i] equal to 0 indicates that the geometry map with the index i for the atlas with the index j is first predicted from another earlier coded map, prior to coding.

The vps_map_absolute_coding_enabled_flag[j][0] field equal to 1 indicates that the geometry map with the index 0 is coded without map prediction.

If the value of the vps_map_absolute_coding_enabled_flag[j][i] field is 0 and i is greater than 0, the second iteration statement may further include a vps_map_predictor_index_diff[j][i] field and, otherwise, the value of the vps_map_predictor_index_diff[j][i] field may become 0.

The value of the vps_map_predictor_index_diff[j][i] field may be used to compute prediction of the geometry map with the index i for the atlas with index j when vps_map_absolute_coding_enabled_flag[j][i] is equal to 0.

According to embodiments, the second iteration statement may further include a vps_raw_patch_enabled_flag[j] field.

The vps_raw_patch_enabled_flag[j] field equal to 1 indicates that patches with raw coded points for the atlas with the index j may be present in the bitstream.

According to embodiments, if the value of the vps_raw_patch_enabled_flag[j] field is True, the second iteration statement may further include a vps_raw_separate_video_present_flag[j] field, occupancy information(j), geometry information(j), and attribute information(j).

The vps_raw_separate_video_present_flag[j] field equal to 1 indicates that raw coded geometry and attribute information for the atlas with the index j may be stored in separate video streams.

occupancy information(j) includes parameter sets related to occupancy video of the atlas with the index j.

geometry information(j) includes parameter sets related to geometry video of the atlas with the index j.

attribute information(j) includes parameter sets related to attribute video of the atlas with the index j.

Figure 34:
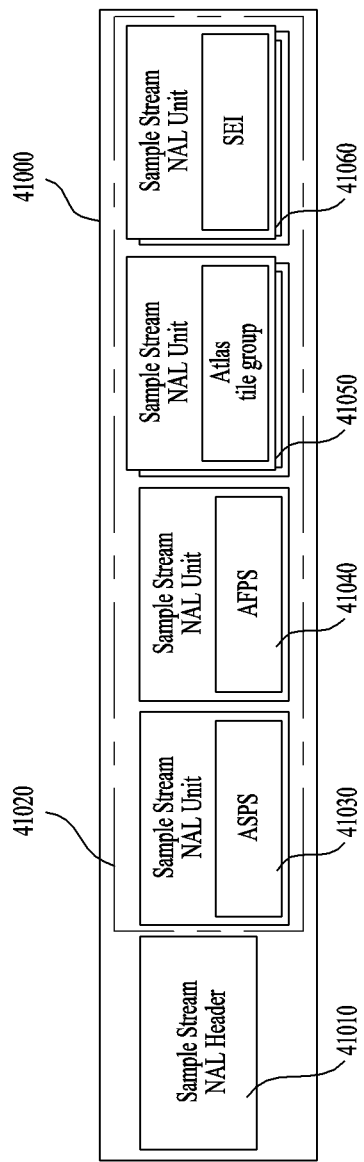
FIG. 34 illustrates an exemplary structure of an atlas substream according to embodiments.

FIG. 34 illustrates an exemplary structure of an atlas substream according to embodiments. In an embodiment, the atlas substream of FIG. 34 conforms to a format of an HEVC NAL unit.

An atlas substream 41000 according to embodiments may include a sample stream NAL header 41010 and one or more sample stream NAL units 41020.

The one or more sample stream NAL units 41020 according to embodiments may include a sample stream NAL unit 41030 including an ASPS, a sample stream NAL unit 41040 including an AFPS, one or more sample stream NAL units 41050 including information about one or more atlas tiles (or tile groups), and/or one or more sample stream NAL units 41060 including one or more SEI messages.

FIG. 35 shows an example of a syntax structure of a sample stream NAL header (sample_stream_nal_header( )) contained in the atlas substream according to embodiments.

The sample_stream_nal_header( ) according to the embodiments may include an ssnh_unit_size_precision_bytes_minus1 field and an ssnh_reserved_zero_5bits field.

The value of the ssnh_unit_size_precision_bytes_minus1 field plus 1 may specify the precision, in bytes, of the ssnu_nal_unit_size element in all sample stream NAL units. The value of this field may be in the range of 0 to 7.

The ssnh_reserved_zero_5bits field is a reserved field for future use.

FIG. 36 shows an example of a syntax structure of a sample stream NAL unit (sample_stream_nal_unit( )) according to embodiments.

The sample_stream_nal_unit( ) according to the embodiments may include an ssnu_nal_unit_size field and nal_unit (ssnu_nal_unit_size).

The ssnu_nal_unit_size field specifies the size, in bytes, of the subsequent NAL unit. The number of bits used to represent the ssnu_nal_unit_size field is equal to (ssnh_unit_size_precision_bytes_minus1+1)*8.

The nal_unit(ssnu_nal_unit_size) has a length corresponding to the value of the ssnu_nal_unit_size field, and carries one of an atlas_sequence_parameter_set (ASPS), an atlas frame parameter set (AFPS), atlas tile group information, and an SEI message. That is, each sample stream NAL unit may contain an ASPS, an AFPS, atlas tile group information, or an SEI message. According to embodiments, the ASPS, the AFPS, the atlas tile group information, and the SEI message are referred to as atlas data (or atlas metadata).

SEI messages according to embodiments may assist in processes related to decoding, reconstruction, display, or other purposes.

Each SEI message according to the embodiments is composed of an SEI message header and an SEI message payload (sei_payload). The SEI message header may contain payload type information (payloadType) and payload size information (payloadSize).

The payloadType indicates the payload type of the SEI message. For example, whether the SEI message is a prefix SEI message or a suffix SEI message may be identified based on the payloadType.

The payloadSize indicates the payload size of the SEI message.

FIG. 37 illustrates an exemplary syntax structure of atlas_sequence_parameter_set( ) according to embodiments. An ASPS of FIG. 37 may be included in a sample stream NAL unit conforming to the format of an HEVC NAL unit when the type of the NAL unit is an atlas sequence parameter.

The ASPS may include syntax elements applied to zero or one or more full coded atlas sequences (CASs) determined by content of a syntax element in the ASPS referenced as a syntax element in each tile group (or tile) header.

According to embodiments, the ASPS may include an asps_atlas_sequence_parameter_set_id field, an asps_frame_width field, an asps_frame_height field, an asps_log 2_patch_packing_block_size field, an asps_log 2_max_atlas_frame_order_cnt_lsb_minus4 field, an asps_max_dec_atlas_frame_buffering_minus1 field, an asps_long_term_ref_atlas_frames_flag field, an asps_num_ref_atlas_frame_lists_in_asps field, an asps_use_eight_orientations_flag field, an asps_45degree_projection_patch_present_flag field, an asps_normal_axis_limits_quantization_enabled_flag field, an asps_normal_axis_max_delta_value_enabled_flag field, an asps_remove_duplicate_point_enabled_flag field, an asps_pixel_deinterleaving_flag field, an asps_patch_precedence_order_flag field, an asps_patch_size_quantizer_present_flag field, an asps_enhanced_occupancy_map_for_depth_flag field, an asps_point_local_reconstruction_enabled_flag field, and an asps_vui_parameters_present_flag field.

The asps_atlas_sequence_parameter_set_id field may provide an identifier for the atlas sequence parameter set for reference by other syntax elements.

The asps_frame_width field indicates the atlas frame width in terms of integer luma samples for the current atlas.

The asps_frame_height field indicates the atlas frame height in terms of integer luma samples for the current atlas.

The asps_log 2_patch_packing_block_size field specifies the value of the variable PatchPackingBlockSize that is used for the horizontal and vertical placement of the patches within the atlas.

The asps_log 2_max_atlas_frame_order_cnt_lsb_minus4 field specifies the value of the variable MaxAtlasFrmOrderCntLsb that is used in the decoding process for the atlas frame order count.

The asps_max_dec_atlas_frame_buffering_minus1 field plus 1 specifies the maximum required size of the decoded atlas frame buffer for the CAS in units of atlas frame storage buffers.

The asps_long_term_ref_atlas_frames_flag field equal to 0 specifies that no long term reference atlas frame is used for inter prediction of any coded atlas frame in the CAS. The asps_long_term_ref_atlas_frames_flag field equal to 1 specifies that long term reference atlas frames may be used for inter prediction of one or more coded atlas frames in the CAS.

The asps_num_ref_atlas_frame_lists_in_asps field specifies the number of the ref_list_struct(rlsIdx) syntax structures included in the atlas_sequence_parameter_set.

The ref_list_struct(i) may be included in the atlas_sequence_parameter_set according to the value of asps_num_ref_atlas_frame_lists_in_asps field.

The asps_use_eight_orientations_flag field equal to 0 specifies that the patch orientation index for a patch with index j in a frame with index i, pdu_orientation_index[i][j] field, is in the range of 0 to 1, inclusive. The asps_use_eight_orientations_flag field equal to 1 specifies that the patch orientation index for a patch with index j in a frame with index i, pdu_orientation_index[i][j] field, is in the range of 0 to 7, inclusive.

The asps_45degree_projection_patch_present_flag field equal to 0 specifies that the patch projection information is not signaled for the current atlas tile (or atlas tile group). The asps_45degree_projection_present_flag field equal to 1 specifies that the patch projection information is signaled for the current atlas tile (or atlas tile group).

The asps_normal_axis_limits_quantization_enabled_flag field equal to 1 specifies that quantization parameters shall be signaled and used for quantizing the normal axis related elements of a patch data unit, a merge patch data unit, or an inter patch data unit. If field asps_normal_axis_limits_quantization_enabled_flag field is equal to 0, then no quantization is applied on any normal axis related elements of a patch data unit, a merge patch data unit, or an inter patch data unit. When asps_normal_axis_limits_quantization_enabled_flag is 1, an atgh_pos_min_z_quantizer field may be included in the atlas tile group (or tile) header.

The asps_normal_axis_max_delta_value_enabled_flag field equal to 1 specifies that the maximum nominal shift value of the normal axis that may be present in the geometry information of a patch with index i in a frame with index j will be indicated in the bitstream for each patch data unit, a merge patch data unit, or an inter patch data unit. If the asps_normal_axis_max_delta_value_enabled_flag field is equal to 0, then the maximum nominal shift value of the normal axis that may be present in the geometry information of a patch with index i in a frame with index j shall not be indicated in the bitstream for each patch data unit, a merge patch data unit, or an inter patch data unit. When the asps_normal_axis_max_delta_value_enabled_flag field is equal to 1, an atgh_pos_delta_max_z_quantizer field may be included in the atlas tile group (or tile) header.

The asps_remove_duplicate_point_enabled_flag field equal to 1 indicates that duplicated points are not reconstructed for the current atlas, where a duplicated point is a point with the same 2D and 3D geometry coordinates as another point from a lower index map. The asps_remove_duplicate_point_enabled_flag field equal to 0 indicates that all points are reconstructed.

The asps_max_dec_atlas_frame_buffering_minus1 field plus 1 specifies the maximum required size of the decoded atlas frame buffer for the CAS in units of atlas frame storage buffers.

The asps_pixel_deinterleaving_flag field equal to 1 indicates that the decoded geometry and attribute videos for the current atlas contain spatially interleaved pixels from two maps. The asps_pixel_deinterleaving_flag field equal to 0 indicates that the decoded geometry and attribute videos corresponding to the current atlas contain pixels from only a single map.

The asps_patch_precedence_order_flag field equal to 1 indicates that patch precedence for the current atlas is the same as the decoding order. The asps_patch_precedence_order_flag field equal to 0 indicates that patch precedence for the current atlas is the reverse of the decoding order.

The asps_patch_size_quantizer_present_flag field equal to 1 indicates that the patch size quantization parameters are present in an atlas tile (or tile group) header. The asps_patch_size_quantizer_present_flag field equal to 0 indicates that the patch size quantization parameters are not present. When the asps_patch_size_quantizer_present_flag field is equal to 1, an atgh_patch_size_x_info_quantizer field and an atgh_patch_size_y_info_quantizer field may be included in the atlas tile group (or tile) header.

The asps_enhanced_occupancy_map_for_depth_flag field equal to 1 indicates that the decoded occupancy map video for the current atlas contains information related to whether intermediate depth positions between two depth maps are occupied. The asps_eom_patch_enabled_flag field equal to 0 indicates that the decoded occupancy map video does not contain information related to whether intermediate depth positions between two depth maps are occupied.

The asps_point_local_reconstruction_enabled_flag field equal to 1 indicates that point local reconstruction mode information may be present in the bitstream for the current atlas. The asps_point_local_reconstruction_enabled_flag field equal to 0 indicates that no information related to the point local reconstruction mode is present in the bitstream for the current atlas.

When the asps_enhanced_occupancy_map_for_depth_flag field or the asps_point_local_reconstruction_enabled_flag field is equal to 1, an asps_map_count_minus1 field may be included in the ASPS.

The asps_map_count_minus1 field plus 1 indicates the number of maps that may be used for encoding the geometry and attribute data for the current atlas.

When the asps_enhanced_occupancy_map_for_depth_flag field and the asps_map_count_minus1 field are set to 0, an asps_enhanced_occupancy_map_fix_bit_count_minus1 field may be included in the ASPS.

The asps_enhanced_occupancy_map_fix_bit_count_minus1 field plus 1 indicates the size in bits of the EOM codeword.

When the asps_point_local_reconstruction_enabled_flag field is equal to 1, the ASPS may include ASPS point local reconstruction information (asps_point_local_reconstruction_information (asps_map_count_minus1)).

When the asps_pixel_deinterleaving_flag field (or asps_pixel_interleaving_flag field) or the asps_point_local_reconstruction_enabled_flag field is equal to 1, an asps_surface_thickness_minus1 field may be included in the ASPS.

The asps_surface_thickness_minus1 field plus 1 specifies the maximum absolute difference between an explicitly coded depth value and interpolated depth value.

The asps_vui_parameters_present_flag field equal to 1 specifies that the vui_parameters( ) syntax structure is present in the ASPS. The asps_vui_parameters_present_flag field equal to 0 specifies that the vui_parameters( ) syntax structure is not present in the ASPS. That is, if the value of the asps_vui_parameters_present_flag field is 1, the vui_parameters( ) syntax is included in the ASPS.

FIG. 38 illustrates an exemplary syntax structure of an atlas frame parameter set (AFPS) according to embodiments. The AFPS of FIG. 38 may be included in a sample stream NAL unit conforming to a format of an HEVC NAL unit when the type of an NAL unit is an atlas frame parameter.

The AFPS includes a syntax structure including syntax elements applied to zero or one or more full coded atlas frames.

According to embodiments, the AFPS may include an afps_atlas_frame_parameter_set_id field, an afps_atlas_sequence_parameter_set_id field, atlas_frame_tile_information( ), an afps_num_ref_idx_default_active_minus1 field, an afps_additional_lt_afoc_lsb_len field, an afps_2d_pos_x_bit_count_minus1 field, an afps_2d_pos_y_bit_count_minus1 field, an afps_3d_pos_x_bit_count_minus1 field, an afps_3d_pos_y_bit_count_minus1 field, an afps_lod_bit_count field, an afps_override_eom_for_depth_flag field, and an afps_raw_3d_pos_bit_count_explicit_mode_flag field.

The afps_atlas_frame_parameter_set_id field specifies an identifier for identifying the AFPS for reference by other syntax elements.

The afps_atlas_sequence_parameter_set_id field specifies the value of asps_atlas_sequence_parameter_set_id for an active ASPS.

atlas_frame_tile_information( ) will be described in detail with reference to FIG. 39.

The afps_num_ref_idx_default_active_minus1 field plus 1 specifies the inferred value of the variable NumRefIdxActive for the tile (or tile group) with atgh_num_ref_idx_active_override_flag field equal to 0.

The afps_additional_lt_afoc_lsb_len field specifies the value of the variable MaxLtAtlasFrmOrderCntLsb that is used in the decoding process for reference atlas frame lists.

The afps_2d_pos_x_bit_count_minus1 field plus 1 specifies the number of bits in the fixed-length representation of pdu_2d_pos_x[j] of a patch with index j in an atlas tile (or tile group) that refers to afps_atlas_frame_parameter_set_id.

The afps_2d_pos_y_bit_count_minus1 field plus 1 specifies the number of bits in the fixed-length representation of pdu_2d_pos_y[j] of a patch with index j in an atlas tile (or tile group) that refers to afps_atlas_frame_parameter_set_id.

The afps_3d_pos_x_bit_count_minus1 field plus 1 specifies the number of bits in the fixed-length representation of pdu_3d_pos_x[j] of patch with index j in an atlas tile (or tile group) that refers to afps_atlas_frame_parameter_set_id.

The afps_3d_pos_y_bit_count_minus1 field plus 1 specifies the number of bits in the fixed-length representation of pdu_3d_pos_y[j] of patch with index j in an atlas tile (or tile group) that refers to afps_atlas_frame_parameter_set_id.

The afps_lod_bit_count field specifies the number of bits in the fixed-length representation of pdu_lod[j] of a patch with index j in an atlas tile (or tile group) that refers to afps_atlas_frame_parameter_set_id field.

The afps_override_eom_for_depth_flag field equal to 1 indicates that the values of the afps_eom_number_of_patch_bit_count_minus1 field and the afps_eom_max_bit_count_minus1 field are explicitly present in the bitstream. The afps_override_eom_for_depth_flag field equal to 0 indicates that the values of the afps_eom_number_of_patch_bit_count_minus1 field and the afps_eom_max_bit_count_minus1 field are implicitly derived.

The afps_eom_number_of_patch_bit_count_minus1 field plus 1 specifies the number of bits used to represent the number of geometry patches associated with the current EOM attribute patch.

The afps_eom_max_bit_count_minus1 field plus 1 specifies the number of bits used to represent the number of EOM points per geometry patch associated with the current EOM attribute patch.

The afps_raw_3d_pos_bit_count_explicit_mode_flag field equal to 1 indicates that the bit count for the rpdu_3d_pos_x field, the rpdu_3d_pos_y field, and the rpdu_3d_pos_z field is explicitly coded in an atlas tile group header that refers to afps_atlas_frame_parameter_set_id field.

FIG. 39 illustrates an exemplary syntax structure of atlas frame tile information (atlas_frame_tile_information) according to embodiments.

FIG. 39 illustrates an embodiment of the syntax of atlas frame tile information (AFTI) included in the AFPS of FIG. 38.

According to embodiments, the AFTI may include an afi_single_tile_in_atlas_frame_flag field, an afti_num_tiles_in_atlas_frame_minus1 field, an afi_num_tile_groups_in_atlas_frame_minus1 field, or an aft_signalled_tile_group_id_flag field.

The afti_single_tile_in_atlas_frame_flag field equal to 1 specifies that there is only one tile in each atlas frame referring to the AFPS. The afi_single_tile_in_atlas_frame_flag field equal to 0 specifies that there is more than one tile in each atlas frame referring to the AFPS.

If the value of the afi_single_tile_in_atlas_frame_flag field is False (e.g., 0), an afti_uniform_tile_spacing_flag field may be included in the AFTI.

The afti_uniform_tile_spacing_flag field equal to 1 specifies that tile column and row boundaries are uniformly distributed across the atlas frame and are signaled using syntax elements such as afti_tile_cols_width_minus1 and afti_tile_rows_height_minus1, respectively. The afti_uniform_tile_spacing_flag field equal to 0 specifies that the tile column and row boundaries are uniformly distributed or are not distributed across the atlas frame and are signaled using syntax elements such as afti_num_tile_columns_minus1, afti_num_tile_rows_minus1, and a list of syntax element pairs afti_tile_column_width_minus1[i] and afti_tile_row_height_minus1[i].

If the value of the afti_uniform_tile_spacing_flag field is True (e.g., 1), the afti_tile_cols_width_minus1 field and the afti_tile_rows_height_minus1 field may be included in the AFTI.

The value of the afti_tile_cols_width_minus1 field plus 1 specifies the width of tile columns excluding the right-most tile column of the atlas frame in units of 64 samples.

The value of the afti_tle_rows_height_minus1 field plus 1 specifies the height of tile rows excluding the bottom tile row of the atlas frame in units of 64 samples.

If the value of the afti_uniform_tile_spacing_flag field is False (e.g., 0), the afti_num_tile_columns_minus1 field and the afti_num_tile_rows_minus1 field may be included in the AFTI.

The value of the afti_num_tile_columns_minus1 field plus 1 specifies the number of tile columns that partition the atlas frame.

The value of the afti_num_tile_rows_minus1 field plus 1 specifies the number of tile rows that partition the atlas frame.

As many afti_tile_column_width_minus1[i] fields as the value of the afti_num_tile_columns_minus1 field may be included in the AFTI, and as many afti_tile_row_height_minus1[i] fields as the value of the afti_num_tile_rows_minus1 field may be included in the AFTI.

The value of the afti_tile_column_width_minus1[i] field plus 1 specifies the width of the i-th tile column in units of 64 samples.

The value of the afti_tile_row_height_minus1[i] field plus 1 may specify the height of the i-th tile row in units of 64 samples.

The value of the afti_num_tiles_in_atlas_frame_minus1 field plus 1 specifies the number of tiles in each atlas frame referring to the AFPS.

As many afti_tile_idx[i] fields as the value of the afti_num_tiles_in_atlas_frame_minus1 field may be included in the AFTI.

The afti_tile_idx[i]) field specifies a tile index of the i-th tile in each atlas frame referring to the AFPS.

The afti_single_tile_per_tile_group_flag field equal to 1 specifies that each tile group (or tile) that refers to the AFPS includes one tile. The afti_single_tile_per_tile_group_flag field equal to 0 specifies that a tile group (or tile) that refers to the AFPS may include more than one tile.

If the value of the afti_single_tile_per_tile_group_flag field is False (e.g., 0), the afti_num_tile_groups_in_atlas_frame_minus1 field may be included in the AFTI.

The value of the afti_num_tile_groups_in_atlas_frame_minus1 field plus 1 specifies the number of tile groups (or tiles) in each atlas frame referring to the AFPS. The value of afti_num_tile_groups_in_atlas_frame_minus1 field may be in the range of 0 to NumTilesInAtlasFrame−1, inclusive. If the afti_num_tile_groups_in_atlas_frame_minus1 field is not present and the afti_single_tile_per_tile_roup_flag is equal to 1, the value of the afti_num_tile_groups_in_atlas_frame_minus1 may be inferred to be equal to NumTilesInAtlasFrame−1.

As many afti_top_left_tile_idx[i] fields and afti_bottom_right_tile_idx_delta[i] fields as the value of the afti_num_tile_groups_in_atlas_frame_minus1 field may be included in the AFTI.

The afti_top_left_tile_idx[i] field may specify a tile index of a tile located at the top-left corner of the i-th tile group (or tile). For any i not equal to j, the value of the afti_top_left_tile_idx[i] field is not equal to the value of an afti_top_left_tile_idx[j] field. If the afti_top_left_tile_idx[j] field is not present, the value of the afti_top_left_tile_idx[i] may be inferred to be equal to i. The length of the afti_top_left_tile_idx[i] field may be Ceil(Log 2(NumTilesInAtlasFrame) bits.

The afti_bottom_right_tile_idx_delta[i] field may specify the difference between a tile index of a tile located at the bottom-right corner of the i-th tile group (or tile) and the afti_top_left_tile_idx[i] field. If the afti_single_tile_per_tile_group_flag field is equal to 1, the value of the afti_bottom_right_tile_idx_delta[i] field may be inferred to be equal to 0. The length of the afti_bottom_right_tile_idx_delta[i] field may be Ceil(Log 2(NumTilesInAtlasFrame−afti_top_left_tile_idx[i])) bits.

The afti_signalled_tile_group_id_flag field equal to 1 specifies that a tile group ID for each tile group or a tile ID for each tile is signaled.

If the value of the afti_signalled_tile_group_id_flag field is 1, an afti_signalled_tile_group_id_length_minus1 field may be included in the AFTI.

The value of the afti_signalled_tile_group_id_length_minus1 field plus 1 specifies the number of bits used to represent a syntax element afti_tile_group_id[i]. If the afti_tile_group_id[i] field is present, there may be a syntax element atgh_address in a tile (or tile group) header.

As many afti_tile_group_id[i] fields as the value of the afti_signalled_tile_group_id_length_minus1 field may be included in the AFTI.

The afti_tile_group_id[i] field specifies a tile group (or tile) ID of the i-th tile group. The length of the afti_tile_group_id[i] field is afti_signalled_tile_group_id_length_minus1+1 bits.

FIG. 40 illustrates an exemplary syntax structure of supplemental enhancement information (SEI) according to embodiments. The SEI of FIG. 40 may be included in a sample stream NAL unit conforming to an HEVC NAL unit.

The reception method/device and system according to embodiments may be configured to decode, restore, and display point cloud data based on an SEI message.

The SEI message according to embodiments may include a prefix SEI message or a suffix SEI message. A payload of each SEI message signals information corresponding to payload type information (payloadType) and payload size information (payloadSize) through an SEI message payload (sei_payload(payloadType, payloadSize)).

For example, when payloadType indicates 13, the payload may include 3D region mapping (3d_region_mapping(payloadSize)) information.

According to embodiments, when a psd_unit_type field indicates a prefix (PSD_PREFIX_SEI), the SEI may include buffering_period(payloadSize), pic_timing(payloadSize), filler_payload(payloadSize), user_data_registered_itu_t_t35(payloadSize), user_data unregistered(payloadSize), recovery_point(payloadSize), no_display(payloadSize), time_code(payloadSize), regional_nesting(payloadSize), sei_manifest(payloadSize), sei_prefix_indication(payloadSize), geometry_transformation_params(payloadSize), 3d_bounding_box_info(payloadSize), and 3d_region_mapping(payloadSize), reserved_sei_message(payloadSize).

According to embodiments, when the psd_unit_type field indicates a suffix (PSD_SUFFIX_SEI), the SEI may include filler_payload(payloadSize), user_data_registered_itu_t_t35(payloadSize), user_data unregistered(payloadSize), decoded_pcc_hash(payloadSize), and reserved_sei_message(payloadSize).

FIG. 41 illustrates an exemplary syntax structure of 3D bounding box information (3d_bounding_box_info(payloadSize)) SEI according to embodiments.

According to embodiments, if the psd_unit_type field indicates the prefix (PSD_PREFIX_SEI) and the payload type (payloadType) is 12, a payload of an SEI message (or SEI) may include 3D bounding box information (3d_bounding_box_info(payloadSize)). The payload type (payloadType) of 12 is one example and the present disclosure is not limited thereto because the value of payloadType is easily changed by one skilled in the art.

According to embodiments, the 3D bounding box information may include a 3dbi_cancel_flag field. If the value of the 3dbi_cancel_flag field is False, the 3D bounding box information may further include an object_id field, a 3d_bounding_box_x field, a 3d_bounding_box_y field, a 3d_bounding_box_z field, a 3d_bounding_box_delta_x field, a 3d_bounding_box_delta_y field, and a 3d_bounding_box_delta_z field.

The 3dbi_cancel_flag field equal to 1 indicates that the 3D bounding box information SEI message cancels the persistence of any previous 3D bounding box information SEI message in output order.

The object_id field specifies an identifier of a point cloud object/content carried in a bitstream.

The 3d_bounding_box_x field indicates an X coordinate value of an origin position of a 3D bounding box of an object.

The 3d_bounding_box_y field indicates a Y coordinate value of an origin position of a 3D bounding box of an object.

The 3d_bounding_box_z field indicates a Z coordinate value of an origin position of a 3D bounding box of an object.

The 3d_bounding_box_delta_x field indicates the size of a bounding box on the X axis of an object.

The 3d_bounding_box_delta_y field indicates the size of a bounding box on the Y axis of an object.

The 3d_bounding_box_delta_z field indicates the size of a bounding box on the Z axis of an object.

FIG. 42 illustrates an exemplary syntax structure of 3D region mapping information (3d_region_mapping(payloadSize)) SEI according to embodiments.

According to embodiments, if the psd_unit_type field indicates the prefix (PSD_PREFIX_SEI) and the payload type (payloadType) is 13, a payload of an SEI message (or SEI) may include 3D region mapping information (3d_region_mapping(payloadSize)). The payload type (payloadType) of 13 is one example and the present disclosure is not limited thereto because the value of payloadType is easily changed by one skilled in the art.

According to embodiments, the 3D region mapping information may include a 3dmi_cancel_flag field. If the value of the 3dmi_cancel_flag field is False, the 3D bounding box information may further include a num_3d_regions field.

The 3dmi_cancel_flag field equal to 1 indicates that a 3D region mapping information SEI message cancels the persistence of any previous 3D region mapping information SEI message in output order.

The num_3d_regions field may indicate the number of 3D regions signaled in corresponding SEI.

According to embodiments, the 3D region mapping information may include an iteration statement repeated as many times as the value of the num_3d_regions field. In an embodiment, the index i is initialized to 0 and incremented by 1 every time the iteration statement is executed, and the iteration statement is repeated until the value of i becomes the value of the num_3d_regions field. This iteration statement may include a 3d_region_idx[i] field, a 3d_region_anchor_x[i] field, a 3d_region_anchor_y[i] field, a 3d_region_anchor_z[i] field, a 3d_region_type[i] field, and a num_2d_regions[i] field.

The 3d_region_idx[i] field may indicate an identifier of the i-th 3D region.

The 3d_region_anchor_x[i] field, the 3d_region_anchor_y[i] field, and the 3d_region_anchor_z[i] field may indicate x, y, and z coordinate values of an anchor point of the i-th 3D region, respectively. For example, when a 3D region is a cuboid type, the anchor point may be an origin of the cuboid. That is, the 3d_region_anchor_x[i] field, the 3d_region_anchor_y[i] field, and the 3d_region_anchor_z[i] field may indicate x, y, and z coordinate values of an origin position of the cuboid of the i-th 3D region, respectively.

The 3d_region_type[i] field may indicate the type of the i-th 3D region and have a type value from 0x01 to cuboid.

The 3d_region_type[i] field equal to 1 may indicate that the type of the 3D region is the cuboid. If the value of the 3d_region_type[i] field is 1, a 3d_region_delta_x[i] field, a 3d_region_delta_y[i] field, and a 3d_region_delta_z[i] field may be included in the 3D region mapping information.

The 3d_region_delta_x[i] field, the 3d_region_delta_y[i] field, and the 3d_region_delta_y[i] field may indicate difference values on x, y, and z axes of the i-th 3D region, respectively.

The num_2d_regions[i] field may indicate the number of 2D regions of a frame in which video or atlas data associated with the i-th 3D region is present. According to embodiments, a 2D region may correspond to an atlas frame.

According to embodiments, the 3D region mapping information may include an iteration statement repeated as many times as the value of the num_2d_regions[i] field. In an embodiment, the index j is initialized to 0 and incremented by 1 every time the iteration statement is executed, and the iteration statement is repeated until the value of j becomes the value of the num_2d_regions[i] field. This iteration statement may include a 2d_region_idx [j] field, a 2d_region_top [j] field, a 2d_region_left [j] field, a 2d_region_width [j] field, a 2d_region_height [j] field, and a num_tiles[j] field.

The 2d_region_idx [j] field may indicate an identifier of the j-th 2D region of the i-th 3D region.

The 2d_region_top [j] field and the 2d_region_left [j] field may indicate a vertical coordinate value and a horizontal coordinate value in a frame of the top-left position of the j-th 2D region of the i-th 3D region, respectively.

The 2d_region_width [j] field and the 2d_region_height [j] field may include a horizontal width and a vertical height in a frame of the j-th 2D region of the i-th 3D region, respectively.

The num_tiles [j] field may indicate the number of atlas tiles or video tiles associated with the j-th 2D region of the i-th 3D region.

According to embodiments, the 3D region mapping information may include an iteration statement repeated as many times as the value of the num_tiles [j] field. In an embodiment, the index k is initialized to 0 and incremented by 1 every time the iteration statement is executed, and the iteration statement is repeated until the value of k becomes the value of the num_tiles [j] field. This iteration statement may include a tile_idx [k] field and a num_tile_groups [k] field.

The tile_idx [k] field may indicate an identifier of the k-th atlas tile or video tile associated with the j-th 2D region.

The num_tile_groups [k] field may indicate the number of the k-th atlas tile group or video tile group associated with the j-th 2D region. This value may correspond to the number of atlas tiles or video tiles.

According to embodiments, the 3D region mapping information may include an iteration statement repeated as many times as the value of the num_tile_groups [k] field. In an embodiment, the index k is initialized to 0 and incremented by 1 every time the iteration statement is executed, and the iteration statement is repeated until the value of k becomes the value of the num_tile_groups [k] field. This iteration statement may include a tile_group_idx [m] field.

The tile_group_idx [m] field may indicate an identifier of the m-th atlas tile group or video tile group associated with the j-th 2D region. This value may correspond to a tile index.

Due to a signaling method according to embodiments, the reception method/device may monitor a mapping relationship between a 3D region and one or more atlas tiles (2D region) and acquire corresponding data.

FIG. 43 illustrates an exemplary syntax structure of a volumetric tiling information (volumetric_tiling_info(payloadSize)) SEI message according to embodiments. According to embodiments, the volumetric tiling information may include identification information, 3D bounding box information, and/or 2D bounding box information of each spatial region. The volumetric tiling information may further include priority information, dependency information, and hidden information. Accordingly, the reception device may display, on a display device, each spatial region (or a space object) in a form suitable for corresponding information when point cloud data is rendered.

According to embodiments, if the psd_unit_type field indicates the prefix (PSD_PREFIX_SEI) and the payload type (payloadType) is 14, a payload of the SEI message (or SEI) may include the volumetric tiling information (volumetric_tiling_info(payloadSize). The payload type (payloadType) of 14 is one example and the present disclosure is not limited thereto because the value of payloadType is easily changed by one skilled in the art.

According to embodiments, the volumetric tiling information SEI message may indicate that a V-PCC decoder (e.g., a point cloud video decoder) should avoid different characteristics of a decoded point cloud, including association with objects, association of areas, relationship and labeling of areas, and correspondence of areas within a 2D atlas and a 3D space.

The persistence scope for this SEI message may be the remainder of a bitstream or until a new volumetric tiling SEI message is encountered. Only corresponding parameters specified in the SEI message may be updated. If the parameters are not modified and if the value of vti_cancel_flag is not equal to 1, previously defined parameters from an earlier SEI message may persist.

According to embodiments, the volumetric tiling information may include a vti_cancel_flag field. If the value of the vti_cancel_flag field is False, the volumetric tiling information may include a vti_object_label_present_flag field, a vti_3d_bounding_box_present_flag field, a vti_object_priority_present_flag field, a vti_object_hidden_present_flag field, a vti_object_collision_shape_present_flag field, a vti_object_dependency_present_flag field, and a volumetric_tiling_info_objectso field.

The vti_cancel_flag field equal to 1 indicates that the volumetric tiling information SEI message cancels the persistence of any previous volumetric tiling information SEI message in output order.

The vti_object_label_present_flag field equal to 1 indicates that object label information is present in a current volumetric tiling information SEI message. The vti_object_label_present_flag field equal to 0 indicates that the object label information is not present.

The vti_3d_bounding_box_present_flag field equal to 1 indicates that 3D bounding box information is present in the current volumetric tiling information SEI message. The vti_3d_bounding_box_present_flag field equal to 0 indicates that the 3D bounding box information is not present.

The value of the vti_object_priority_present_flag field equal to 1 indicates that object priority information is present in the current volumetric tiling information SEI message. The vti_object_priority_present_flag field equal to 0 indicates that the object priority information is not present.

The vti_object_hidden_present_flag field equal to 1 indicates that hidden object information is present in the current volumetric tiling information SEI message. The vti_object_hidden_present_flag field equal to 0 indicates that the hidden object information is not present.

The vti_object_collision_shape_present_flag field equal to 1 indicates that object collision shape information is present in the current volumetric tiling information SEI message. The vti_object_collision_shape_present_flag field equal to 0 indicates that the object collision shape information is not present.

The vti_object_dependency_present_flag field equal to 1 indicates that object dependency information is present in the current volumetric tiling information SEI message. The vti_object_dependency_present_flag field equal to 1 indicates that the object dependency information is not present.

If the value of the vti_object_label_present_flag field is 1, the volumetric tiling information SEI message includes volumetric tiling information labels (volumetric_tiling_info_labels( )).

The volumetric tiling information labels (volumetric_tiling_info_labels( )) will be described in detail with reference to FIG. 44.

If the value of the vti_3d_bounding_box_present_flag field is 1, the volumetric tiling information SEI message may include a vti_bounding_box_scale_log 2 field, a vti_3d_bounding_box_scale_log 2 field, and a vti_3d_bounding_box_precision_minus8 field.

The vti_bounding_box_scale_log 2 field indicates a scale to be applied to 2D bounding box parameters that may be specified for an object.

The vti_3d_bounding_box_scale_log 2 field indicates a scale to be applied to 3D bounding box parameters that may be specified for an object.

The value of the vti_3d_bounding_box_precision_minus8 field plus 8 indicates the precision of the 3D bounding box parameters that may be specified for an object.

The volumetric_tiling_info_objectso specifies additional information when each of the values of the vti_object_label_present_flag field, the vti_3d_bounding_box_present_flag field, the vti_object_priority_present_flag field, the vti_object_hidden_present_flag field, the vti_object_collision_shape_present_flag field, and the vti_object_dependency_present_flag field is 1.

The volumetric_tiling_info_objects (vti_object_label_present_flag, vti_3d_bounding_box_present_flag, vti_object_priority_present_flag, vti_object_hidden_present_flag, vti_object_collision_shape_present_flag, and vti_object_dependency_present_flag) will be described in detail with reference to FIG. 45

FIG. 44 illustrates an exemplary syntax structure of volumetric tiling information labels (volumetric_tiling_info_labels( )) information according to embodiments. In an embodiment, if the value of the vti_object_label_present_flag field is 1 as illustrated in FIG. 43, the volumetric tiling information labels (volumetric_tiling_info_labels( )) may be included in the volumetric tiling information SEI message. In another embodiment, a separate payload type (payloadType) may be allocated to the volumetric tiling information labels (volumetric_tiling_info_labels( )) information so that the volumetric_tiling_info_labels( ) information may be included in a sample stream NAL unit in the form of an independent SEI message.

According to embodiments, the volumetric tiling information labels (volumetric_tiling_info_labels( )) information may include a vti_object_label_language_present_flag field and a vti_num_object_label_updates field.

The vti_object_label_language_present_flag field equal to 1 indicates that object label language information is present in the current volumetric tiling information SEI message. The vti_object_label_language_present_flag field equal to 0 indicates that the object label language information is not present.

If the value of the vti_object_label_language_present_flag field is 1, the volumetric_tiling_info_labels( ) information may include a vti_bit_equal_to_zero field and a vti_object_label_language field.

The value of the vti_bit_equal_to_zero field is equal to 0.

The vti_object_label_language field contains a language tag followed by a null termination byte equal to 0x00. The length of the vti_object_label_language field may be less than or equal to 255 bytes, not including the null termination byte.

The vti_num_object_label_updates field indicates the number of object labels that are to be updated by current SEI.

As many vti_label_idx[i] fields, vti_label_cancel_flag fields, vti_bit_equal_to_zero fields, and/or vti_label[i] fields as the value of the vti_num_object_label_updates field may be included in the volumetric_tiling_info_labels( ) information.

The vti_label_idx[i] field indicates a label index of the i-th label to be updated.

The vti_label_cancel_flag field equal to 1 indicates that a label with the same index as the vti_label_idx[i] field is canceled and set to be equal to an empty string. The vti_label_cancel_flag equal to 0 indicates that the label with the same index as the vti_label_idx[i] field is updated with information that follows this element.

The value of the vti_bit_equal_to_zero field is equal to 0.

The vti_label[i] field indicates a label of the i-th label. The length of the vti_label[i] field may be less than or equal to 255 bytes, not including the null termination byte.

FIG. 45 illustrates an exemplary syntax structure of volumetric tiling information objects (volumetric_tiling_info_objects( )) information according to embodiments. In an embodiment, the volumetric tiling information objects (volumetric_tiling_info_objectso) information includes additional information according to the values of the vti_object_label_present_flag field, the vti_3d_bounding_box_present_flag field, the vti_object_priority_present_flag field, the vti_object_hidden_present_flag field, the vti_object_collision_shape_present_flag field, and the vti_object_dependency_present_flag of FIG. 43.

According to embodiments, the volumetric_tiling_info_objectso) information includes a vti_num_object_updates field.

The vti_num_object_updates field indicates the number of objects that are to be updated by current SEI.

According to embodiments, the volumetric_tiling_info_objectso information includes as many vti_object_idx[i] fields, vti_num_object_tile_groups[i] fields, and vti_object_cancel_flag[i] fields as the value of the vti_num_object_updates field.

The vti_object_idx[i] field indicates an object index of the i-th object to be updated.

The vti_num_object_tile_groups[i] field indicates the number of atlas tile groups (or tiles) that are associated with an object identified by the vti_object_idx[i] field (i.e., an object with the index i).

According to embodiments, the volumetric_tiling_info_objectso information includes as many vti_num_object_tile_group_id[k] fields as the value of the vti_num_object_tile_groups[i] field.

The vti_num_object_tile_group_id[k] field indicates an identifier of the k-th atlas tile group (or tile) of an object with the index i.

In an embodiment, the value of the vti_num_object_tile_group_id field is equal to an identifier of an associated atlas tile group signaled in the atlas frame tile information (atlas_frame_tile_information( )) of the AFPS (i.e., the value of the afti_tile_group_id field of FIG. 39).

The vti_object_cancel_flag[i] field equal to 1 indicates that an object with the index i is canceled and a parameter ObjectTracked[i] is set to 0. 2D and 3D bounding box parameters of an object may be set to 0. The vti_object_cancel_flag[i] field equal to 0 indicates that an object with an index equal to vti_object_idx[i] is updated with information that follows this field and the parameter ObjectTracked[i] is set to 1.

If the value of the vti_object_cancel_flag[i] field is False (i.e., 0), object related information is added by the number of objects that are updated according to the values of the vti_object_label_present_flag field, the vti_3d_bounding_box_present_flag field, the vti_object_priority_present_flag field, the vti_object_hidden_present_flag field, the vti_object_collision_shape_present_flag field, and the vti_object_dependency_present_flag field.

That is, the vti_bounding_box_update_flag[vti_object_idx[i]] field equal to 1 indicates that 2D bounding box information is present for the object with the index i. The vti_bounding_box_update_flag[vti_object_idx[i]] field equal to 0 indicates that the 2D bounding box information is not present.

If the value of the vti_bounding_box_update_flag[vti_object_idx[i]] field is 1, a vti_bounding_box_top[vti_object_idx[i]] field, a vti_bounding_box_left[vti_object_idx[i]] field, a vti_bounding_box_width[vti_object_idx[i]] field, and a vti_bounding_box_height[vti_object_idx[i]] field may be included in the volumetric_tiling_info_objectso information.

The vti_bounding_box_top[vti_object_idx[i]] field indicates a vertical coordinate value of the top-left position of a bounding box of the object with the index i in a current atlas frame.

The vti_bounding_box_left[vti_object_idx[i]] field indicates a horizontal coordinate value of the top-left position of the bounding box of the object with the index i in the current atlas frame.

The vti_bounding_box_width[vti_object_idx[i]] field indicates the width of the bounding box of the object with the index i.

The vti_bounding_box_height[vti_object_idx[i]] field indicates the height of the bounding box of the object with the index i.

According to embodiments, if the value of vti3dBoundingBoxPresentFlag (i.e., the vti_3d_bounding_box_present_flag field of FIG. 43) is 1, a vti_3d_bounding_box_update_flag[vti_object_idx[i]] field may be included in the volumetric_tiling_info_objects( )) information and, if the value of the vti_3d_bounding_box_update_flag[vti_object_idx[i]] field is 1, a vti_3d_bounding_box_x[vti_object_idx[i]] field, a vti_3d_bounding_box_y[vti_object_idx[i]] field, a vti_3d_bounding_box_z[vti_object_idx[i]] field, a vti_3d_bounding_box_delta_x[vti_object_idx[i]] field, a vti_3d_bounding_box_delta_y[vti_object_idx[i]] field, and a vti_3d_bounding_box_delta_z[vti_object_idx[i]] field may be included in the volumetric_tiling_info_objectso) information.

The vti_3d_bounding_box_update_flag[vti_object_idx[i]] field equal to 1 indicates that 3D bounding box information is present for the object with the index i. The vti_3d_bounding_box_update_flag[vti_object_idx[i]] field equal to 0 indicates that the 3D bounding box information is not present.

The vti_3d_bounding_box_x[vti_object_idx[i]] field indicates an X coordinate value of an origin position of a 3D bounding box of the object with the index i.

The vti_3d_bounding_box_y[vti_object_idx[i]] field indicates a Y coordinate value of the origin position of the 3D bounding box of the object with the index i.

The vti_3d_bounding_box_z[vti_object_idx[i]] field indicates a Z coordinate value of the origin position of the 3D bounding box of the object with the index i.

The vti_3d_bounding_box_delta_x[vti_object_idx[i]] field indicates the size of a bounding box on the X axis of the object with the index i.

The vti_3d_bounding_box_delta_y[vti_object_idx[i]] field indicates the size of the bounding box on the Y axis of the object with the index i.

The vti_3d_bounding_box_delta_z[vti_object_idx[i]] field indicates the size of the bounding box on the Z axis of the object with the index i.

According to embodiments, if the value of vtiObjectPriorityPresentFlag (i.e., the vti_object_priority_present_flag field of FIG. 43) is 1, a vti_object_priority_update_flag[vti_object_idx[i]] field may be included in the volumetric_tiling_info_objectso information and, if the value of the vti_object_priority_update_flag[vti_object_idx[i]] field is 1, a vti_object_priority_value[vti_object_idx[i]] field may be included in the volumetric_tiling_info_objectso information.

The vti_object_priority_update_flag[vti_object_idx[i]] field equal to 1 indicates that object priority update information is present for the object with the index i. The vti_object_priority_update_flag[vti_object_idx[i]] field equal to 0 indicates that the object priority update information is not present.

The vti_object_priority_value[vti_object_idx[i]] field indicates the priority of the object with the index i. The lower a priority value, the higher the priority.

According to embodiments, if the value of vtiObjectHiddenPresentFlag (i.e., the vti_object_hidden_present_flag field of FIG. 43) is 1, a vti_object_hidden_flag[vti_object_idx[i]] field may be included in the volumetric_tiling_info_objectso information.

The vti_object_hidden_flag[vti_object_idx[i]] field equal to 1 indicates that the object with the index i is hidden. The vti_object_hidden_flag[vti_object_idx[i]] field equal to 0 indicates that the object with the index i is present.

According to embodiments, if vtiObjectLabelPresentFlag (i.e., the vti_object_label_present_flag field of FIG. 43) is 1, a vti_object_label_update_flag[vti_object_idx[i]] field may be included in the volumetric_tiling_info_objectso information and, if the value of the vti_object_label_update_flag[vti_object_idx[i]] field is 1, a vti_object_label_idx[vti_object_idx[i]] field may be included in the volumetric_tiling_info_objectso information.

The vti_object_label_update_flag[vti_object_idx[i]] field equal to 1 indicates that object label update information is present for the object with the index i. The vti_object_label_update_flag[vti_object_idx[i]] field equal to 0 indicates that the object label update information is not present.

The vti_object_label_idx[vti_object_idx[i]] field indicates a label index of the object with the index i.

According to embodiments, if the value of vtiObjectCollisionShapePresentFlag (i.e., the vti_object_collision_shape_present_flag field of FIG. 43) is 1, a vti_object_collision_shape_update_flag[vti_object_idx[i]] field may be included in the volumetric_tiling_info_objectso information and, if the value of the vti_object_collision_shape_update_flag[vti_object_idx[i]] field is 1, a vti_object_collision_shape_id[vti_object_idx[i]] field may be included in the volumetric_tiling_info_objectso information.

The vti_object_collision_shape_update_flag[vti_object_idx[i]] field equal to 1 indicates that object collision shape update information is present for the object with the index i. The vti_object_collision_shape_update_flag[i] equal to 0 indicates that the object collision shape update information is not present.

The vti_object_collision_shape_id[vti_object_idx[i]] field indicates a collision shape ID of the object with the index i.

According to embodiments, if vtiObjectDependencyPresentFlag (i.e., the vti_object_dependency_present_flag field of FIG. 43) is 1, a vti_object_dependency_update_flag[vti_object_idx[i]] field may be included in the volumetric_tiling_info_objectso information and, if the value of the vti_object_dependency_update_flag[vti_object_idx[i]] field is 1, a vti_object_num_dependencies[vti_object_idx[i]] field may be included in the volumetric_tiling_info_objectso information.

The vti_object_dependency_update_flag[vti_object_idx[i]] field equal to 1 indicates that object dependency update information is present for the object with the index i. The vti_object_dependency_update_flag[vti_object_idx[i]] field equal to 0 indicates that the object dependency update information is not present.

The vti_object_num_dependencies[vti_object_idx[i]] field indicates the number of dependencies of the object with the index i.

As many vti_object_dependency_idx[vti_object_idx[i]][j] fields as the value of the vti_object_num_dependencies[vti_object_idx[i]] field may be included in the volumetric_tiling_info_objectso information.

The vti_object_dependency_idx[vti_object_idx[i]][j] field indicates an index of the j-th object that has a dependency for the object with the index i.

Meanwhile, a V-PCC bitstream having the structure as illustrated in FIG. 25 may be transmitted to a reception side or may be encapsulated in an ISOBMFF file format by the file/segment encapsulation module or unit of FIG. 1, FIG. 18, FIG. 20, or FIG. 21 and then transmitted to the reception side.

In the latter, the V-PCC stream may be transmitted through multiple tracks or a single track of a file. In this case, the file may be decapsulated to the V-PCC bitstream by the file/segment decapsulation module of the reception device of FIG. 20 or 22.

For example, the V-PCC bitstream carrying a V-PCC parameter set, a geometry bitstream, an occupancy map bitstream, an attribute bitstream, and/or an atlas data bitstream may be encapsulated in the ISOBMFF-based file format by the file/segment encapsulation module of FIG. 20 or FIG. 21. In an embodiment, the V-PCC bitstream is stored in a single track or multiple tracks in an ISOBMFF-based file.

According to embodiments, the ISOBMFF-based file may be referred to as a container, a container file, a media file, a V-PCC file and so on. More specifically, a file may be composed of a box and/or information, which may be referred to as ftyp, meta, moov, or mdat.

The ftyp box (file type box) may provide information related to a file type or file compatibility for the file. The receiving side may identify the file with reference to the ftyp box.

The meta box may include a vpcg{0,1,2,3} box (V-PCC Group Box).

The mdat box, which is also referred to as a media data box, may include actual media data. According to embodiments, a video-coded geometry bitstream, a video-coded attribute bitstream, a video-coded occupancy map bitstream, and/or an atlas data bitstream are included in a sample of the mdat box in the file. According to embodiments, the sample may be referred to as a V-PCC sample.

The moov box, which is also referred to as a movie box, may contain metadata about the media data (e.g., a geometry bitstream, an attribute bitstream, an occupancy map bitstream, etc.) of the file. For example, it may contain information necessary for decoding and playback of the media data, and information about samples of the file. The moov box may serve as a container for all metadata. The moov box may be a box of the highest layer among the metadata related boxes. According to an embodiment, only one moov box may be present in a file.

A box according to embodiments may include a track (trak) box providing information related to a track of the file. The trak box may include a media (mdia) box providing media information about the track and a track reference container (tref) box for referencing the track and a sample of the file corresponding to the track.

The mdia box may include a media information container (minf) box providing information on the media data and a handler box (HandlerBox) indicating a type of a stream.

The minf box may include a sample table (stbl) box providing metadata related to samples of the mdat box.

The stbl box may include a sample description (stsd) box providing information on an employed coding type and initialization information necessary for the coding type.

The stsd box may include a sample entry for a track storing a V-PCC bitstream according to embodiments.

In the present disclosure, a track in a file that carries some or all of a V-PCC bitstream may be referred to as a V-PCC track or a volumetric track.

In order to store the V-PCC bitstream according to the embodiments in a single track or multiple tracks in a file, the present disclosure defines a volumetric visual track, a volumetric visual media header, a volumetric sample entry, volumetric samples, and a sample and simple entry of a V-PCC track.

The term V-PCC used herein is the same as visual volumetric video-based coding (V3C). The two terms may be used to complement each other.

According to embodiments, video-based point cloud compression (V-PCC) represents a volumetric encoding of point cloud visual information.

That is, the minf box in the trak box of the moov box may further include a volumetric visual media header box. The volumetric visual media header box contains information on a volumetric visual track containing a volumetric visual scene.

Each volumetric visual scene may be represented by a unique volumetric visual track. An ISOBMFF file may contain multiple scenes and therefore multiple volumetric visual tracks may be present in the ISOBMFF file.

The volumetric visual track according to embodiments may be identified by a volumetric visual media handler type 'volv' included in a handler box of a media box (MediaBox) and/or by a volumetric visual media header (vvhd) in the minf box of the MediaBox. The minf box is referred to as a media information container or a media information box. The minf box is included in the mdia box, the mdia box is included in the trak box, and the trak box is included in the moov box of the file. A single volumetric visual track or multiple volumetric visual tracks may be present in the file.

According to embodiments, volumetric visual tracks may use a volumetric visual media header box (VolumetricVisualMediaHeaderBox) in a media information box (MediaInformationBox). MediaInformationBox is referred to as the minf box and VolumetricVisualMediaHeaderBox is referred to as a vvhd box. According to embodiments, the vvhd box may be defined as follows.

Box Type: 'vvhd'
Container: MediaInformationBox
Mandatory: Yes
Quantity: Exactly one A syntax of the volumetric visual media header box (i.e., a box of the vvhd type) is as follows.

```
aligned(8) class VolumetricVisualMediaHeaderBox extends
FullBox('vvhd', version = 0, 1)
{
}
```

The version may be an integer indicating the version of this box.

Volumetric visual tracks according to embodiments may use a volumetric visual sample entry (VolumetricVisualSampleEntry) for transmission of signaling information as follows.

```
class VolumetricVisualSampleEntry(codingname) extends SampleEntry
(codingname){
    unsigned int(8)[32] compressor_name;
}
```

The compressor_name is a name, for informative purposes. It is formatted in a fixed 32-byte field, with the first byte set to the number of bytes to be displayed, followed by the number of bytes of displayable data encoded using UTF-8, and then padding to complete 32 bytes total (including the size byte). This field may be set to 0.

The format of a volumetric visual sample according to embodiments may be defined by a coding system.

A V-PCC unit header box according to embodiments may be present in both the V-PCC track included in the sample entry and in all video coded V-PCC component tracks included in the scheme information. The V-PCC unit header box may contain a V-PCC unit header for data carried by the respective tracks as follows.

```
aligned(8) class VPCCUnitHeaderBox extends FullBox('vunt', version =
0, 0) {
    vpcc_unit_header( )  unit_header;
}
```

That is, the VPCCUnitHeaderBox may include vpcc_unit_header( ). FIG. 30 shows examples of a syntax structure of the (vpcc_unit_header( ).

According to embodiments, a sample entry (i.e., a higher class of VolumetricVisualSampleEntry) inherited by the volumetric visual sample entry (VolumetricVisualSampleEntry) includes a VPCC decoder configuration box (VPCCConfigurationBox).

According to embodiments, the VPCCConfigurationBox may include a VPCC decoder configuration record (VPCC-DecoderConfigurationRecord) as shown below.

```
aligned(8) class VPCCDecoderConfigurationRecord {
    unsigned int(8) configurationVersion = 1;
    unsigned int(3) sampleStreamSizeMinusOne;
    unsigned int(5) numOfVPCCParameterSets;
    for (i=0; i< numOfVPCCParameterSets; i++) {
        sample_stream_vpcc_unit VPCCParameterSet;
    }
    unsigned int(8) numOfAtlasSetupUnits;
    for (i=0; i< numOfAtlasSetupUnits; i++) {
        sample_stream_vpcc_unit atlas_setupUnit;
    }
}
```

The configurationVersion included in the VPCCDecoderConfigurationRecord indicates a version field. Incompatible changes to the record are indicated by a change of the version number.

sampleStreamSizeMinusOne plus 1 may indicate the precision, in bytes, of the ssvu_vpcc_unit_size element in all sample stream V-PCC units in either this configuration record or a V-PCC sample in the stream to which this configuration record applies.

The numOfVPCCParameterSets specifies the number of V-PCC parameter sets (VPS) signaled in the VPCCDecoderConfigurationRecord.

The VPCCParameterSet is a sample_stream_vpcc_unit( ) instance for a V-PCC unit of type VPCC_VPS. The V-PCC unit may include vpcc_parameter_set( )(see FIG. 33). That is, the VPCCParameterSet array may include vpcc_parameter_set( ). FIG. 28 shows an example of a syntax structure of a sample stream V-PCC unit (sample_stream_vpcc_unit( )).

The numOfAtlasSetupUnits indicates the number of setup arrays for the atlas stream signaled in the VPCCDecoderConfigurationRecord.

The Atlas_setupUnit is a sample_stream_vpcc_unit( ) instance containing an atlas sequence parameter set, an atlas frame parameter set, an atlas tile (or tile group) or an SEI atlas NAL unit(see FIG. 34 to FIG. 45). FIG. 28 shows an example of a syntax structure of the sample stream V-PCC unit (sample_stream_vpcc_unit( )).

Specifically, the atlas_setupUnit arrays may include atlas parameter sets that are constant for the stream referred to by the sample entry in which the VPCCDecoderConfigurationRecord is present as well as atlas stream SEI messages(see FIG. 40 to FIG. 45). According to embodiments, the atlas_setupUnit may be referred to simply as a setup unit.

According to other embodiments, the VPCCDecoderConfigurationRecord may be represented as follows.

```
aligned(8) class VPCCDecoderConfigurationRecord {
    unsigned int(8) configurationVersion = 1;
    unsigned int(3) sampleStreamSizeMinusOne;
    bit(2) reserved = 1;
    unsigned int(3) lengthSizeMinusOne;
    unsigned int(5) numOfVPCCParameterSets;
    for (i=0; i< numOfVPCCParameterSets; i++) {
        sample_stream_vpcc_unit VPCCParameterSet;
    }
    unsigned int(8) numOfSetupUnitArrays;
    for (j=0; j<numOfSetupUnitArrays; j++) {
        bit(1) array_completeness;
        bit(1) reserved = 0;
        unsigned int(6) NAL_unit_type;
        unsigned int(8) numNALUnits;
        for (i=0; i<numNALUnits; i++) {
            sample_stream_nal_unit setupUnit;
        }
    }
}
```

The configurationVersion is a version field. Incompatible changes to the record are indicated by a change of the version number.

The value of the lengthSizeMinusOne plus 1 may indicate the precision, in bytes, of the ssnu_nal_unit_size element in all sample stream NAL units in either the VPCCDecoderConfigurationRecord or a V-PCC sample in the stream to which the VPCCDecoderConfigurationRecord applies. FIG. 36 shows an example of a syntax structure of a sample stream NAL unit (sample_stream_nal_unit( )) including the ssnu_nal_unit_size field.

The numOfVPCCParameterSets specifies the number of V-PCC parameter sets (VPS) signaled in the VPCCDecoderConfigurationRecord.

The VPCCParameterSet is a sample_stream_vpcc_unit( ) instance for a V-PCC unit of type VPCC_VPS. The V-PCC unit may include vpcc_parameter_set( ). That is, the VPCCParameterSet array may include vpcc_parameter_set( ). FIG. 28 shows an example of a syntax structure of the sample_stream_vpcc_unit( ).

The numOfSetupUnitArrays indicates the number of arrays of atlas NAL units of the indicated type(s).

An iteration statement repeated as many times as the value of the numOfSetupUnitArrays may contain array_completeness.

array_completeness equal to 1 indicates that all atlas NAL units of the given type are in the following array and none are in the stream. array_completeness equal to 0 indicates that additional atlas NAL units of the indicated type may be in the stream. The default and permitted values are constrained by the sample entry name.

NAL_unit_type indicates the type of the atlas NAL units in the following array. NAL_unit_type is restricted to take one of the values indicating a NAL_ASPS, NAL_PREFIX_SEI, or NAL_SUFFIX_SEI atlas NAL unit.

The numNALUnits indicates the number of atlas NAL units of the indicated type included in the VPCCDecoderConfigurationRecord for the stream to which the VPCCDecoderConfigurationRecord applies. The SEI array shall only contain SEI messages of a 'declarative' nature, that is, those that provide information about the stream as a whole. An example of such an SEI may be a user-data SEI The setupUnit is a sample_stream_nal_unit( ) instance containing an atlas sequence parameter set, or atlas frame parameter set, or declarative SEI atlas NAL unit.

Sample Group

According to embodiments, the file/segment encapsulation unit of FIG. 20 or FIG. 21 may generate a sample group by grouping one or more samples. According to embodiments, the file/segment encapsulation unit or the metadata processing unit of FIG. 20 or FIG. 21 may signal signaling information associated with the sample group to a sample, a sample group, or a sample entry. That is, sample group information associated with the sample group may be added to the sample, the sample group, or the sample entry. The sample group information will be described below together with a description of a corresponding sample group. According to embodiments, the sample group information may include V-PCC atlas parameter set sample group information, V-PCC SEI sample group information, V-PCC bounding box sample group information, and V-PCC 3D region mapping sample group information.

V-PCC Atlas Parameter Set Sample Group

According to embodiments, one or more samples to which the same V-PCC atlas parameter set is applicable may be grouped and this sample group may be referred to as a V-PCC atlas parameter sample group.

According to embodiments, the syntax of V-PCC atlas parameter sample group information (VPCCAtlasParamSampleGroupDescriptionEntry) associated with the V-PCC atlas parameter sample group may be defined as follows.

```
aligned(8) class VPCCAtlasParamSampleGroupDescriptionEntry( )
    extends
    SampleGroupDescriptionEntry('vaps') {
    unsigned int(8) numOfAtlasParameterSets;
    for (i=0; i<numOfAtlasParameterSets; i++) {
        sample_stream_vpcc_unit atlasParameterSet;
    }
}
```

According to embodiments, grouping_type of 'vaps' for sample grouping represents the assignment of samples in a V-PCC track to atlas parameter sets carried in the V-PCC atlas parameter sample group.

According to embodiments, the V-PCC track may contain at most one SampleToGroupBox with grouping_type equal to 'vaps'.

According to embodiments, if SampleToGroupBox with grouping_type equal to 'vaps' is present, accompanying SampleGroupDescriptionBox with the same grouping type is present and contains an ID of this group of samples.

VPCCAtlasParamSampleGroupDescriptionEntry with the grouping type of 'vaps' may include numOfAtlasParameterSets.

numOfAtlasParameterSets indicates the number of atlas parameter sets signaled in a sample group description.

atlasParameterSet corresponding to the value of numOfAtlasParameterSets may be included in VPCCAtlasParamSampleGroupDescriptionEntry.

atlasParameterSet is a sample stream VPCC unit (sample_stream_vpcc_unit( )) instance including an ASPS or an AFPS associated with this group of samples.

According to another embodiment, the syntax of VPCCAtlasParamSampleGroupDescriptionEntry associated with the V-PCC atlas parameter sample group may be defined as follows.

```
aligned(8) class VPCCAtlasParamSampleGroupDescriptionEntry( )
    extends
    SampleGroupDescriptionEntry('vaps') {
    unsigned int(3) lengthSizeMinusOne;
    unsigned int(5) numOfAtlasParameterSets;
    for (i=0; i<numOfAtlasParameterSets; i++) {
        sample_stream_nal_unit atlasParameterSetNALUnit;
    }
}
``` lengthSizeMinusOne plus 1 indicates the precision, in bytes, of ssnu_nal_unit_size element included in all sample stream NAL units signaled in a corresponding sample group description.

numOfAtlasParameterSets indicates the number of atlas parameter sets signaled in the sample group description.

atlasParameterSetNALUnit corresponding to the value of numOfAtlasParameterSets may be included in VPCCAtlasParamSampleGroupDescriptionEntry.

atlasParameterSetNALUnit is sample_stream_nal_unit( ) instance including an ASPS or an AFPS associated with this group of samples.

V-PCC SEI Sample Group

According to embodiments, one or more samples to which the same V-PCC SEI is applicable may be grouped and this sample group may be referred to as a V-PCC SEI sample group.

According to embodiments, the syntax of V-PCC SEI sample group information (VPCCSEISampleGroupDescriptionEntry) associated with the V-PCC SEI sample group may be defined as follows.

```
aligned(8) class VPCCSEISampleGroupDescriptionEntry( ) extends
    SampleGroupDescriptionEntry('vsei') {
    unsigned int(8) numOfSEIs;
    for (i=0; i<numOfSEISets; i++) {
        sample_stream_vpcc_unit_sei;
    }
}
```

According to embodiments, grouping_type of 'vsei' for sample grouping represents the assignment of samples in a V-PCC track to SEI carried in the V-PCC SEI sample group.

According to embodiments, the V-PCC track may contain at most one SampleToGroupBox with grouping_type equal to 'vsei'.

According to embodiments, if SampleToGroupBox with grouping_type equal to 'vsei' is present, accompanying SampleGroupDescriptionBox with the same grouping type is present and contains an ID of this group of samples.

numOfSEIs indicates the number of V-PCC SEIs signaled in a corresponding sample group description.

'sei' corresponding to the value of numOfSEIs may be included in VPCCSEISampleGroupDescriptionEntry.

'sei' is a sample_stream_vpcc_unit( ) instance including SEI associated with this group of samples.

According to another embodiment, the syntax of VPCCSEISampleGroupDescriptionEntry associated with the V-PCC SEI sample group may be defined as follows.

```
aligned(8) class VPCCSEISampleGroupDescriptionEntry ( ) extends
    SampleGroupDescriptionEntry('vsei') {
    unsigned int(3) lengthSizeMinusOne;
    unsigned int(5) numOfSEIs;
    for (i=0; i<numOfSEIs; i++) {
        sample_stream_nal_unit seiNALUnit;
    }
}
``` lengthSizeMinusOne plus 1 indicates the precision, in bytes, of the ssnu_nal_unit_size element included in all sample stream NAL units signaled in this sample group description.

numOfSEIs indicates the number of V-PCC SEIs signaled in a corresponding sample group description.

atlasParameterSetNALUnit corresponding to the value of numOfSEIs may be included in VPCCSEISampleGroupDescriptionEntry.

seiNALUnit is a sample_stream_nal_unit( ) instance including SEI associated with this group of samples.

V-PCC Bounding Box Sample Group

According to embodiments, one or more samples to which the same V-PCC bounding box is applicable may be grouped and this sample group may be referred to as a V-PCC bounding box sample group.

According to embodiments, the syntax of V-PCC bounding box sample group information (VPCC3DBoundingBoxSampleGroupDescriptionEntry) associated with the V-PCC bounding box sample group may be defined as follows.

```
aligned(8) class VPCC3DBoundingBoxSampleGroupDescriptionEntry( )
extends
SampleGroupDescriptionEntry('vpbb') {
    3DBoundingBoxInfoStruct( );
}
```

According to embodiments, grouping_type of 'vpbb' for sample grouping represents the assignment of samples in a V-PCC track to 3D bounding box information carried in the V-PCC bounding box sample group.

According to embodiments, the V-PCC track may contain at most one SampleToGroupBox with grouping_type equal to 'vpbb'.

According to embodiments, if a SampleToGroupBox with grouping_type equal to 'vpbb' is present, accompanying SampleGroupDescriptionBox with the same grouping type is present and contains an ID of this group of samples.

In the above syntax, detailed information included in 3DBoundingBoxInfoStruct( ) will be described below.

V-PCC 3D Region Mapping Sample Group

According to embodiments, one or more samples to which the same V-PCC 3D region mapping is applicable may be grouped and this sample group may be referred to as a V-PCC 3D region mapping sample group.

According to embodiments, the syntax of V-PCC 3D region mapping sample group information (VPCC3DRegionMappingSampleGroupDescriptionEntry) associated with the V-PCC 3D region mapping sample group may be defined as follows.

```
aligned(8) class VPCC3DRegionMappingSampleGroupDescriptionEntry( )
extends
SampleGroupDescriptionEntry('vpsr') {
    VPCC3DRegionMappingBox 3d_region_mapping;
}
```

According to embodiments, grouping_type of 'vpsr' for sample grouping represents the assignment of samples in a V-PCC track to 3D region mapping information carried in this sample group.

According to embodiments, the V-PCC track may contain at most one SampleToGroupBox with grouping_type equal to 'vpsr'.

According to embodiments, if SampleToGroupBox with grouping_type equal to 'vpsr' is present, accompanying SampleGroupDescriptionBox with the same grouping type is present and contains an ID of this group of samples.

In the above syntax, detailed information included in VPCC3DRegionMappingBox will be described below.

Track Group

According to embodiments, the file/segment encapsulation unit of FIG. 20 or FIG. 21 may generate a track group by grouping one or more tracks. According to embodiments, the file/segment encapsulation unit or the metadata processing unit of FIG. 20 or FIG. 21 may signal signaling information associated with the track group to a sample, a track group, or a sample entry. That is, track group information associated with the track group may be added to the sample, the track group, or the sample entry. The track group information will be described below together with a description of a corresponding track group. According to embodiments, the track group information may include 3D region track group information and 2D region track group information.

3D Region Track Group

According to embodiments, one or more tracks to which the same 3D spatial region is applicable may be grouped and this track group may be referred to as a 3D region track group.

According to embodiments, the syntax of 3D region track group information (SpatialRegionGroupBox) associated with the 3D region track group may be defined as follows.

```
aligned(8) class SpatialRegionGroupBox extends TrackGroupTypeBox('3drg') {
    3DRegionInfoStruct( )
}
```

According to embodiments, TrackGroupTypeBox with track_group_type equal to '3drg' indicates that this track belongs to a group of V-PCC component tracks that correspond to a 3D spatial region.

According to embodiments, tracks belonging to the same 3D spatial region have track_group_id of the same value for track_group_type of '3drg', and track_group_id of tracks in one 3D spatial region differs from track_group_id of tracks in another 3D spatial region.

According to embodiments, tracks having the same value of track_group_id within TrackGroupTypeBox with track_group_type equal to '3drg' belong to the same 3D spatial region. track_group_id within TrackGroupTypeBox with track_group_type equal to '3drg' is therefore used as an identifier of the 3D spatial region.

SpatialRegionGroupBox may include 3DSpatialRegionStruct( ) instead of 3DRegionInfoStruct( ) above.

3DRegionInfoStruct( ) and 3DSpatialRegionStruct( ) include 3D region information applied to tracks of the 3D region track group. Detailed information included in 3DRegionInfoStruct( ) and 3DSpatialRegionStruct( ) will be described below.

2D Region Track Group

According to embodiments, one or more tracks to which the same 2D region is applicable may be grouped and this track group may be referred to as a 2D region track group.

According to embodiments, the syntax of 2D region track group information (RegionGroupBox) associated with the 2D region track group may be defined as follows.

```
aligned(8) class RegionGroupBox extends TrackGroupTypeBox('2drg') {
    2DRegionInfoStruct( )
}
```

According to embodiments, TrackGroupTypeBox with track_group_type equal to '2drg' may indicate that this track belongs to a group of V-PCC component tracks corresponding to a 2D region.

According to embodiments, tracks belonging to the same 2D region have track_group_id of the same value for track_group_type of '2drg', and track_group_id of tracks in one 2D region differs from track_group_id of tracks in another 2D region.

According to embodiments, tracks having track_group_id of the same value within TrackGroupTypeBox with track_group_type equal to '2drg' belong to the same 2D region. The track_group_id within TrackGroupTypeBox with track_group_type equal to '2drg' is therefore used as an identifier of the 2D region.

2DRegionInfoStruct( ) includes 2D region information applied to tracks of the 2D region track group. Detailed information included in 2DRegionInfoStruct( ) will be described below.

As described above, the V-PCC bitstream may be stored in a single track or multiple tracks and then transmitted.

Next, a multiple track container of the V-PCC bitstream related to the multiple tracks will be described.

According to embodiments, in the general layout of a multi-track container (also referred to as a multi-track ISOBMFF V-PCC container), V-PCC units in a V-PCC elementary stream may be mapped to individual tracks within the container file based on their types). There are two types of tracks in the multi-track ISOBMFF V-PCC container according to the embodiments. One of the types is a V-PCC track, and the other is a V-PCC component track.

The V-PCC track according to the embodiments is a track carrying the volumetric visual information in the V-PCC bitstream, which includes the atlas sub-bitstream and the sequence parameter sets (or V-PCC parameter sets).

V-PCC component tracks according to the embodiments are restricted video scheme tracks which carry 2D video encoded data for the occupancy map, geometry, and attribute sub-bitstreams of the V-PCC bitstream. In addition, the following conditions may be satisfied for V-PCC component tracks:

a) in the sample entry, a new box is inserted which documents the role of the video stream contained in this track, in the V-PCC system;

b) a track reference is introduced from the V-PCC track, to the V-PCC component track, to establish the membership of the V-PCC component track in the specific point-cloud represented by the V-PCC track;

c) the track-header flags are set to 0, to indicate that this track does not contribute directly to the overall layup of the movie but contributes to the V-PCC system.

Tracks belonging to the same V-PCC sequence may be time-aligned. Samples that contribute to the same point cloud frame across the different video-encoded V-PCC component tracks and the V-PCC track has the same presentation time. The V-PCC atlas sequence parameter sets and atlas frame parameter sets used for such samples have a decoding time equal or prior to the composition time of the point cloud frame. In addition, all tracks belonging to the same V-PCC sequence have the same implied or explicit edit lists.

Note: Synchronization between the elementary streams in the component tracks are handled by the ISOBMFF track timing structures (stts, ctts, and cslg), or equivalent mechanisms in movie fragments.

Based on this layout, a V-PCC ISOBMFF container may include the following:

A V-PCC track which contains V-PCC parameter sets (in the sample entry) and samples carrying the payloads of the V-PCC parameter set V-PCC unit (unit type VPCC_VPS) and atlas V-PCC units (unit type VPCC_AD). This track also includes track references to other tracks carrying the payloads of video compressed V-PCC units (i.e., unit types VPCC_OVD, VPCC_GVD, and VPCC_AVD).

A restricted video scheme track where the samples contain access units of a video-coded elementary stream for occupancy map data (i.e., payloads of V-PCC units of type VPCC_OVD).

One or more restricted video scheme tracks where the samples contain access units of video-coded elementary streams for geometry data (i.e., payloads of V-PCC units of type VPCC_GVD).

Zero or more restricted video scheme tracks where the samples contain access units of video-coded elementary streams for attribute data (i.e., payloads of V-PCC units of type VPCC_AVD).

Next, V-PCC tracks are be described below.

The syntax structure of the V-PCC Track Sample Entry according to the embodiments is configured as follows.

Sample Entry Type: 'vpc1', 'vpcg'
Container: SampleDescriptionBox
Mandatory: A 'vpc1' or 'vpcg' sample entry is mandatory.
Quantity: One or more sample entries may be present.
The sample entry type is 'vpc1' or 'vpcg'.

Under the 'vpc1' sample entry, all atlas sequence parameter sets, atlas frame parameter sets, or V-PCC SEIs are in the setupUnit array (i.e., sample entry).

Under the 'vpcg' sample entry, the atlas sequence parameter sets, atlas frame parameter sets, V-PCC SEIs may be present in this array (i.e., sample entry), or in the stream (i.e., sample).

An optional BitRateBox may be present in the VPCC volumetric sample entry to signal the bit rate information of the V-PCC track.

As described later, the V-PCC tracks uses a V-PCC sample entry (VPCCSampleEntry) that inherits VolumetricVisualSampleEntry. VPCCSampleEntry includes a V-PCC configuration box (VPCCConfigurationBox), a V-PCC unit header box (VPCCUnitHeaderBox), and/or VPCCBoundingInformationBox( ). VPCCConfigurationBox includes a V-PCC decoder configuration record (VPCCDecoderConfigurationRecord).

Volumetric Sequences:

```
class VPCCConfigurationBox extends Box('vpcC') {
    VPCCDecoderConfigurationRecord( ) VPCCConfig;
}
aligned(8) class VPCCSampleEntry( ) extends VolumetricVisualSampleEntry ('vpc1') {
    VPCCConfigurationBox config;
    VPCCUnitHeaderBox unit_header;
    VPCCBoundingInformationBox ( );
}
```

Figure 46:
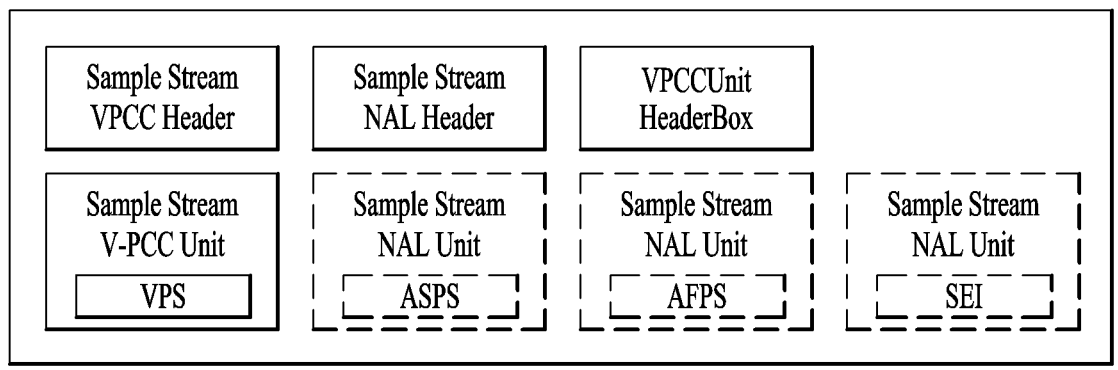
FIG. 46 illustrates an exemplary structure of a V-PCC sample entry according to embodiments.

FIG. 46 illustrates an exemplary structure of a V-PCC sample entry according to embodiments. In FIG. 46, the V-PCC sample entry may include one VPS and optionally include an ASPS, an AFPS, or SEI. That is, the ASPS, the AFPS, or the SEI may be included in a sample entry or a sample according to a sample entry type (i.e., vpc1 or vpcg).

The V-PCC sample entry according to embodiments may further include a sample stream V-PCC header, a sample stream NAL header, and a V-PCC unit header box.

Figure 47:
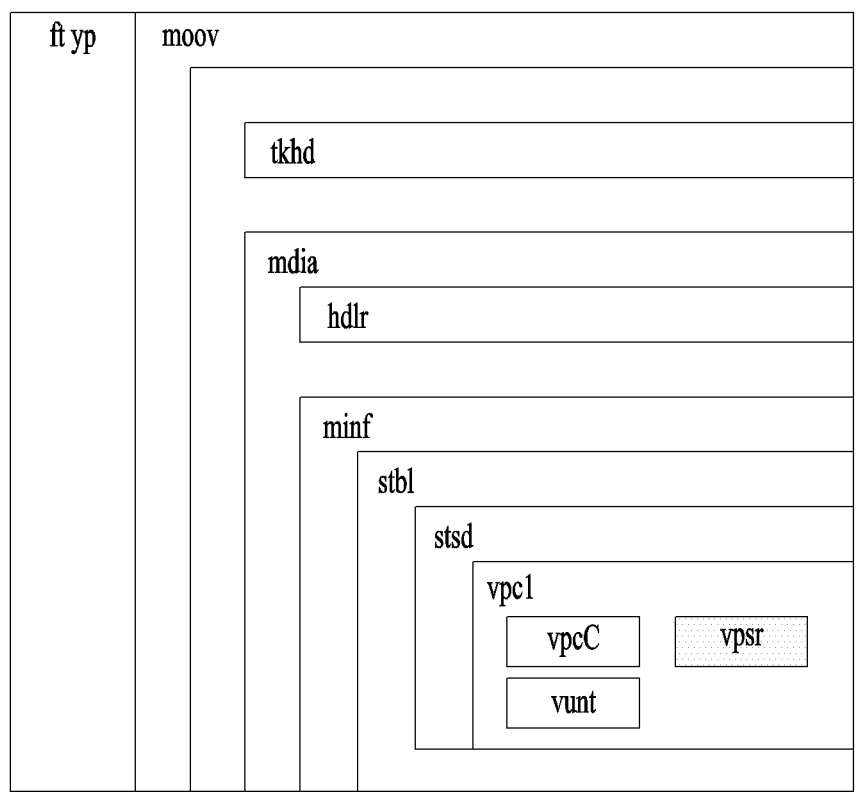
FIG. 47 illustrates an exemplary structure of a moov box and an exemplary s structure of a sample entry according to embodiments.

FIG. 47 illustrates an exemplary structure of a moov box and an exemplary structure of a sample entry according to embodiments. In particularly, the structure of the sample entry when the sample entry type is vpc1 is illustrated.

In the moov box of FIG. 47, an stbl box may include a sample description (stsd) box, and the stsd box may include a sample entry for a track that stores a V-PCC bitstream. In an embodiment, when the sample entry type is vpc1, the sample entry may include a V-PCC configuration box (VPCCConfigurationBox, ('vpcC')), a V-PCC unit header box (V-PCC unit header box ('vunt')), and a V-PCC 3D region mapping box (VPCC3DRegionMappingBox ('vpcr')). According to another embodiment, when the sample entry type is vpc1, the sample entry may include vpcC, vunt, and a V-PCC spatial region box (VPCCSpatialRegionsBox ('vpsr')).

The V-PCC configuration box (VPCCConfigurationBox, vpcC) may include VPCCDecoderConfigurationRecord( ) and the VPCCDecoderConfigurationRecord( ) may include ASPSs, AFPSs, or V-PCC SEIs.

Next, the V-PCC track sample format is described below.

Each sample in the V-PCC track corresponds to a single point cloud frame. Samples corresponding to this frame in various component tracks have the same composition time as the V-PCC track sample. Each V-PCC sample includes one or more atlas NAL units as follows.

```
aligned(8) class VPCCSample {
    unsigned int PointCloudPictureLength = sample_size; // size of sample (e.g., from SampleSizeBox)
    for (i=0; i<PointCloudPictureLength; ) {
        sample_stream_nal_unit nalUnit
        i += (VPCCDecoderConfigurationRecord.lengthSizeMinusOne+1) +
        nalUnit.ssnu_nal_unit_size;
    }
}
aligned(8) class VPCCSample {
    unsigned int PictureLength = sample_size; //size of sample (e.g., from SampleSizeBox)
    for (i=0; i<PictureLength; )   // Signaled to the end of the picture {
        unsigned int((VPCCDecoderConfigurationRecord.LengthSizeMinusOne+1)*8) NALUnitLength;
        bit(NALUnitLength * 8) NALUnit;
        i += (VPCCDecoderConfigurationRecord.LengthSizeMinusOne+1) + NALUnitLength;
    }
}
```

A sync sample (random access point) in a V-PCC track is a V-PCC IRAP coded patch data access unit. Atlas parameter sets may be repeated, if needed, at a sync sample to allow for random access.

Next, video-encoded V-PCC component tracks are described below.

Carriage of coded video tracks that use MPEG-specified codecs may conform to ISOBMFF derived specifications. For example, for carriage of AVC and HEVC coded videos, reference may be made to the ISO/IEC 14496-15. ISOBMFF may also provide an extension mechanism if other codec types are required.

Since it is not meaningful to display the decoded frames from attribute, geometry, or occupancy map tracks without reconstructing the point cloud at the player side, a restricted video scheme type may be defined for these video-coded tracks.

Next, the restricted video scheme is described below.

V-PCC component video tracks may be represented in the file as restricted video, and may be identified by 'pccv' in the scheme_type field of the SchemeTypeBox of the RestrictedSchemeInfoBox of the restricted video sample entries.

It should be noted that there is no restriction on the video codec used for encoding of the attribute, geometry, and occupancy map V-PCC components. Moreover, these components may be encoded using different video codecs.

Scheme information (SchemeInformationBox) according to embodiments may be present in a sample entry of the corresponded track and contain a VPCCUnitHeaderBox.

Next, referencing V-PCC component tracks is described below.

To link a V-PCC track to component video tracks, three TrackReferenceTypeBoxes may be added to a TrackReferenceBox within the TrackBox of a sample entry of the V-PCC track, one for each component. The TrackReferenceTypeBox contains an array of track_IDs designating the video tracks which the V-PCC track references. The reference_type of a TrackReferenceTypeBox identifies the type of the component, such as an occupancy map, geometry, or attribute. The track reference types are as follows.

In 'pcco', the referenced track(s) contain the video-coded occupancy map V-PCC component.

In 'pccg', the referenced track(s) contain the video-coded geometry V-PCC component.

In 'pcca', the referenced track(s) contain the video-coded attribute V-PCC component.

The type of the V-PCC component carried by the referenced restricted video track and signaled in the Restricted-SchemeInfoBox of the track shall match the reference type of the track reference from the V-PCC track.

Figure 48:
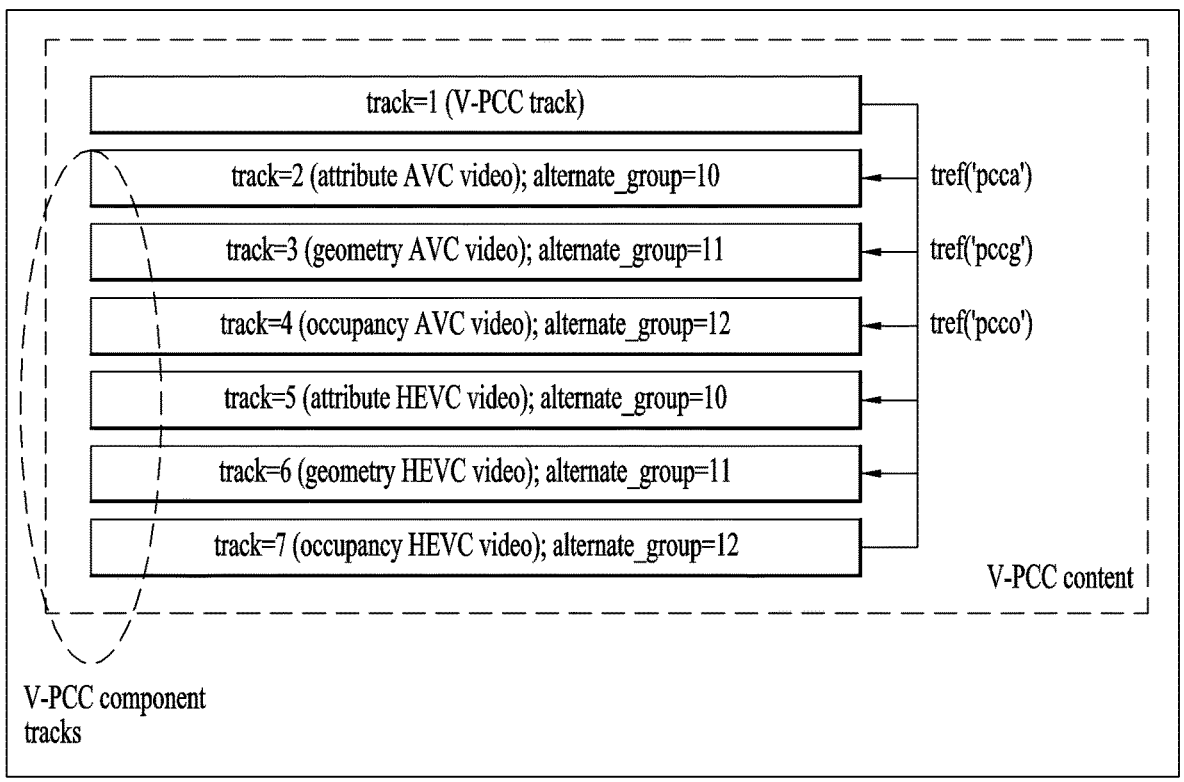
FIG. 48 illustrates exemplary track alternatives and track grouping according to embodiments.

FIG. 48 illustrates exemplary track alternatives and track grouping according to embodiments. In FIG. 48, track alternatives or track grouping of an ISOBMFF file structure is applied.

According to embodiments, V-PCC component tracks having alternate_group of the same value are different encoded versions of the same V-PCC component. A volumetric visual scene may be alternatively coded. In this case, all alternative V-PCC tracks have alternate_group of the same value within TrackHeaderBox.

Similarly, when 2D video tracks representing one of V-PCC components are encoded to alternatives, there may be a track reference for such alternatives and one of alternatives forming an alternate group.

Referring to FIG. 48, V-PCC component tracks constituting V-PCC content based on a file structure are illustrated. Atlas group IDs may be equal or may be 10, 11, or 12. Track 2 and track 5 corresponding to attribute video may be alternatively used. Track 3 and track 6 may be alternatively used as geometry video and track 4 and track 7 may be alternatively used as occupancy video.

As described above, the V-PCC bitstream may be stored in a single track or multiple tracks and then transmitted.

Next, a single track container of the V-PCC bitstream related to the single track will be described.

A single-track encapsulation of V-PCC data requires the V-PCC encoded elementary bitstream to be represented by a single-track declaration.

Single-track encapsulation of PCC data may be utilized in the case of simple ISOBMFF encapsulation of a V-PCC encoded bitstream. Such a bitstream may be directly stored as a single track without further processing. V-PCC unit header data structures may be kept in the bitstream. A single-track container for V-PCC data may be provided to media workflows for further processing (e.g., multi-track file generation, transcoding, DASH segmentation, etc.).

An ISOBMFF file which contains single-track encapsulated V-PCC data may contain 'pcst' in the compatible_brands[ ] list of the FileTypeBox.

V-PCC elementary stream track:
Sample Entry Type: 'vpe1', 'vpeg'
Container: SampleDescriptionBox
Mandatory: A 'vpe1' or 'vpeg' sample entry is mandatory
Quantity: One or more sample entries may be present V-PCC elementary stream tracks include a sample entry type of 'vpe1' or 'vpeg'. The V-PCC elementary stream tracks use a V-PCC elementary stream sample entry (VPCCElementaryStreamSampleEntry) that inherits VolumetricVisualSampleEntry. The V-PCC elementary stream sample entry having the sample entry type of 'vpe1' includes a V-PCC configuration box (VPCCConfigurationBox) and a VPCC bounding box information box (VPCCBoundingInformationBox). VPCCConfigurationBox includes a V-PCC decoder configuration record (VPCCDecoderConfigurationRecord). Under the 'vpe1' sample entry, all ASPSs, AFPSs, and SEI may be present within a setupUnit array (i.e., sample array). Under the 'vpeg' sample array, the ASPSs, the AFPSs, and SEI are present in this array (i.e., sample array) or a stream (i.e., sample).

Volumetric Sequences:

```
class VPCCConfigurationBox extends Box('vpcC') {
    VPCCDecoderConfigurationRecord( ) VPCCConfig;
}
aligned(8) class VPCCElementaryStreamSampleEntry( ) extends
    VolumetricVisualSampleEntry ('vpe1') {
        VPCCConfigurationBox config;
        VPCCBoundingInformationBox 3d_bb;
}
```

Next, the V-PCC elementary stream sample format is described below.

A V-PCC elementary stream sample may be comprised of one or more V-PCC units which belong to the same presentation time. Each sample has a unique presentation time, a size, and a duration. A sample may be a sync sample or be decoding-wise dependent on other V-PCC elementary stream samples.

Next, a V-PCC elementary stream sync sample is described below.

A V-PCC elementary stream sync sample may satisfy all the following conditions:
It is independently decodable;
None of the samples that come after the sync sample in decoding order have any decoding dependency on any sample prior to the sync sample; and
All samples that come after the sync sample in decoding order are successfully decodable.

Next, a V-PCC elementary stream subsample will be described. That is, when one sample is composed of multiple V-PCC units, each of the multiple V-PCC units may be stored as a subsample. According to embodiments, a sample may be referred to as a V-PCC elementary stream subsample.

That is, the V-PCC elementary stream subsample is one V-PCC unit included in the V-PCC elementary stream sample.

A sample entry of a V-PCC elementary stream track includes SubSampleInformationBox within TrackFragmentBox of each of MovieFragmentBoxes or within SampleTableBox, which lists V-PCC elementary stream subsamples.

A 32-bit unit header of a V-PCC unit which represents the subsample may be copied to a 32-bit codec_specific_parameters field of a subsample entry within SubSampleInformationBox. A V-PCC unit type of each subsample may be identified by parsing the codec_specific_parameters field of the subsample entry within SubSampleInformationBox.

According to embodiments, signaling information is needed in order to extract only partial point cloud data among overall point cloud data from a file and decode the partial point cloud data, i.e., in order to support partial access of the point cloud data.

According to embodiments, the signaling information for supporting partial access of the point cloud data may include 3D bounding box information, 3D spatial region information, 2D region information, and 3D region mapping information. The signaling information may be stored in a sample within a track, a sample entry within the track, a sample group within the track, a track group, or separate metadata track. In particular, a portion of the signaling information may be stored in a sample entry in the form of a box or a full box.

Next, the signaling information needed to support partial access of the point cloud data will be described.

3D Bounding Box Information Structure

According to embodiments, 3D bounding box information (3DBoundingBoxInfoStruct) provides 3D bounding box information of point cloud data, including x, y, and z offsets of a 3D bounding box of the point cloud data and the width, height, and depth of the 3D bounding box of the point cloud data.

According to embodiments, the syntax of 3DBoundingBoxInfoStruct may be defined as follows.

```
aligned(8) class 3DBoundingBoxInfoStruct( ) {
    unsigned int(16) bb_x;
    unsigned int(16) bb_y;
    unsigned int(16) bb_z;
    unsigned int(16) bb_delta_x;
    unsigned int(16) bb_delta_y;
    unsigned int(16) bb_delta_z;
}
```

The bb_x field, the bb_y field, and the bb_z field specify x, y, and z coordinate values of an origin position of the 3D bounding box of the point cloud data in Cartesian coordinates, respectively.

The bb_delta_x field, the bb_delta_y field, and the bb_delta_z field indicate the extension of the 3D bounding box of the point cloud data in Cartesian coordinates along the x, y, and z axes relative to the origin position, respectively.

3D Region Information Structure

According to embodiments, 3D region information (3DRegionInfoStruct or 3DSpatialRegionStruct) may include 3D region information about a partial region of the point cloud data.

According to an embodiment, the syntax of 3DRegionInfoStruct( ) may be defined as follows.

```
aligned(8) class 3DRegionInfoStruct(dimensions_included_flag) {
    unsigned int(16) 3d_region_id;
    unsigned int(16) 3d_anchor_x;
    unsigned int(16) 3d_anchor_y;
    unsigned int(16) 3d_anchor_z;
    if(3d_dimension_included_flag){
        unsigned int(8)  3d_region_type;
        if(3d_region_type == '1') {//cuboid
            unsigned int(16) 3d_region_delta_x;
            unsigned int(16) 3d_region_delta_y;
            unsigned int(16) 3d_region_delta_z;
        }
    }
}
```

The 3d_region_id field may indicate an identifier of a 3D region.

The 3d_region_anchor_x field, the 3d_region_anchor_y field, and the 3d_region_anchor_z field may indicate x, y, and z coordinate values of an anchor point of the 3D region, respectively. For example, when the 3D region is a cuboid type, the anchor point may be an origin of the cuboid. The 3d_region_anchor_x field, the 3d_region_anchor_y field, and the 3d_region_anchor_z field may indicate x, y, and z coordinate values of an origin position of the cuboid of the 3D region.

The 3d_region_type field may indicate the type of the 3D region. 0x01 to cuboid may be allocated as the value of the 3d_region_type field.

The 3d_dimension_included_flag field indicates whether detailed information of the 3D region, e.g., the 3d_region_type field, the 3d_region_delta_x field, the 3d_region_delta_y field, and the 3d_region_delta_z field are included in corresponding 3D region information.

The 3d_region_delta_x field, the 3d_region_delta_y field, and the 3d_region_delta_z field may indicate difference values on the x, y, and z axes, respectively, when the type of the 3D region is a cuboid.

According to another embodiment, the syntax of 3DSpatialRegionStruct( ) may be defined as follows.

```
aligned(8) class 3DSpatialRegionStruct(dimensions_included_flag) {
    unsigned int(16) 3d_region_id;
    3DPoint anchor;
    if (dimensions_included_flag) {
        CuboidRegionStruct( );
    }
}
```

The 3d_region_id field may indicate an identifier of the 3D region.

The 3DPoint anchor field may indicate x, y, and z coordinate values of an anchor point of the 3D region. For example, when the 3D region is the cuboid type, the anchor point may be an origin of the cuboid. In this case, the 3D Point anchor field may indicate x, y, and z coordinate values of an origin position of the cuboid of the 3D region.

The dimensions_included_flag field may indicate whether dimensions of a spatial region are signaled.

The dimensions_included_flag field indicates whether CuboidRegionStruct( ) is included in corresponding 3D region information.

The CuboidRegionStruct( ) may include a difference value on x, y, and z axes when the 3D region is a cuboid.

2D Region Information Structure

According to embodiments, 2D region information (2DRegionInfoStruct) may include 2D region information for a partial region of a 3D spatial region.

According to embodiments, the syntax of 2DRegionInfoStruct( ) may be defined as follows.

```
aligned(8) class 2DRegionInfoStruct(2d_dimension_included_flag) {
    unsigned int(8) 2d_region_type;
    unsigned int(16) 2d_region_id;
    if(2d_dimension_included_flag){
        unsigned int(16) 2d_region_top;
        unsigned int(16) 2d_region_left;
        unsigned int(16) 2d_region_width;
        unsigned int(16) 2d_region_height;
    }
}
```

The 2d_region_type field may indicate the type of a 2D region. That is, the 2d_region_type field may represent whether the type of the 2D region, for example, the 2D region indicates a rectangle or whether the 2D region indicates a video tile (or a tile group) or an identifier of an atlas tile (or a tile group) in an atlas frame.

The 2d_region_id field may indicate an identifier of the 2D region. In some cases, the 2d_region_id field may be equal to an identifier of a video tile (or tile group) or an identifier of an atlas tile (or tile group) in an atlas frame.

The 2d_dimension_included_flag field may indicate whether a horizontal coordinate, vertical coordinate, width, and height values of the 2D region are included in corresponding 2D region information.

The 2d_region_top field, and the 2d_region_left field may indicate a vertical coordinate value and a horizontal coordinate value in a frame at the top-left position of the 2D region, respectively.

The 2d_region_width field and the 2d_region_height field may indicate a width value and a height value in a frame of the 2D region, respectively.

V-PCC 3D Region Mapping Information Structure

According to embodiments, V-PCC 3D region mapping information (VPCC3DRegionMappingInfoStruct) may include 2D region information of one or more geometry, occupancy map, attribute video, or atlas frames in which associated data is included in a 3D region of point cloud data and in a video or atlas frame. According to embodiments, VPCC3DRegionMappingInfoStruct may include an identifier of a track group including 3D region data (the track group may refer to a collection of tracks including data of the same 3D region).

According to embodiments, the syntax of VPCC3DRegionMappingInfoStruct( ) may be defined as follows.

```
aligned(8) class VPCC3DRegionMappingInfoStruct( ){
    unsigned int(16) num_3d_regions;
    for (i = 0; i < num_3d_regions; i++) {
```

-continued

```
        3DRegionInfoStruct(1);
        unsigned int(8) num_2d_regions[i];
        for (j=0; j< num_2d_regions[i]; j++){
            2DRegionInfoStruct(1);
        }
        unsigned int(8) num_track_groups[i];
        for (k=0 ; k <num_track_groups[i]; k++)
            unsigned int(32)  track_group_id;
    }
}
```

The num_3d_regions field may indicate the number of 3D regions signaled in VPCC3DRegionMappingInfoStruct( ) or included in a bounding box of the point cloud data.

VPCC3DRegionMappingInfoStruct( ) may include a first iteration statement repeated as many times as the value of the num_3d_regions field. In an embodiment, the i is initialized to 0 and incremented by 1 every time the first iteration statement is executed, and the first iteration statement is repeated until the value of i becomes the value of the num_3d_regions field.

The first iteration statement may include a 3DRegionInfoStruct(1) field, a num_2d_regions[i] field, and a num_track_groups[i] field.

3DRegionInfoStruct(1) may indicate 3D region information. For information, i.e., fields, included in 3DRegionInfoStruct(1), reference will be made to the detailed description of the above "3D region information structure" to avoid a redundant description and a description of the information will be omitted herein.

The num_2d_regions[i] field may indicate the number of 2D regions of one or more video or atlas frames including data associated with the point cloud data in the i-th 3D region.

VPCC3DRegionMappingInfoStruct( ) may include a second iteration statement repeated as many times as the value of the num_2d_regions[i] field. In an embodiment, the index j is initialized to 0 and incremented by 1 every time the second iteration statement is executed, and the second iteration statement is repeated until the value of j becomes the value of the num_2d_regions[i] field.

The second iteration statement may include 2DRegionInfoStruct(1). 2DRegionInfoStruct(1) may indicate 2D region information of a geometry, occupancy map, attribute video, or atlas frame including data associated with the point cloud data in the i-th 3D region.

For information, i.e., fields, included in 2DRegionInfoStruct(1), reference has been made to the detailed description of the above "2D region information structure" to avoid a redundant description and a description of the information will be omitted herein.

The num_track_groups[i] field may indicate the number of track groups related to the i-th 3D region.

VPCC3DRegionMappingInfoStruct( ) may include a third iteration statement repeated as many times as the value of the num_track_groups[i] field. In an embodiment, the index k is initialized to 0 and incremented by 1 every time the third iteration statement is executed, and the third iteration statement is repeated until the value of k becomes the value of the num_track_groups[i] field. The third iteration statement may include a track_group_id field.

The track_group_id field may indicate an identifier for identifying a track group corresponding to tracks carrying V-PCC components for the i-th 3D spatial region.

VPCC3DRegionMappingInfoStruct( ) may include 3DSpatialRegionStruct(1) instead of 3DRegionInfoStruct(1). For information, i.e., fields, included in 3DSpatialRegionStruct(1), reference has been made to the above detailed description of the "3D region information structure" to avoid a redundant description and a description of the information will be omitted herein.

V-PCC 3D Region Mapping Information Box Structure

According to embodiments, a V-PCC 3D region mapping information box (VPCC3DRegionMappingBox) may include 3D region information in a partial or overall 3D space of the point cloud data, an identifier of a track group including data of a corresponding 3D region (the track group may refer to a collection of tracks including data of the same 3D region), 2D region information of one or more video or atlas frames including data associated with the point cloud data in a corresponding 3D region, and information about a video tile (or tile group) or atlas tile (or tile group) associated with each 2D region. According to embodiments, VPCC3DRegionMappingBox may further include an identifier of a track group including 2D region data (the track group may refer to a collection of tracks including the same 2D region).

According to embodiments, VPCC3DRegion MappingBox may be added to a sample entry of a track in the form of a full box as follows.

```
aligned(8) class VPCC3DRegionMappingBox extends FullBox('vpsr',0,0) {
    VPCC3DRegionMappingInfoStruct( );
    unsigned int(8) num_2d_regions;
    for (j=0; j< num_2d_regions; j++) {
        unsigned int(8) 2d_region_id[j];
        unsigned int(8) num_tiles[j];
        for (k=0 ; k <num_tiles[j]; k++)
            unsigned int(32) tile_id[k];
        unsigned int(8) num_tile_groups[j];
        for (k=0 ; k <num_groups[j]; k++)
            unsigned int(32) tile_group_id[k];
        unsigned int(8) num_track_groups[j];
        for (k=0 ; k <num_track_groups[j]; k++)
            unsigned int(32)  track_group_id;
    }
}
```

VPCC3DRegionMappingInfoStruct( ) may be included in VPCC3DRegionMappingBox.

VPCC3DRegionMappingBox may further include a num_2d_regions field.

VPCC3DRegionMappingInfoStruct( ) provides information about mapping between the 3D region and the 2D region. For information, i.e., fields, included in VPCC3DRegionMappingInfoStruct( ), reference has been made to the detailed description of the above "V-PCC 3D region mapping information" to avoid a redundant description and a description of the information will be omitted.

The num_2d_regions field may indicate the number of 2D regions signaled in VPCC3DRegionMappingBox.

VPCC3DRegionMappingBox may include a first iteration statement repeated as many times as the value of the num_2d_regions field. In an embodiment, the index j is initialized to 0 and incremented by 1 every time the first iteration statement is executed, and the first iteration statement is repeated until the value of j becomes the value of the num_2d_regions field.

The first iteration statement may include a 2d_region_id[j] field, a num_tiles[j] field, a num_tile_groups[j] field, or a num_track_groups[j] field.

The 2d_region_id[j] field may indicate an identifier of the j-th 2D region of a geometry, occupancy map, attribute video, or atlas frame.

The num_tiles[j] field may indicate the number of tiles of a video frame associated with the j-th 2D region of the geometry, occupancy map, attribute video, or atlas frame.

VPCC3DRegionMappingBox may include a second iteration statement repeated as many times as the value of the num_tiles[j] field. In an embodiment, the index k is initialized to 0 and incremented by 1 every time the second iteration statement is executed, and the second iteration statement is repeated until the value of k becomes the value of the num_tiles[i] field.

The second iteration statement may include a tile_id[k] field. The tile_id[k] field may indicate an identifier of the k-th tile of the video frame or the k-th tile of the atlas frame, associated with the j-th 2D region of the geometry, occupancy map, attribute video, or atlas frame.

The num_tile_groups[j] field may indicate the number of tile groups (or tiles) of a video frame associated with the j-th 2D region of the geometry, occupancy map, attribute video, or atlas frame.

VPCC3DRegionMappingBox may include a third iteration statement repeated as many times as the value of the num_tile_groups[j] field. In an embodiment, the index k is initialized to 0 and incremented by 1 every time the third iteration statement is executed, and the third iteration statement is repeated until the value of k becomes the value of the num_tile_groups[j] field.

The third iteration statement may include a tile_group_id[k] field. The tile_group_id[k] field may indicate an identifier of the k-th tile group (or time) of the video frame or the k-th tile group (or tile) of the atlas frame, associated with the j-th 2D region of the geometry, occupancy map, attribute video, or atlas frame.

The num_track_groups[j] field may indicate the number of track groups related to the j-th 2D spatial region.

VPCC3DRegionMappingBox may include a fourth iteration statement repeated as many times as the value of the num_track_groups[j] field. In an embodiment, the index k is initialized to 0 and incremented by 1 every time the fourth iteration statement is executed, and the fourth iteration statement is repeated until the value of k becomes the value of the num_track_groups[j] field.

The fourth iteration statement may include a track_group_id field.

The track_group_id field may indicate an identifier for identifying the k-th track group corresponding to tracks carrying V-PCC components for the j-th 2D region.

According to embodiments, 3D region information may be divided into static 3D region information and dynamic 3D region information. That is, the static 3D region information refers to non-varying information over time and the dynamic 3D region information refers to dynamically varying information over time.

Next, the static 3D region information and the dynamic 3D region information will be described.

Static V-PCC Spatial Region Box Structure

According to embodiments, a V-PCC spatial region box (VPCCSpatialRegionsBox) may include information about a 3D region in a partial or overall 3D space (or referred to as a spatial region) of the point cloud data, identification information of a track group including data of the 3D region, information about a tile (or tile group) associated with each 3D region, or priority information, dependency information, and hidden information about 3D regions. The track group may refer to a collection of tracks including data of the same 3D region.

According to embodiments, VPCCSpatialRegionsBox may be added to a sample entry of a track in the form of a full box.

```
aligned(8) class VPCCSpatialRegionsBox extends FullBox('vpsr',0,0) {
    unsigned int(16) num_regions;
    for (i=0; i < num_regions; i++) {
        3DSpatialRegionStruct(1);
        RegionInfoStruct( );
        unsigned int(16) num_region_tile_groups[i];
        for (k=0; k < num_region_tile_groups; k++) {
            unsigned int(16) region_tile_group_id;
        }
        unsigned int(8) num_track_groups[i];
        for (j=0; j < num_track_groups; j++) {
            unsigned int(32) track_group_id;
        }
    }
}
```

The num_regions field indicates the number of 3D regions (i.e., spatial regions) signaled in VPCCSpatialRegionsBox.

VPCCSpatialRegionsBox may include a first iteration statement repeated as many times as the value of the num_regions field. In an embodiment, the index i is initialized to 0 and incremented by 1 every time the first iteration statement is executed, and the first iteration statement is repeated until the value of i becomes the value of the num_regions field.

The first iteration statement may include 3DSpatialRegionStruct(1), RegionInfoStruct( ), a num_region_tile_groups[i] field, or a num_track_groups[i] field.

According an embodiment, 3DSpatialRegionStruct(1) includes static 3D region information. For 3D information, i.e., fields, included in 3DSpatialRegionStruct(1), reference has been made to the detailed description of the above "3D region information structure" to avoid a redundant description and a description of the information will be omitted herein.

RegionInfoStruct( ) refers to region information and will be described later in detail.

The num_region_tile_groups[i] field indicates the number of tile groups (or tiles) related to the i-th 3D regions.

The num_track_groups[i] field indicates the number of track groups related to the i-th 3D region.

VPCCSpatialRegionsBox may include a second iteration statement repeated as many times as the value of the num_region_tile_groups[i] field. In an embodiment, the index k is initialized to 0 and incremented by 1 every time the second iteration statement is executed, and the second iteration statement is repeated until the value of k becomes the value of the num_region_tile_groups[i] field.

The second iteration statement may include a region_tile_group_id field. The region_tile_group_id field may indicate an identifier of the k-th tile group (or tile) related to the i-th 3D region. According to embodiments, the value of the region_tile_group_id field may be equal to the value of an atlas tile (or tile group) ID of atlas tiles (or tile groups) included in an atlas frame.

VPCCSpatialRegionsBox may include a third iteration statement repeated as many times as the value of the num_track_groups[i] field. In an embodiment, the index j is initialized to 0 and incremented by 1 every time the third iteration statement is executed, and the third iteration statement is repeated until the value of j becomes the value of the num_track_groups[i] field.

The third iteration statement may include a track_group_id field. The track_group_id field may indicate an identifier for identifying the k-th track group corresponding to tracks carrying V-PCC components for the i-th 3D region.

VPCCSpatialRegionsBox may include 3DRegionInfoStruct(1) instead of the 3DSpatialRegionStruct(1). For 3D information, i.e., fields, included in 3DRegionInfoStruct(1), reference has been made to the detailed description of the above "3D region information structure" to avoid a redundant description and a description of the information will be omitted herein.

Dynamic V-PCC 3D Region Information

According to embodiments, upon encapsulating a V-PCC bitstream in a file, the file/segment encapsulation module of FIG. 20 or FIG. 21 may generate metadata tracks carrying metadata included in the V-PCC bitstream. According to embodiments, a metadata track may be referred to as a timed metadata track.

According to embodiments, metadata carried by timed metadata tracks may include dynamic 3D region information. According to embodiments, a timed metadata track carrying the 3D region information may be referred to as a 3D region timed metadata track.

If a V-PCC track has a timed metadata track associated with a sample entry type of 'dyvm', 3D spatial regions defined for a point cloud stream (i.e., a volumetric media stream) carried by the V-PCC track may be regarded as dynamic regions (i.e., spatial region information may dynamically change over time).

According to embodiments, the associated timed metadata track includes a 'cdsc' track reference for a V-PCC track carrying an atlas stream. The content description reference 'cdsc' links a descriptive or metadata track to content that the content description reference describes. According to embodiments, the metadata tracks may be linked to tracks that the metadata tracks describes using the 'cdsc' track reference.

According to embodiments, the syntax of a sample entry (Dynamic3DSpatialRegionSampleEntry) in the 3D region timed metadata track may be defined as follows.

```
aligned(8) class Dynamic3DSpatialRegionSampleEntry extends
MetaDataSampleEntry('dyvm') {
    VPCC3DRegionBox( );
}
```

When the 3D region information changes over time, VPCC3DRegionBox( ) may include initial 3D region information.

According to embodiments, the syntax of a sample (DynamicSpatialRegionSample) in the 3D region timed metadata track may be defined as follows. That is, this sample is a sample corresponding to a sample entry having the sample entry type of 'dyvm'.

```
aligned(8) DynamicSpatialRegionSample( ) {
    unsigned int(16) num_regions;
    for (i=0; i < num_regions; i++) {
        3DSpatialRegionStruct(dimensions_included_flag);
        RegionInfoStruct( );
    }
}
```

The num_regions field may indicate the number of 3D regions (i.e., spatial regions) signaled in the sample.

The sample may include an iteration statement repeated as many times as the value of the num_regions field. In an embodiment, the index i is initialized to 0 and incremented by 1 every time the iteration statement is executed, and the iteration statement is repeated until the value of i becomes the value of the num_regions field.

The iteration statement may include 3DSpatialRegionStruct(dimensions_included_flag) and RegionInfoStruct( ).

According to an embodiment, 3DSpatialRegionStruct(dimensions_included_flag) includes 3D region information that dynamically varies over time. For 3D region information, i.e., fields, included in 3DSpatialRegionStruct(dimensions_included_flag), reference has been made to the detailed description of the above "3D region information structure" to avoid a redundant description and a description of the information will be omitted herein.

The dimensions_included_flag field may indicate whether dimensions of a 3D region (i.e., spatial region) are signaled.

If dimensions_included_flag is set to 0, this implies that the dimensions of the region have been previously signaled in a previous instance of a 3DSpatialRegionStruct with 3d_region_id of the same value, either in a previous sample or in the sample entry.

RegionInfoStruct( ) is referred to as region information and will be described below in detail.

Region Information Structure (RegionInfoStruct( ))

According to embodiments, RegionInfoStruct( ) may include priority information, dependency information, and hidden information about 3D regions.

According to embodiments, RegionInfoStruct( ) may be defined as follows.

```
aligned(8) class RegionInfoStruct( ) {
    unsigned int(4) priority;
    unsigned int(8) numOfDependencies;
    bool(1) hidden;
    for (i=0; i < numOfDependencies; i++) {
        unsigned int(8) dependency_id;
    }
    //Additional Fields
}
```

The priority field may indicate a priority value of an object associated with a corresponding 3D region. According to embodiments, the lower the priority value, the higher the priority.

The hidden field may indicate that a corresponding 3D region is hidden.

The numOfDependencies field specifies the number of 3D spatial regions that have dependency.

RegionInfoStruct( ) includes as many dependency_id fields as the value of the numOfDependencies field.

The dependency_id field indicates identification information of the 3D spatial region (i.e., 3d_region_id) that has dependency.

According to embodiments, RegionInfoStruct( ) may also be included in the above-described V-PCC 3D region mapping information box (VPCC3DRegionMappingBox).

sample entry of a V-PCC track or a V-PCC elementary stream track.

According to embodiments, the syntax of a sample entry (VPCCSampleEntry( )) having a sample entry type of 'vpc1' of a V-PCC track or a V-PCC elementary stream track may be defined as follows.

```
aligned(8) class VPCCSampleEntry( ) extends VolumetricVisualSampleEntry ('vpc1') {
    VPCCConfigurationBox config;
    VPCCUnitHeaderBox unit_header;
    VPCC3DRegionMappingBox 3d_region_mapping;
}
```

In this way, the region information (RegionInfoStruct( )) may be included in a sample entry of a file format. In an embodiment, when a corresponding spatial region is a static spatial region, RegionInfoStruct( )) may be included in the V-PCC spatial region box (VPCCSpatialRegionBox) and, when the corresponding spatial region is a dynamic spatial region, RegionInfoStruct( )) may be included in a sample (DynamicSpatialRegionSample) of a separate timed metadata track. According to another embodiment, when the corresponding spatial region is the static spatial region, RegionInfoStruct( ) may be included in VPCC3DRegionMappingBox and, when the corresponding spatial region is the dynamic spatial region, RegionInfoStruct( ) may be included in DynamicSpatialRegionSample of the separate timed metadata track.

RegionInfoStruct( ) may signal information for identifying a priority, dependency, and/or hidden state of spatial regions.

According to embodiments, the priority information included in RegionInfoStruct( ) may be rendering priority information about spatial regions and the point cloud reception device may determine whether to display a corresponding spatial region on a display device based on this priority information.

According to embodiments, the dependency information included in RegionInfoStruct( ) may be rendering dependency information about spatial regions and the point cloud reception device may determine whether to display associated spatial regions on the display device based on the dependency information.

According to embodiments, the hidden information included in RegionInfoStruct( ) may be used when the point cloud reception device determines whether to display a corresponding spatial region on the display device.

According to embodiments, 3D region mapping information may be divided into static 3D region mapping information and dynamic 3D region mapping information. That is, the static 3D region mapping information refers to information that is invariant over time and the dynamic 3D region mapping information refers to information that dynamically varies over time.

Next, the static 3D region mapping information and the dynamic 3D region mapping information will be described.

Static V-PCC 3D Region Mapping Information

When 2D region information of one or more video or atlas frames in which associated data is included in a 3D region of point cloud data and in a video or atlas frame and information about a video or atlas tile (or tile group) associated with each 2D region are invariable in a point cloud sequence, VPCC3DRegionMappingBox (i.e., static 3D region mapping information) may be included in a According to embodiments, the sample entry having the sample entry type of 'vpc1' may include VPCCConfigurationBox, VPCCUnitHeaderBox, and/or VPCC3DRegionMappingBox.

All ASPSs, AFPSs, frame parameter sets, or V-PCC parameter sets may be signaled in VPCCConfigurationBox.

Information of a V-PCC unit header of a V-PCC unit included in a sample stream V-PCC unit may be signaled in VPCCUnitHeaderBox.

2D region information of an atlas frame signaled in VPCC3DRegionMappingBox may be 2D region information of an atlas frame included in a sample in a V-PCC track.

2D region information of a video (geometry attribute, or occupancy) frame signaled in VPCC3DRegionMappingBox may be 2D region information of a video frame referenced through a track reference of a V-PCC track.

According to embodiments, a syntax of a sample entry (VPCCSampleEntry( )) having a sample entry type of 'vpe1' of a V-PCC track or a V-PCC elementary stream track may be defined as follows.

```
aligned(8) class VPCCElementaryStreamSampleEntry( ) extends
VolumetricVisualSampleEntry ('vpe1') {
    VPCCConfigurationBox config;
    VPCC3DRegionMappingBox 3d_region_mapping;
}
```

According to embodiments, the sample entry having the sample entry type of 'vpe1' may include VPCCConfigurationBox and VPCC3DRegionMappingBox.

According to embodiments, if the sample entry type is 'vpe1', an ASPS, an AFPS, and a V-PCC parameter set may be signaled in VPCCConfigurationBox of a sample entry or may be signaled in a sample of a corresponding track.

According to embodiments, the 2D region information of the video (geometry, attribute, or occupancy) frame or the atlas frame signaled in VPCC3DRegionMappingBox may be 2D region information of the video or atlas frame included in a sub-sample in a V-PCC elementary stream track.

Dynamic V-PCC 3D Region Mapping Information

According to embodiments, upon encapsulating a V-PCC bitstream in a file, the file/segment encapsulation module of FIG. 20 or FIG. 21 may generate metadata tracks carrying metadata included in the V-PCC bitstream. According to embodiments, the metadata track may be referred to as a timed metadata track.

According to embodiments, the metadata carried by the timed metadata tracks may include dynamic 3D region mapping information. According to embodiments, the timed metadata track carrying the 3D region mapping information may be referred to as a 3D region mapping timed metadata track.

If the V-PCC track has a timed metadata track associated with the sample entry type 'dysr', 3D spatial regions defined for point cloud stream carried by the V-PCC track may be considered to be dynamic regions (i.e., spatial region information may dynamically vary over time).

According to embodiments, the associated timed metadata track includes a 'cdsc' track reference for the V-PCC track carrying the atlas stream. The content description reference 'cdsc' links a descriptive or metadata track to content that the content description reference describes. According to embodiments, the metadata tracks may be linked to tracks that the 'cdsc' track reference describes using the 'cdsc' track reference.

According to embodiments, the 2D region information of the atlas frame signaled in VPCC3DRegionMappingBox may be 2D region information of the atlas frame included in a sample in the V-PCC track.

According to embodiments, 2D region information of a video (geometry, attribute, or occupancy) frame signaled in VPCC3DRegionMappingBox may be 2D region information of the video frame included in a sample in a video track (geometry, attribute, or occupancy) referenced through the track reference of the V-PCC track.

If a V-PCC elementary stream track has a timed metadata track associated with the sample entry type 'dysr', 3D spatial regions defined for the point cloud stream carried by the V-PCC elementary stream track may be considered to be dynamic regions (i.e., spatial region information may dynamically vary over time).

According to embodiments, the associated timed metadata track includes the 'cdsc' track reference for the V-PCC elementary stream track.

According to embodiments, the 2D region information of a video (geometry, attribute, or occupancy) frame or an atlas frame signaled in VPCC3DRegionMappingBox may be 2D region information of the video or atlas frame included in a subsample in the V-PCC elementary stream track.

According to embodiments, the syntax of a sample entry (Dynamic3DSpatialRegionSampleEntry) in a 3D region mapping timed metadata track may be defined as follows.

```
aligned(8) class Dynamic3DSpatialRegionSampleEntry extends
    MetaDataSampleEntry('dysr') {
        VPCC3DRegionMappingBox init_3d_region_mapping;
}
``` init_3d_region_mapping may include mapping information for an initial 3D region when mapping information for a 3D region varies over time.

According to embodiments, the syntax of a sample (DynamicSpatialRegionSample) in the 3D region mapping timed metadata track may be defined as follows. That is, this sample is a sample corresponding to a sample entry having the sample entry type of 'dysr'.

```
aligned(8) DynamicSpatialRegionSample( ) {
    VPCC3DRegionMappingBox 3d_region_mapping;
}
```

3d_region_mapping includes 3D region mapping information that dynamically changes over time.

Point Cloud Bounding Box Information

According to embodiments, VPCCBoundingInformationBox may be included in a sample entry of a V-PCC track or a V-PCC elementary stream track.

If VPCCBoundingInformationBox is included in the sample entry of the V-PCC track or the V-PCC elementary stream track, VPCCBoundingInformationBox provides overall bounding box information of associated or carried point cloud data.

According to embodiments, VPCCBoundingInformationBox may be added to the sample entry of the V-PCC track or the V-PCC elementary stream track in the form of a full box as follows.

```
aligned(8) class VPCCBoundingInformationBox extends FullBox('vpbb',0,0) {
    3DBoundingBoxInfoStruct( );
}
```

For detailed information, i.e., fields, included in 3DBoundingBoxInfoStruct( ), reference has been made to the detailed description of the above "3D bounding box information structure" to avoid redundant description and a description of the information will be omitted herein.

If the V-PCC track has an associated timed metadata track having a sample entry type of 'dybb', the timed metadata track provides 3D bounding box information of point cloud data that dynamically varies. That is, metadata carried by timed metadata tracks may include dynamic 3D bounding box information. According to embodiments, a timed metadata track carrying 3D bounding box information may be referred to as a 3D bounding box timed metadata track.

According to embodiments, the associated timed metadata track includes a 'cdsc' track reference for a V-PCC track carrying an atlas stream. The content description reference 'cdsc' links a descriptive or metadata track to content that the content description reference 'cdsc' describes. According to embodiments, the metadata tracks may be linked to tracks that the 'cdsc' track reference metadata tracks describe using the 'cdsc' track reference.

According to embodiments, the syntax of a sample entry (Dynamic3DBoundingBoxSampleEntry) in the 3D bounding box timed metadata track may be defined as follows.

```
aligned(8) class Dynamic3DBoundingBoxSampleEntry extends
    MetaDataSampleEntry('dybb') {
        VPCCBoundingInformationBox all_bb;
}
``` all_bb provides the overall 3D bounding box information, including x, y, and z coordinates of an origin position and the extension of the overall 3D bounding box of point cloud data in Cartesian coordinates along the x, y, and z axes, respectively, relative to the origin.

A 3D bounding box carried by samples in this track is a spatial part of this overall 3D bounding box.

According to embodiments, the syntax of a sample (Dynamic3DBoundingBoxSample) in the 3D bounding box timed metadata track may be defined as follows. That is, this sample is a sample corresponding to a sample entry having the sample entry type of 'dybb'.

```
aligned(8) Dynamic3DBoundingBoxSample( ) {
    VPCCBoundingInformationBox 3dBB;
}
```

3dBB includes 3D bounding box information that dynamically varies over time.

Next, carriage of non-timed V-PCC data will be described.

Figure 49:
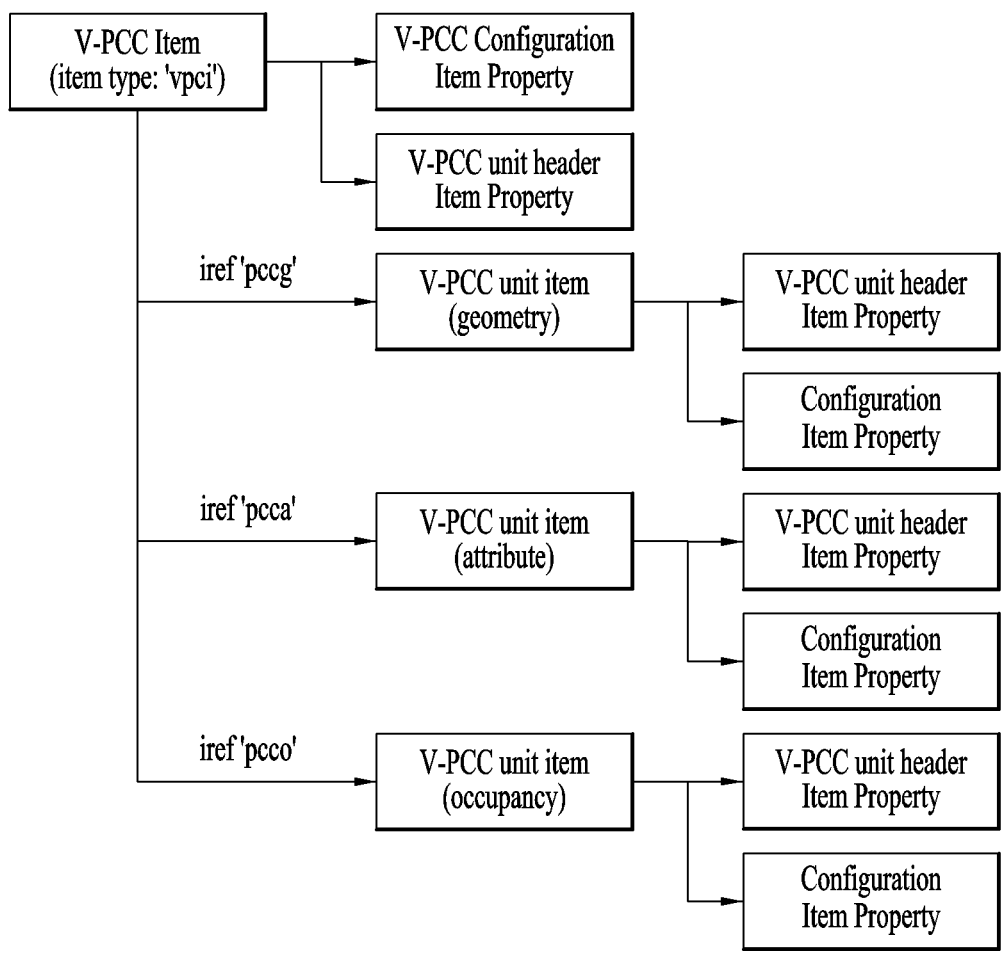
FIG. 49 illustrates an exemplary structure of encapsulating non-timed V-PCC data according to embodiments.

FIG. 49 illustrates an exemplary structure of encapsulating non-timed V-PCC data according to embodiments.

The non-timed V-PCC data according to embodiments may be stored in a file as image items.

According to embodiments, a new handler type 4CC code 'vpcc' is defined and stored in HandlerBox of MetaBox. This serves to indicate whether V-PCC items, V-PCC unit items, or other V-PCC encoded content representation information is present.

A V-PCC item according to embodiments is an item which represents an independently decodable V-PCC access unit.

According to embodiments, a 4CC code 'vpci' of a new item type is defined to identify the V-PCC items. According to embodiments, the V-PCC items may store V-PCC unit payload(s) of an atlas sub-bitstream.

If PrimaryItemBox is present, item_id in this box is configured to indicate the V-PCC item.

The V-PCC unit item according to embodiments is an item which represents V-PCC unit data. According to embodiments, V-PCC unit items may store V-PCC unit payload(s) of occupancy, geometry, and attribute video data units.

The V-PCC unit item according to embodiments stores only one V-PCC access unit related data.

According to embodiments, an item type 4CC code for the V-PCC unit item is set depending on a codec used to encode corresponding video data units.

According to embodiments, the V-PCC unit item may be associated with a corresponding V-PCC unit header item property and a codec specific configuration item property.

According to embodiments, the V-PCC unit items are marked as hidden items, since it is not meaningful to display the V-PCC unit items independently.

According to embodiments, in order to indicate the relationship between the V-PCC items and the V-PCC units, three 4CC codes 'pcco', 'pccg', and 'pcca', which are new item reference types, are defined as follows. An item reference according to embodiments is defined "from" a V-PCC item "to" related V-PCC unit items.

The 4CC codes of the item reference types according to embodiments are as follows.

In the 'pcco' type, the referenced V-PCC unit item(s) include occupancy video data units.

In the 'pccg' type, the referenced V-PCC unit item(s) include geometry video data units.

In the 'pcca' type, the referenced V-PCC unit item(s) include attribute video data units.

Next, V-PCC-related item properties will be described.

According to embodiments, descriptive item properties are defined to carry V-PCC parameter set information and V-PCC unit header information, respectively.

A syntax structure of a V-PCC configuration item property is described below.

Box Types: 'vpcp'
Property type: Descriptive item property
Container: ItemPropertyContainerBox
Mandatory (per item): Yes, for a V-PCC item of type 'vpci'
Quantity (per item): One or more for a V-PCC item of type 'vpci'

According to embodiments, V-PCC parameter sets are stored as descriptive item properties and are associated with the V-PCC items.

According to embodiments, essential is set to 1 for an item property 'vpcp'.

According to embodiments, the syntax of a V-PCC unit payload structure (vpcc_unit_payload_struct) may be defined as follows.

```
aligned(8) class vpcc_unit_payload_struct ( ) {
    unsigned int(16) vpcc_unit_payload_size;
    vpcc_unit_payload( );
}
```

According to embodiments, the V-PCC unit payload structure (vpcc_unit_payload_struct) may include a V-PCC unit payload size (vpcc_unit_payload_size) and a V-PCC unit payload (vpcc_unit_payload( ).

vpcc_unit_payload_size indicates the size of vpcc_unit_payload( ) in bytes.

According to embodiments, a syntax of a V-PCC configuration property (VPCCConfigurationProperty) may be defined as follows.

```
aligned(8) class VPCCConfigurationProperty extends ItemProperty('vpcc') {
    vpccunit_payload_struct( )[ ];
}
```

According to embodiments, VPCCConfigurationProperty may include a V-PCC unit payload structure (vpcc_unit_payload_struct). A syntax structure of a V-PCC unit header item property is described below.

Box Types: 'vunt'
Property type: Descriptive item property
Container: ItemPropertyContainerBox
Mandatory (per item): Yes, for a V-PCC item of type 'vpci' and for a V-PCC unit item
Quantity (per item): One According to embodiments, a V-PCC unit header is stored as descriptive item properties and is associated with the V-PCC items and the V-PCC unit items.

According to embodiments, essential is set to 1 for an item property of 'vunt'.

According to embodiments, the syntax of a V-PCC unit header property (VPCCUnitHeaderProperty) may be defined as follows.

```
aligned(8) class VPCCUnitHeaderProperty ( )
    extends ItemFullProperty('vunt', version=0, 0) {
    vpcc_unit_header( );
}
```

According to embodiments VPCCUnitHeaderProperty may include a V-PCC unit header (vpcc_unit_header( )).

A V-PCC 3D bounding box item property is described below.

Box Types: 'v3dd'
Property type: Descriptive item property
Container: ItemPropertyContainerBox
Mandatory (per item): Yes, for a V-PCC item of type 'vpci' and for a V-PCC unit item
Quantity (per item): One According to embodiments, 3D bounding box information is stored as descriptive item properties and is associated with the V-PCC items and the V-PCC unit items.

A syntax of 3D bounding box information property (VPCC3DBoundingBoxInfoProperty( )) according to embodiments may be defined as follows.

```
aligned(8) class VPCC3DBoundingBoxInfoProperty ( ) extends ItemFullProperty('v3dd', version=0, 0) {
    3DBoundingBoxInfoStruct( );
}
```

For detailed information, i.e., fields, included in 3DBoundingBoxInfoStruct( ), reference has been made to the detailed description of the above "3D bounding box information structure" to avoid redundant description and a description of the information will be omitted herein.

A V-PCC 3D region mapping information item property is described below.

Box Types: 'dysr'
Property type: Descriptive item property
Container: ItemPropertyContainerBox
Mandatory (per item): Yes, for a V-PCC item of type 'vpci' and for a V-PCC unit item
Quantity (per item): One According to embodiments, 3D region mapping information is stored as descriptive item properties and is associated with the V-PCC items and the V-PCC unit items.

According to embodiments, the syntax of a 3D region mapping box information property (VPCC3DRegionMappingBoxInforoperty( )) may be defined as follows.

```
aligned(8) class VPCC3DRegionMappingBoxInforoperty ( ) extends ItemFullProperty('v3dd', version=0, 0) {
    VPCC3DRegionMappingInfoStruct();
}
```

For detailed information, i.e., fields, included in VPCC3DRegionMappingInfoStruct( ), reference has been made to the detailed description of the above "3D region mapping information structure" to avoid a redundant description and a description of the information will be omitted herein.

A syntax structure of a V-PCC view item property is described below.

Box Types: 'vpvi'
Property type: Descriptive item property
Container: ItemPropertyContainerBox
Mandatory (per item): Yes, for a V-PCC item of type 'vpci' and for a V-PCC unit item
Quantity (per item): One According to embodiments, V-PCC view information is stored as the descriptive item properties and is associated with the V-PCC items and the V-PCC unit items.

```
aligned(8) class VPCCViewInfoproperty ( ) extends ItemFullProperty('vpvi', version=0, 0) {
    ViewInfoStruct( );
}
```

A syntax structure of a V-PCC rendering parameter item property is described below.

Box Types: 'vprp'
Property type: Descriptive item property
Container: ItemPropertyContainerBox
Mandatory (per item): Yes, for a V-PCC item of type 'vpci' and for a V-PCC unit item
Quantity (per item): One According to embodiments, a V-PCC rendering parameter is stored as the descriptive item properties and is associated with the V-PCC items and the V-PCC unit items.

```
aligned(8) class VPCCRenderingParamsproperty ( ) extends ItemFullProperty('vprp', version=0, 0) {
    RenderingParamStruct( );
}
```

A syntax structure of a V-PCC object rendering information item property is described below.
- Box Types: 'vpri'
- Property type: Descriptive item property
- Container: ItemPropertyContainerBox
- Mandatory (per item): Yes, for a V-PCC item of type 'vpci' and for a V-PCC unit item
- Quantity (per item): One According to embodiments, V-PCC object rendering information is stored as the descriptive item properties and is associated with the V-PCC items and the V-PCC unit items.

```
aligned(8) class VPCCObjRenderingInfoproperty ( ) extends ItemFullProperty('vpri',
version=0, 0) {
    ObjectRenderingInfoStruct( );
}
```

As described so far, the point cloud data transmission device according to embodiments may provide 3D region information of V-PCC content for supporting partial spatial access of the V-PCC content according to a viewport of a user and provide 2D region-related metadata in a video or atlas frame, associated with the 3D region information.

The point cloud data transmission device according to embodiments may process signaling of 3D region information of a point cloud in a point cloud bitstream and process signaling of 2D region-related information in a video or atlas frame, associated with the 3D region information.

The point cloud data reception device according to embodiments may efficiently access point cloud content based on storage and signaling of 3D region information of a point cloud in a file and on storage and signaling of 2D region-related information in a video or atlas frame, associated with the 3D region information.

The point cloud data receiving device according to embodiments may provide point cloud content considering a user environment, based on 3D region information of a point cloud associated with an image item in a file and on 2D region-related information in a video or atlas frame, associated with the 3D region information.

Figure 50:
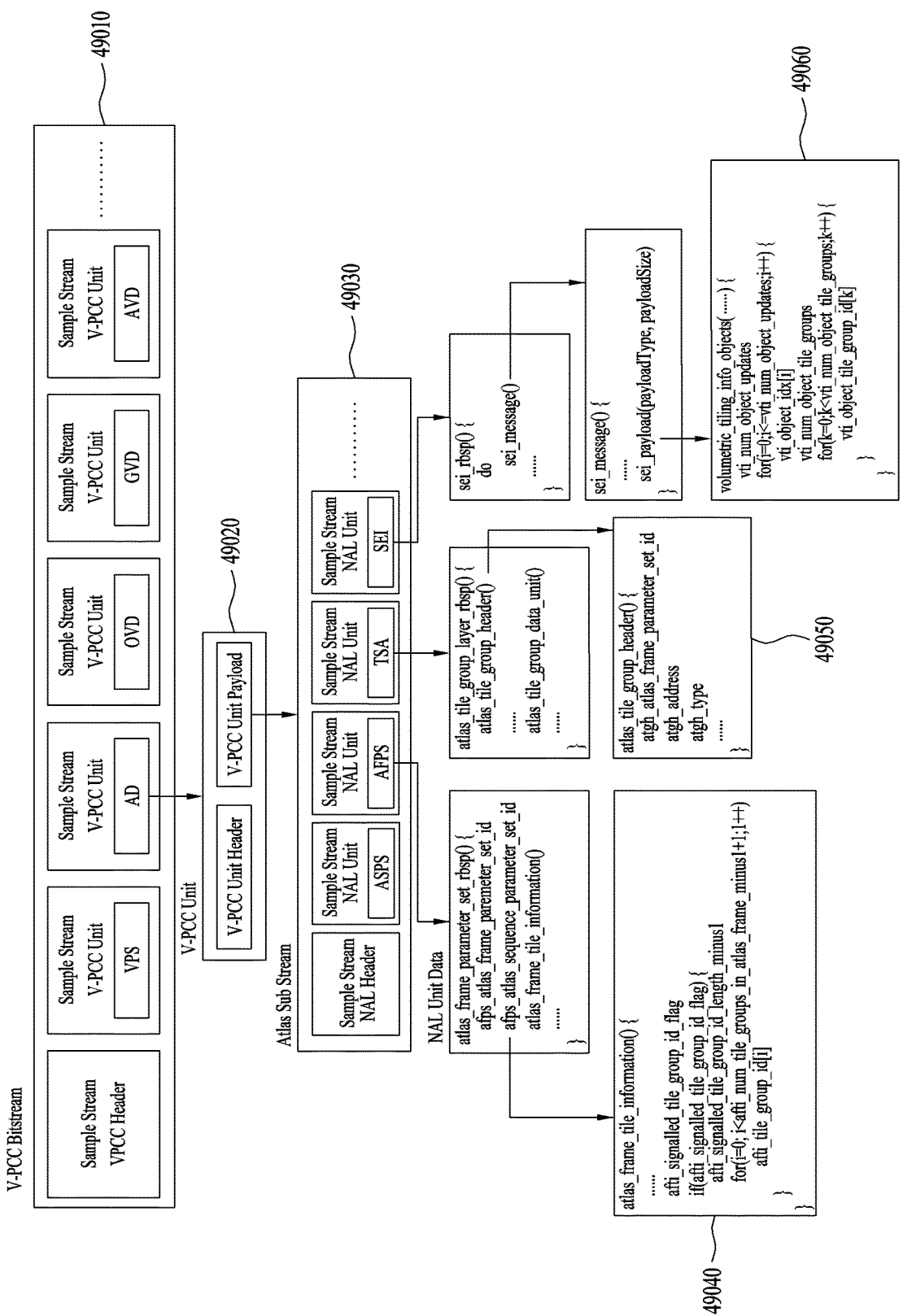
FIG. 50 illustrates an overall structure of sample stream V-PCC units according to embodiments.

FIG. 50 illustrates an exemplary overall structure of a V-PCC bitstream and exemplary bitstream-level signaling for partial access according to embodiments. In an embodiment of the present specification, signaling information at a bitstream level is generated by the point cloud pre-processing unit of FIG. 20 or FIG. 21.

In FIG. 50, for a detailed description of a V-PCC bitstream 49010, which includes a sample stream V-PCC header and one or more sample stream V-PCC units, and a V-PCC unit 49020 in each sample stream V-PCC unit, reference has been made to the description of FIG. 25. In addition, for a detailed description of an atlas subframe 49030 configured in a corresponding V-PCC unit payload when the vuh_unit_type field in the V-PCC unit header indicates atlas data (VPCC_AD), reference has been made to FIG. 34. Further, for a detailed description of atlas_frame_tile_information( ) information 49040 included in an AFPS among atlas data, reference has been made to FIG. 39 and a detailed description of volumetric_tiling_info_objectso information 49060 included in an SEI message among the atlas data, reference has been made to FIG. 45.

According to embodiments, at least one of sample stream NAL units included in the atlas subframe 49030 may include atlas tile (or tile group) information (TSA). The TSA (i.e., atlas_tile_group_layer_rbsp( ) or atlas_tile_layer_rbsp( )) may include an atlas tile (or tile group) header (atlas_tile_group_header( )) 49050 and an atlas tile (or tile group) data unit ((atlas_tile_group_data_unit)( )).

atlas_tile_group_header( ) 49050 may include an atgh_atlas_frame_parameter_set_id field, an atgh_address field, or an atgh_type field.

The atgh_atlas_frame_parameter_set_id field represents the value of an afps_atlas_frame_parameter_set_id field for an active AFPS for a current atlas tile.

The atgh_address field specifies a tile identifier (or address) related to the current tile. The atgh_address field may be expressed as an atgh_id field.

The atgh_type field may indicate a coding type of the current atlas tile (or tile group). For example, the atgh_type field may indicate whether the current atlas tile (or tile group) is an inter atlas tile (P_TILE), an intra atlas tile (I_TILE), or a skip atlas tile (SKIP_TILE).

On the other hand, in FIG. 50, an atfi_tile_group_id field of the atlas_frame_tile_information( ) information 49040 in the AFPS and the atgh_address field of atlas_tile_group_header( ) 49050 in the atlas tile (or tile group) may be mapped to each other.

That is, a specific atlas tile (or tile group) may be processed with reference to atlas_tile_group_data_unit( ) corresponding to atlas_tile_group_header( ) having the value of the atgh_address field that matches the value of the atfi_tile_group_id field of the atlas_frame_tile_information( ) information 49040 included in the AFPS. In another embodiment, a vti_num_object_tile_group_id field of volumetric_tiling_info_objects( ) 49060 in the SEI message may be mapped to the afti_tile_group_id field of the atlas_frame_tile_information( ) 49040 in the AFPS.

In addition, volumetric_tiling_info_objects( ) 49060 included in the SEI message includes 3D bounding box information and 2D bounding box information that are related to one or more objects transmitted through an atlas substream.

In this case, the atlas tile (or tile group) information may be referenced using the 2D bounding box information included in volumetric_tiling_info_objectso 49060. According to embodiments, if one or more objects are associated with one or more atlas tiles (or tile groups), reference may be made to the atlas tile (or tile group) information (e.g., vti_object_tile_group_id[k] field) associated with the objects (e.g., vti_object_idx[i] field).

In an embodiment of the present specification, file level signaling is performed in the file/segment encapsulation module of FIG. 20 or FIG. 21. That is, the file/segment encapsulation module stores one or several objects in a file by dividing the objects into one or more spatial regions or defines streaming signaling (referred to as file-level signaling). In an embodiment, the file/segment encapsulation module generates file-level signaling information (3D spatial region box, 3D bounding box information box, or 3D region mapping box) using bitstream-level signaling information (e.g., a VPS, an ASPS, an AFPS, or an SEI message).

According to embodiments, the atlas tile (or tile group) information (e.g., the region_tile_group_id field) may be signaled at the file level, in a V-PCC spatial region box (VPCCSpatialRegionsBox) structure included in a sample entry of a V-PCC track, such as the file format structure of FIG. 47, i.e., in the 'vpsr' box, based on the bitstream-level signaling information.

That is, the region_tile_group_id field represents identification information of related atlas tiles (or tile groups). For example, the region_tile_group_id field may indicate identification information of the k-th tile group (or tile) related to the i-th 3D region. According to embodiments, the value of the region_tile_group_id field may be the same as the value of an atlas tile (or tile group) ID of atlas tiles (or tile groups) included in an atlas frame (i.e., the value of the afti_tile_roup_id field of FIG. 39).

According to embodiments, a 3d_region_id field of 3D region information (3DspatialRegionStruct( )) included in VPCCSpatialRegionsBox may be mapped to a vti_object_idx[i] field of volumetric_tiling_info_objects( ) carried in the atlas substream. In this case, the point cloud reception device may be aware of the value of a num_region_tile_groups field and the region_tile_group_id field in VPCCSpatialRegionsBox that are related to the 3d_region_id field at the file level. Accordingly, the reception device may receive the atlas substream of the V-PCC track, parse atgh_address of atlas tile_group_header( ), select only atlas_tile_group_data_unit( ) matching the region_tile_group_id field, and use atlas_tile_group_data_unit( )) to reconstruct point cloud data. That is, the point cloud reception device may select and receive spatial regions at the file level.

Figure 51:
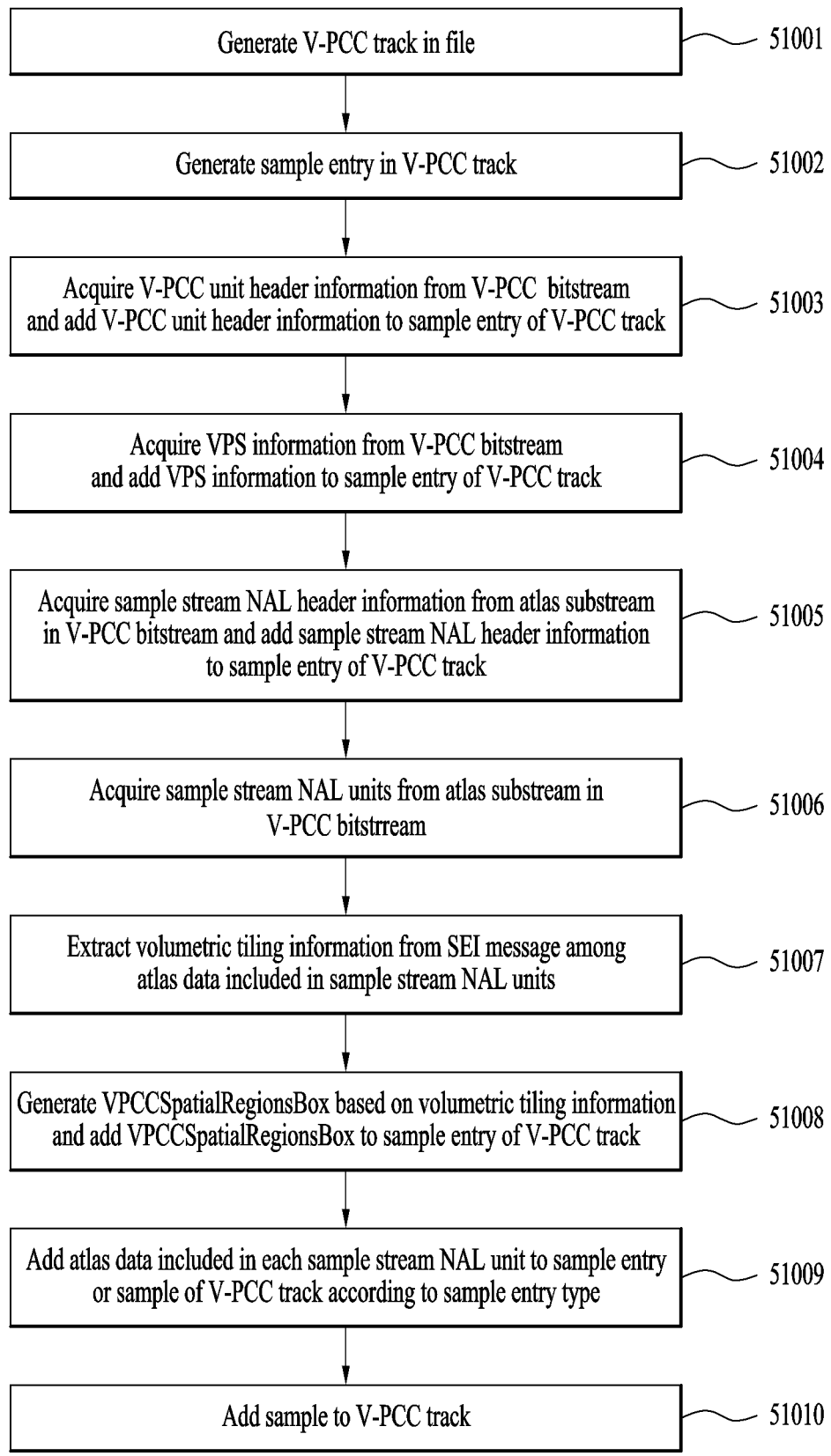
FIG. 51 is a flowchart of a file-level signaling method according to embodiments.

FIG. 51 is a flowchart of a file-level signaling method according to embodiments. In an embodiment, the signaling method of FIG. 51 is performed in the file/segment encapsulation module of FIG. 1, FIG. 20, or FIG. 21.

In an embodiment, in FIG. 51, the file/segment encapsulation module receives the structure of the V-PCC bitstream as illustrated in FIG. 25.

According to embodiments, the file/segment encapsulation module generates a V-PCC track in an ISOBMFF-based file (step 51001).

The file/segment encapsulation module generates a sample entry in the V-PCC track generated in step 51001 (step 51002). The file/segment encapsulation module acquires V-PCC unit header information from the V-PCC bitstream and adds the V-PCC unit header information to a sample entry of the V-PCC track (step 51003). The file/segment encapsulation module acquires VPS information from the V-PCC bitstream and adds the VPS information to the sample entry of the V-PCC track (step 51004). The file/segment encapsulation module acquires a sample stream NAL header from an atlas substream in the V-PCC bitstream and adds the sample stream NAL header to the sample entry of the V-PCC track (step 51005).

The file/segment encapsulation module acquires sample stream NAL units from the atlas substream (step 51006). The sample stream NAL units may include a sample stream NAL unit including an ASPS, a sample stream NAL unit including an AFPS, one or more sample stream NAL units including one or more atlas tile (or tile group) information, and/or one or more sample stream NAL units including one or more SEI messages.

The file/segment encapsulation module extracts volumetric tiling information from the one or more sample stream NAL units including the one or more SEI messages among the sample stream NAL units (step 51007).

In an embodiment, the volumetric tiling information is included in the SEI message. According to embodiments, the volumetric tiling information includes identification information (i.e., vti_object_idx[i] field) of each spatial region, 3D bounding box information, 2D bounding box information, and identification information (i.e., vti_num_object_tile_group_id field) of one or more atlas tiles (or tile groups) related to the vti_object_idx[i] field, as illustrated in FIGS. 43 to 45. In addition, the volumetric tiling information includes priority information, dependency information, and/or hidden information of each spatial region.

The file/segment encapsulation unit generates a V-PCC spatial region box (VPCCSpatialRegionsBox) structure and/or a V-PCC 3D region mapping box (VPCC3DRegionMappingBox) structure suitable for a file format using the volumetric tiling information and adds VPCCSpatialRegionsBox and/or VPCC3DRegionMappingBox to the sample entry of the V-PCC track (step 51008).

The file/segment encapsulation module identifies the ASPS, the AFPS, and SEI message included in the sample stream NAL units according to atlas NAL type information and adds the identified ASPS, AFPS, and SEI message to the sample entry or the sample of the V-PCC track (step 51009). For example, if a sample entry type is 'vpc1', all ASPSs, AFPSs, or SEI are included in the sample entry of the V-PCC track and, if the sample entry type is 'vpcg', the ASPSs, the AFPSs, or the SEI may be included in the sample entry or the sample of the V-PCC track. In an embodiment, data (e.g., atlas tile (or tile group) information (TSA)) other than the ASPS or the SEI message among atlas data may be included in a sample.

The file/segment encapsulation module adds the sample to the V-PCC track (step 51010).

Figure 52:
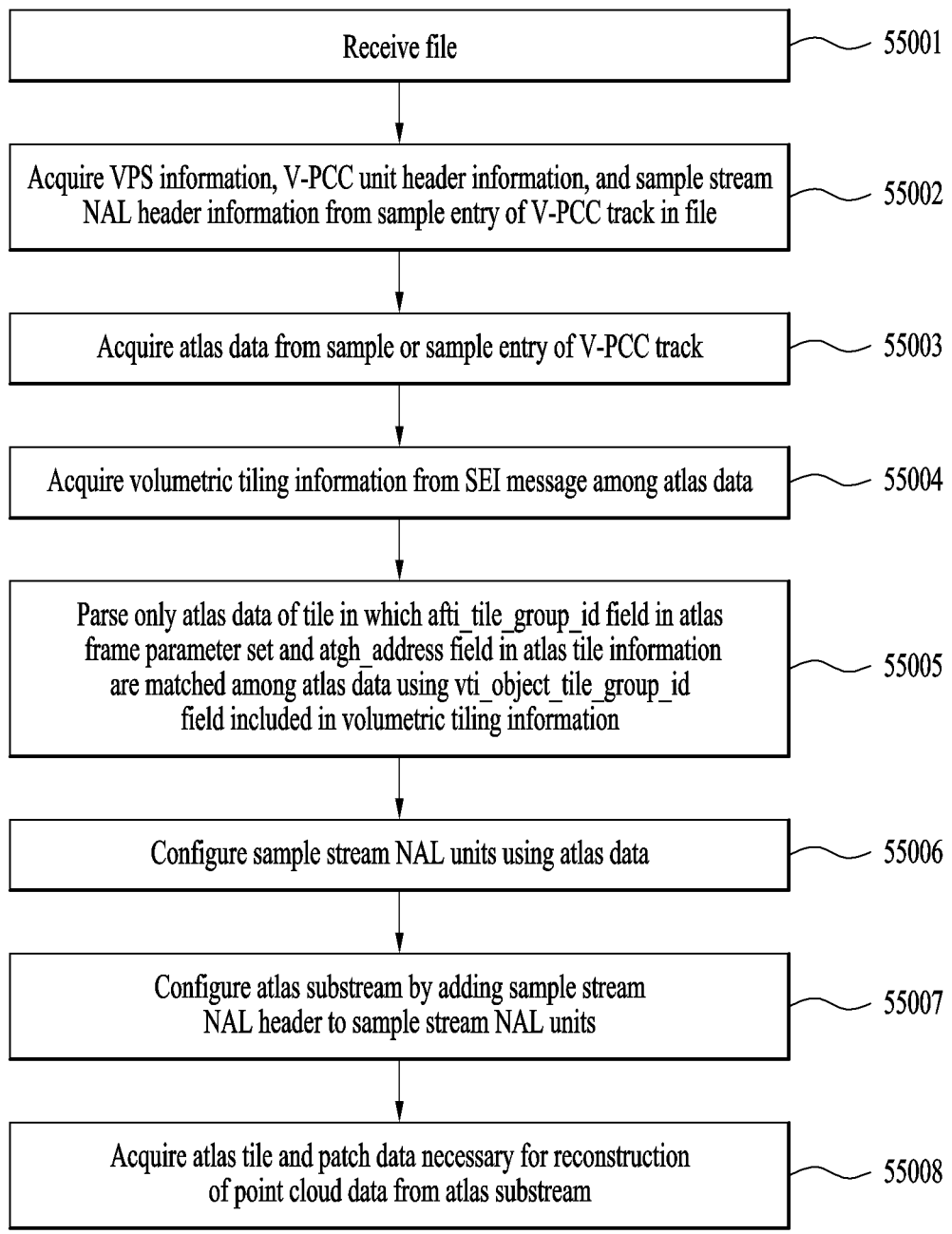
FIG. 52 is a flowchart of a signaling information acquisition method in a reception device according to embodiments.

FIG. 52 is a flowchart of a signaling information acquisition method in a reception device according to embodiments. In particular, in an embodiment of FIG. 52, the reception device receives an ISOBMFF-based file. In an embodiment, an operation of configuring a V-PCC bitstream structure by parsing signaling information stored in a V-PCC track of the received file is performed by the file/segment decapsulation module of FIG. 1, FIG. 20, or FIG. 22.

That is, the reception device receives a file (step 55001) and acquires VPS information, V-PCC unit header information, and sample stream NAL header information from a sample entry of a V-PCC track in the received file (step 55002). In this case, the acquired VPS information, V-PCC unit header information, and sample stream NAL header information may be configured in the form of a V-PCC bitstream.

The reception device acquires atlas data from a sample or a sample entry of the V-PCC track (step 55003). The atlas data includes an ASPS, an AFPS, tile (or tile group) information (TSA), and an SEI message. In an embodiment, the sample entry of the V-PCC track may include VPCCConfigurationBox, VPCCConfigurationBox may include VPCCDecoderConfigurationRecord( ), and VPCCDecoderConfigurationRecord( ) may include the VPS information, the ASPS, the AFPS, and the SEI message. In an embodiment, the sample of the V-PCC track may include tile (or tile group) information (TSA).

The reception device acquires volumetric tiling information from the atlas data obtained in step 55003 (step 55004). According to embodiments, the volumetric tiling information may be obtained from the SEI message among the atlas data.

The volumetric tiling information incudes, as illustrated in FIG. 43 to FIG. 45, identification information (i.e., vti_object_idx[i] field) of each spatial region, an afti_tile_group_id field of atlas frame tile information in the AFPS, and/or tile (or tile group) identification information (i.e., vti_object_tile_group_id field) mapped to an atgh_address field of atlas tile_group_header( ). In addition, the volumetric tiling information includes priority information, dependency information, and/or hidden information of each spatial region. Accordingly, the point cloud reception device may appropriately display each spatial region (or spatial object) on the display device in a form suitable for each information when rendering is performed later.

The reception device parses only atlas data of a tile (or tile group) in which the afti_tile_group_id field of the AFPS and the atgh_address field of atlas_tile_group_header( ) are matched among the atlas data acquired in step 55003 using the vti_object_tile_group_id field acquired in step 55004 (step 55005).

The reception device configures sample stream NAL units (i.e., sample stream NAL units having a matched atlas tile (or tile group) ID) using the atlas data parsed in step 55005 (step 55006).

The reception device configures an atlas substream for decoding the V-PCC bitstream by adding a sample stream NAL header to the sample stream NAL units configured in step 55006 (step 55007).

The reception device acquires an atlas tile (or tile group) and patch data necessary for reconstruction of point cloud data by parsing the atlas substream generated in step 55007 (step 55008).

For the V-PCC track, the sample entry, the sample, the VPS information, the V-PCC unit header information, the atlas substream, the volumetric tiling information, the V-PCC spatial region box, and the V-PCC 3D region mapping information, mentioned in FIGS. 51 and 52, reference has been made to the above detailed description and thus a detailed description thereof may refer to the above description.

Figure 53:
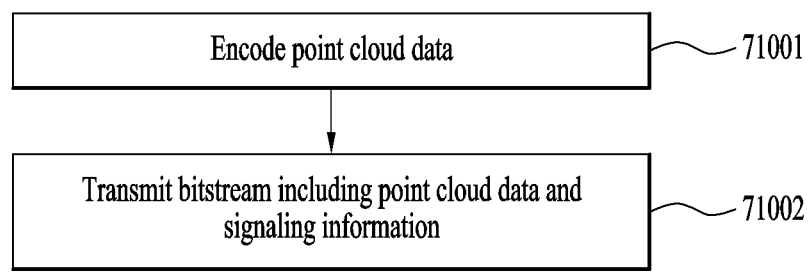
FIG. 53 is a flowchart of a point cloud data transmission method according to embodiments.

FIG. 53 illustrates an exemplary point cloud data transmission method according to embodiments.

The point cloud data transmission method according to embodiments may include encoding point cloud data (71001) and/or transmitting a bitstream including point cloud data and signaling information (71002).

In step 71001 according to embodiments, all or part of the point cloud data may be encoded. According to embodiments, the transmission device 10000 and/or the point cloud video encoder 10002 of FIG. 1 may perform encoding. According to embodiments, the point cloud data as illustrated in FIG. 3 may be encoded. According to embodiments, the point cloud data may be encoded by the V-PCC encoding process of FIG. 4. The point cloud data may be encoded based on the method as in FIGS. 5 to 14. In addition, the point cloud data may be encoded by the encoder of FIG. 15.

For example, in step 71001, the point cloud data of an overall spatial region or only the point cloud data of a specific spatial region may be encoded based on signaling information at a bitstream level and/or signaling information at a file level. According to embodiments, the bitstream-level signaling information may be generated by the point cloud pre-processing unit 20001 of FIG. 20 or 21, and the file-level signaling information may be generated by the file/segment encapsulation module or unit 20004 or 21009 of FIG. 20 or 21. Since the bitstream-level signaling information and the file-level signaling information have been sufficiently described above, a detailed description thereof will be omitted herein.

In step 71002 according to embodiments, the point cloud data or the bitstream including the point cloud data and the signaling information may be transmitted. According to embodiments, a V-PCC bitstream including the point cloud data may be transmitted by the transmitter 10004 of FIG. 1, the transmitter 18008 of FIG. 18, the delivery of FIG. 20, or the delivery of FIG. 21. The point cloud data (or V-PCC bitstream including point cloud data) may be transmitted after being encapsulated in the form of a file/segment by the file/segment encapsulation module 10003. Furthermore, the point cloud data may be provided to a user by being combined with various devices through the network of FIG. 23.

According to embodiments, the bitstream-level signaling information may be included in the V-PCC bitstream, and the file-level signaling information may be stored in a single track or multiple tracks of a file.

In step 71002 according to embodiments, all or part of the point cloud data may be encapsulated in the file/segment. For example, in step 71002, the point cloud data of the overall spatial region or only the point cloud data of a specific spatial region may be encapsulated in the file/segment based on the bitstream-level signaling information and/or the file-level signaling information.

The point cloud data transmission method/device according to embodiments may be combined with all/some of the above-described embodiments to provide point cloud content.

Figure 54:
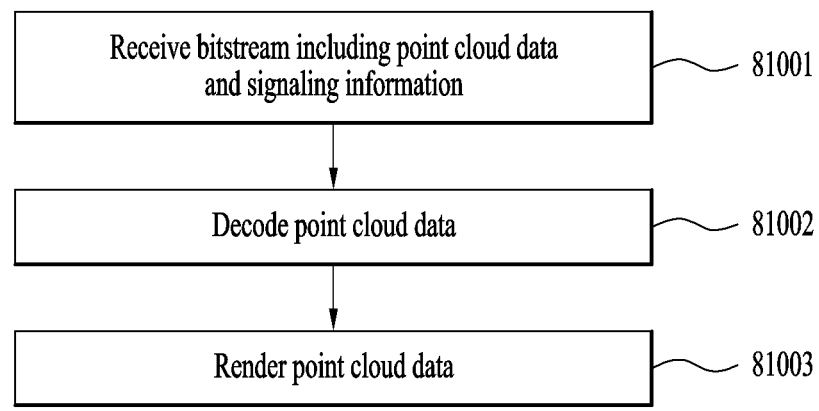
FIG. 54 is a flowchart of a point cloud data reception method according to embodiments.

FIG. 54 illustrates an exemplary point cloud data reception method according to embodiments.

The point cloud data reception method according to embodiments includes receiving a bitstream including point cloud data and signaling information (81001), decoding the point cloud data (81002), and/or rendering the point cloud data (81003).

In step 81001 according to embodiments, part or all of a V-PCC bitstream including the point cloud data may be received. In the point cloud data reception method, the V-PCC bitstream including the point cloud data may be received in the form of a file/segment. The receiver 10006 of FIG. 1, the receiver of FIG. 19, the delivery of FIG. 20, or the delivery of FIG. 22 may receive the V-PCC bitstream (or the file/segment including the V-PCC bitstream). The file/segment decapsulation module of FIG. 1, FIG. 20, or FIG. 22 may decapsulate the point cloud data of a file/segment format.

In step 81001 according to embodiments, a file including all or part of the point cloud data may be decapsulated based on signaling information at a bitstream level and/or signaling information at a file level. For example, in step 81001, a file including point cloud data of the overall spatial region or a file including point cloud data of a specific spatial region may be decapsulated based on the bitstream-level signaling information and/or the file-level signaling information. Since the bitstream-level signaling information and the file-level signaling information have been sufficiently described above, a detailed description thereof will be omitted herein.

In step 81002 according to embodiments, the point cloud data is decoded. In step 81002 according to embodiments, all or part of the point cloud data may be decoded based on the bitstream-level signaling information and/or the file-level signaling information. For example, in step 81002, the point cloud data of the overall spatial region or the point cloud data of the specific spatial region may be decoded based on the bitstream-level signaling information and/or the file-level signaling information. According to embodiments, all or part of the point cloud data may be decoded by the point cloud video decoder of FIG. 1, 16, 18, 20 or 22. As illustrated in FIG. 23, the point cloud data may be provided to a user through various devices/environments connected through a network.

In step 81003 according to embodiments, the point cloud data is rendered/displayed. In step 81003 according to embodiments, all or part of the point cloud data may be rendered/displayed based on the bitstream-level signaling information and/or the file-level signaling information. For example, in step 81003, the point cloud data of the overall spatial region or the point cloud data of the specific spatial region may be rendered/displayed based on the bitstream-level signaling information and/or the file-level signaling information. The user may view an overall or partial region of the rendered result through a VR/AR display or a general display.

In step 81003 according to embodiments, the point cloud data may be rendered by the renderer 10009 of FIG. 1, the point cloud renderer 19007 of FIG. 19, the renderer 2001 of FIG. 20, or the point cloud renderer 22004 of FIG. 22.

The point cloud data reception method/device according to embodiments may be combined with all/some of the above-described embodiments to provide the point cloud content.

A point cloud data transmission method, a point cloud data transmission device, a point cloud data reception method, and a point cloud data reception device according to embodiments may provide a good-quality point cloud service.

A point cloud data transmission method, a point cloud data transmission device, a point cloud data reception method, and a point cloud data reception device according to embodiments may achieve various video codec methods.

A point cloud data transmission method, a point cloud data transmission device, a point cloud data reception method, and a point cloud data reception device according to embodiments may provide universal point cloud content such as an autonomous driving service.

With a point cloud data transmission method, a point cloud data transmission device, a point cloud data reception method, and a point cloud data reception device according to embodiments, a V-PCC bitstream may be configured, and a file may be transmitted and received and stored. Thereby, an optimal point cloud content service may be provided.

With a point cloud data transmission method, a point cloud data transmission device, a point cloud data reception method, and a point cloud data reception device according to embodiments, metadata for data processing and rendering in a V-PCC bitstream may be transmitted and received in the V-PCC bitstream. Thereby, an optimal point cloud content service may be provided.

With a point cloud data transmission method, a point cloud data transmission device, a point cloud data reception method, and a point cloud data reception device according to embodiments, a player or the like may enable a spatial or partial access of a point cloud object/content according to a user viewport. Accordingly, point cloud bitstreams may be efficiently accessed and processed according to the user viewport.

With a point cloud data transmission method, a point cloud data transmission device, a point cloud data reception method, and a point cloud data reception device according to embodiments, a bounding box for partial access and/or spatial access to point cloud content and signaling information therefor may be provided. Accordingly, the point cloud content may be accessed in various ways on the receiving side in consideration of the player environment or user environment.

A point cloud data transmission method and transmission device according to embodiments may provide 3D region information about the point cloud content and 2D region related metadata in a video or atlas frame associated therewith to support spatial/partial access to the point cloud content according to a user viewport.

A point cloud data transmission method and transmission device according to embodiments may process signaling of 3D region information about a point cloud in a point cloud bitstream and 2D region related metadata in a video or atlas frame associated therewith.

With a point cloud data reception method and reception device according to embodiments, point cloud content may be efficiently accessed based on storage and signaling of 3D region information about a point cloud in a point cloud bitstream and 2D region related metadata in a video or atlas frame associated therewith.

With a point cloud data reception method and reception device according to embodiments, point cloud content may be provided in consideration of a user environment based on 3D region information about a point cloud associated with an image item in a file and 2D region related information in a video or atlas frame associated therewith.

The point cloud data transmission method and device and the point cloud data reception method and device according to embodiments process point cloud data by partitioning a space into a plurality of 3D spatial regions, thereby performing encoding and transmission operations at a transmission side and decoding and rendering operations at a reception side in real time and processing those operations with low latency.

The point cloud data transmission method according to embodiments encodes spatially partitioned 3D blocks (e.g., 3D spatial regions) independently or dependently, thereby enabling parallel encoding with random access in a 3D space occupied by point cloud data.

The point cloud data transmission method and device and the point cloud data reception method and device according to embodiments perform encoding and decoding of point cloud data independently or dependently in units of spatially partitioned 3D blocks (e.g., 3D spatial regions), thereby preventing errors accumulated in encoding and decoding processes.

Each part, module, or unit described above may be a software, processor, or hardware part that executes successive procedures stored in a memory (or storage unit). Each of the steps described in the above embodiments may be performed by a processor, software, or hardware parts. Each module/block/unit described in the above embodiments may operate as a processor, software, or hardware. In addition, the methods presented by the embodiments may be executed as code. This code may be written on a processor readable storage medium and thus read by a processor provided by an apparatus.

Although embodiments have been explained with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may fall within the scope of the appended claims and their equivalents.

The apparatuses and methods may not be limited by the configurations and methods of the embodiments described above. The embodiments described above may be configured by being selectively combined with one another entirely or in part to enable various modifications.

Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

It will be appreciated by those skilled in the art that various modifications and variations may be made in the embodiments without departing from the scope of the disclosures. Thus, it is intended that the present disclosure cover the modifications and variations of the embodiments provided they come within the scope of the appended claims and their equivalents.

Both apparatus and method disclosures are described in this specification and descriptions of both the apparatus and method disclosures are complementarily applicable.

In this document, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." "A, B, C" may also mean "at least one of A, B, and/or C."

Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Various elements of the apparatuses of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the apparatus according to the embodiments may include one or more processors capable of executing one or more programs. The one or more programs may perform any one or more of the operations/methods according to the embodiments or include instructions for performing the same. Executable instructions for performing the method/operations of the apparatus according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components.

As used herein, conditional expressions such as "if" and "when" are not limited to an optional case and are intended to be interpreted, when a specific condition is satisfied, to perform the related operation or interpret the related definition according to the specific condition.

Embodiments may include variations/modifications within the scope of the claims and their equivalents.

It will be apparent to those skilled in the art that various modifications and variations can be made in the present invention without departing from the spirit and scope of the invention. Thus, it is intended that the present invention cover the modifications and variations of this invention provided they come within the scope of the appended claims and their equivalents.

What is claimed is:

1. A point cloud data transmission method, the method comprising:
   encoding point cloud data;
   encapsulating a bitstream that includes the encoded point cloud data into a file; and
   transmitting the file,
   wherein the point cloud data include at least one of geometry data, attribute data, or an occupancy map data,
   wherein the bitstream is comprised of first precision information and first units,
   wherein each of the first units is comprised of first size information and a second unit,
   wherein the first precision information includes information for specifying a precision of the first size information in the first units,
   wherein the first size information includes information for specifying a size of the second unit,
   wherein the second unit is comprised of a header and a payload,
   wherein the header includes type information for indicating a type of data in the payload,
   wherein the payload includes one of the geometry data, the attribute data, the occupancy map data, or atlas data,
   wherein the atlas data is comprised of second precision information and third units,
   wherein each of the third units is composed of second size information and a fourth unit, wherein the second precision information includes information for specifying a precision of the second size information in the third units,
wherein the second size information includes information for specifying a size of the fourth unit,
wherein the fourth unit includes an atlas frame parameter set that includes first tile identification information for identifying each of one or more tiles in an atlas frame,
wherein the bitstream is stored in multiple tracks of the file,
wherein the file further includes signaling data,
wherein the signaling data include spatial region information of the point cloud data,
wherein the spatial region information includes static spatial region information that does not change over time and dynamic spatial region information that changes over time,
wherein the point cloud data are divided into one or more 3 dimension (3D) spatial regions,
wherein the static spatial region information includes region number information for identifying a number of the one or more 3D spatial regions, region identification information for identifying each 3D spatial region, information related to an anchor point for each 3D spatial region, tile number information for identifying a number of one or more tiles associated with each 3D spatial region, and second tile identification information for identifying each of the one or more tiles associated with each 3D spatial region, and
wherein a value of the first tile identification information is equal to a value of the second tile identification information.

2. The method of claim 1,
wherein the dynamic spatial region information includes region number information for identifying the number of the one or more 3D spatial regions, region identification information for identifying each 3D spatial region, and priority information and dependency information that are related to a 3D spatial region.

3. A point cloud data transmission apparatus, the apparatus comprising:
at least one processor configured to:
encode point cloud data, and
encapsulate a bitstream that includes the encoded point cloud data into a file; and
a transmitter configured to transmit the file,
wherein the point cloud data include at least one of geometry data, attribute data, or an occupancy map data,
wherein the bitstream is comprised of first precision information and first units,
wherein each of the first units is comprised of first size information and a second unit,
wherein the first precision information includes information for specifying a precision of the first size information in the first units,
wherein the first size information includes information for specifying a size of the second unit,
wherein the second unit is comprised of a header and a payload,
wherein the header includes type information for indicating a type of data in the payload,
wherein the payload includes one of the geometry data, the attribute data, the occupancy map data, or atlas data,
wherein the atlas data is comprised of second precision information and third units,
wherein each of the third units is composed of second size information and a fourth unit,
wherein the second precision information includes information for specifying a precision of the second size information in the third units,
wherein the second size information includes information for specifying a size of the fourth unit,
wherein the fourth unit includes an atlas frame parameter set that includes first tile identification information for identifying each of one or more tiles in an atlas frame,
wherein the bitstream is stored in multiple tracks of the file,
wherein the file further includes signaling data,
wherein the signaling data include spatial region information of the point cloud data,
wherein the spatial region information includes static spatial region information that does not change over time and dynamic spatial region information that changes over time,
wherein the point cloud data are divided into one or more 3 dimension (3D) spatial regions,
wherein the static spatial region information includes region number information for identifying a number of the one or more 3D spatial regions, region identification information for identifying each 3D spatial region, information related to an anchor point for each 3D spatial region, tile number information for identifying a number of one or more tiles associated with each 3D spatial region, and second tile identification information for identifying each of the one or more tiles associated with each 3D spatial region, and
wherein a value of the first tile identification information is equal to a value of the second tile identification information.

4. The apparatus of claim 3,
wherein the dynamic spatial region information includes region number information for identifying the number of the one or more 3D spatial regions, region identification information for identifying each 3D spatial region, and priority information and dependency information that are related to a 3D spatial region.

5. A point cloud data reception apparatus, the apparatus comprising:
a receiver configured to receive a file; and
at least one processor configured to:
decapsulate the file into a bitstream that includes encoded point cloud data, wherein the bitstream is stored in multiple tracks of the file, and wherein the file further includes signaling data,
decode the encoded point cloud data based on the signaling data, and
render the decoded point cloud data based on the signaling data,
wherein the point cloud data include at least one of geometry data, attribute data, or an occupancy map data,
wherein the bitstream is comprised of first precision information and first units,
wherein each of the first units is comprised of first size information and a second unit,
wherein the first precision information includes information for specifying a precision of the first size information in the first units,
wherein the first size information includes information for specifying a size of the second unit,
wherein the second unit is comprised of a header and a payload, wherein the header includes type information for indicating a type of data in the payload, wherein the payload includes one of the geometry data, the attribute data, the occupancy map data, or atlas data, wherein the atlas data is comprised of second precision information and third units, wherein each of the third units is composed of second size information and a fourth unit, wherein the second precision information includes information for specifying a precision of the second size information in the third units, wherein the second size information includes information for specifying a size of the fourth unit, wherein the fourth unit includes an atlas frame parameter set that includes first tile identification information for identifying each of one or more tiles in an atlas frame, wherein the signaling data include spatial region information of the point cloud data, wherein the spatial region information includes static spatial region information that does not change over time and dynamic spatial region information that changes over time, wherein the point cloud data are divided into one or more 3 dimension (3D) spatial regions, wherein the static spatial region information includes region number information for identifying a number of the one or more 3D spatial regions, region identification information for identifying each 3D spatial region, information related to an anchor point for each 3D spatial region, tile number information for identifying a number of one or more tiles associated with each 3D spatial region, and second tile identification information for identifying each of the one or more tiles associated with each 3D spatial region, and wherein a value of the first tile identification information is equal to a value of the second tile identification information.

6. The apparatus of claim 5,
wherein the dynamic spatial region information includes region number information for identifying the number of the one or more 3D spatial regions, region identification information for identifying each 3D spatial region, and priority information and dependency information that are related to a 3D spatial region.

7. A point cloud data reception method, the method comprising:
receiving a file;
decapsulating the file into a bitstream that includes encoded point cloud data, wherein the bitstream is stored in multiple tracks of the file, and wherein the file further includes signaling data;
decoding the encoded point cloud data based on the signaling data; and
rendering the decoded point cloud data based on the signaling data,
wherein the point cloud data include at least one of geometry data, attribute data, or an occupancy map data, wherein the bitstream is comprised of first precision information and first units, wherein each of the first units is comprised of first size information and a second unit, wherein the first precision information includes information for specifying a precision of the first size information in the first units, wherein the first size information includes information for specifying a size of the second unit, wherein the second unit is comprised of a header and a payload, wherein the header includes type information for indicating a type of data in the payload, wherein the payload includes one of the geometry data, the attribute data, the occupancy map data, or atlas data, wherein the atlas data is comprised of second precision information and third units, wherein each of the third units is composed of second size information and a fourth unit, wherein the second precision information includes information for specifying a precision of the second size information in the third units, wherein the second size information includes information for specifying a size of the fourth unit, wherein the fourth unit includes an atlas frame parameter set that includes first tile identification information for identifying each of one or more tiles in an atlas frame, wherein the signaling data include spatial region information of the point cloud data, wherein the spatial region information includes static spatial region information that does not change over time and dynamic spatial region information that changes over time, wherein the point cloud data are divided into one or more 3 dimension (3D) spatial regions, wherein the static spatial region information includes region number information for identifying a number of the one or more 3D spatial regions, region identification information for identifying each 3D spatial region, information related to an anchor point for each 3D spatial region, tile number information for identifying a number of one or more tiles associated with each 3D spatial region, and second tile identification information for identifying each of the one or more tiles associated with each 3D spatial region, and wherein a value of the first tile identification information is equal to a value of the second tile identification information.

8. The method of claim 7,
wherein the dynamic spatial region information includes region number information for identifying the number of the one or more 3D spatial regions, region identification information for identifying each 3D spatial region, and priority information and dependency information that are related to a 3D spatial region.

* * * * *